US008707857B2

(12) United States Patent
Popeil et al.

(10) Patent No.: US 8,707,857 B2
(45) Date of Patent: Apr. 29, 2014

(54) COOKING DEVICE TO DEEP FAT FRY FOODS

(76) Inventors: Ronald M. Popeil, Beverly Hills, CA (US); Alan Lester Backus, Los Angeles, CA (US); Kathryn Popeil, Newbury Park, CA (US); Lauren Popeil, Los Angeles, CA (US); Shannon Popeil-Stairs, Calabasas, CA (US)

( * ) Notice: Subject to any disclaimer, the term of this patent is extended or adjusted under 35 U.S.C. 154(b) by 1280 days.

(21) Appl. No.: 11/425,317

(22) Filed: Jun. 20, 2006

(65) Prior Publication Data

US 2007/0028781 A1    Feb. 8, 2007

Related U.S. Application Data

(63) Continuation-in-part of application No. 11/345,187, filed on Feb. 1, 2006.

(60) Provisional application No. 60/706,859, filed on Aug. 8, 2005.

(51) Int. Cl.
*A47J 37/07* (2006.01)
*A47J 37/12* (2006.01)

(52) U.S. Cl.
USPC ................ 99/340; 99/330; 99/336; 99/350; 99/355; 99/356; 99/403; 99/407; 99/408; 99/409; 99/410; 99/444

(58) Field of Classification Search
CPC . A47J 37/129; A47J 37/1266; A47J 37/1261; A47J 37/1219; A47J 37/1209; A47J 36/10; A47J 37/12

USPC .......... 99/403, 330, 356, 355, 336, 407, 409, 99/408, 410, 444; 220/573.1; 426/233; D7/354, 360

See application file for complete search history.

(56) References Cited

U.S. PATENT DOCUMENTS

| 91,899 A | 6/1869 | Beaumont |
| 92,791 A | 7/1869 | Burwell |

(Continued)

FOREIGN PATENT DOCUMENTS

| EP | 0 513 817 A2 | 11/1992 |
| GB | 668 613 A | 3/1952 |

(Continued)

OTHER PUBLICATIONS

Step by Step Instructions for Using a Pressure Cooker, Jun. 22, 2004, http://missvickie.com/workshop/stepbystep.html.*

(Continued)

*Primary Examiner* — Henry Yuen
*Assistant Examiner* — Brett Spurlock
(74) *Attorney, Agent, or Firm* — Tucker Ellis LLP

(57) ABSTRACT

A cooking device include an outer housing and a cooking cavity disposed within and separate from the outer housing. The cooking cavity accommodates a volume of cooking liquid therein. The device includes a heater positioned adjacent the cooking cavity to heat the cooking liquid. A lid is movably attached to the device and is used to form a seal with the cooking cavity. The lid includes a transparent portion positioned along a top surface to enable viewing inside of the cooking cavity. A controller can be used to heat the cooking fluid for an amount of time designated by user input. A moving mechanism can be used to move a food article into and out of the cooking liquid. The moving mechanism can be automated. The device can include a drainage system for removing the cooking liquid.

20 Claims, 107 Drawing Sheets

(56) References Cited

U.S. PATENT DOCUMENTS

| | | | |
|---|---|---|---|
| 211,076 A | 12/1878 | Follett | |
| 213,244 A | 3/1879 | Pettibone | |
| 217,378 A | 7/1879 | Hodges | |
| 274,208 A | 3/1883 | Mayo | |
| 300,691 A | 6/1884 | Brown | |
| 309,249 A | 12/1884 | Rains | |
| 413,225 A | 10/1889 | Coates | |
| 418,366 A | 12/1889 | Crampton | |
| 427,481 A | 5/1890 | Richter | |
| 442,431 A | 12/1890 | Fries et al. | |
| 462,567 A | 11/1891 | Lyte | |
| 474,036 A | 5/1892 | Wood | |
| 474,120 A | 5/1892 | Ganss | |
| 475,840 A | 5/1892 | Woods | |
| 475,874 A | 5/1892 | Leggett | |
| 486,689 A | 11/1892 | Weston | |
| 489,223 A | 1/1893 | Doolittle | |
| 498,992 A | 6/1893 | Schilling | |
| 499,615 A | 6/1893 | Walker | |
| 502,622 A | 8/1893 | Goldsmith | |
| 503,068 A | 8/1893 | Austin | |
| 506,068 A | 10/1893 | Paterson | |
| 558,816 A | 4/1896 | Kellum | |
| 559,588 A | 5/1896 | Louden | |
| 565,016 A | 8/1896 | Mott | |
| 568,353 A | 9/1896 | Kennedy | |
| 568,914 A | 10/1896 | Miller | |
| 571,686 A | 11/1896 | Reel | |
| 571,929 A | 11/1896 | Phifer | |
| 572,595 A | 12/1896 | Bucher | |
| 616,095 A | 12/1898 | Foerg | |
| 633,423 A | 9/1899 | Burns | |
| 641,267 A | 1/1900 | Cahill | |
| 661,681 A | 11/1900 | Ashbaugh et al. | |
| 703,331 A | 6/1902 | Acree | |
| 812,546 A | 2/1906 | Cloninger | |
| 875,972 A | 1/1908 | Wessel | |
| 895,856 A | 8/1908 | Harton | |
| 899,244 A | 9/1908 | Chase | |
| 900,398 A | 10/1908 | Lange | |
| 910,812 A | 1/1909 | Harton | |
| 940,557 A | 11/1909 | Roe | |
| 951,241 A | 3/1910 | Hampel | |
| 959,715 A | 5/1910 | Carson | |
| 975,843 A | 11/1910 | Duffy | |
| 1,012,877 A | 12/1911 | Mahan | |
| 1,117,277 A | 11/1914 | Supplee | |
| 1,189,498 A | 7/1916 | Sesler | |
| 1,199,211 A | 9/1916 | Simons | |
| 1,205,026 A | 11/1916 | Rodgers | |
| 1,214,992 A | 3/1917 | Boleratz | |
| 1,255,014 A | 1/1918 | Janiszewski | |
| 1,263,151 A | 4/1918 | Topalian | |
| 1,264,348 A | 4/1918 | Toth | |
| 1,272,222 A | 7/1918 | Clayton | |
| 1,302,086 A | 4/1919 | Pitlick | |
| 1,315,665 A | 9/1919 | Hamilton | |
| 1,368,640 A | 2/1921 | Melchior | |
| 1,371,718 A | 3/1921 | Zimmermann | |
| 1,462,275 A | 5/1921 | Gammel | |
| 1,396,606 A | 11/1921 | Vincent | |
| 1,430,691 A | 10/1922 | Self et al. | |
| 1,445,788 A | 2/1923 | Millican | |
| 1,461,654 A | 7/1923 | Haessler | |
| 1,469,512 A | 10/1923 | Hutchison | |
| 1,478,939 A | 12/1923 | Cavilla | |
| 1,487,824 A | 3/1924 | Vincent | |
| 1,538,171 A | 5/1925 | Dailey | |
| 1,563,005 A | 11/1925 | Allee | |
| 1,577,856 A | 3/1926 | Wingert | |
| 1,599,805 A | 9/1926 | Barsam | |
| 1,635,563 A | 7/1927 | Sanford | |
| 1,638,446 A | 8/1927 | Bel | |
| 1,662,147 A | 3/1928 | Farden | |
| 1,733,261 A | 10/1929 | Higby et al. | |
| 1,789,428 A | 1/1931 | Deschenes et al. | |
| 1,842,101 A | 1/1932 | Kaufmann | |
| 1,881,549 A | 10/1932 | Hatch | |
| 1,909,983 A | 5/1933 | Powell | |
| 2,061,533 A | 12/1934 | Anetsberger | |
| 2,081,751 A | 10/1935 | Lendrum | |
| 2,027,146 A | 1/1936 | Bly et al. | |
| 2,032,175 A | 2/1936 | Jones | |
| 2,112,990 A | 11/1936 | Hunter | |
| 2,127,749 A | 8/1938 | Noeth et al. | |
| 2,196,968 A | 4/1940 | Bemis | |
| 2,215,929 A | 9/1940 | Husk | |
| 2,247,650 A | 9/1940 | Carlson | |
| 2,250,910 A | 7/1941 | Hiett | |
| 2,269,689 A | 1/1942 | Reichold | |
| 2,287,396 A | 6/1942 | Roth | |
| 2,302,138 A | 11/1942 | Nicholson | |
| 2,315,473 A | 3/1943 | Wolcott | |
| 2,342,067 A | 2/1944 | Turner | |
| 2,509,533 A | 5/1950 | Schoen, Jr. | |
| 2,517,759 A | 8/1950 | Bentzen | |
| 2,543,052 A | 2/1951 | Park | |
| 2,560,229 A | 7/1951 | Leavens | |
| 2,563,237 A | 8/1951 | Grocoff | |
| 2,568,792 A | 9/1951 | Cripps | |
| 2,576,688 A | 11/1951 | Landgraf | |
| 2,577,433 A | 12/1951 | Robb | |
| 2,588,614 A | 3/1952 | Capra et al. | |
| 2,597,695 A | 5/1952 | Braski et al. | |
| 2,622,187 A | 12/1952 | Welch | |
| 2,625,972 A | 1/1953 | Torres | |
| 2,645,262 A | 7/1953 | Marasco | |
| 2,658,444 A | 11/1953 | Wheeler | |
| 2,915,000 A | 1/1954 | Hetzel et al. | |
| 2,703,522 A | 3/1955 | Smith | |
| 2,703,670 A | 3/1955 | Voight | |
| 2,714,070 A | 7/1955 | Welch | |
| 2,716,939 A * | 9/1955 | Smith | 99/408 |
| 2,735,357 A | 2/1956 | Gagnon | |
| 2,742,850 A | 4/1956 | Fond | |
| 2,751,120 A | 6/1956 | Bond et al. | |
| 2,769,878 A | 11/1956 | Krichton | |
| 2,785,277 A | 3/1957 | Jepson | |
| 2,786,502 A | 3/1957 | Turner | |
| 2,805,314 A | 9/1957 | Michaelis | |
| 2,811,181 A | 10/1957 | Correll | |
| 2,835,191 A | 5/1958 | Clurman | |
| 2,836,212 A | 5/1958 | Shaw | |
| 2,855,893 A | 10/1958 | Greer et al. | |
| 2,897,776 A | 8/1959 | Black et al. | |
| 2,902,062 A | 9/1959 | Smekal | |
| 2,906,850 A | 9/1959 | Meletio et al. | |
| 2,926,595 A | 3/1960 | Hron | |
| 2,997,566 A | 8/1961 | Pierce et al. | |
| 3,026,790 A | 3/1962 | Aryan | |
| D193,754 S | 10/1962 | Popeil | |
| 3,063,843 A | 11/1962 | Hashimoto | |
| 3,078,785 A | 2/1963 | Antonelli | |
| 3,078,786 A | 2/1963 | Arvan | |
| 3,095,326 A | 6/1963 | Green et al. | |
| 3,107,601 A | 10/1963 | Longmire | |
| 3,112,781 A | 12/1963 | Popeil | |
| 3,116,770 A | 1/1964 | Tanuma | |
| 3,127,494 A | 3/1964 | Kellough et al. | |
| 3,128,810 A | 4/1964 | Whipp | |
| 3,145,743 A | 8/1964 | Cronheim | |
| 3,194,662 A * | 7/1965 | Nelson | 426/438 |
| 3,201,015 A | 8/1965 | Wagaman | |
| 3,211,195 A | 10/1965 | Porter | |
| 3,216,474 A | 11/1965 | Popeil | |
| 3,217,633 A | 11/1965 | Anetsberger | |
| 3,225,681 A | 12/1965 | Wells | |
| 3,225,735 A | 12/1965 | Arcabasso | |
| 3,234,905 A | 2/1966 | Olson | |
| 3,283,730 A | 11/1966 | Mohler | |
| 3,327,621 A | 6/1967 | Zysset | |
| 3,354,546 A | 11/1967 | Pagliuca | |
| 3,364,845 A | 1/1968 | Wilson et al. | |
| 3,375,476 A | 3/1968 | Tibbs | |

(56) References Cited

U.S. PATENT DOCUMENTS

| | | |
|---|---|---|
| 3,394,677 A | 7/1968 | Taylor et al. |
| 3,396,656 A | 8/1968 | Forkner |
| 3,404,659 A | 10/1968 | Croston |
| 3,434,410 A | 3/1969 | Galle |
| 3,438,353 A | 4/1969 | Pellegrini |
| 3,463,077 A * | 8/1969 | Lescure .................. 99/403 |
| 3,468,355 A | 9/1969 | Hall |
| 3,469,561 A | 9/1969 | Gordon |
| 3,489,267 A | 1/1970 | Carpenter |
| 3,547,075 A | 12/1970 | Johnson |
| 3,554,253 A | 1/1971 | Vasile |
| 3,561,511 A | 2/1971 | Kummer |
| 3,618,587 A | 11/1971 | Lee, Sr. |
| 3,626,840 A | 12/1971 | Day |
| 3,641,923 A | 2/1972 | Wilkinson |
| 3,667,374 A | 6/1972 | Holmes |
| 3,688,683 A | 9/1972 | Boggs |
| 3,690,246 A | 9/1972 | Guthrie, Sr. |
| 3,696,778 A | 10/1972 | Moore |
| 3,714,889 A | 2/1973 | Mazzola et al. |
| 3,718,485 A | 2/1973 | Lankford |
| D226,940 S | 5/1973 | Lax |
| 3,731,038 A | 5/1973 | Bosisio |
| 3,735,726 A | 5/1973 | Butler |
| 3,737,621 A | 6/1973 | Elkins |
| 3,739,743 A | 6/1973 | McKee, Jr. |
| 3,767,884 A | 10/1973 | Osepchuk et al. |
| 3,789,178 A | 1/1974 | Harhen |
| 3,789,822 A | 2/1974 | Schantz |
| 3,800,649 A | 4/1974 | Chinn |
| 3,800,692 A | 4/1974 | Simens |
| 3,808,963 A | 5/1974 | Ludena |
| 3,816,703 A | 6/1974 | Binks |
| 3,821,925 A | 7/1974 | Moore |
| 3,830,151 A | 8/1974 | Gerson |
| 3,842,725 A | 10/1974 | Sano et al. |
| 3,845,702 A | 11/1974 | Mies |
| 3,853,044 A | 12/1974 | Albright et al. |
| 3,869,972 A | 3/1975 | Chase |
| 3,874,429 A | 4/1975 | LaFarge |
| 3,885,519 A | 5/1975 | Orlowski |
| 3,933,645 A | 1/1976 | Keramidas |
| 3,939,884 A | 2/1976 | Mader |
| 3,971,304 A | 7/1976 | Cvitkovich |
| 3,971,307 A | 7/1976 | Graham |
| 3,975,997 A | 8/1976 | DiPietro |
| 3,998,144 A | 12/1976 | Curtis |
| 4,013,861 A | 3/1977 | Westfall |
| 4,028,520 A | 6/1977 | Torrey |
| 4,041,852 A | 8/1977 | Keating |
| 4,059,046 A | 11/1977 | Yamazaki et al. |
| 4,062,260 A | 12/1977 | Steinhogl |
| 4,062,387 A | 12/1977 | Peniche |
| 4,081,647 A | 3/1978 | Torrey |
| 4,091,252 A | 5/1978 | Koinuma |
| 4,095,518 A | 6/1978 | Jones |
| 4,103,604 A | 8/1978 | Berard |
| 4,108,222 A | 8/1978 | Kaufman |
| 4,114,013 A | 9/1978 | Simon et al. |
| 4,127,060 A | 11/1978 | Curtis |
| 4,140,049 A | 2/1979 | Stewart |
| 4,140,160 A | 2/1979 | Glackin |
| 4,143,690 A | 3/1979 | Dunicz |
| 4,157,707 A | 6/1979 | Schwind et al. |
| 4,164,174 A | 8/1979 | Wallsten |
| 4,170,252 A | 10/1979 | Peterson |
| 4,189,993 A | 2/1980 | Kaufman |
| 4,202,386 A | 5/1980 | Orr |
| 4,203,357 A | 5/1980 | Vaussanvin |
| 4,205,803 A | 6/1980 | Elsner |
| 4,211,909 A | 7/1980 | Yoshida et al. |
| 4,230,238 A | 10/1980 | Wilson |
| 4,238,997 A | 12/1980 | Hengstenberg |
| 4,250,803 A | 2/1981 | Wohlfart |
| 4,256,154 A | 3/1981 | Black |
| 4,266,813 A | 5/1981 | Oliver |
| 4,317,017 A | 2/1982 | Bowen |
| 4,331,251 A | 5/1982 | Berman et al. |
| 4,331,691 A | 5/1982 | Poovaiah et al. |
| 4,332,992 A | 6/1982 | Larsen et al. |
| 4,339,326 A | 7/1982 | Hirose et al. |
| 4,371,623 A | 2/1983 | Taylor |
| 4,385,911 A | 5/1983 | Popeil et al. |
| 4,397,299 A | 8/1983 | Taylor et al. |
| 4,397,879 A | 8/1983 | Wilson |
| 4,399,743 A | 8/1983 | Izzi, Sr. |
| 4,401,017 A | 8/1983 | Feld |
| 4,420,006 A | 12/1983 | Moore et al. |
| 4,436,025 A | 3/1984 | Jones |
| 4,462,308 A | 7/1984 | Wang |
| 4,468,556 A | 8/1984 | Cunningham et al. |
| 4,478,140 A * | 10/1984 | Bullock .................. 99/404 |
| 4,485,831 A | 12/1984 | Ungerleider |
| 4,489,646 A * | 12/1984 | Schmidt et al. .................. 99/330 |
| 4,491,602 A | 1/1985 | Miller |
| 4,505,193 A | 3/1985 | Mariotti |
| 4,508,026 A | 4/1985 | Anetsberger et al. |
| 4,509,412 A | 4/1985 | Whittenburg et al. |
| 4,510,361 A | 4/1985 | Mahan |
| 4,535,931 A | 8/1985 | Bartok et al. |
| 4,557,378 A | 12/1985 | Klebold |
| 4,569,280 A | 2/1986 | D'Ambro et al. |
| 4,571,473 A | 2/1986 | Wyslouzil et al. |
| 4,573,384 A | 3/1986 | Jones |
| 4,574,776 A | 3/1986 | Hidle |
| 4,580,024 A | 4/1986 | Thomas |
| 4,580,549 A | 4/1986 | Sato |
| 4,593,170 A | 6/1986 | Maeda et al. |
| 4,602,612 A | 7/1986 | Schwizer |
| 4,604,989 A | 8/1986 | Kita |
| 4,616,625 A | 10/1986 | Froome |
| 4,617,452 A * | 10/1986 | Miwa .................. 219/441 |
| 4,623,544 A | 11/1986 | Highnote |
| 4,658,117 A | 4/1987 | Sayward, Jr. |
| 4,668,390 A | 5/1987 | Hurley et al. |
| 4,685,386 A | 8/1987 | Bezon |
| 4,688,475 A | 8/1987 | Witt et al. |
| 4,688,549 A | 8/1987 | Blankemeyer et al. |
| 4,691,096 A | 9/1987 | Knauss |
| 4,694,742 A | 9/1987 | Dover |
| 4,698,861 A | 10/1987 | Bogusz |
| 4,704,290 A | 11/1987 | Fritzsche |
| 4,706,719 A | 11/1987 | Eversdijk |
| 4,713,522 A | 12/1987 | Kimura |
| 4,719,850 A | 1/1988 | Sowell |
| 4,732,081 A | 3/1988 | Sakuma |
| 4,738,246 A | 4/1988 | Aylott et al. |
| 4,739,698 A | 4/1988 | Allaire |
| 4,754,698 A | 7/1988 | Naish |
| 4,785,725 A * | 11/1988 | Tate et al. .................. 99/330 |
| 4,787,301 A | 11/1988 | Hoatson et al. |
| 4,789,017 A | 12/1988 | Panasewicz et al. |
| 4,798,939 A | 1/1989 | Nett |
| 4,804,026 A | 2/1989 | Bailey |
| 4,807,862 A | 2/1989 | Popeil et al. |
| 4,817,509 A | 4/1989 | Erickson |
| 4,823,848 A | 4/1989 | Sentmore, Sr. et al. |
| 4,832,095 A | 5/1989 | Bonnell |
| 4,832,226 A | 5/1989 | Leon |
| 4,838,244 A | 6/1989 | Giles, Sr. et al. |
| 4,850,403 A | 7/1989 | Wiese |
| 4,852,256 A | 8/1989 | Schoettler |
| 4,852,471 A | 8/1989 | Lansing |
| 4,854,227 A | 8/1989 | Koopman |
| 4,854,299 A | 8/1989 | Anderson |
| 4,858,592 A | 8/1989 | Hayek et al. |
| 4,873,920 A | 10/1989 | Yang |
| 4,896,707 A | 1/1990 | Cowles |
| 4,898,091 A | 2/1990 | Rozak et al. |
| 4,898,151 A | 2/1990 | Luebke et al. |
| 4,901,633 A | 2/1990 | De'Longhi |
| 4,911,068 A | 3/1990 | Koether et al. |
| 4,913,041 A | 4/1990 | Taber et al. |
| 4,913,042 A | 4/1990 | Miller |

(56) References Cited

U.S. PATENT DOCUMENTS

| | | |
|---|---|---|
| 4,930,408 A | 6/1990 | King et al. |
| 4,945,893 A | 8/1990 | Manchester |
| 4,948,106 A | 8/1990 | Popeil et al. |
| 4,951,558 A | 8/1990 | Figliuzzi |
| 4,955,271 A | 9/1990 | Boutin-Lester |
| 4,957,039 A | 9/1990 | Reyes |
| 4,968,516 A * | 11/1990 | Thompson .................... 426/233 |
| 4,995,312 A | 2/1991 | Leiros |
| 5,010,740 A | 4/1991 | Backus et al. |
| 5,017,143 A | 5/1991 | Backus et al. |
| 5,022,773 A | 6/1991 | Waldinger et al. |
| 5,027,697 A | 7/1991 | De'Longhi |
| 5,030,027 A | 7/1991 | Bachrach et al. |
| 5,033,162 A | 7/1991 | Jacob et al. |
| 5,033,453 A | 7/1991 | Loyd et al. |
| 5,038,676 A | 8/1991 | Davis et al. |
| 5,052,369 A | 10/1991 | Johnson |
| 5,074,199 A | 12/1991 | Miller |
| 5,078,189 A | 1/1992 | Ronsonet |
| 5,090,305 A | 2/1992 | Lehman |
| 5,097,753 A | 3/1992 | Naft |
| 5,133,788 A | 7/1992 | Backus |
| 5,134,956 A | 8/1992 | Stewart |
| 5,140,711 A | 8/1992 | Johnson |
| 5,142,973 A | 9/1992 | Tur et al. |
| 5,148,655 A | 9/1992 | Salinas |
| 5,165,328 A | 11/1992 | Erickson et al. |
| 5,165,329 A | 11/1992 | Jacob et al. |
| 5,166,886 A | 11/1992 | Molnar et al. |
| 5,168,797 A | 12/1992 | Wang |
| 5,168,908 A | 12/1992 | Boyum |
| 5,170,696 A | 12/1992 | Reed |
| 5,172,328 A | 12/1992 | Cahlander et al. |
| 5,182,981 A | 2/1993 | Wilcox |
| 5,189,946 A | 3/1993 | Leon |
| 5,193,524 A | 3/1993 | Loyd et al. |
| 5,195,145 A | 3/1993 | Backus et al. |
| 5,197,736 A | 3/1993 | Backus et al. |
| 5,200,224 A | 4/1993 | Friedman |
| 5,209,218 A | 5/1993 | Daneshvar et al. |
| 5,221,962 A | 6/1993 | Backus et al. |
| 5,230,279 A | 7/1993 | McFadden et al. |
| 5,232,151 A | 8/1993 | Mercer et al. |
| 5,235,904 A | 8/1993 | Ludena |
| 5,238,138 A | 8/1993 | Bois |
| 5,245,902 A | 9/1993 | Pereira |
| 5,247,876 A | 9/1993 | Wilson et al. |
| 5,253,566 A | 10/1993 | McCabe et al. |
| 5,271,317 A | 12/1993 | Aguerrevere et al. |
| 5,275,090 A | 1/1994 | Connell |
| 5,277,233 A | 1/1994 | Fleming |
| 5,287,798 A | 2/1994 | Takeda |
| 5,301,604 A | 4/1994 | Takahashi |
| 5,305,686 A | 4/1994 | Svensson |
| 5,313,876 A | 5/1994 | Hilger et al. |
| 5,324,185 A | 6/1994 | Backus et al. |
| 5,333,539 A | 8/1994 | Hurley et al. |
| 5,355,776 A | 10/1994 | Driskill |
| 5,359,924 A | 11/1994 | Roberts et al. |
| 5,363,749 A | 11/1994 | Hurley et al. |
| 5,373,781 A | 12/1994 | Knasel |
| 5,375,512 A | 12/1994 | Ertmer |
| 5,379,684 A | 1/1995 | Ettridge |
| 5,385,180 A | 1/1995 | Wittman |
| 5,400,700 A * | 3/1995 | Bois ............................ 99/403 |
| 5,402,712 A | 4/1995 | King et al. |
| 5,421,249 A | 6/1995 | Repisky et al. |
| 5,421,713 A | 6/1995 | Backus et al. |
| 5,429,039 A | 7/1995 | Chang |
| 5,431,092 A | 7/1995 | Guillory |
| 5,445,073 A | 8/1995 | Gilwood |
| 5,452,648 A | 9/1995 | Hohler et al. |
| 5,458,168 A | 10/1995 | Lindgren |
| 5,463,943 A | 11/1995 | Knasel |
| 5,465,651 A | 11/1995 | Erickson et al. |
| 5,469,778 A | 11/1995 | Prudhomme |
| 5,490,453 A | 2/1996 | Mackay |
| 5,513,558 A | 5/1996 | Erickson et al. |
| 5,515,892 A | 5/1996 | Najafi et al. |
| 5,515,990 A | 5/1996 | Popeil et al. |
| 5,517,902 A | 5/1996 | Boston |
| 5,524,527 A | 6/1996 | Dumoux et al. |
| 5,535,665 A | 7/1996 | Wong |
| 5,535,793 A | 7/1996 | Tantre |
| 5,542,347 A | 8/1996 | Joseph |
| 5,543,166 A | 8/1996 | Masel et al. |
| 5,553,531 A | 9/1996 | Brown |
| 5,555,793 A | 9/1996 | Tocchet et al. |
| 5,560,284 A | 10/1996 | Weidman et al. |
| 5,573,292 A | 11/1996 | Citino |
| 5,582,093 A | 12/1996 | Amitrano et al. |
| 5,584,234 A | 12/1996 | Baillieul et al. |
| 5,584,235 A | 12/1996 | DuBois et al. |
| 5,586,486 A | 12/1996 | Nitschke et al. |
| 5,605,091 A * | 2/1997 | Garber ............................ 99/330 |
| 5,607,004 A | 3/1997 | Cope |
| 5,609,093 A | 3/1997 | Hohler et al. |
| 5,617,777 A | 4/1997 | Davis et al. |
| 5,629,039 A | 5/1997 | Brintle |
| 5,632,197 A | 5/1997 | Lubawy et al. |
| 5,638,873 A | 6/1997 | Burns |
| 5,651,905 A | 7/1997 | Thies et al. |
| 5,655,580 A | 8/1997 | Schrock |
| 5,699,722 A | 12/1997 | Erickson et al. |
| D388,665 S | 1/1998 | So |
| 5,718,934 A | 2/1998 | Hayakawa |
| 5,720,991 A | 2/1998 | Gildersleeve et al. |
| 5,722,289 A | 3/1998 | Carr |
| 5,731,012 A | 3/1998 | Backus et al. |
| 5,746,117 A | 5/1998 | Chang |
| 5,746,217 A | 5/1998 | Erickson et al. |
| 5,758,569 A | 6/1998 | Barbour |
| 5,762,120 A | 6/1998 | Smith |
| 5,770,252 A | 6/1998 | McEwen et al. |
| 5,771,781 A | 6/1998 | Sham |
| 5,776,530 A | 7/1998 | Davis et al. |
| 5,782,164 A | 7/1998 | Brintle |
| 5,782,165 A | 7/1998 | Glenboski et al. |
| 5,782,170 A | 7/1998 | Pomara, Jr. |
| 5,787,944 A | 8/1998 | Sarkis et al. |
| 5,794,522 A | 8/1998 | Bois et al. |
| 5,809,870 A | 9/1998 | Baillieul |
| 5,813,321 A | 9/1998 | Bourgeois |
| 5,816,139 A | 10/1998 | Scorta Paci |
| 5,826,494 A | 10/1998 | Wang |
| 5,836,238 A | 11/1998 | Kobayashi |
| 5,857,504 A | 1/1999 | Tremblay |
| RE36,147 E | 3/1999 | Backus et al. |
| 5,882,116 A | 3/1999 | Backus |
| 5,887,509 A | 3/1999 | Russett |
| 5,896,810 A | 4/1999 | Barbour |
| 5,899,246 A | 5/1999 | Cummins et al. |
| 5,902,618 A | 5/1999 | Haasis, Jr. |
| 5,918,535 A | 7/1999 | Moreau |
| 5,920,916 A | 7/1999 | Norton |
| 5,927,181 A | 7/1999 | Desnoyers et al. |
| 5,927,353 A | 7/1999 | Persson et al. |
| D413,225 S | 8/1999 | King |
| 5,931,081 A | 8/1999 | Sham et al. |
| 5,937,741 A | 8/1999 | Manger |
| 5,941,407 A | 8/1999 | De'Longhi |
| 5,947,016 A | 9/1999 | Repac et al. |
| 5,950,697 A | 9/1999 | Hobbs |
| 5,970,853 A | 10/1999 | Marszalek et al. |
| 5,971,690 A | 10/1999 | Whitten |
| 5,973,297 A | 10/1999 | Winter et al. |
| D415,937 S | 11/1999 | Robinson |
| 5,974,955 A | 11/1999 | King et al. |
| 5,979,516 A | 11/1999 | Grant |
| 5,988,046 A | 11/1999 | Noll |
| 5,988,048 A | 11/1999 | Hunter et al. |
| 5,993,872 A | 11/1999 | Rolle et al. |
| 5,994,672 A | 11/1999 | Mestnik |
| 5,996,474 A | 12/1999 | Collas et al. |

(56) References Cited

U.S. PATENT DOCUMENTS

| | | | |
|---|---|---|---|
| 5,997,938 A | 12/1999 | Taylor et al. | |
| 6,002,111 A | 12/1999 | Beugnot et al. | |
| 6,006,658 A | 12/1999 | Siu | |
| D418,366 S | 1/2000 | King | |
| 6,009,795 A | 1/2000 | Werts | |
| 6,029,566 A | 2/2000 | McLemore | |
| 6,035,767 A | 3/2000 | Gibson | |
| 6,035,907 A | 3/2000 | DeCoster | |
| 6,055,901 A | 5/2000 | Gantos et al. | |
| 6,077,555 A | 6/2000 | Dotan | |
| 6,079,319 A | 6/2000 | Doria | |
| D427,481 S | 7/2000 | De' Longhi | |
| 6,082,249 A | 7/2000 | Su | |
| 6,085,640 A | 7/2000 | King | |
| 6,092,547 A | 7/2000 | Komiya et al. | |
| 6,095,037 A | 8/2000 | Savage et al. | |
| 6,103,291 A | 8/2000 | Fernandez Tapia | |
| 6,112,646 A * | 9/2000 | King et al. | 99/336 |
| 6,116,299 A | 9/2000 | Cummins et al. | |
| 6,119,739 A | 9/2000 | McGee et al. | |
| 6,131,564 A | 10/2000 | Song | |
| 6,138,552 A | 10/2000 | Baillieul et al. | |
| 6,142,064 A | 11/2000 | Backus et al. | |
| 6,142,193 A | 11/2000 | Sanders | |
| 6,152,022 A | 11/2000 | Savage et al. | |
| 6,152,198 A | 11/2000 | Nguyen | |
| 6,162,481 A | 12/2000 | Bernacchi et al. | |
| 6,167,799 B1 | 1/2001 | Macias | |
| 6,170,390 B1 | 1/2001 | Backus et al. | |
| 6,173,645 B1 | 1/2001 | Backus et al. | |
| 6,179,558 B1 | 1/2001 | Eastman, III et al. | |
| 6,180,934 B1 | 1/2001 | Ishizaki et al. | |
| 6,182,561 B1 | 2/2001 | Garner et al. | |
| 6,187,355 B1 | 2/2001 | Akoh et al. | |
| 6,196,119 B1 | 3/2001 | Takahashi | |
| 6,213,002 B1 | 4/2001 | Batten et al. | |
| 6,223,792 B1 | 5/2001 | Slagle | |
| 6,240,835 B1 | 6/2001 | Bois et al. | |
| 6,240,838 B1 | 6/2001 | Backus et al. | |
| 6,244,170 B1 | 6/2001 | Whited et al. | |
| 6,244,483 B1 | 6/2001 | McLemore et al. | |
| 6,250,213 B1 | 6/2001 | De'Longhi | |
| 6,250,214 B1 | 6/2001 | Backus et al. | |
| 6,253,665 B1 | 7/2001 | Backus et al. | |
| 6,254,790 B1 | 7/2001 | King et al. | |
| 6,255,636 B1 | 7/2001 | Cochran, II et al. | |
| 6,260,590 B1 | 7/2001 | Ziegmann | |
| 6,262,398 B1 | 7/2001 | Busquets et al. | |
| 6,269,737 B1 | 8/2001 | Rigney et al. | |
| 6,280,092 B1 | 8/2001 | Backus et al. | |
| 6,289,793 B1 | 9/2001 | Hu et al. | |
| 6,289,795 B1 | 9/2001 | McLemore et al. | |
| 6,305,270 B1 | 10/2001 | Wang | |
| 6,306,294 B1 | 10/2001 | Blair | |
| 6,314,869 B1 | 11/2001 | Bourgeois, Jr. | |
| 6,320,166 B1 | 11/2001 | Park | |
| 6,322,831 B1 | 11/2001 | Mote et al. | |
| 6,330,855 B2 | 12/2001 | Backus et al. | |
| 6,341,631 B1 | 1/2002 | Hobbs | |
| 6,364,120 B1 | 4/2002 | Sanchez et al. | |
| 6,365,878 B1 | 4/2002 | Lau et al. | |
| 6,371,014 B1 | 4/2002 | Ismail et al. | |
| 6,378,420 B1 | 4/2002 | Savage et al. | |
| 6,393,972 B1 | 5/2002 | Backus et al. | |
| 6,398,066 B1 | 6/2002 | Mullins | |
| 6,405,765 B1 | 6/2002 | Handrick | |
| 6,408,742 B1 | 6/2002 | Backus et al. | |
| 6,412,401 B1 | 7/2002 | Mariotti | |
| 6,422,136 B1 | 7/2002 | Backus et al. | |
| 6,436,380 B1 | 8/2002 | Pond et al. | |
| D462,567 S | 9/2002 | Smith | |
| 6,443,051 B1 | 9/2002 | Suzuki | |
| 6,446,545 B2 | 9/2002 | Rigney | |
| 6,450,087 B2 | 9/2002 | Backus et al. | |
| 6,450,219 B1 | 9/2002 | Ingram | |
| 6,453,801 B1 | 9/2002 | Masel et al. | |
| 6,470,794 B2 | 10/2002 | Takahashi | |
| 6,478,614 B1 | 11/2002 | De'Longhi | |
| 6,483,990 B1 | 11/2002 | Bikhovsky | |
| 6,491,195 B1 | 12/2002 | McLemore et al. | |
| 6,495,808 B1 | 12/2002 | Clayton et al. | |
| 6,498,323 B1 | 12/2002 | Robertson, Jr. et al. | |
| 6,498,326 B1 | 12/2002 | Knappe | |
| RE37,955 E | 1/2003 | Kiczko et al. | |
| 6,513,668 B1 | 2/2003 | Masterton | |
| 6,515,262 B1 | 2/2003 | Li | |
| 6,523,457 B1 | 2/2003 | Ancona et al. | |
| 6,527,570 B1 | 3/2003 | Hartman et al. | |
| 6,532,865 B1 | 3/2003 | Hoffman | |
| 6,536,334 B2 | 3/2003 | Backus et al. | |
| 6,539,838 B1 | 4/2003 | Bengtsson et al. | |
| 6,546,848 B2 * | 4/2003 | Ehlhardt et al. | 99/403 |
| 6,568,315 B2 | 5/2003 | Backus et al. | |
| 6,568,316 B1 | 5/2003 | Backus et al. | |
| 6,568,942 B2 | 5/2003 | Lau et al. | |
| 6,572,764 B2 | 6/2003 | Mullaney, Jr. | |
| 6,578,470 B2 | 6/2003 | Backus et al. | |
| 6,588,325 B1 | 7/2003 | Savage | |
| 6,598,515 B1 * | 7/2003 | Bove' | 99/407 |
| 6,603,099 B2 | 8/2003 | Gouthiere | |
| 6,619,191 B2 | 9/2003 | Mariotti | |
| 6,626,090 B2 | 9/2003 | McLemore et al. | |
| 6,629,491 B1 | 10/2003 | Chan | |
| 6,658,991 B2 | 12/2003 | Backus et al. | |
| 6,666,131 B2 * | 12/2003 | Bizard | 99/403 |
| D486,689 S | 2/2004 | Lu | |
| 6,688,347 B1 | 2/2004 | Selby | |
| 6,689,408 B2 | 2/2004 | Nockermann et al. | |
| 6,708,603 B1 | 3/2004 | Li-Chen | |
| 6,708,738 B2 | 3/2004 | Olsen | |
| 6,711,992 B1 | 3/2004 | McLemore | |
| 6,719,576 B2 | 4/2004 | Hartman et al. | |
| D489,223 S | 5/2004 | Jung et al. | |
| 6,732,637 B2 | 5/2004 | Artt | |
| 6,736,130 B2 | 5/2004 | Takahashi | |
| 6,739,363 B2 | 5/2004 | Walter et al. | |
| 6,742,445 B2 | 6/2004 | Backus et al. | |
| 6,742,446 B2 | 6/2004 | McLemore et al. | |
| 6,743,007 B2 | 6/2004 | Backus et al. | |
| 6,745,669 B2 * | 6/2004 | Suzuki | 99/330 |
| 6,748,851 B2 | 6/2004 | Hoffman | |
| 6,752,303 B2 | 6/2004 | McLemore et al. | |
| 6,758,209 B2 | 7/2004 | Takeda et al. | |
| 6,758,308 B1 | 7/2004 | Hearting et al. | |
| 6,759,634 B2 * | 7/2004 | Wang | 219/433 |
| 6,772,677 B2 * | 8/2004 | Marotel et al. | 99/330 |
| 6,776,201 B2 | 8/2004 | Willis | |
| 6,777,009 B1 | 8/2004 | Shealy | |
| 6,782,805 B2 | 8/2004 | Backus et al. | |
| 6,782,806 B2 | 8/2004 | Backus et al. | |
| 6,783,276 B2 | 8/2004 | Machacek et al. | |
| 6,783,685 B2 | 8/2004 | Hwang | |
| 6,786,139 B2 | 9/2004 | Ponting et al. | |
| 6,786,215 B1 | 9/2004 | Moravec et al. | |
| 6,792,983 B2 * | 9/2004 | Allora | 141/98 |
| 6,814,957 B1 | 11/2004 | Pond et al. | |
| 6,820,536 B2 * | 11/2004 | Kijimoto | 99/330 |
| 6,820,540 B1 | 11/2004 | Bivens | |
| 6,823,772 B2 * | 11/2004 | Payen et al. | 99/330 |
| 6,831,185 B2 | 12/2004 | Ikuina et al. | |
| 6,834,577 B2 * | 12/2004 | Xu | 99/409 |
| 6,834,578 B1 | 12/2004 | Wu Chang | |
| 6,837,150 B2 | 1/2005 | Backus et al. | |
| 6,840,161 B2 | 1/2005 | Backus et al. | |
| 6,841,857 B2 | 1/2005 | Beer et al. | |
| 6,845,707 B1 | 1/2005 | Xu et al. | |
| 6,851,351 B2 | 2/2005 | Payen et al. | |
| D503,068 S | 3/2005 | May et al. | |
| 6,865,983 B2 | 3/2005 | McNamee | |
| 6,874,408 B2 | 4/2005 | Backus et al. | |
| 6,900,415 B1 | 5/2005 | Roach et al. | |
| D506,068 S | 6/2005 | Senyuva | |
| 6,921,480 B2 | 7/2005 | Post | |
| 6,935,389 B1 | 8/2005 | Rinaldi | |

(56) References Cited

U.S. PATENT DOCUMENTS

| | | |
|---|---|---|
| 6,941,857 B2 | 9/2005 | McLemore |
| 6,955,118 B1 | 10/2005 | Bivens |
| 6,965,095 B1 | 11/2005 | Popeil et al. |
| 6,976,420 B1 | 12/2005 | Wong |
| 6,976,882 B2 | 12/2005 | Kernan |
| 6,988,445 B1 | 1/2006 | Backus et al. |
| 6,998,581 B2 | 2/2006 | Currie |
| 7,012,271 B2 | 3/2006 | Wnek et al. |
| 7,013,934 B1 | 3/2006 | Hicok |
| 7,021,203 B2 | 4/2006 | Backus et al. |
| 7,021,204 B2 | 4/2006 | Backus et al. |
| 7,036,425 B2 | 5/2006 | Chang |
| 7,044,049 B2 | 5/2006 | Johnston, Sr. et al. |
| 7,053,338 B1 | 5/2006 | Tesfagaber |
| 7,065,883 B2 | 6/2006 | Popeil et al. |
| 7,074,046 B2 | 7/2006 | Kernan |
| 7,086,155 B2 | 8/2006 | Chan et al. |
| 7,114,536 B2 | 10/2006 | Guthrie |
| 7,138,609 B2 | 11/2006 | Popeil et al. |
| 7,141,764 B1 | 11/2006 | Shumate |
| 7,153,120 B2 | 12/2006 | Backus et al. |
| D535,164 S | 1/2007 | St. Germain et al. |
| 7,211,770 B2 | 5/2007 | Wilson |
| 7,225,729 B2 | 6/2007 | Backus et al. |
| 7,225,730 B2 | 6/2007 | Backus et al. |
| 7,229,656 B2 | 6/2007 | Paumen et al. |
| 7,237,476 B1 | 7/2007 | Bourgeois et al. |
| 7,237,582 B1 | 7/2007 | Harvey |
| 7,237,583 B2 | 7/2007 | Salani et al. |
| 7,240,701 B2 | 7/2007 | Salani et al. |
| D552,921 S | 10/2007 | Garman et al. |
| D553,432 S | 10/2007 | Lin |
| 7,284,581 B2 | 10/2007 | Steinweg |
| 7,302,976 B1 | 12/2007 | Bultman |
| 7,309,422 B2 | 12/2007 | Mullaney, Jr. |
| D560,424 S | 1/2008 | McLemore |
| 7,322,386 B2 | 1/2008 | Holm |
| D563,719 S | 3/2008 | Fitzgerald |
| 7,412,922 B2 | 8/2008 | McLemore |
| D576,454 S | 9/2008 | Repac |
| 7,424,849 B2 | 9/2008 | Backus et al. |
| 7,626,142 B2 | 12/2009 | Backus et al. |
| 7,739,948 B2 | 6/2010 | Backus et al. |
| 2002/0017201 A1 | 2/2002 | Backus et al. |
| 2002/0040644 A1 | 4/2002 | McLemore et al. |
| 2002/0050212 A1 | 5/2002 | Backus et al. |
| 2002/0069767 A1* | 6/2002 | Wendel et al. .................. 99/403 |
| 2002/0092803 A1 | 7/2002 | Mullaney, Jr. |
| 2003/0003209 A1 | 1/2003 | Rigney |
| 2003/0005828 A1 | 1/2003 | McLemore et al. |
| 2003/0110954 A1 | 6/2003 | Hoffman |
| 2003/0132259 A1 | 7/2003 | McLemore et al. |
| 2003/0179653 A1 | 9/2003 | McLemore et al. |
| 2003/0196940 A1 | 10/2003 | Mullaney, Jr. |
| 2003/0222112 A1 | 12/2003 | McLemore et al. |
| 2003/0226452 A1 | 12/2003 | Artt |
| 2004/0069149 A1 | 4/2004 | Wakefield |
| 2004/0103795 A1* | 6/2004 | McLemore ..................... 99/403 |
| 2004/0112225 A1* | 6/2004 | Mercer et al. .................. 99/330 |
| 2004/0187702 A1 | 9/2004 | Xu |
| 2004/0237801 A1 | 12/2004 | Starkey |
| 2004/0260018 A1 | 12/2004 | Simendinger, III et al. |
| 2005/0034611 A1 | 2/2005 | McLemore |
| 2005/0051034 A1 | 3/2005 | Cheng |
| 2005/0051035 A1 | 3/2005 | Johnston, Sr. et al. |
| 2005/0055130 A1 | 3/2005 | Carlson et al. |
| 2005/0055533 A1 | 3/2005 | Kadambi et al. |
| 2005/0056157 A1 | 3/2005 | Savage et al. |
| 2005/0061159 A1 | 3/2005 | Currie |
| 2005/0072309 A1 | 4/2005 | Mullaney, Jr. |
| 2005/0072315 A1 | 4/2005 | Romero |
| 2005/0091050 A1 | 4/2005 | Surendran et al. |
| 2005/0115556 A1 | 6/2005 | Carson et al. |
| 2005/0121020 A1 | 6/2005 | McLemore et al. |
| 2005/0144248 A1 | 6/2005 | Doganowski et al. |
| 2005/0144250 A1 | 6/2005 | Banatwala et al. |
| 2005/0151464 A1 | 7/2005 | Sung |
| 2005/0172949 A1 | 8/2005 | Moore et al. |
| 2005/0194372 A1 | 9/2005 | Lau et al. |
| 2005/0204929 A1 | 9/2005 | Rosenzweig |
| 2005/0207438 A1 | 9/2005 | Horiguchi et al. |
| 2005/0217494 A1 | 10/2005 | Hrushowy |
| 2005/0217662 A1 | 10/2005 | McDuffie |
| 2005/0229760 A1 | 10/2005 | Chang |
| 2005/0235838 A1 | 10/2005 | Cohn |
| 2005/0241492 A1 | 11/2005 | Kooyker et al. |
| 2005/0247454 A1 | 11/2005 | Domann et al. |
| 2005/0252504 A1 | 11/2005 | Cabrera et al. |
| 2005/0259309 A1 | 11/2005 | Blank |
| 2005/0266228 A1 | 12/2005 | Jain et al. |
| 2005/0268791 A1 | 12/2005 | Svabeck et al. |
| 2005/0268792 A1 | 12/2005 | Wu Chang |
| 2005/0269332 A1 | 12/2005 | Svabeck et al. |
| 2005/0272513 A1 | 12/2005 | Bissonnette et al. |
| 2005/0276892 A1 | 12/2005 | McLemore |
| 2005/0283335 A1 | 12/2005 | Banke, Jr. et al. |
| 2005/0284306 A1 | 12/2005 | Backus et al. |
| 2005/0289443 A1 | 12/2005 | Kuznetsov |
| 2006/0091137 A1 | 5/2006 | McLemore et al. |
| 2006/0272514 A1* | 12/2006 | Curtis ............................ 99/403 |
| 2006/0272633 A1 | 12/2006 | Osias, Jr. |
| 2007/0028780 A1 | 2/2007 | Popeil et al. |
| 2007/0028781 A1 | 2/2007 | Popeil et al. |
| 2007/0040559 A1 | 2/2007 | Klun |
| 2007/0054018 A1 | 3/2007 | Yuan |
| 2007/0145061 A1 | 6/2007 | Backus et al. |
| 2007/0221651 A1 | 9/2007 | Kristina et al. |
| 2007/0251517 A1 | 11/2007 | Sus et al. |
| 2007/0256571 A1 | 11/2007 | Popeil et al. |
| 2008/0041238 A1 | 2/2008 | Usui et al. |
| 2008/0102181 A1 | 5/2008 | Rao et al. |
| 2008/0124438 A1 | 5/2008 | Forte et al. |
| 2008/0153281 A1 | 6/2008 | Knollenberg et al. |
| 2008/0159281 A1 | 7/2008 | Jesseph |
| 2008/0169281 A1 | 7/2008 | Borovicka et al. |
| 2008/0196596 A1 | 8/2008 | Forrest et al. |
| 2008/0202349 A1 | 8/2008 | Peng |
| 2008/0210100 A1 | 9/2008 | Fraij et al. |
| 2008/0265594 A1 | 10/2008 | Popeil et al. |

FOREIGN PATENT DOCUMENTS

| | | |
|---|---|---|
| JP | 02310425 A * | 12/1990 |
| JP | 09037966 A * | 2/1997 |
| WO | WO 03/009730 A1 | 2/2003 |

OTHER PUBLICATIONS

Disclosure Document No. 595972, Compact Turkey Fryer, Mar. 3, 2005.

Disclosure Document No. 572595, Device to Deep Fat Fry Foods, Mar. 15, 2005.

Disclosure Document No. 571929, Device to Deep Fat Fry Foods, Mar. 2, 2005.

Disclosure Document No. 571686, Device to Deep Fat Fry Foods, Feb. 28, 2005.

Disclosure Document No. 568914, Device to Deep Fat Fry Foods, Jan. 21, 2005.

Disclosure Document No. 568353, Device to Deep Fat Fry Foods, Jan. 11, 2005.

Disclosure Document No. 565016, Rotisserie Deep Fat Fryer, Nov. 10, 2004.

Disclosure Document No. 559588, Rotisserie Deep Fat Fryer, Aug. 24, 2004.

Disclosure Document No. 558816, Disclosure Document Receipt Notice, Aug. 10, 2004.

PCT/2009/042676 International Preliminary Report on Patentability and Written Opinion of the International Search Authority dated Apr. 28, 2011.

(56) References Cited

OTHER PUBLICATIONS

International Search Report and Written Opinion for Application No. PCT/US2009/42676 dated Aug. 12, 2009.
European Search Report and Written Opinion for Application No. 06800998.4 dated Jul. 8, 2010.
PCT/US11/35530 International Preliminary Report on Patentability and Written Opinion of the International Searching Authority dated Feb. 5, 2013.
PCT/US11/56314 International Search Report and Written Opinion of the International Search Authority, Feb. 28, 2012.

\* cited by examiner

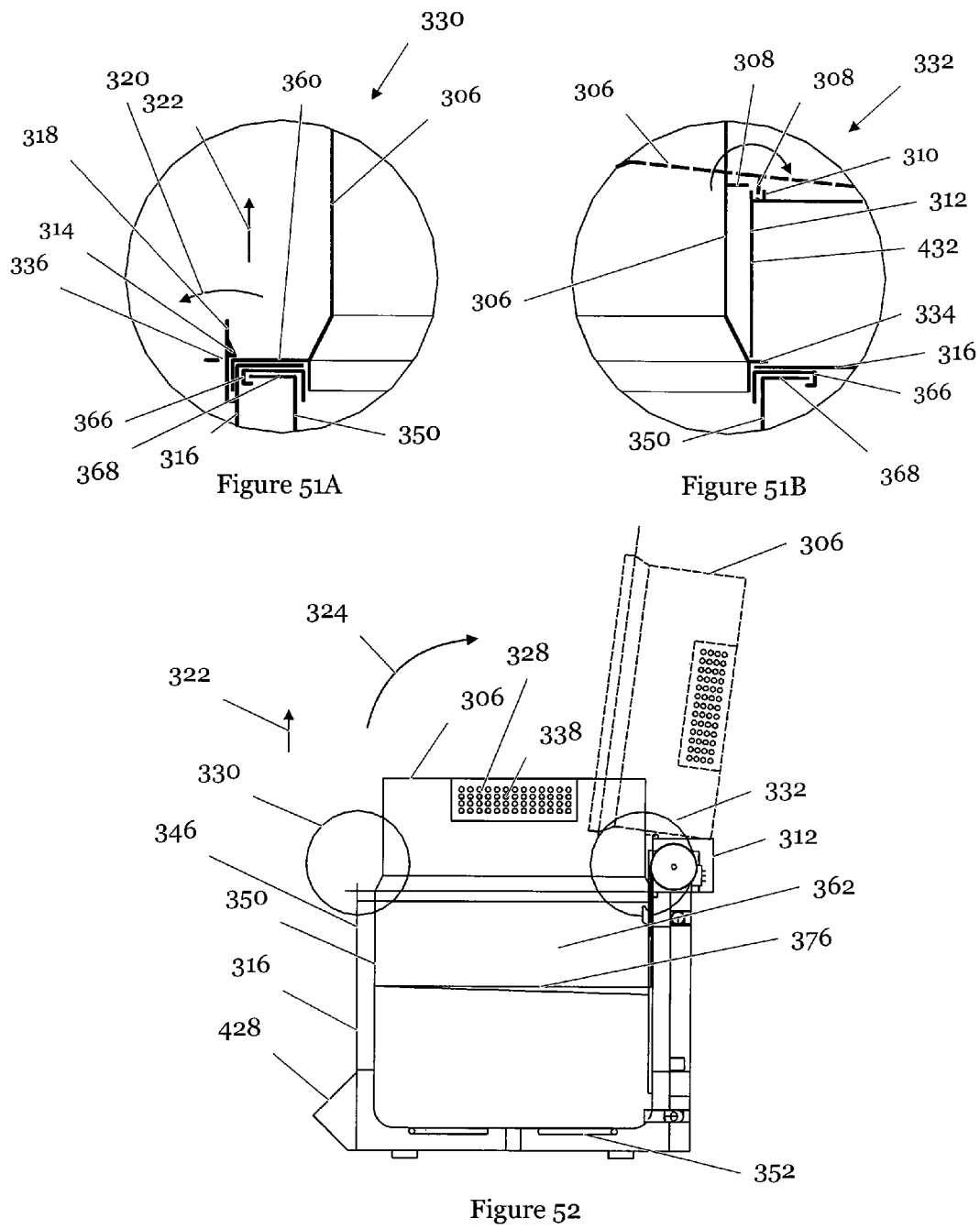

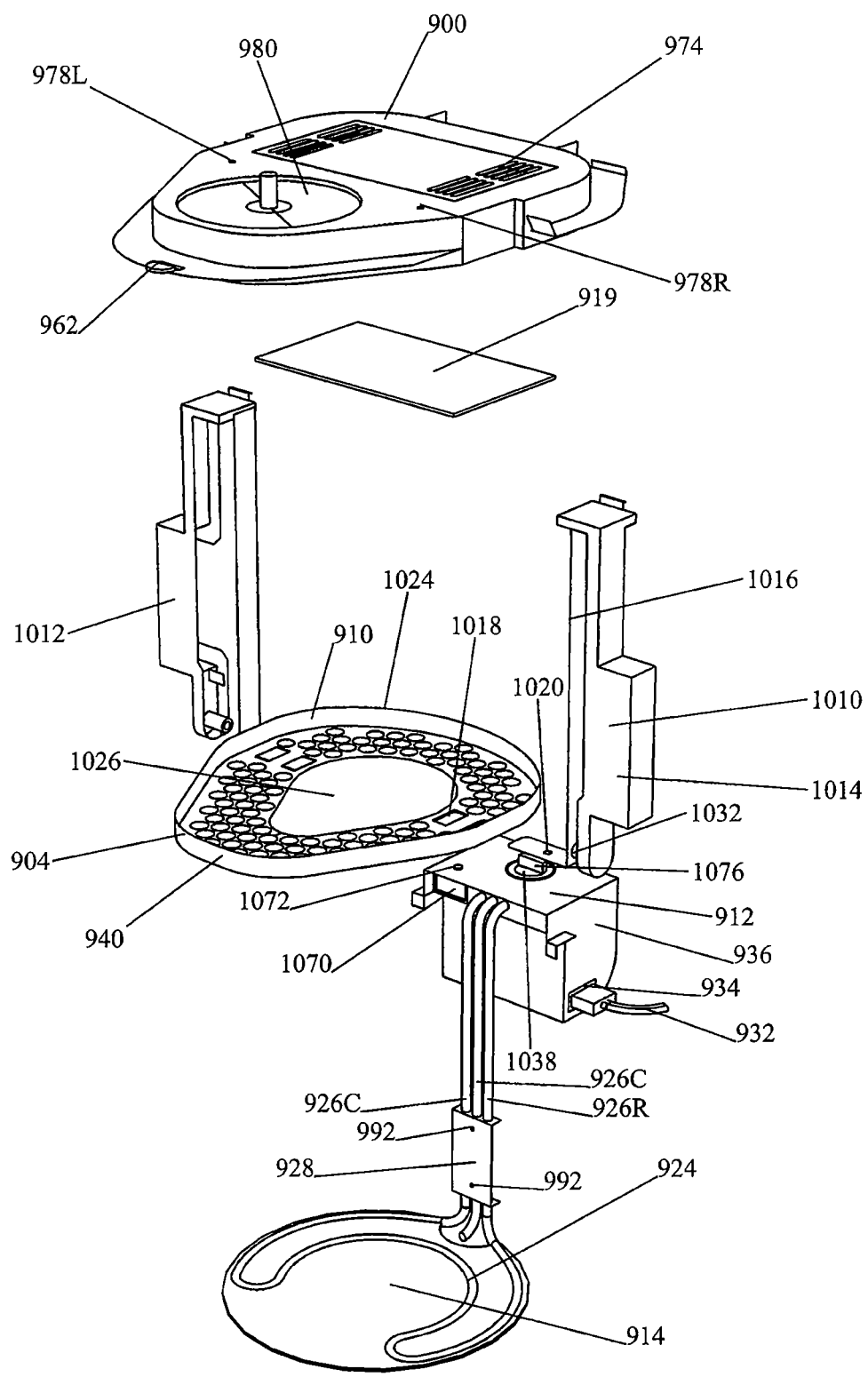
figure 98A – upper enlarged

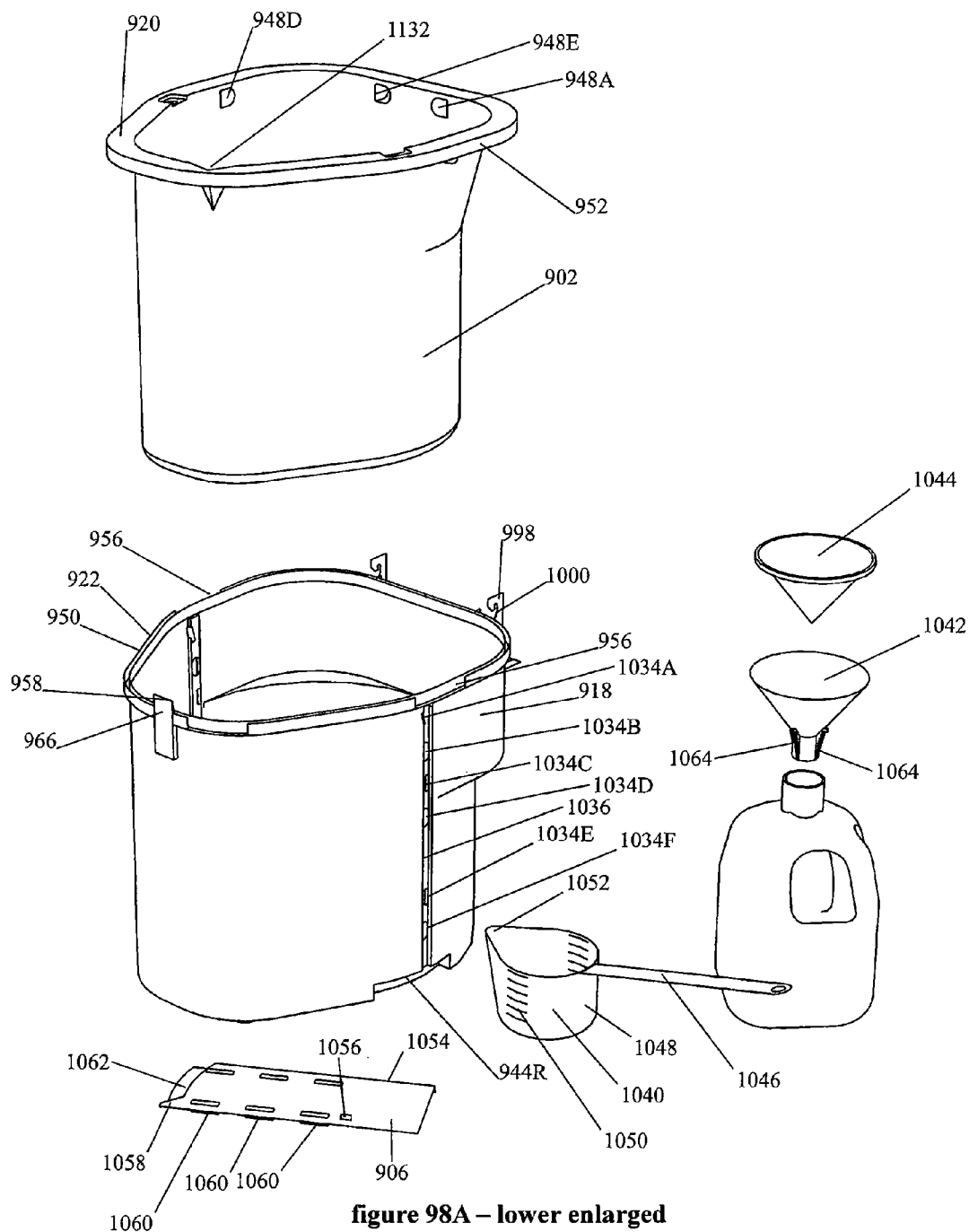
figure 98A – lower enlarged

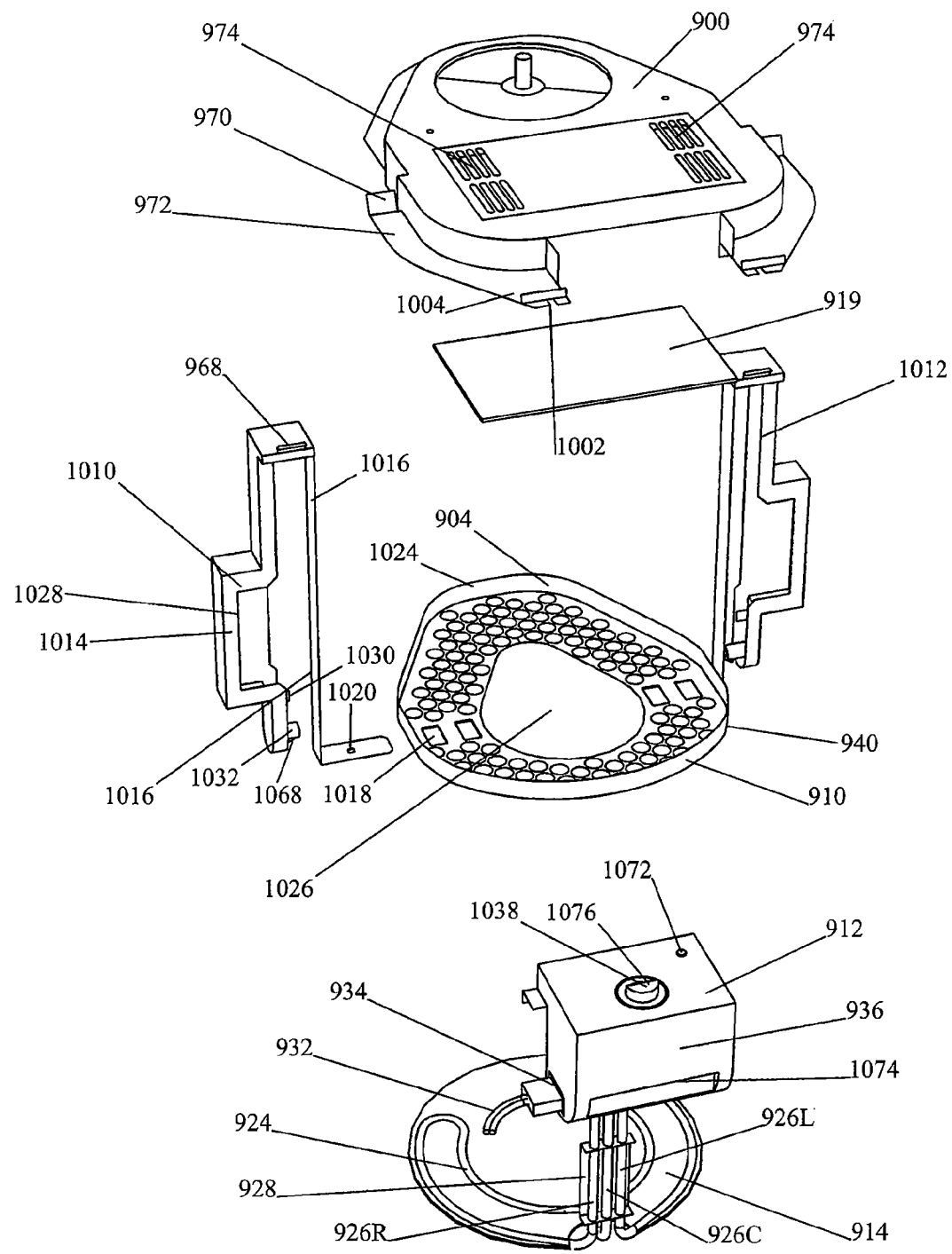
figure 98B – upper enlarged

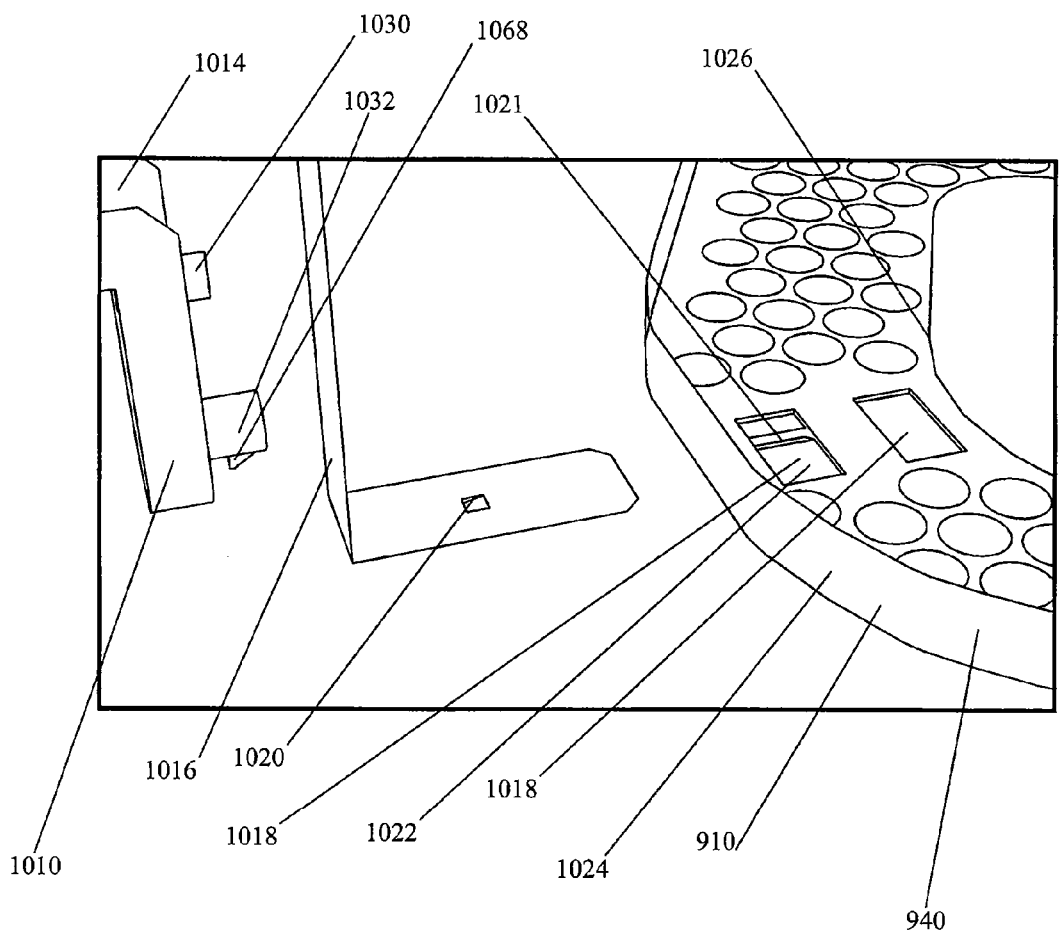
figure 98B – food support enlarge

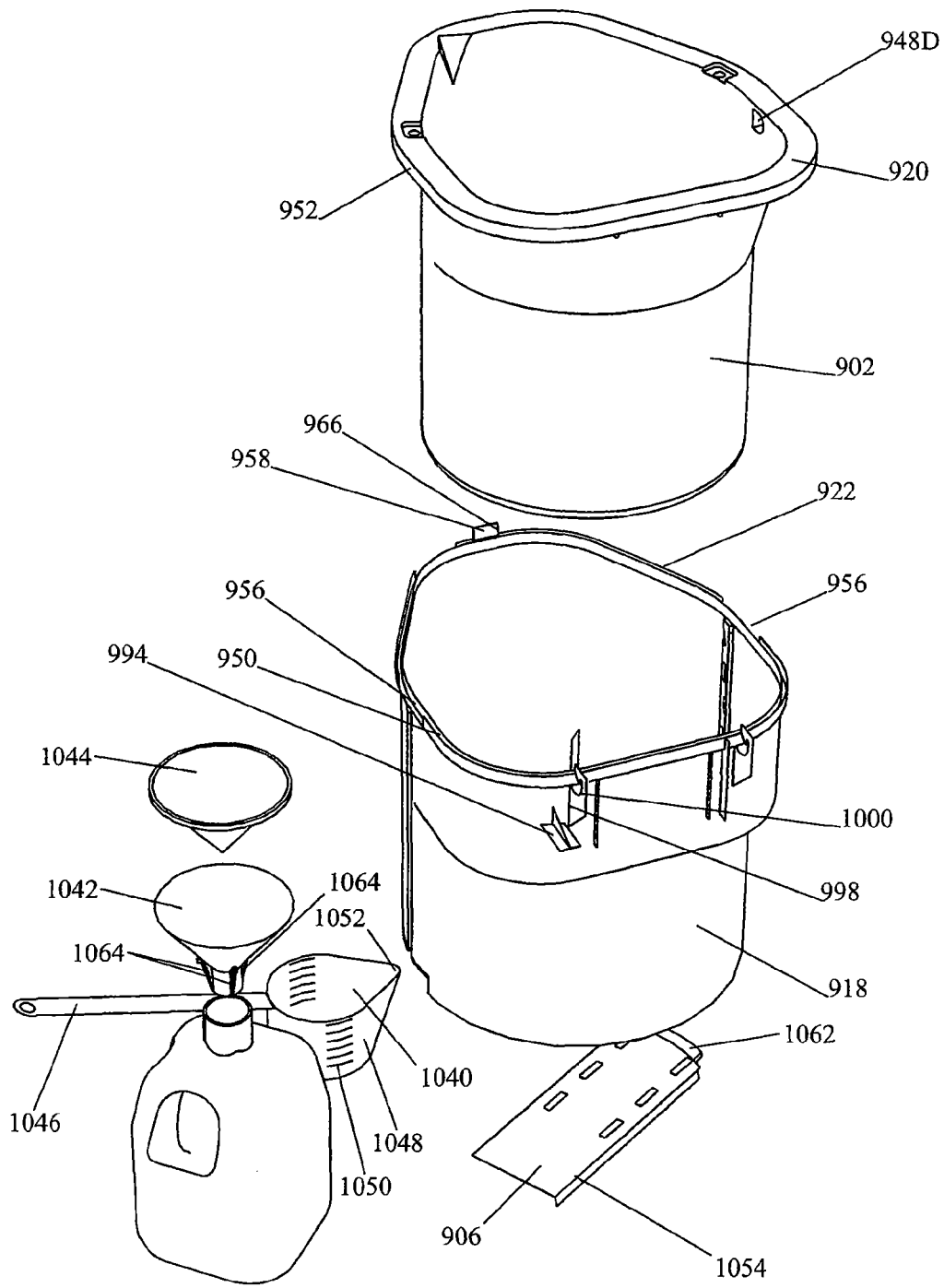
figure 98B – lower enlarged

COOKING DEVICE TO DEEP FAT FRY FOODS

This application is a continuation-in-part of U.S. patent application Ser. No. 11/345,187, filed on Feb. 1, 2006, which claims the benefit of U.S. Provisional Application No. 60/706,859, filed on Aug. 8, 2005.

FIELD OF THE INVENTION

The present inventions are directed to cooking devices used for cooking food articles and, more particularly to cooking devices that are configured to enable countertop deep fat frying of large foods in a manner that is safer, more efficient, and more user friendly than that provided by conventional deep fat frying devices used to cook large food articles.

BACKGROUND OF THE INVENTION

What is known today in the art of home use deep fat fryers are small countertop devices. Such home use countertop devices have a very limited capacity, such as the ability to cook only a few ounces of French fries or the like in up to about 8 quarts of cooking oil. Besides lacking capacity, such conventional devices are inconvenient to use. Typically, a user must first pour cooking oil into the device and preheat the cooking oil before cooking can commence. Preheating the oil can take from a few minutes to more than half-an-hour, after which time the user must then return to immerse the food into the hot oil. If the user returns too soon, the oil is not fully heated, resulting further waiting by the user before using the device.

After oil preheating, the food must be immersed into the oil. Immersing food into the extremely hot cooking oil can be a dangerous process. For example, a user might be holding onto a short handle just a few inches away from the exposed surface of the hot cooking oil while trying to gently lower a basket full of food at the end of the handle. Upon placing the basket and the food contents into the hot oil, the oil can erupt with boiling, and/or sputtering that could burn the user, and that could possibly result in the basket being dropped and splashing into the hot oil should the user become burned during the process and let go of the basket to avoid further harm. Dropping the basket into the hot oil, however, could result in a more violet result that could cause further harm to the user. In many devices, the surface of the hot cooking oil may be fully exposed when the food is being lowered into the oil, thus presenting other safety hazards of accidental contact with the extremely hot oil.

Once the desired food content is immersed in the hot oil, the cooking process can take anywhere from a few minutes to more than an hour. At the end of the cooking process, the user must be present at a precise time to remove the food from the hot cooking oil. If the user arrives too late, the food may be overcooked. If the user arrived too soon, they may have to wait until the food is fully cooked, or have undercooked food.

Next, drainage of the oil from the food is required. This again can take anywhere from a few minutes to over half-an-hour. After the food has been drained, the user must again return to serve the food.

The cooking oil that is used in such conventional countertop devices may only last for one to about four uses, after which the oil must be changed. Filtering the cooking oil between uses generally helps to increase its useful life. While some commercial units have pumps and filters to periodically cleanse their cooking oil during and/or between uses, such countertop home units generally have no means for such oil filtration. Thus, the cooking oil in these devices must either be changed as noted above, or filtered by a manual method that involves a multi-step task of physically removing the oil from the device, filtering it outside of the device, and then reintroducing the oil into the device.

The oil from such countertop device is removed by pouring the oil from the device into a disposal container, and then discarding the oil by pouring it down the kitchen drain. The practice of discarding used oil down the drain may clog the drain pipes. Disposing of used oil is generally also a cumbersome process, as the heavy, greasy, oil must be carefully poured directly from its cooking pot, which generally has no pour spout, into the narrow neck of a containment bottle or the like for further handling.

Besides imparting a bad taste to foods being cooked, using the cooking oil too many times may result in the oil foaming like a bubble bath either when food is lowered into it, or spontaneously upon the oil being heated, with or without food. Such foaming vastly increases the amount of space required to contain the oil and food, and may result in the fryer being overflowed and hot oil potentially destructively dripping down to the countertop or other surface upon which the device is resting.

These small, countertop home use deep frying device also generally have no easy way of being cleaned. While the internal portion of the cook pots are typically cleaned by soap and water like any other cooking pan, because these devices also include electrical components for heating the device, it is important that such electrical components does not get wet or be exposed to water during the cleaning process. Thus, when cleaning such devices, it is important to avoid having water overflow into the electrical components particularly when the water is dumped out of the pans.

Larger deep fat frying, outdoor, home use, cooking devices, commonly referred to as turkey fryers, are also coming into use today. These units have the capacity to hold from 2½ gallons to over 10 gallons of cooking oil, and the capacity to cook foods ranging from a few pounds, to well over a 20 pound turkey. Typically, such turkey fryers comprise a large metal bucket about a foot in diameter and a-foot-and-a-half high, which sits atop an open-frame support that contains a bottle gas fired burner. Some turkey fryers have metal lids similar to those found on saucepans, which are held in place only by gravity.

Except for typically having no electronics to complicate cleanup, such conventional turkey fryers have most or all of the same problems described above, except on a larger scale due to their increased size. For example, instead of, in a small home countertop deep fat fryer, lowering a few ounces of French fries contained in a small basket into a few quarts of cooking oil, such turkey fryers may present their users with the task of with slowly lowering a 15 pound or larger turkey into over 5 gallons of hot, sputtering cooking oil. The cooking oil in such turkey fryers are contained in a tall, top-heavy, open bucket that rests precariously on an unstable platform which houses an open flame for heating the bucket contents. Thus, the act of accidentally dropping the food into the hot oil of such turkey fryer can have a result of a larger magnitude than splashes causes from dropping French fries into a few quarts of hot oil. Accidentally dropping a 15 pound turkey into the turkey fryer can cause the displacement of 5 gallons of hot oil, which could contact the user and/or which could come into contact the open flame burner and ignite, potentially resulting in further injury and/or property damage.

Safety issues may also arise from where and when turkey fryers are used. Generally, they must be used outdoors due to the open flame cooking element. The two most common times during the year that such turkey fryers are used in the United States are during Thanksgiving and Christmas. Cold and/or inclement weather are generally the rule in many parts of the United States during these times. A user may typically be in his or her driveway, under these weather conditions while trying to cook a large turkey. Additionally, there may be ice and/or snow on the ground. The task of slowly lowering a heavy turkey away from the user's body into a large, top-heavy, bucket containing hot oil precariously resting atop an unstable platform with an open flame may be dangerous under the best of circumstances, but being outdoors with cold and inclement weather, possibly combined with slippery footing, may make it especially hazardous.

Cleanliness may also be a problem with deep fat frying. During the deep fat frying cooking process, fats and oils may vaporize, and be disbursed into the air. Filtering air before it leaves a deep fat fryer may help to reduce contaminants in room air including cooking odors.

Viewing items being cooked may be a problem for both countertop home deep fat fryers as well as turkey fryers. Many home deep fat fryers have small horizontal windows in their lids to view the cooking progress. These windows, however, are virtually useless as steam condenses on their horizontal window surfaces and obfuscates the view. Also, construction of these small viewing windows includes many pieces, which are both expensive and time consuming to fabricate and assemble. In contrast, the food being cooked in a turkey fryers may be viewed by either looking into directly into the cooking bucket, in devices that are constructed without having a lid, or by removing any such lid that the turkey fryer may have. Both these situations present a hazard of directly exposing the user to the cooking oil with no intervening safety barrier.

Turkey fryers have at least one other typical hazard, that of overheating the oil due to lack of thermostatic control. Such fryers are typically heated by bottled gas-fired burners that generally have no thermostats or temperature control to shut the flame down when the oil has reached cooking temperature. By simply failing to turn down or off the flame at the appropriate time, cooking oils can be accidentally overheated to a point where they may produce smoke and possibly spontaneously combust into flame.

Recently, indoor use electric turkey fryers have made it into the marketplace. These units are primarily used on a kitchen countertop. The food to be cooked is hand lowered into the hot cooking oil at the end of a coat hanger like handle hooked onto a bucket-like bail handle, which is attached to a perforated pot which holds the food. Adding even a minimal 36 inch countertop height, and the 14 inch turkey fryer height, and the 8 inch high perforated bucket, and the 14 inches of handle above it, this may require the user to lift a 14 pound or larger turkey, away from their body, a distance of about 72 inches into the air just to load it. As noted above, the task of lowering the turkey into the hot cooking oil must slowly avoid splashing the hot oil. This is difficult for a six foot tall man, but may be nearly impossible for those of smaller stature.

In addition, the presence of an electrical cord introduces the opportunity for these new units to be accidentally pulled off the countertop by their cords, thus presenting new potential safety hazards associated with spilled hot cooking oil.

SUMMARY OF THE INVENTION

Several preferred embodiments of the present inventions are described herein and illustrated in the accompanying figures. A preferred embodiment of the present inventions may have one, or a combination of the following features and advantages.

It may deep fat fry small and large foods up to, as an example, a large 20 pound turkey.

It may also be used as a food steamer for steaming items such as vegetables, clams, crabs, and many other foods.

A preferred embodiment may be used as a roaster, similar to roasters marketed today under the Nesco brand-name. Such a device may roast food, or be used to prepare soups and stews.

A preferred embodiment may be used to boil foods in water, such as eggs, lobsters and vegetables.

A preferred embodiment may be electrically powered.

A preferred embodiment may be used indoors.

A preferred embodiment may be used on a countertop.

A preferred embodiment may have its cooking functions controlled using only a simple, single, user-set timer.

A preferred embodiment may use its mounted food support as an intervening safety barrier between a user and hot cooking liquid contained within the embodiment.

A preferred embodiment may have a lid that can be latched down as a barrier between a user and hot cooking liquid.

A preferred embodiment may comprise means for lowing food into hot cooking liquid under motor power.

A preferred embodiment may have a compact food lifting and lowering mechanism that fits within the cooking enclosure. Such a mechanism may use a flexible tension member. Alternatively, such a mechanism might use a rotating screw threaded rod. Such a mechanism may be removable to facilitate embodiment cleaning.

A preferred embodiment may have a control box enclosure that can be removed from the rest of the device for cleaning or other purposes. When removed, such an enclosure may automatically disconnect internal electrical components from electrical power by separating a plug and receptacle connecting the enclosure with the rest of the device. Such an enclosure may house the food lifting and lowering mechanism. Such an enclosure may also solidly connect to a heating coil.

A preferred embodiment may be vented to cool its outer enclosure. The outer enclosure may also be constructed from materials, such as plastics and the like, to reduce the potential of a user getting a burn from touching the outer enclosure.

A preferred embodiment may comprise means for lowering food into the hot cooking liquid immediately upon the cooking liquid becoming hot enough to cook.

As a safety and a convenience feature, a preferred embodiment may not require a user to be present when food is being lowered into the hot cooking liquid.

Also as a safety and a convenience feature, a preferred embodiment may not require a user to be present when food is raised from the hot cooking liquid.

A preferred embodiment may comprise means for lifting the food out of the hot cooking liquid under motor power.

A preferred embodiment may comprise means for lifting food out of hot cooking liquid at a user predetermined time.

A preferred embodiment may comprise means for automatically draining excess cooking liquid from foods after cooking is complete. It may also incline foods to facilitate this draining.

A preferred embodiment may be easily emptied of cooking liquid using an inexpensive, simple drain tube, hose or conduit that may be flexible to facilitate the draining process.

Likewise, wash and rinse water may also be emptied using the same simple, inexpensive, simple drain tube, hose or conduit.

A preferred embodiment may use such a drain hose as both a means for transporting drained liquids, and as a valve having no moving parts. It may also have a redundant, inexpensive, simple plug or pinch valve for safety.

A preferred embodiment may use a single, accurate, inexpensive preset thermostat instead of an expensive relatively inaccurate adjustable thermostat. Likewise, it may use two or more such inexpensive preset thermostats where two or more specific cooking temperatures are needed, such as cooking with hot oil and cooking with boiling water.

A preferred embodiment may use an inexpensive external heating element.

A preferred embodiment may have a lid whose area is over 90% transparent to facilitate viewing of foods being cooked, and thus stimulate appetite appeal, and aid in gauging of food cooking progress. The transparent portions of the lid may be inclined to minimize build up of vision obscuring moisture.

To accommodate larger foods, a preferred embodiment may have a concave lid which is over 20% deeper than it is wide moving radially from right to left across the lid surface. Such a concave lid may be transparent to provide an even more expansive viewing area of foods being cooked. Such a concave lid may be inverted and nested into an embodiment base to provide compact storage. Such a concave lid may be positioned close to the cooking oil level through use of a flexible, heat resistant gasket, which prevents any foam formed during the cooking process from escaping. Such a concave lid can be monolithic in construction. As an example, it might be injection mold to simplify construction, ease cleaning, reduce cost, and increase durability.

A preferred embodiment may have a lid that can be easily detached from the rest of the device for food insertion or removal, and/or for cleaning. Alternatively, the lid may be configured to be rotated back and rested in a stable open position for food insertion and removal.

A preferred embodiment may have a lid that can be latched down to prevent rapid egress of hot cooking liquid in the event the cooking device is tipped over, or it falls off a countertop or other supporting surface.

A preferred embodiment may be scaled to a height of not more than 16 inches to cook on a kitchen countertop having adjacent over-countertop cabinets.

A preferred embodiment may have side vents to minimize or eliminate damage to such over-counter cabinets.

A preferred embodiment may have handles on its side to facilitate movement and storage of the cooking device.

A preferred embodiment may have a spring loaded lid with a single latch to facilitate opening and latching the lid using only one hand.

A preferred embodiment may have handles at its foreword right and left hand corners to allow a user to open the device without putting their hands or arms in the direct path of hot vapors escaping from the cooking device's cooking cavity.

A preferred embodiment may attach an electrical cord using a magnetically coupled plug.

A preferred embodiment may use inexpensive low-temperature materials by insulating them from high temperature components using small insulation barriers.

A preferred embodiment may have a food support that is open without vertical walls on three of its sides, thus reducing construction costs, and minimizing embodiment countertop footprint.

A preferred embodiment may only need two user interventions to deep fat fry foods, as compared to conventional fryers which require four user interventions as described above.

A preferred embodiment may have a filter to condense and reduce cooking contaminants and odors from mixing with the room air.

A preferred embodiment may have a cooking oil filter disposed within its cooking cavity to strain cooking oil, and thus extend the oil's cooking life. In conjunction with this, or as an alternative, a preferred embodiment may have a filter assembly to strain cooking oil when it is being drained from the cooking cavity for storage or other purposes.

The following additional exemplary embodiment addresses real world marketing and cost considerations. This means, as in earlier exemplary embodiments, that not all desired features are provided.

BRIEF DESCRIPTION OF THE DRAWINGS

These and other features and advantages of the present inventions will be appreciated as the same becomes better understood by reference to the following detailed description when considered in connection with the accompanying drawings wherein:

FIGS. 51A and 51B are cross-sectional views taken of detail sections 330 and 332 of FIG. 52;

FIG. 52 is a cross-sectional side view of the fourth preferred embodiment of FIG. 39, showing the lid in both the closed position (solid lines) and in the tilted back open position (phantom);

FIG. 98A—upper enlarged, is a close-up of the upper portion of FIG. 98A.

FIG. 98A—lower enlarged, is a close-up of the lower portion of FIG. 98A.

FIG. 98B—upper enlarged, is a close-up of the upper portion of FIG. 98B.

FIG. 98B—food support enlarged, is a close-up of FIG. 98B showing a portion of the right side of the food support assembly 910.

FIG. 98B—lower enlarged, is a close-up of the lower portion of FIG. 98B.

FIG. 108 is a side perspective view of the embodiment shown in FIG. 107 with food support assembly 910 raised and level.

FIG. 109 is similar to FIG. 108 except that food support assembly 910 is lowered and level.

FIG. 110 is similar to FIG. 108 except that food support assembly 910 is raised and tilted forward.

FIG. 111 is similar to FIG. 110 except that food support assembly 910 is lowered and is set to raise in a tilted position.

FIG. 112 is a forward perspective view of food containment basket 911.

FIG. 113 is a forward perspective view of two food containment baskets 911, 911A stacked on top of one another in a first widely spaced stacking arrangement.

FIG. 114 is similar to FIG. 113 except food containment baskets 911, 911A stacked on top of one another in a second closely spaced stacking arrangement.

FIG. 115 is a forward exploded perspective view of three food containment baskets 911, 911A, 911B and including food support assembly 910

FIG. 116 is a forward perspective view including control box 912 and enclosed heatsink 914.

Figure 91:
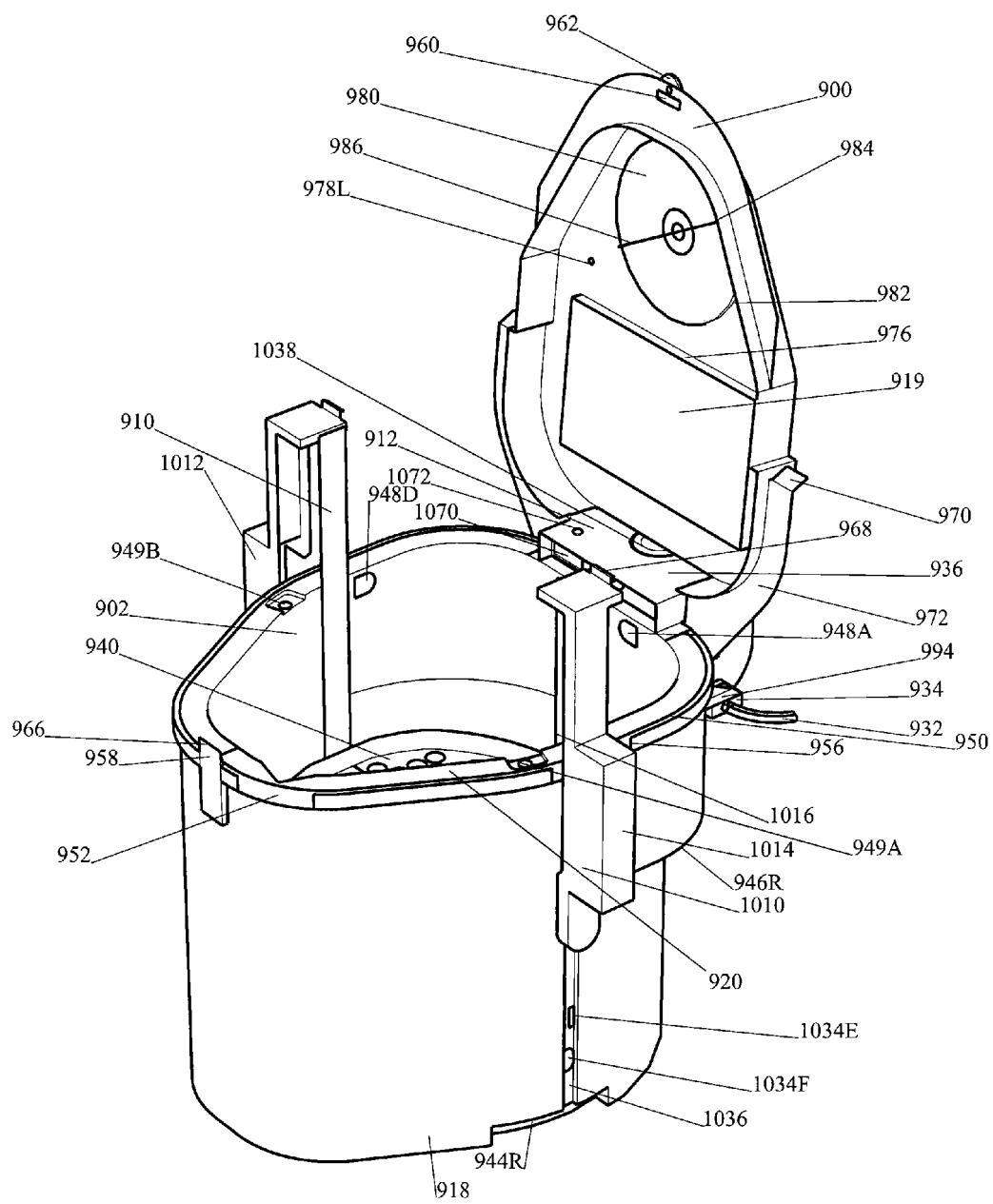
FIG. 91 is a forward perspective view of the exemplary embodiment shown in FIG. 90 with its lid 900 raised and its food support assembly 910 in place in its intermediate raised position.
Figure 117:
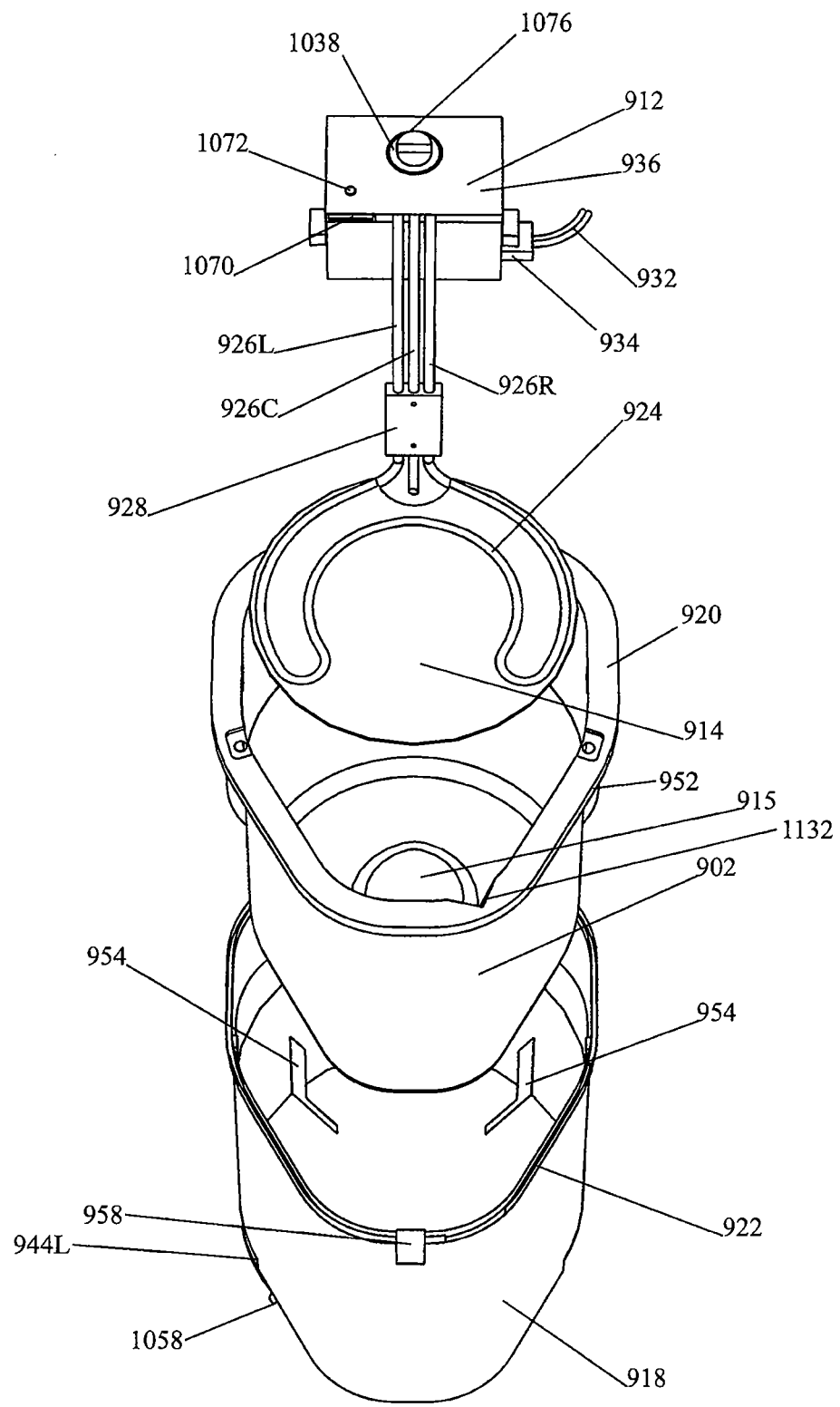

FIG. 117 is an upper perspective exploded view of the device shown in FIG. 91, but only showing control/heating assembly 936, cooking vessel 902, and outer enclosure 918.

Figures 118A, 118B:
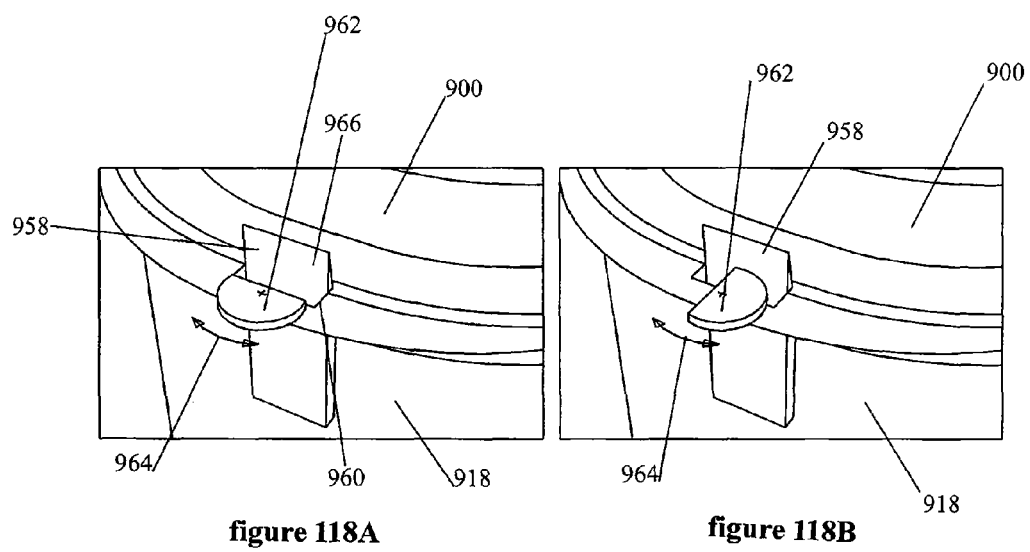

FIG. 118A and FIG. 118B is a forward perspective view showing how latch lock 962 operates.

Figure 119:
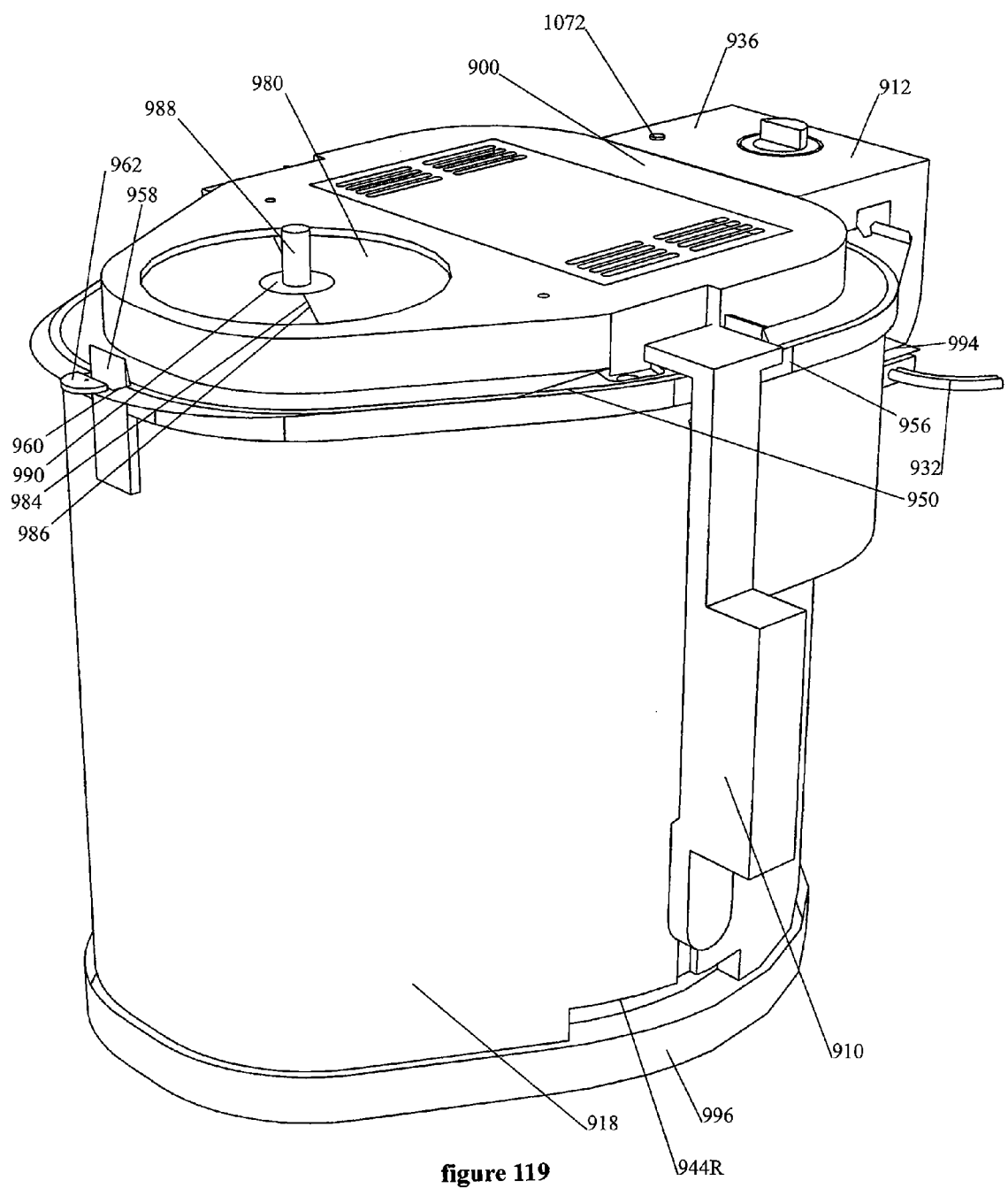

FIG. 119 is a forward perspective view showing overflow reservoir 996.

DETAILED DESCRIPTION OF THE INVENTION

Cooking devices, constructed in accordance with the principles of this invention, are generally configured to facilitate the cooking of a food article by placing the food article into contact with a hot cooking liquid, e.g., oil or hot water. The devices are specifically constructed to facilitate this process and comprise an internal cooking cavity designed to accommodate a volume of a cooking liquid and the desired food article. A heating source is contained in the device and is positioned adjacent the cooking cavity to heat the cavity and its contents. A lid is positioned over an opening of the cooking cavity and is transparent to permit viewing of the food article being cooked.

The device can be configured having a food support vessel or food basket disposed therein that can be raised and/or lowered automatically or manually to remove the food article from the cooking liquid or place the food article into the cooking liquid, respectively. In an example embodiment, the device can be automatically controlled to provide a desired cooking temperature and/or to place and/or remove the food article into the cooking liquid to achieve a desired cooking effect.

Cooking devices, constructed in accordance with principles of the invention can be configured having a number of different embodiments. Accordingly, while a number of example embodiments of the cooking device are disclosed and illustrated herein, it is to be understood that other embodiments of cooking devices constructed according to principles of this invention not expressly disclosed or illustrated are also intended to be within the scope of this invention.

First Embodiment

Figure 12:
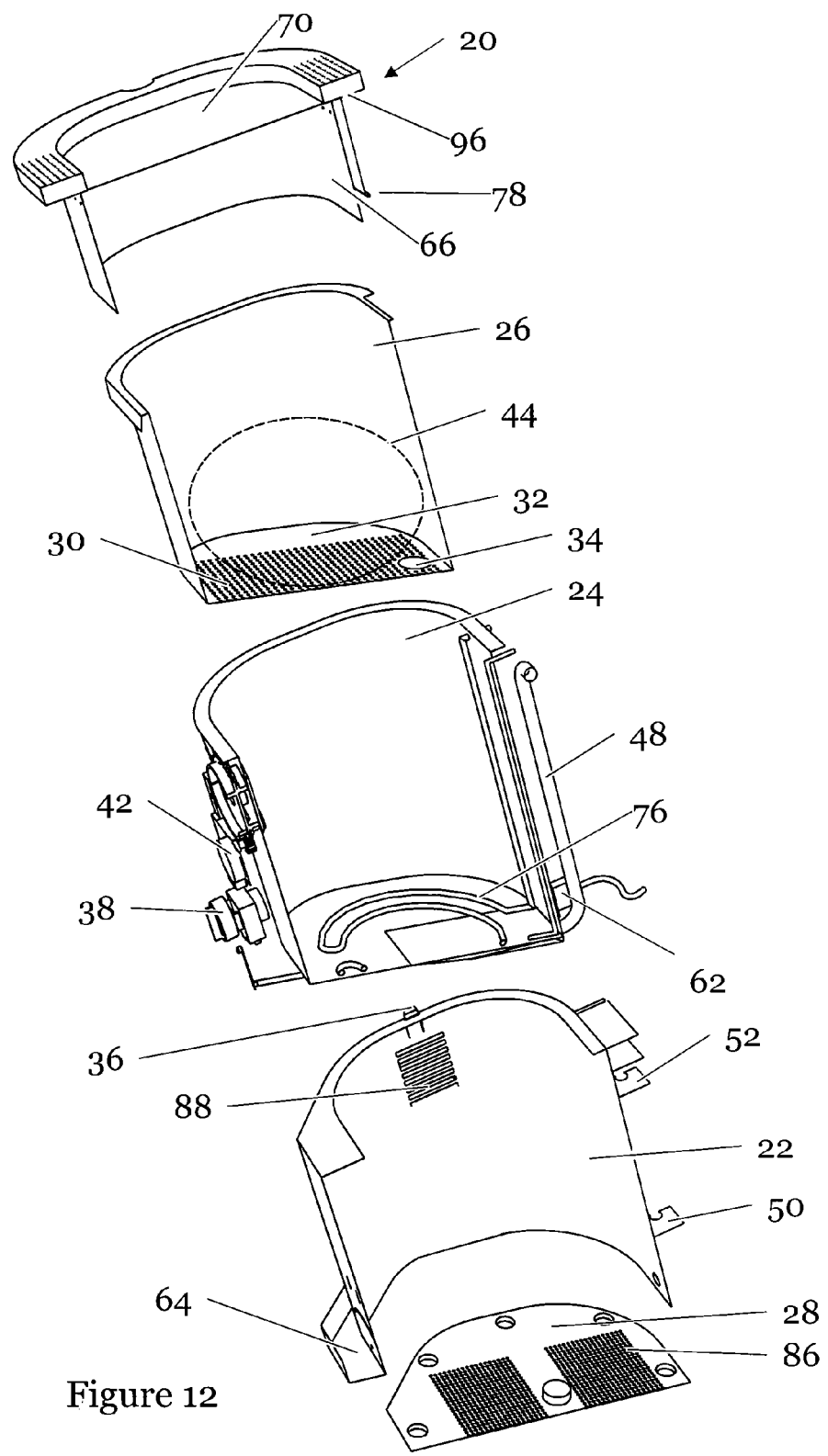
FIG. 12 is an exploded cross-sectional perspective view of the first preferred embodiment of FIG. 1 showing its elements in an unassembled state.

FIGS. 1 to 12 illustrate a first embodiment cooking device 21 constructed in accordance with the principles of this invention. The cooking device 21 generally comprises an outer or external housing 22 that is sized and shaped to provide an inner cavity to accommodate the different elements of the device. The outer housing 22 can be formed from structurally rigid materials such as metals, plastics and the like and defines an outer structure of the device. The outer housing 22 comprises a wall structure that extends upwardly from a base or bottom portion that is positioned adjacent a device supporting surface, e.g., a table or kitchen counter, and that extends axially a distance to an open end. In an example embodiment, the outer housing is capped on its bottom end by a base 28 (as best shown in FIG. 12).

The outer housing 22 can be configured including one or more vents to facilitate providing a more user-friendly cool outer surface. In an example embodiment, the outer housing 22 is constructed having convection ventilation of hot air that is disposed within the annular space that is formed between the inside surface of the outer housing and the outside surface of the cooking vessel (24 described below). Specifically, the outer housing is constructed comprising a plurality of vent openings 86 disposed through the base 28, and vents 88 disposed through the wall surface of the outer housing 22.

Figure 3:
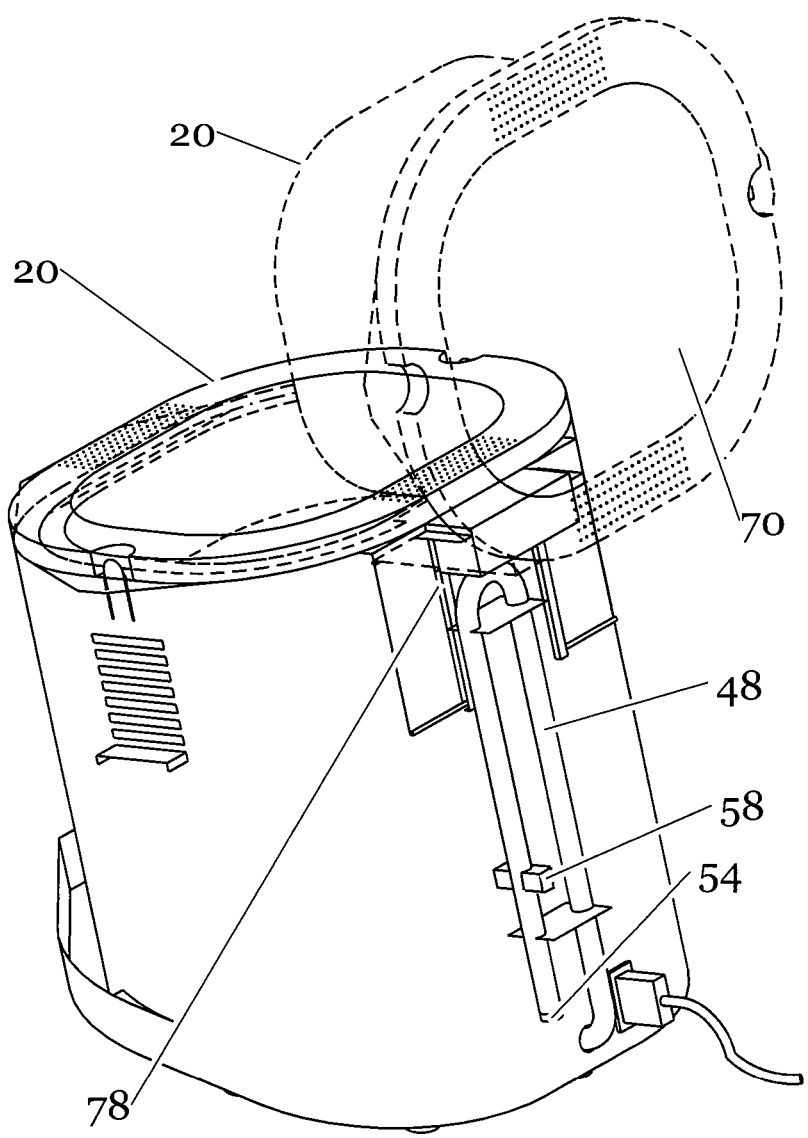
FIG. 3 is a rear upper perspective view of the first preferred embodiment of FIGS. 1 and 2.

A lid 20 is positioned over a top end of the device 21 and is located adjacent the open end of the outer housing 22. In an example embodiment, a portion of the lid is attached to the device to facilitate movement of the lid from an open to a closed position without being removed therefrom. In an example embodiment, the lid is configured to close against a cooking vessel 24 that is disposed within a cavity ## of the outer housing 22. The lid 20 is attached to the device 21 in a manner that permits it to both move axially within the device, to seal and unseal with the cooking vessel 24, and to pivot away from the open end of the outer housing 22, to permit for the loading and unloading of food into and out of the cooking device. In an example embodiment, the lid 20 is attached to the device through a slide and hinge mechanism 78 (as best shown in FIG. 3). The lid may be rested in an open position (as shown in FIG. 3) to make it more convenient to use the device.

The cooking vessel 24 is statically secured within the cavity of the outer housing and is made from a structural material such as metal, metal alloy and the like that is capable of retaining a rigid structure while containing a volume of heated cooking liquid such as oil or water. In an example embodiment, the cooking vessel is formed from a metallic material. The cooking vessel is configured having a wall surface that is sized and shaped to fit concentrically within the outer housing cavity. The cooking vessel as a closed end that is positioned adjacent the outer housing base, and has an open end that is positioned adjacent the outer housing open end.

A food support vessel 26 is disposed within the device 21 and, more specifically, is removably disposed within the cooking vessel 24. The food support vessel 26 comprises a generally continuous wall structure that is sized and shaped to fit concentrically within the cooking vessel, and that extends axially from a base or floor 32 to an open end. The food vessel floor 32 comprises a plurality of holes or perforations 30 that extend therethrough that are sized and shaped to facilitate the passage of the desired cooking liquid from the cooking vessel and into the food vessel.

The food support vessel 26 is sized to permit axial movement within the cooking vessel 24 to facilitate moving the food vessel axially upwards and downwards therein. As better described below, the food support vessel 26 is configured to contain one or more desired food articles therein while the food article is being cooked within the cooking vessel, and while the food is being lowered into a cooking position and removed from a cooking position within the cooking vessel 24.

In an example embodiment, the cooking vessel 24 and food support vessel 26 are both configured having an slightly elongate cylindrical configuration, thus being better able to accommodate and being more closely contoured to fit an exterior of a turkey. Configuring the cooking vessel and food support vessel in this manner enables the device to more efficiently accommodate a turkey without wasted space, thereby helping to maximize counter space, as well as more efficiently cook a turkey without wasted cooking liquid and the energy and time necessary to heat the same, when compared to a simple cylindrical cooking device.

The lid 20 of the device is placed into an open position to allow for the loading of one or more food articles into the food support vessel 26. The lid is designed to move from an open position by hingedly swinging over the open end of the food support vessel 26, and then sliding axially towards the food support vessel 26 to cap and seal the cooking vessel 24.

In operation, the lid 20 is opened to exposing the food support vessel 26. The desired cooking liquid, e.g., oil, poured into the open end of the food support vessel 26 and runs through the holes 30 in the food support vessel floor 32. The cooking liquid is provided until a desired cooking volume is achieved. In an example embodiment, the floor of the food support vessel includes a viewing depression 34 disposed therein that enables viewing of the cooking liquid level within the device. Viewing the depression 34, located in and projecting below the bottom of food support vessel 26, by filling with oil before the acceptable oil level is exceeded, helps to ensure a user will not overfill, or underfill, the device with water for steaming, or with cooking oil for deep fat frying. Alternatively, a light conducting material, such as glass or plastic, may be formed to perform the same purpose.

The device includes a trough 64, formed at least along a lower forward outer portion of outer housing 22 that operates to catch and contain any cooking liquid that may spill when introducing it into the device or that overflows from the device for any reason. Accordingly, the trough 64 helps to prevent the spillage of cooking liquid from the device onto and potentially causing damage to a supporting substrate surface.

Figure 5:
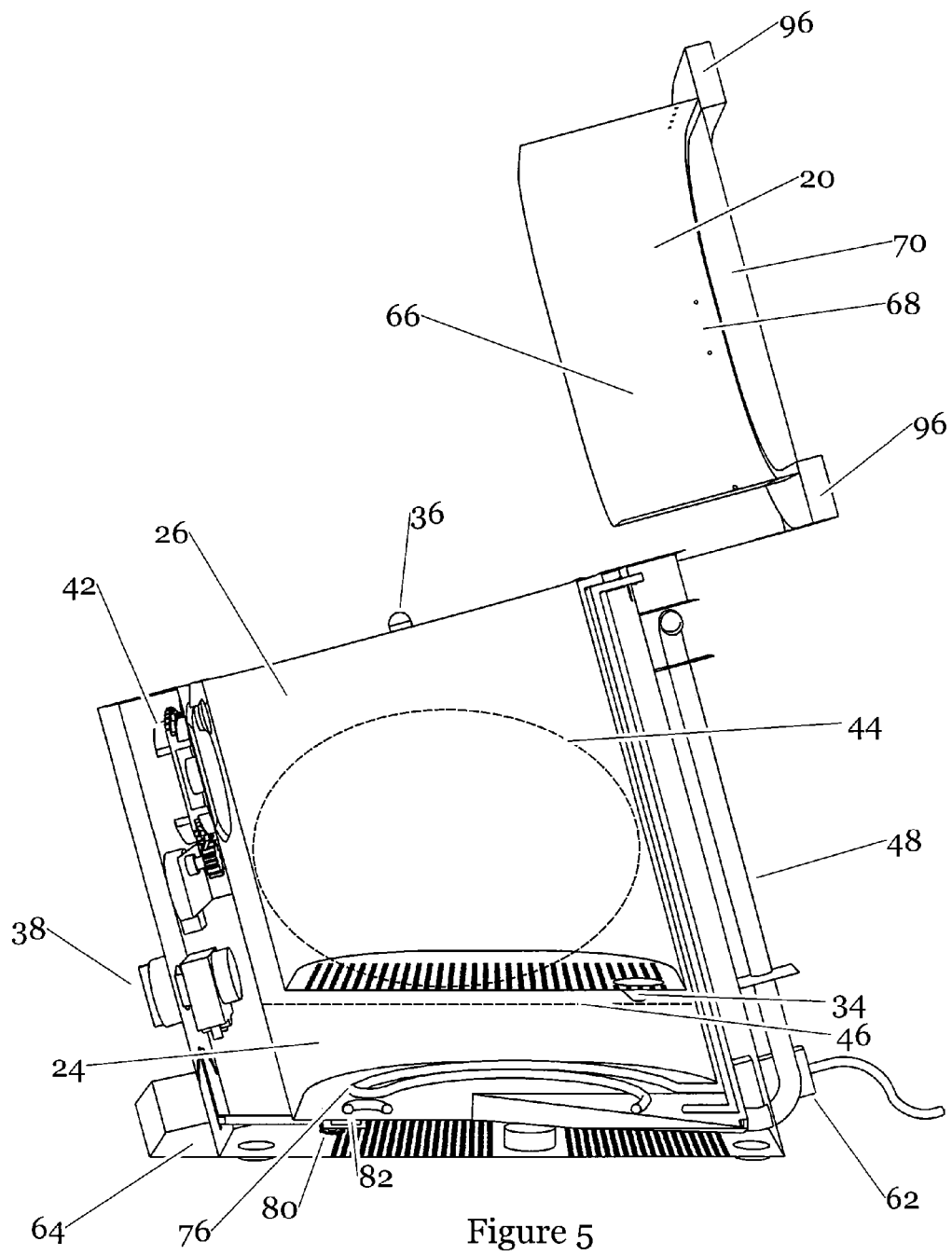
FIG. 5 is a cross-sectional side view of the first preferred embodiment taken along section 5-5 in FIG. 4, with both its lid open and its food support vessel in a raised position.
Figure 6:
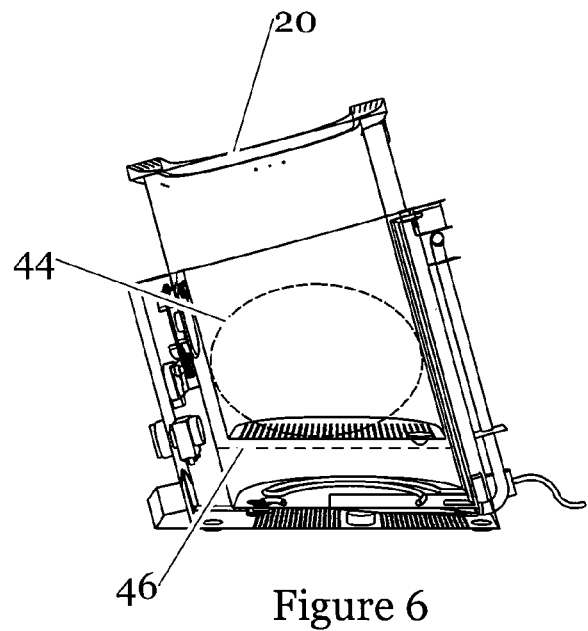
FIG. 6 is a cross-sectional side view of the first preferred embodiment as shown in FIG. 5, but with the lid in an intermediate position between being opened and closed, and with the food support vessel in a raised position.

FIG. 5 shows the device after a desired food article 44 or food articles have been placed in the food supporting vessel 26. The food supporting vessel 26 is placed in a raised position with cooking vessel 24, and the lid 20 is retracted back away from the opening of the food supporting vessel 26. Once the food article is loaded within the food supporting vessel 26, the lid 20 is pivoted towards and placed over open end of the food supporting vessel as best shown in FIG. 6. Once positioned over the open end, the lid 20 is then axially moved into the food supporting vessel 26 and is closed into position to cap the cooking vessel 24. In an example embodiment, the lid is secured into place in its closed position by the use of one or more latches. In an example embodiment, the latches 36 are positioned along the device outer housing at diametrically opposed locations along the open end, and the latches can be operated to release the lid by latch switches positioned along an outside surface outer housing.

In an example embodiment, the device can include a timer that is configured to permit a user to set a desired cooking time. In a preferred embodiment, the timer is configured so that the set cooking time includes the time necessary to preheat the cooking liquid. Timer only control, where an adjustable thermostat is not used, may be desired for the purpose of making the cooking process simpler and more convenient.

Figure 8:
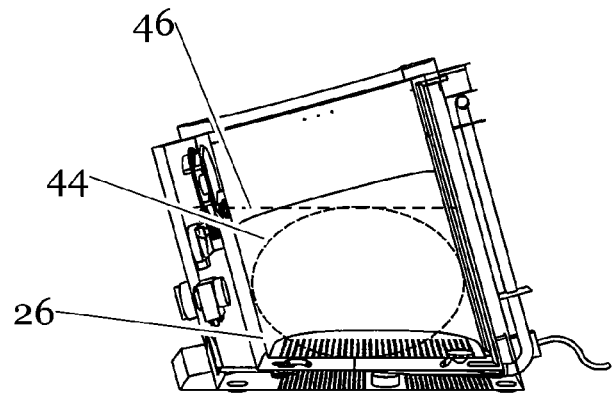
FIG. 8 is a cross-sectional side view of the first preferred embodiment as shown in FIG. 7, but with the lid in a closed position, and with the food support vessel in a raised position.
Figure 9:
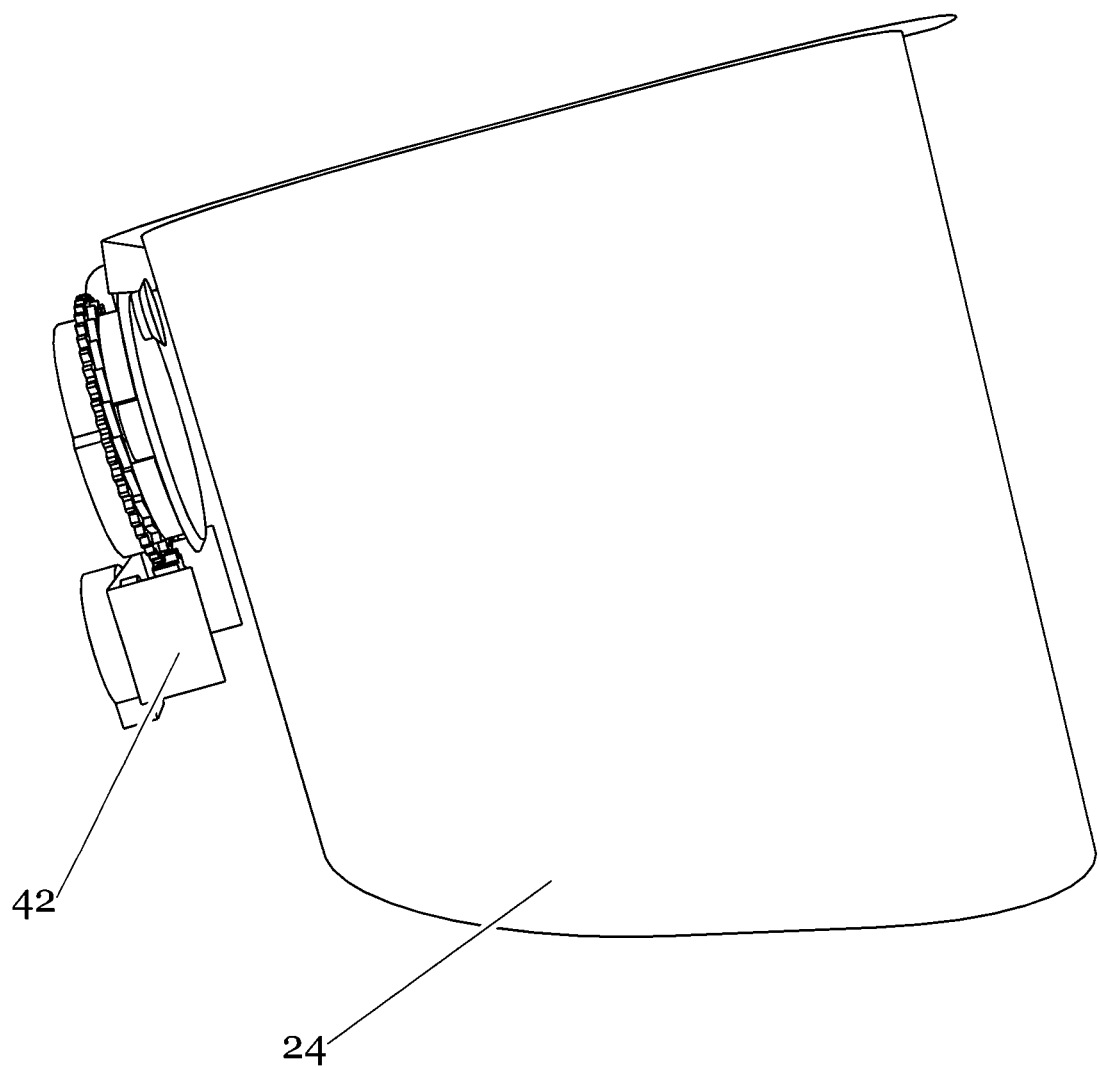
FIG. 9 is a side view of the food support vessel and a motor lifting mechanism.
Figure 10:
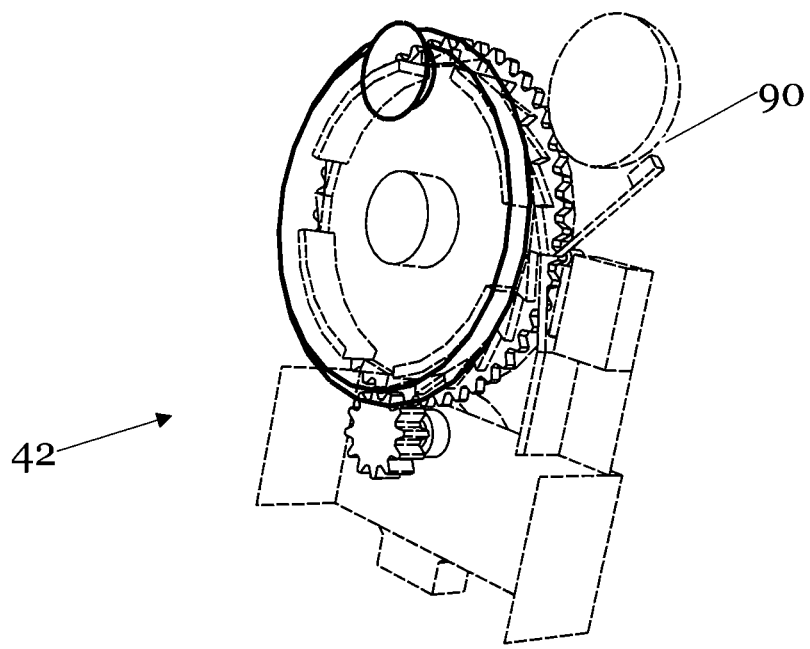
FIG. 10 is a front perspective view of the motor lifting mechanism of FIG. 9.
Figure 11:
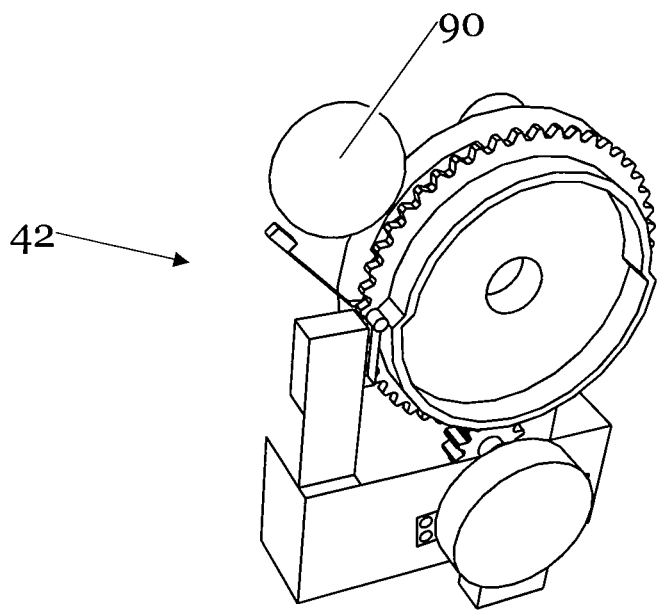
FIG. 11 is a rear perspective view of the motor lifting mechanism of FIGS. 9 and 10.

The device 21 further includes means for lowering and raising the food support vessel 26 within the cooking vessel. In an example embodiment, such lowering and raising means is provided in the form of a motor lifting and lowing mechanism 42. In an example embodiment, the motor lifting and lowering mechanism 42 is activated by an electric circuit 40, and is configured to lower the food support vessel 26 further down into cooking vessel 24 (as shown in FIG. 8). The electric circuit can be configured to operate the mechanism 42 by user input and/or in conjunction with the timer. For example, the electric circuit can be configured to operate the mechanism to lower the food article into the cooking liquid when the cooking liquid has reached the desired cooking temperature.

Figure 7:
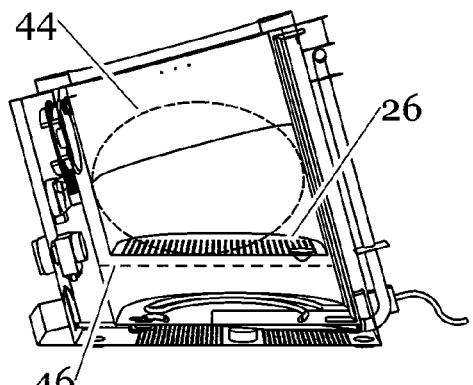
FIG. 7 is a cross-sectional side view of the first preferred embodiment as shown in FIG. 6, but with the lid in a closed position, and with the food support vessel in a raised position.

In FIGS. 7 and 8, the food article being cooked is shown as 44 and the cooking liquid surface is represented by dotted straight line 46. Accordingly, FIGS. 7 and 8 illustrate how the motor lifting and lowering mechanism 42 operates to place the food article into contact with the cooking liquid, and how the cooking liquid is displaced within both the cooking vessel and the food supporting vessel to cover the food article to enable cooking of the same.

In such example, when the timer has reached the set cooking time, it is configured with the electric circuit 40 to operate the motor lifting and lowering mechanism to raise the food support vessel 26 and remove the food article out of the cooking liquid. As shown in FIG. 7, the food is then suspended above the cooking oil where the food may drain. In an example embodiment, the lifting and lowering mechanism 42 can include a lifting bell mechanism 90 that is configured to ring when the food placed within the food support vessel is being raised or lowered in the device, thereby operating to provide an audio alert to the user to verify that these operations are carried out correctly.

Figure 13:
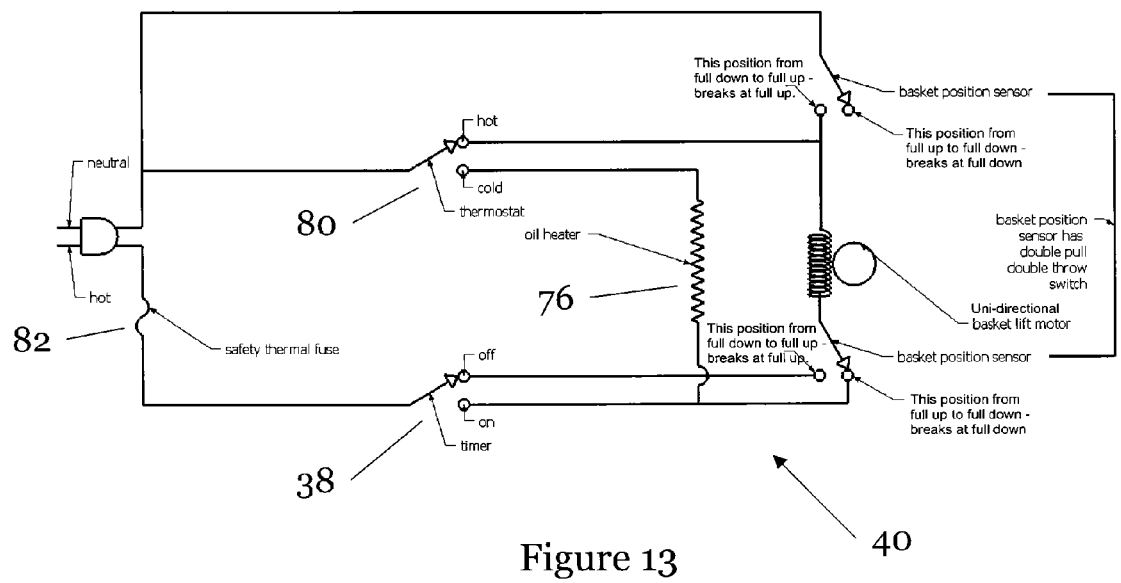
FIG. 13 is a schematic diagram of an electrical system in the first preferred embodiment.

An example electrical circuit utilizing a preset thermostat, shown as circuit 40 in FIG. 13, used in combination with food lifting and lowering 42, helps ensure that the food article is lowered into the cooking liquid immediately or soon after the cooking liquid has reached a temperature that us sufficient to cook the food. Once the fool article is placed into the device and the thermostat is set at the desired cooking temperature, the remaining steps of heating the coking liquid to the cooking temperature, lowering the food article into the cooking liquid, cooking the food article for a desired amount of time, and removing the cooked food article from the cooking liquid, is all done automatically, and without the need for user intervention. Thus, the electrical circuit and lifting and lowering mechanism combination helps to ensure that the food properly cooked, removed from the cooking liquid, and drained, all at the proper time, as set by the user, and all again without the need for user intervention after start up.

Thus, the circuit and lifting mechanism greatly simplifies and makes safer the cooking process. Instead of having to use the four-step process described earlier, where the user must first preheat oil, then come back and put the food into the heated oil, and then return a third time to take the food out from the oil, and finally return a fourth time after the food has been drained of excess oil to serve the food; the user of the present device must only put the food and the oil into the device, activate the circuit by setting the timer 38, and then return to serve the food after the food has been automatically cooked and drained.

The cooking liquid can be left in the device 21 for repeated use or may be removed, depending upon expected usage and operator desires. In an example embodiment, the device 21 is constructed comprising a drain tube or conduit 48 (best shown in FIG. 3) that is mounted in storage brackets 50 and 52 that are positioned along an outside surface of the outer housing 22. The drain tube has a first end that extends through an opening in the outer housing and that is in communication with cooking liquid disposed within the cooking vessel 24. The opposite end of the drain tube is closed by the use of an appropriate closing member, such as a valve, plug or the like. In an example embodiment, the drain tube end opposite from the cooking vessel is sealed by a plug 54 that is pressed into the end of tube. The drain tube can be formed from conventional materials that can be flexible and that are able to with-stand the temperature of the cooking liquid. Suitable materials for forming the drain tube include.

In an example embodiment, the drain tube runs upwardly a distance along the outside surface of the outer housing 22 from the opening near the base of the outer housing to a height that is above the highest surface level of the cooking liquid, i.e., as measured when the food article is lowered therein for cooking. The drain tube then has a 180 degree bend at this point along the outer housing so that its end opposite the end disposed within the outer housing opening is positioned adjacent the outer housing base. The drain tube 48 is positioned in this matter along the outer housing outside surface to prevent unwanted leakage of cooking liquid therefrom from gravity effect.

When the cooking liquid is to be removed from the device, the drain tube 48 is removed from the storage brackets 50 and 52, and the plug is removed from the tube end. The end of the tube 48 is then placed into communication with an appropriate storage or disposal device. The tube may also be configured having a pinch valve 58 positioned therealong in addition to or in place of the plug 54. The plug 54 and pinch valve 58 are optional redundant valving mechanisms, which may augment the gravity valve provided by drain tube 48 when it is stored on brackets 50 and 52. The cooking liquid is then allowed to drain from the device by gravity by moving the disposal container, and the drain tube, to a position below the surface level of the cooking liquid, e.g., by placing the disposal container onto the floor. In an example embodiment, the storage or disposal container can be configured as illustrated in FIG. 14.

Figure 14:
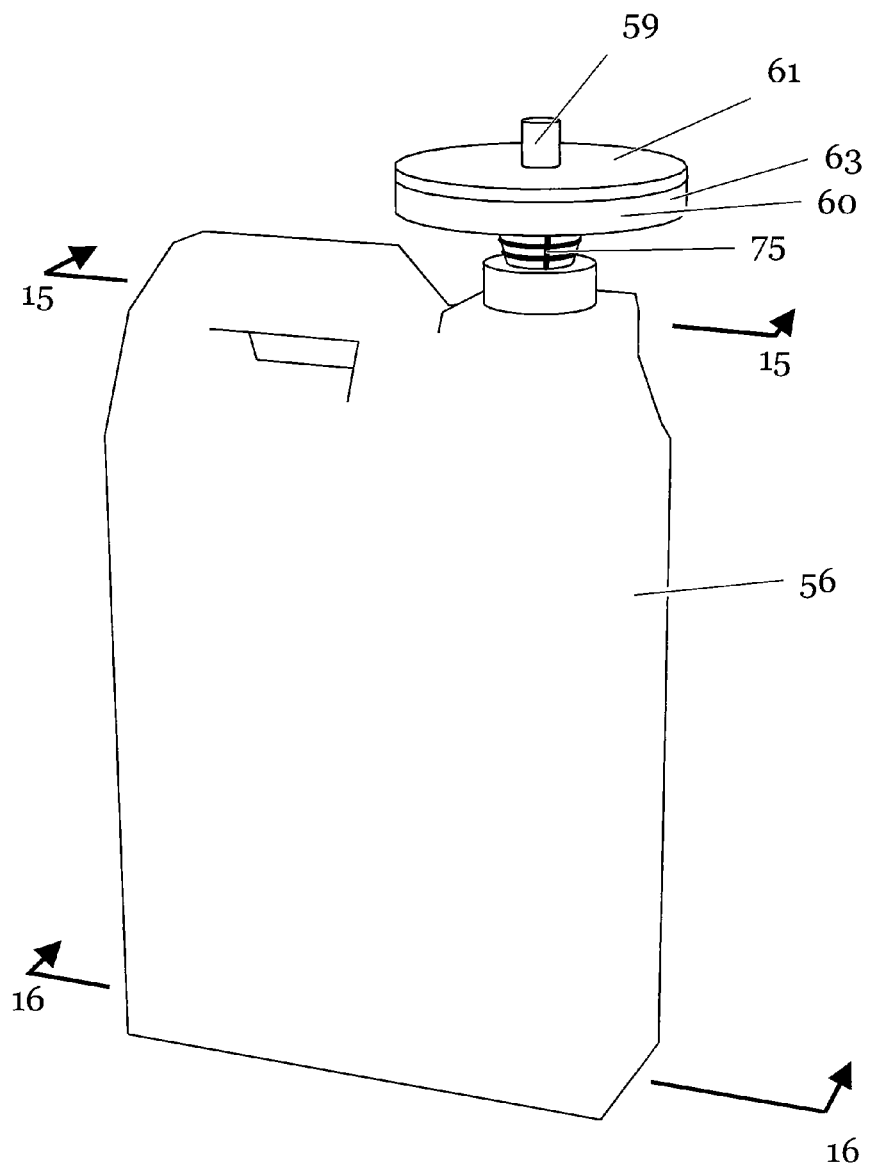
FIG. 14 is a front perspective view of a filter that may be attached to the end of a flexible drainage hose, and inserted as shown into a storage or disposal container.
Figure 15:
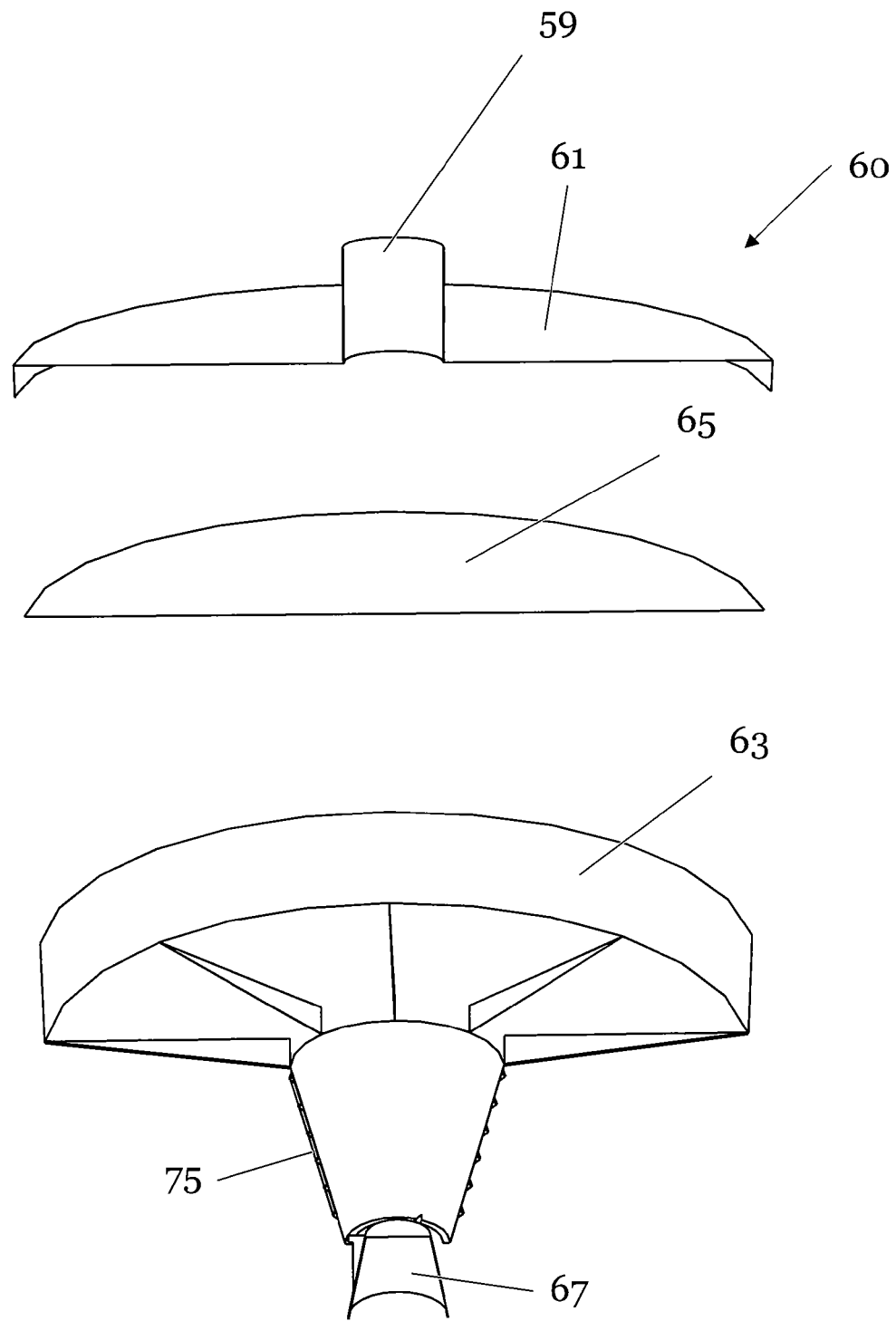
FIG. 15 is an exploded cross-sectional view through the filter shown taken along section 15-15 in FIG. 14.
Figure 16:
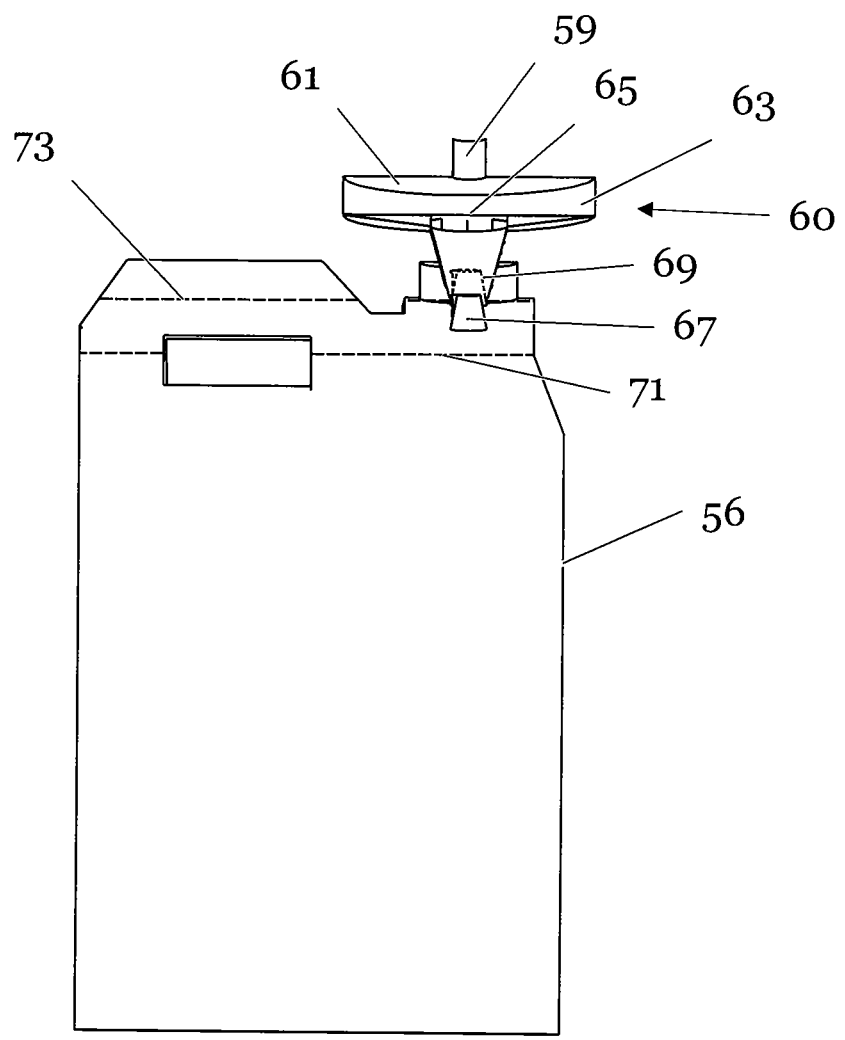
FIG. 16 is a cross-sectional perspective view taken along section 16-16 of FIG. 14.

FIGS. 14 to 16 illustrate a filtering mechanism 60 that can be used in conjunction with the device 21 for the purpose of filtering the cooking liquid removed from the device for reuse within the device or for storage. The filtering mechanism 60 comprises an upper filter housing 61 having a nipple 59 that projects outwardly therefrom, and that is sized and configured to permit connection to an end of the drain tube 48. The upper filter housing 61 is sealed to a lower filter housing 63 with the two housings forming an enclosure that contains a filter 65. All liquid entering the filter enclosure via the nipple 59 must therefore pass through the filter 65 before exiting out of the bottom of lower filter housing 63.

The lower filter housing 63 includes a plurality of surface features 75 that are configured to provide a secured fit with the storage or disposal container 56 and/or to allow air to escape from the container 56 during the cooking liquid draining process to prevent unwanted pressure build up within the container that could otherwise impair cooking liquid drainage. In a preferred embodiment, the surface features 75 are provided in the form of ribs that extend circumferentially around the lower filter housing 63.

The filtering mechanism additionally includes means for shutting off the flow of cooking liquid therethough when the level of cooking liquid in the disposal or storage container 56 reaches a predetermined maximum level. In an example embodiment, the means for shutting off flow is provided in the form of a float valve that is embodied in the form of a inverted frustum-conical shaped filter stopper 67 that normally hangs in an open position allowing liquid flow thereby when the cooking liquid level within storage or disposal container 56 is below the bottom of filter assembly 60 as exemplified by dotted line 71 (as best shown in FIG. 16).

When the cooking liquid level in the container 56 rises above filter stopper 67's lower rim (as shown by the cooking liquid level 73 in FIG. 16), further transmission of liquid through filter assembly 60 is blocked by the upward movement of the filter stopper 67, floating up on higher cooking liquid level 73, blocking the cooking liquid from passing through the filtering mechanism, as indicated by as dotted outline 69. This, therefore, operates to prevent the storage or disposal container 56 from becoming overfilled. The cooking liquid that is filtered through the filtering mechanism 60 can be reused in the device, and such filtering of the cooking liquid operates to extend the duration during which the same cooking liquid can be used without replacement.

Figure 4:
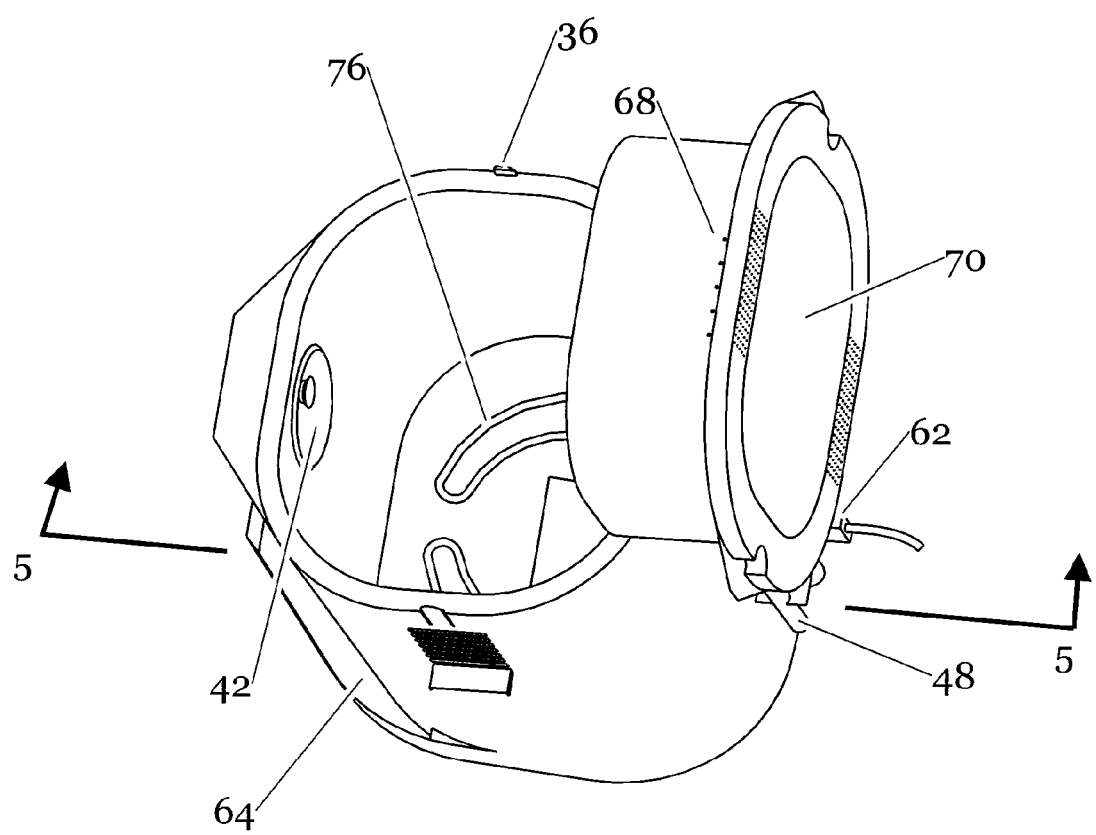
FIG. 4 is a top view of the first preferred embodiment of FIGS. 1 to 3 with a food support vessel removed.

In an example embodiment, the device 21 is configured to heat the cooking liquid contained therein by use of an electric heating element or coil 76 (as best shown in FIG. 4). In an example embodiment, a very efficient electric immersion heater, in the form of the heat coil 76, is used to bring the cooking liquid to a desired cooking temperature in minimum amount of time while simultaneously conserving electricity. This same heater can conveniently be unplugged and removed from the cooking vessel 24 to facilitate cleaning. Thereby, avoiding any potential damage or safety issue that may exist by exposing any electrical components to water during cleaning of the device.

Power can be supplied to the device by conventional household AC electricity via a conventional household electrical outlet. In a preferred embodiment, power is supplied into the device through the use of a plug 62 that is magnetically coupled to the device. The use of such a magnetically coupled plug 62 is desired for the purpose of permitting an easy release of the power supply cord from the device should the power supply cord be pulled. This feature provides an additional level of safety from the device unit being inadvertently moved or tipped due to an unintentionally stumbling or pulling on the cord.

The above-described and illustrated first embodiment cooking device has been described for cooking foods using a cooking liquid. Cooking liquids useful with the device are understood to be cooking oil and water. Thus, it is to be understood the device can be operated using either cooking oil or water using all of the same mechanisms described above to provide the same advantages noted above.

In an example embodiment, the device can be configured having an internal venting system that is engineered to reduce the possibility of foam overflowing from the cooking vessel 24. The venting system is operates to convert any cooking liquid foam formed in the device back into liquid cooking oil, and is provided in the form of a skirt 66 that extends downwardly a distance from an inside surface of the lid 20 and that is sized and configured to fit concentrically within the food support vessel 26 when the lid is in a closed position. The lid skirt 66 is basically a wall structure that extends a predetermined depth within food support vessel and that forms an annular space therebetween. In an example embodiment, the annular space is sufficient to allow for the free flow of cooking liquid therebetween.

The lid skirt 66 includes a plurality if vent holes 68 disposed therethough and that are provided adjacent a top potion of the skirt where it meets the lid. Any foam that is formed in the device during the cooking process is forced by cooking pressure through the annular space between the skirt 66 and the food support vessel 26 wall, and optionally also through lid skirt vent holes 68, and this operation operates to convert the foam back to liquid that is channeled back into the device.

As best shown in FIG. 5, in an example embodiment, the outer housing 22, cooking vessel 24, and food support vessel 26 are all configured having an inclined structure that is tilted towards a front of the device 21, and thus that is inclined towards the user. Such an inclined configuration is desired for the purpose of aiding the user in placing foods into and removing foods from the device. The inclined configuration of the outer housing 22, the cooking vessel 24, and the food support vessel 26 also makes the device easy to look into, without having to stand up directly over the device, thereby enabling a viewer to more easily view the food article being cooked.

To further facilitate this ease-of-viewing feature, the lid 20 is constructed comprising a large transparent window 70, which can be made from glass or plastic or the like.

In an example embodiment, the lid is configured to help prevent steam buildup on the inside surface of the lid glass through the inclined orientation of the lid on the device, and thus help a user to view the food being cooked. Additionally, the inclined placement of the lid and its window, by facing the user more directly than a horizontal window, also facilitates a user looking into cooking vessel 24 to view the food being cooked. In an example embodiment, the glass window 70 occupies about 80 percent of the lid upper surface, thereby also operating to provide an improved level of food viewing within the device.

In an example embodiment, a thermostat 80 is attached to the outside bottom surface of the cooking vessel 24, and its placement there may operate to facilitate cleaning of the cooking vessel as well as provide inexpensive manufacture. The thermostat 80 may be set at the factory for a fixed temperature or may be user adjustable. A thermal fuse 82 may also be attached to the exterior of the cooking vessel 24 to simplify manufacture and enhance safety.

Figure 1:
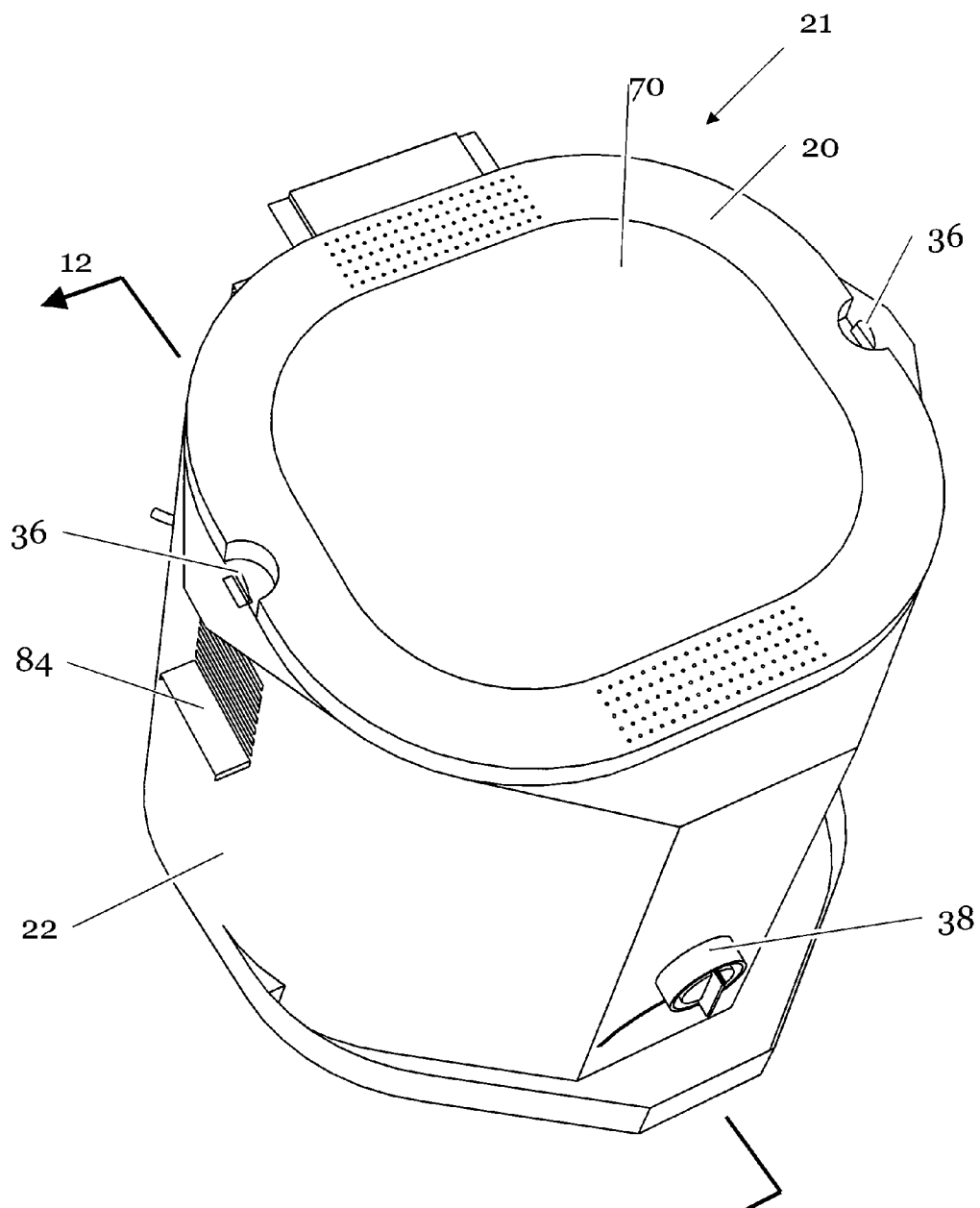
FIG. 1 is a front upper perspective view of a first preferred embodiment in a lip closed position.
Figure 2:
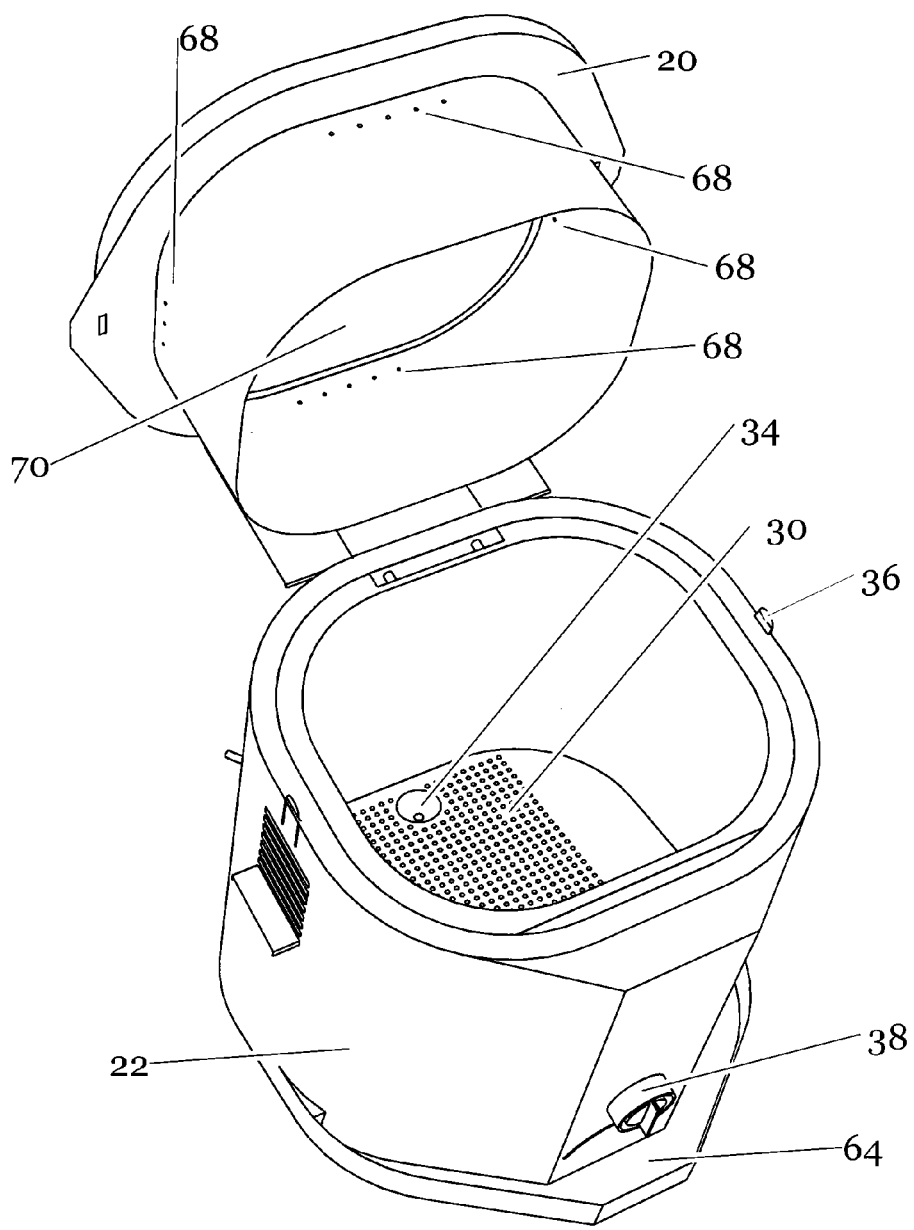
FIG. 2 is a front upper perspective view of the first preferred embodiment of FIG. 1 in a lid up position.

As best shown in FIG. 1, the device may be constructed having handles 84 located on sides of the outer housing 22, to assist the user in conveniently and safely moving the device 21.

If desired, the internal parts of the device, such as the cooking vessel 24 and foods support vessel 26, can be formed having a nonstick coating for the purpose of facilitating cleaning and to prevent the food articles from adhering thereto.

Each of the embodiments described herein has the potential to deep fat fry, or steam, or roast, or heat foods. They may also function as a roaster, similar to those made today by the company Nesco, with virtually all of the advantages that company's product line offers. This includes not only roasting and cooking solid food, including meats and vegetables, but also making soups and other liquid foods.

Second Embodiment

Figure 17:
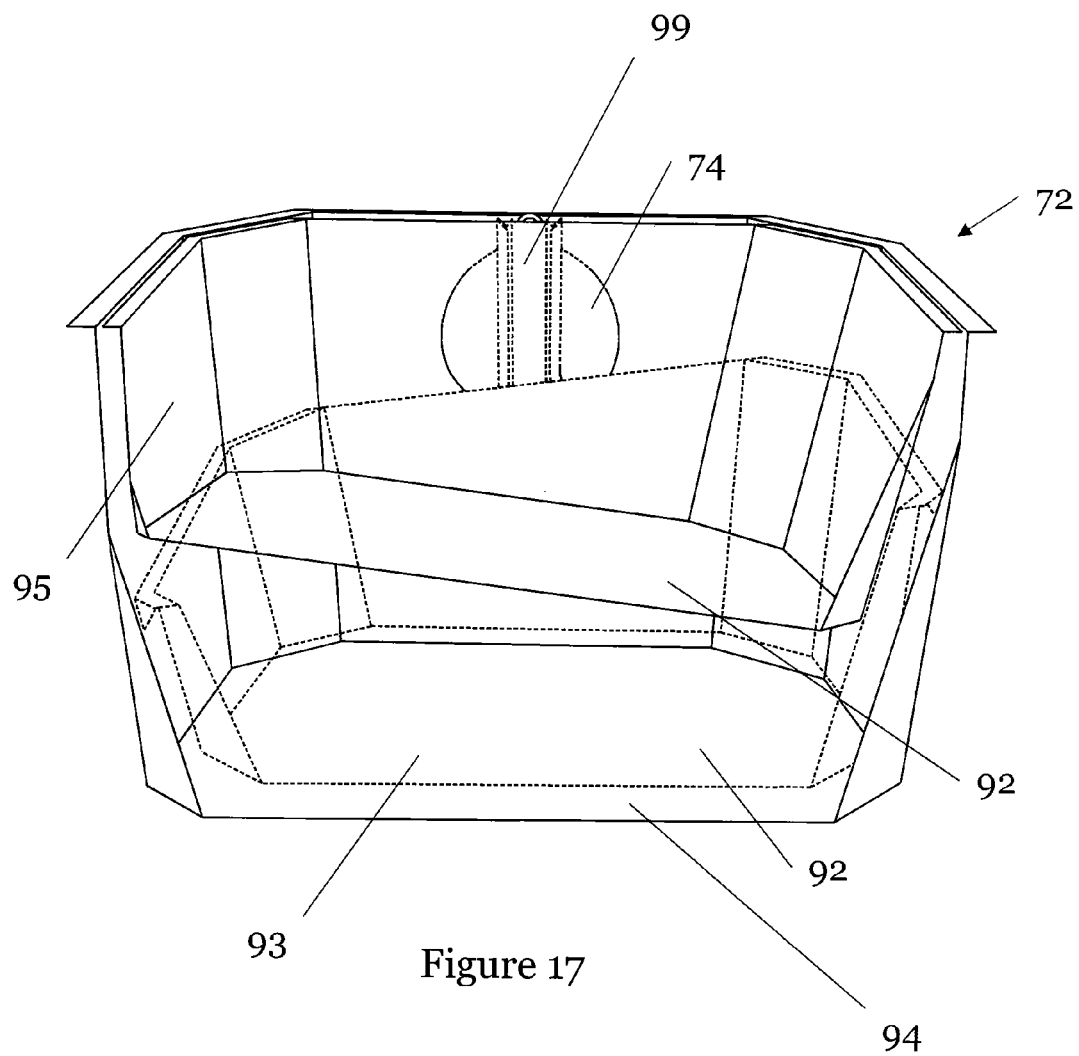
FIG. 17 is a cross-sectional perspective view taken along section 17-17 of FIG. 18 of a second preferred embodiment.
Figure 18:
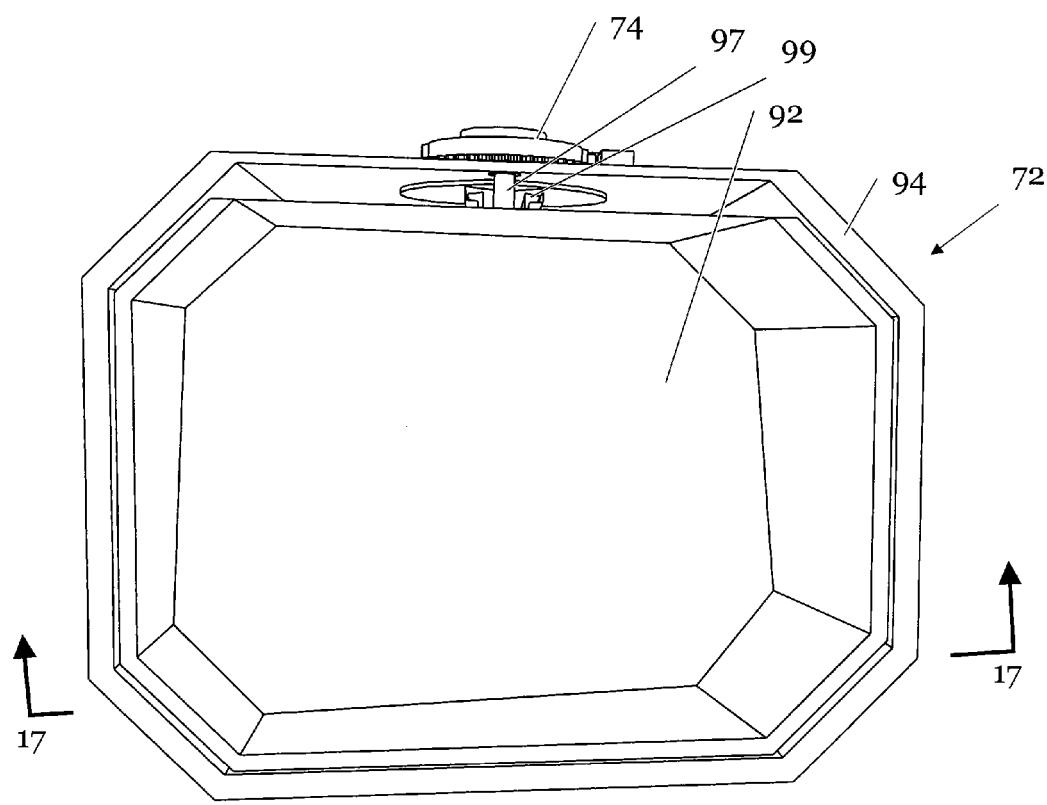
FIG. 18 is a top perspective view of a second preferred embodiment.

FIGS. 17 and 18 illustrate an alternative or second embodiment of the cooking device 72 as constructed in accordance with the principles of the invention. Some features from the first embodiment cooking device described above and illustrated in FIGS. 1 to 13 are incorporated into second alternative embodiment 72, and will be obvious to those knowledgeable in the art.

The second embodiment cooking device 72 comprises a food support vessel 92 that is disposed within a cooking vessel 94. As best shown in FIG. 18, in an example embodiment, the cooking vessel 94 and/or the food support vessel 92 are configured having one end that is slightly wider that an opposite end. In a preferred embodiment, the cooking vessel and food support vessel are each configured having one end slightly wider than an opposite end to better and more efficiently accommodate placement of a turkey therein. Configuring the cooking vessel and food support vessel in this manner helps reduce the overall size of the cooking devices, reduce countertop space usage, reduce storage space, reduce oil usage and thus oil warm-up time. In particular cooking vessel 94 and food support vessel 92, by being broad at one end to accommodate the turkey's breast when placed horizontally therein, minimizes the volume needed for cooking. Additionally, the placement of a turkey horizontally within the cooking device also helps to minimize cooking liquid usage during the cooking process, and thus reduce cooking liquid heating times.

As illustrated in FIG. 17, the food support vessel 92 is moved within the cooking vessel between a lower position 93 (shown in phantom) and an upper position 95 by a lift mechanism 74 that is similar to the lift mechanism 42 described above for the first embodiment cooking device. The lift mechanism 74 for this second embodiment includes an added track 99 that is positioned outside of the food support vessel and that is provided to restrict travel of the food support vessel and its contents to low-friction vertical linear movement only, with no side to side component. When the food support vessel 92 is in the upper position 95, it is inclined by gravity pulling on off-gravitational-center single pivot support 97 fixed on the side of food support vessel 92 to allow oil to drain from the food support vessel and its food contents.

Third Embodiment

FIGS. 19 to 36 illustrate a third embodiment cooking device 200, constructed according to principles of the invention. This third embodiment cooking device shares some of the advantages and features of the first two embodiment cooking devices disclosed above. The third embodiment cooing device 200 generally includes an outer housing 202 having a base support 210 positioned at a closed outer housing end. The closed base support 210 may comprise a plurality of holes disposed therethrough to facilitate a convective flow of air within the outer housing.

Figure 20:
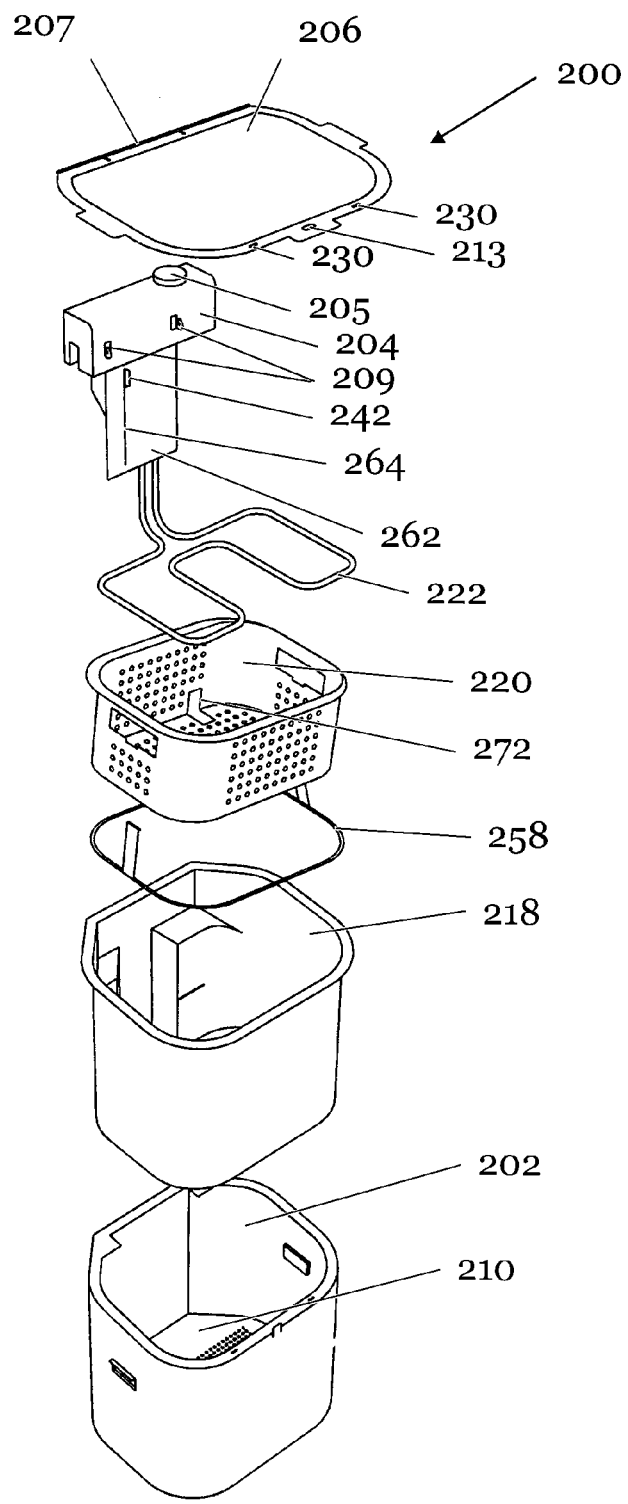
FIG. 20 is a front exploded perspective of the third preferred embodiment of FIGS. 18 and 19 showing its elements in an unassembled state.

A cooking vessel or cooking liquid bucket 218 is statically disposed within a cavity of the outer housing 202 and is sized and configured to accommodate a volume of cooking liquid therein. The cooking vessel 218 is supported by the outer housing base support 210. A food support vessel or food holding basket 220 is disposed within the cooking vessel 218, and an oil straining screen 220 is interposed between the food support vessel 218 and the cooking vessel. As shown in FIG. 20, the food support vessel 218 includes an oil level viewing port 272 disposed therethrough to help the user ascertain how much oil is in, or needs to be added to, the cooking vessel 218.

The oil straining screen 258, which is suspended below the food support vessel 220, strains out impurities in the oil, which can operate shorten its useful life. This straining process takes place every time the food support vessel 220 is raised from the oil. Impurities are easily cleaned from straining screen 258 by placing it in a dishwasher, or by washing it in a sink, or by other means. The oil straining screen 258 may include any appropriate filtering material. One particularly advantageous reusable filtering construction comprises a stainless steel screen with between 15 and 50 wires per inch.

An immersion heat coil 222 is disposed within the cooking vessel, positioned adjacent a bottom portion of the cooking vessel, and is interposed between the bottom portion of the cooking vessel 218 and the oil straining screen 220. The immersion heat coil 222 is connected to a control box 204. The control box 204, including the heat coil 222, is removably attached to a portion of a rear wall surface of the outer housing 202, positioned adjacent the open end of the outer housing and positioned generally in a central position along the rear wall surface, via a mounting bracket 262. A conventional multi-prong pin-type plug and socket can be used to electrically connect the control box 204 to the base of the cooking device, with both the plug and the socket being rigidly mounted, one to control box 204, and the other to the cooking device outer housing. Such plugs and sockets are common and thus are not illustrated herein.

When the control box 204 is lifted from the outer housing 202, the flow of electricity to the control device and its internal electrical components is cut off by the plug and socket arrangement described above being consequently disconnected. The control box 204 is configured so that it can be lifted clear of the outer housing 202 to allow for easier cleaning of the cooking vessel 218 without the presence of immersion heat coil 222 and any of the other electronic components attached to and removed with the control box 204. The control box is constructed so that most of mounting bracket 262 and the immersion heat coil 222 are disposed within the cooking vessel 218 when control box 204 is mounted to the outer housing 202.

A lid 206 is disposed over the open ends of the outer housing 202 and the cooking vessel 218. The lid can be configured to permit opening be either unlatching it and pivoting it rearwards, or by unlatching it and lifting it off and away from the cooking device. In an example embodiment, the cooking device includes a lid latch 212 that projects from the outer housing 202 that is configured to releasibly hold the lid in closed position, and by a rod axle 207 that is mounted on the back of lid 206 and that engages open hooks 209 that are part of control box 204. Engagement of the lid rod axle 207 resting in the open hooks 209 permits the lid 206, when released from its closed position, to be pivoted upwards away from the outer housing open end to a stable position that is just past vertical (best shown in FIG. 35) to facilitate loading and unloading food from the cooking device, or for other purposes.

To enhance safety, in combination with the engagement between the open hooks 209 and the rod axle 207, the lid latch 212 operate to secures the lid 206 to the outer housing 202 and the cooking vessel 218 during the cooking process. This lid is latched into a closed positioned in the cooking device by placing the lid over the open end of the outer housing and cooking vessel and passing the lid latch 212 projecting from the outer base cover 202 through a latch opening 213 in the lid. The latch 212 can include a spring mechanism to bias the latch 212 into a position within the latch opening 213 that causes the latch to interface and abut against a portion of the lid to prevent its upward movement away from the outer housing.

In an example embodiment, the cooking device can include alignment pins 228 that extend from the an open end of the outer housing 202 and that cooperate with alignment holes 230 in the lid to assist ensuring proper positioning of the lid over the outer housing open end to ensure desired engagement of the latch within the latch opening. The lid is placed into position over the open end of the outer housing 202 by pulling the lid forward so that the rod axle 207 engages the hooks 209, and the alignment pins 228 pass though the alignment holes 230 to force the lid forward permitting engagement of the latch within the latch opening.

Figure 19:
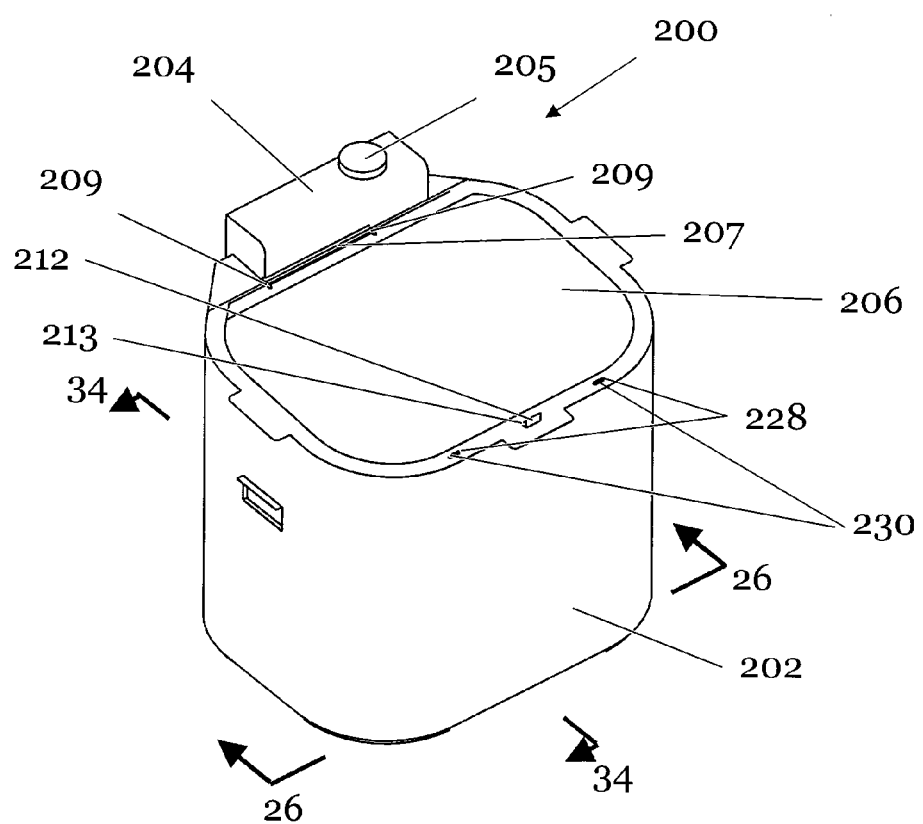
FIG. 19 is a front upper perspective view of a third preferred embodiment.

As shown in FIGS. 19 and 20, in an example embodiment, the lid 206 is constructed comprising a primary portion that is formed from a transparent material as noted above for the other cooking device embodiments of this invention, and further comprising an outer frame surrounding at least a portion of the transparent material. In an example embodiment, at least about 80 percent of the lid is formed from the transparent material. In a preferred embodiment, the lid comprises greater than about 90 percent of the transparent material. By allowing more ambient light into the cooking cavity, and by providing more viewing area, such lid comprising a large transparent portion facilitates viewing food while is cooking, and thus helps in both gauging food cooking progress, and also providing appetite appeal.

In an example embodiment, when the lid 206 is disposed over the open end of the outer housing 202 in a closed position it tilts or is inclined downwardly (moving from the rear of the lid forward). The inclined position of the lid can be provided by either the shape of the lid itself or by the shape of the outer housing open end. In an example embodiment, the outer housing open end is shaped having a front portion that is shorter than a rear portion to provide the downwardly tilted orientation. This downwardly tilted orientation makes it easier for the user to place and remove food articles into and out of the cooking assembly, and helps to keep moisture from collecting on the inside of lid 206 that could otherwise operate to obscure viewing of the food being cooked. Such downwardly tilted orientation also enables a user to have a clearer view of the interior of the cooking device and the cooking vessel where food is being cooked from a distance, i.e., without having to stand and look directly over the cooking device.

Figure 21:
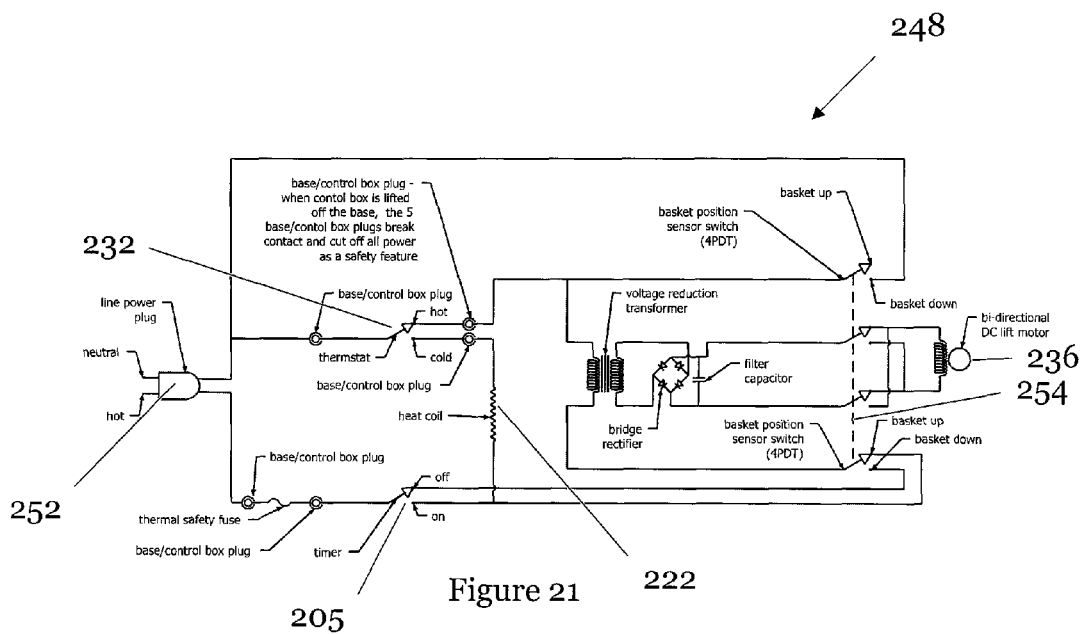
FIG. 21 is a schematic diagram of an electrical system of the third preferred embodiment of FIG. 19 utilizing a bidirectional DC lift motor.
Figure 22:
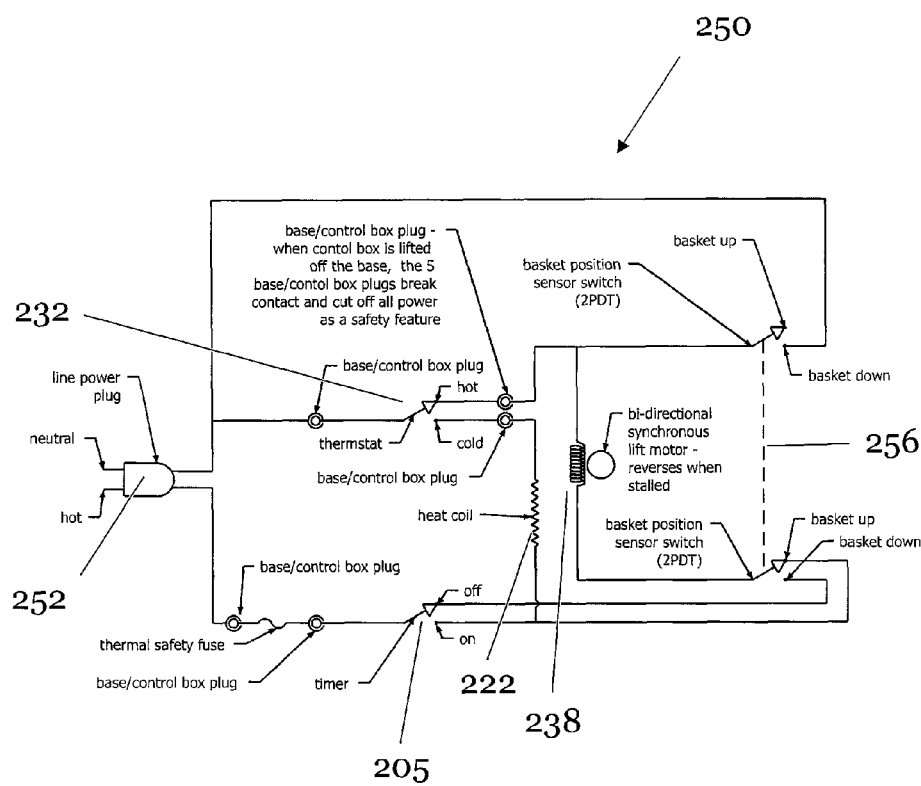
FIG. 22 is a schematic diagram of an electrical system of the third preferred embodiment of FIG. 19 utilizing a bidirectional synchronous lift motor that reverses when stalled.

FIGS. 21 and 22 illustrate two electrical circuits 248, 250 of a control system used with the cooking device of this invention that can be used to control the cooking process. One of the electrical circuits is used with a bidirectional DC motor, and the other of the electrical circuits is used with an auto-reversing when stalled synchronous motor.

In an example embodiment, a timer 205 is disposed within the control box and is part of the control system to control the cooking process. Specifically, timer and the control system are configured to raise the food from the hot cooking liquid once both a predetermined preheating of the cooking liquid and cooking of the food article has been completed. The control system is also configured to lower the food into the hot cooking liquid once the cooking liquid has been preheated to a temperature preset by thermostats 232 and 234. Thus, the control system operates to cook food in a minimum amount of time by precisely starting the cooking process immediately upon the cooking liquid being hot enough to cook.

Figure 25:
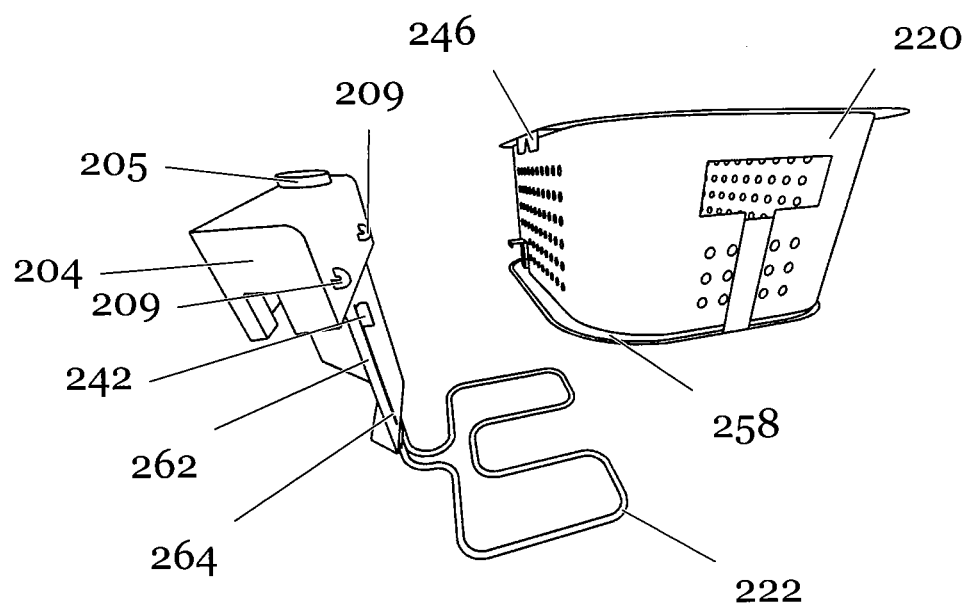
FIG. 25 is a side exploded perspective view of a food holding basket and a control box with an outer base cover and oil containment bucket 218 removed, taken from the third preferred embodiment of FIG. 19.

A food article disposed within the food support vessel 220 is raised and lowered into the cooking vessel 218 by use of a lifting mechanism that is attached to the control box. In an example embodiment, the lifting mechanism comprises a gear reduced bidirectional motor 236, 238 that is mounted in the control box 204. The bidirectional motor 236, 238 bidirectionly drives a screw threaded rod 240 that projects downwardly from the motor into the control box. The screw threaded rod 240 is threadedly engaged with a hook 242 to cause the hook to travel up and down by screw thread engagement with the threaded rod 240. The hook 242 is configured having a forward face that removably engages a bracket 246 positioned on a backside portion of an upper flange of the food support vessel 220 (as best shown in FIG. 25), and thereby enables mounting of the food support vessel 220 within the cooking vessel 218.

The electrical circuits 248, 250 control the cooking process in the following manner. Power enters through a power supply plug 252 and passes through both the thermostat 232, 234 and the timer 205. A food support vessel position sensor switch 254, 256 is provided in the form of a snap-action toggle switch that switches when the food support vessel 220 is either at its lowermost or uppermost positions.

Circuits 248, 250 start with the food support vessel 220 in its uppermost position as detected by the basket position sensor switches 254, 256. Once the cooking liquid has reached the desired cooking temperature, thermostat 232, 234 switches and causes the food support vessel 220 and the food article disposed therein to lower until it reaches its lowermost position, at which point the basket position sensor switches 254, 256 change their switching position. Cooking continues until the countdown timer 205 reaches the user preset time and then turns off. This causes motor 236, 238 to raise the food support vessel 220 until it reaches its uppermost position and the basket position sensor switches 254, 256 again switches.

A feature of this cooking device is that the control system and the lift mechanism allows automated cooking of a food article even when the user is not present. In operation, the user simply, in sequence: pours in the appropriate amount of cooking liquid oil into the cooking vessel 218; mounts the food support vessel 220 to the hook 242; inserts the food article to be cooked into the food holding vessel 220; closes the lid 206; sets the timer 205 for the combined oil warm-up and cooking time; and may then walk away with only minimal need for periodic checking to be sure everything is functioning normally. Once cooking is complete, the food is automatically lifted under control of circuits 248, 250, and without need for user interface, from the cooking oil, and is drained of oil. After oil draining, the food is ready to be removed from the cooking device and served.

This automated cooking system is much safer and more user friendly than systems that require the user to manually lower food into the cooking liquid, at least because it does not depend on the user slowly lowering the food into the hot cooking oil while using only imprecise muscle power, and because the user need not be present adjacent to the unit when food is lowered into, or is removed from, the hot cooking liquid. Also, the lid may be closed when the food is lowered into the oil, thus providing yet one more level of safety.

Figure 26:
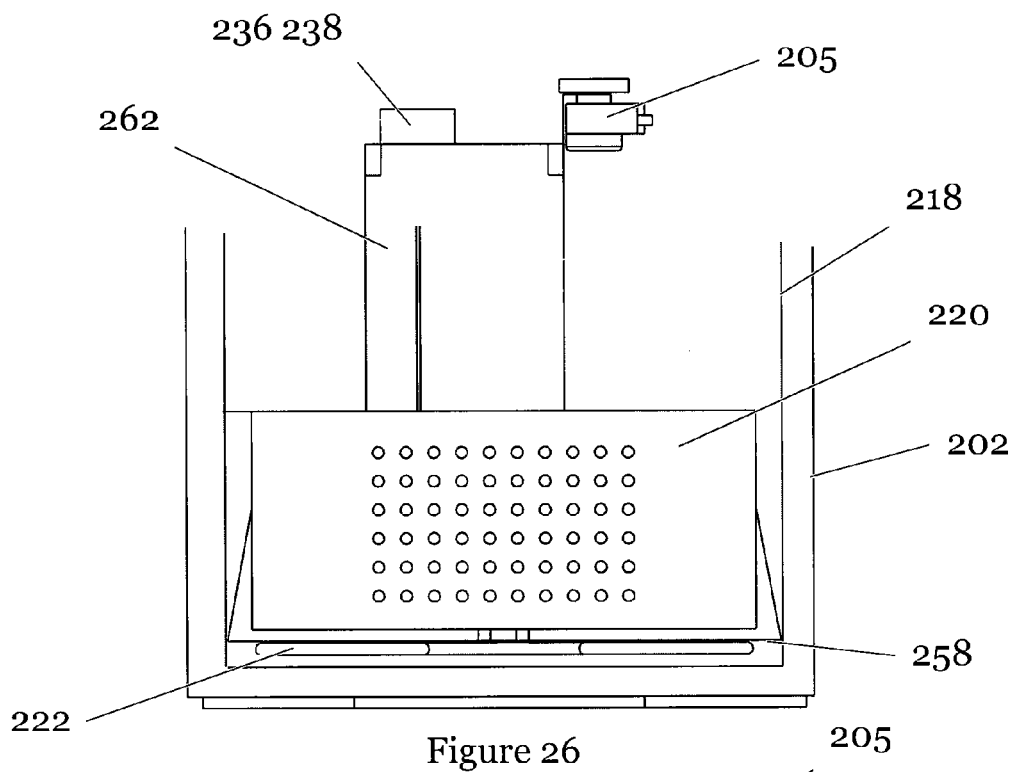
FIG. 26 is a front cross-sectional view through section 26-26 of the third preferred embodiment of FIG. 19, illustrating the food holding basket in its lower position.
Figure 27:
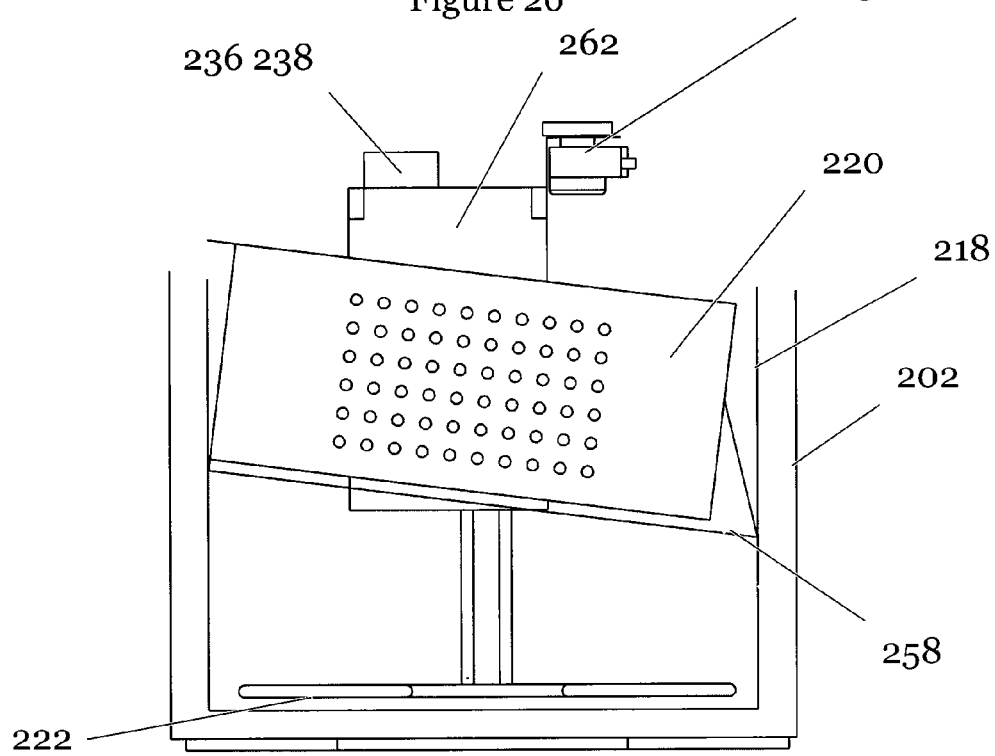
FIG. 27 is a front cross-sectional view through section 26-26 of the third preferred embodiment of FIG. 19, illustrating the food holding basket in its upper and tilted position.

FIGS. 26 and 27 illustrate how the food support vessel 220 may be configured to automatically tilt when placed into its raised position (shown in FIG. 27) by action of the food support vessel 220 pivoting under gravity on an off-center connection between the hook 242 and the bracket 246. When configured to provide such tilting operation, the tilting movement of the food support vessel 220 can be constrained or limited by action of the food support vessel contacting an adjacent side wall of the cooking vessel 218. Tilting of the food support vessel 220 helps to facilitate draining of oil from a cooked food article container therein such as a turkey or a chicken.

Figure 23:
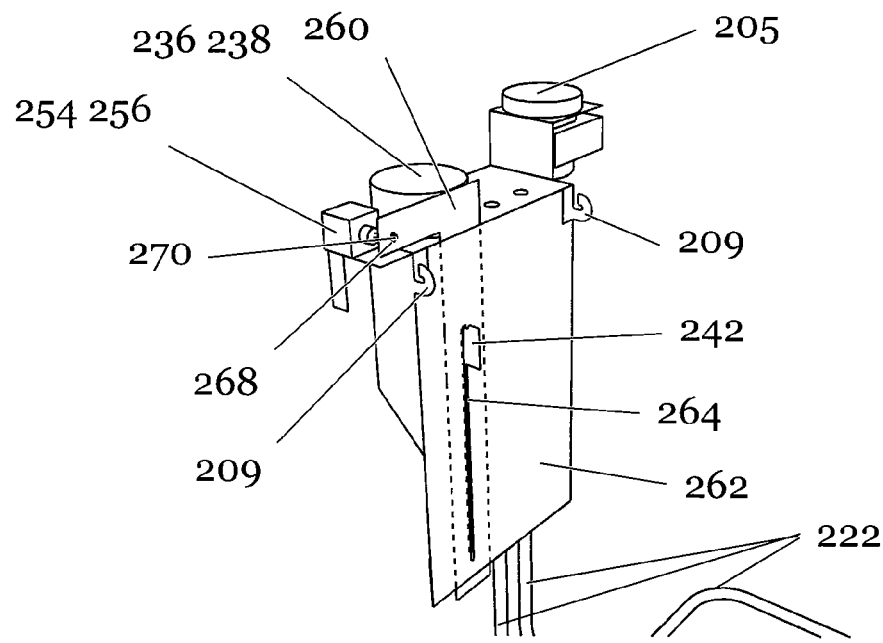
FIG. 23 is a front perspective view of a lifting mechanism from the third preferred embodiment of FIG. 19, with a basket lifting hook in an upper position.
Figure 24:
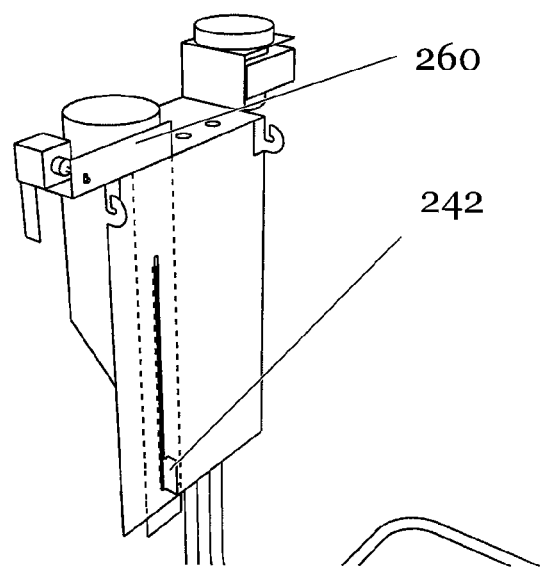
FIG. 24 is a front perspective view of the lifting mechanism of FIG. 23, with the basket lifting hook in a lower position.
Figure 28:
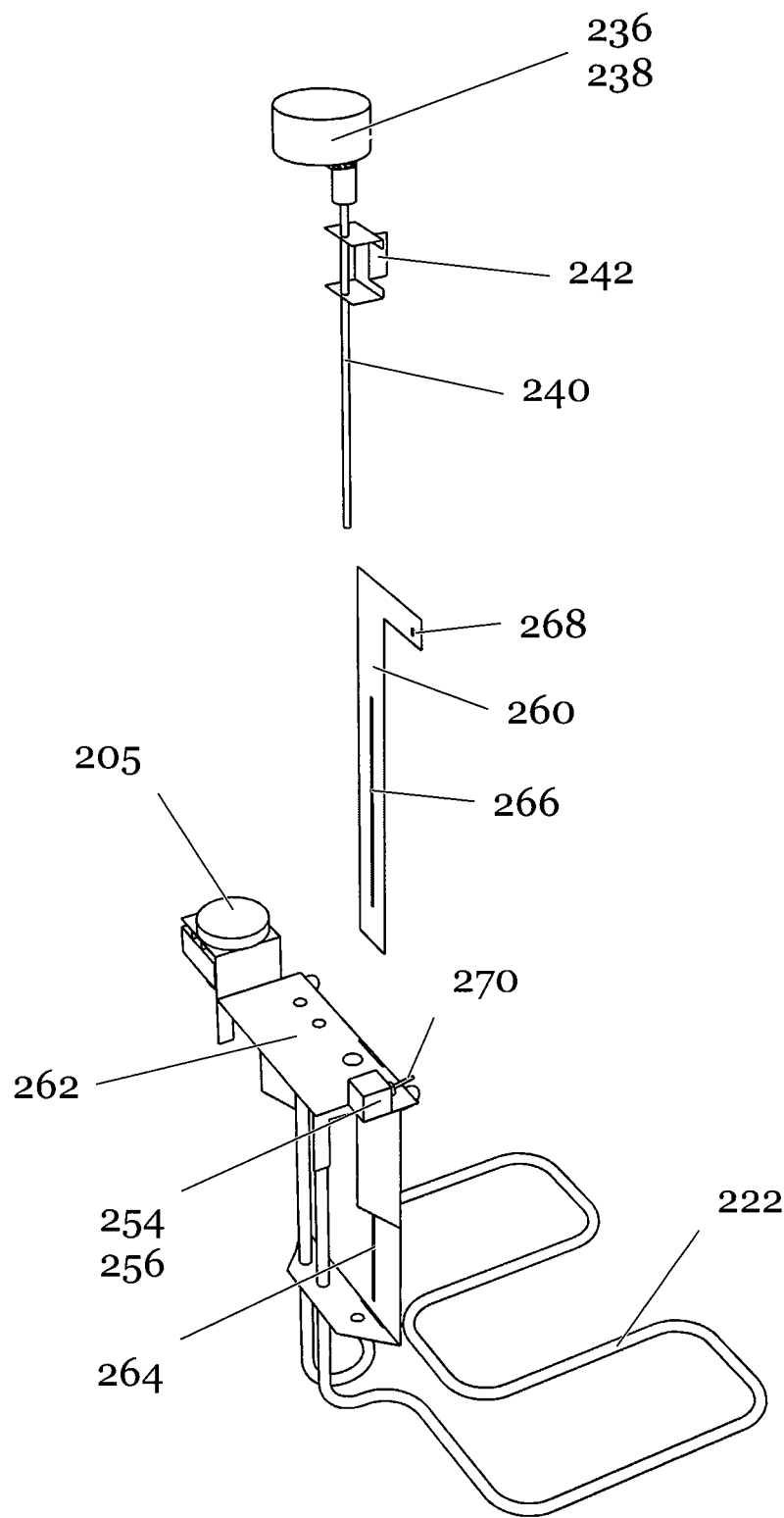
FIG. 28 is a rear exploded perspective view of the lifting mechanism of the third preferred embodiment of FIG. 19.
Figure 29:
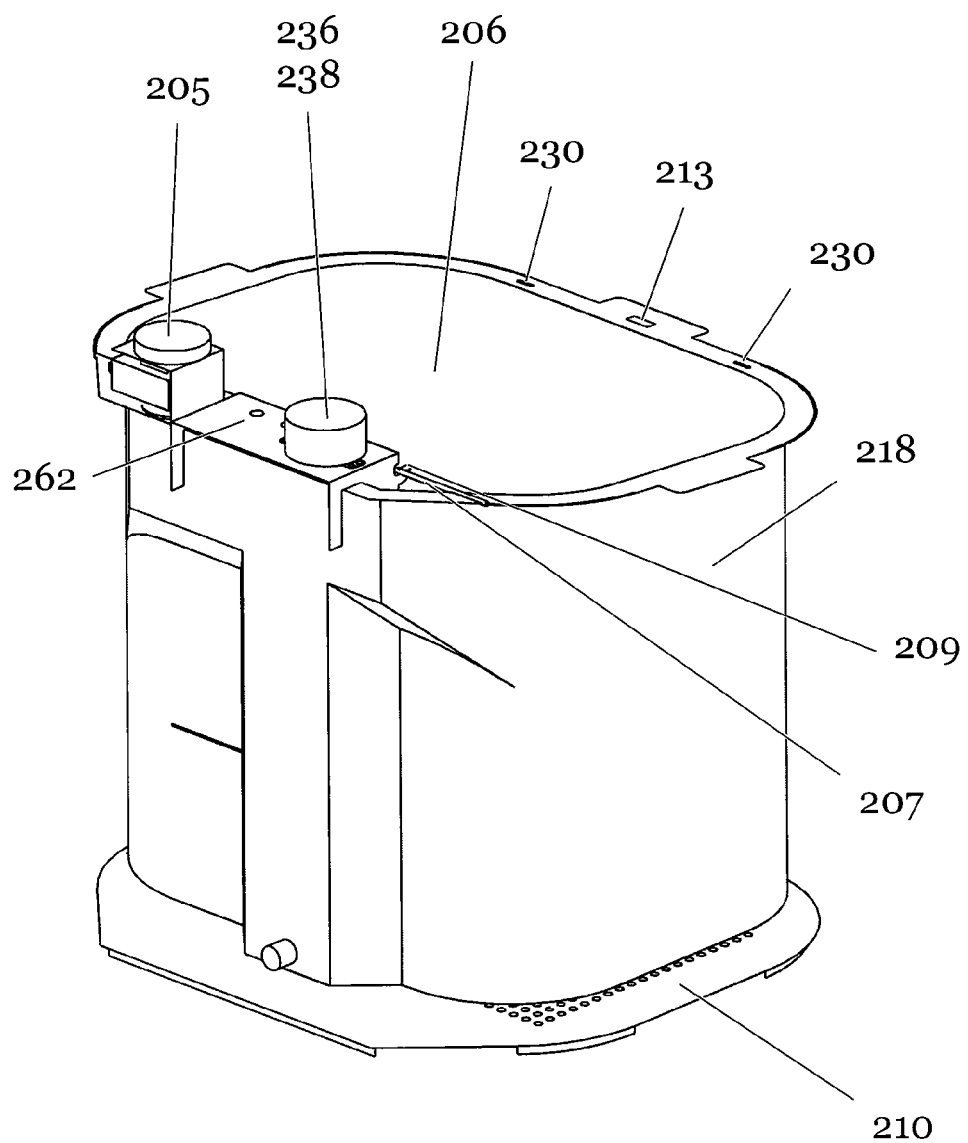
FIG. 29 is a rear perspective view of the third preferred embodiment of FIG. 19 with an outer base cover removed.

FIGS. 23, 24, and 28 illustrates how the basket position sensor switch 254, 256 operates. The hook 242 that threadedly engages the threaded rod 240 moves up and down under power from the bidirectional gear reduced motor 236, 238. The hook 242 passes through a slot 264 that extends vertically within a mounting bracket 262 of the control box. The hook 242 also passes through a slot 266 that is disposed through a slide plate 260. In an example embodiment, the slide plate 260 is movably interposed between the mounting plate 262 and the threaded rod 240 and hook assembly. The slide plate slot 266 is sized having a vertical slot length that is slightly less than that of the vertical excursion of hook 242, thereby causing causes the slide plate 260 to rise to with the hook a predetermined amount to a raised position when the hook 242 reaches its upper position (as shown in FIG. 23). This also causes slide plate 260 to fall to a lower position when the hook 242 reaches its lower position (as shown in FIG. 24).

The slide plate 260 includes an elongated switch lever that extends outwardly therefrom and that is configured to engage a toggle actuator 270 of switch 254, 256. In an example embodiment, elongated switch lever includes a hole 268 disposed therethrough that is sized to accommodate placement of the toggle actuator 270 therein. Configured in this manner, the upward and downward movement of the slide plate 260, caused by hook 242 hitting the top and bottom of slide plate slot 266 when moving to its upper and lower positions, causes switch 254, 256 to change its actuating position. In an example embodiment, the switch lever hole 268 is elongated vertically to allow space for the toggle actuator 270 to snap cleanly when changing its actuating position.

Figure 30:
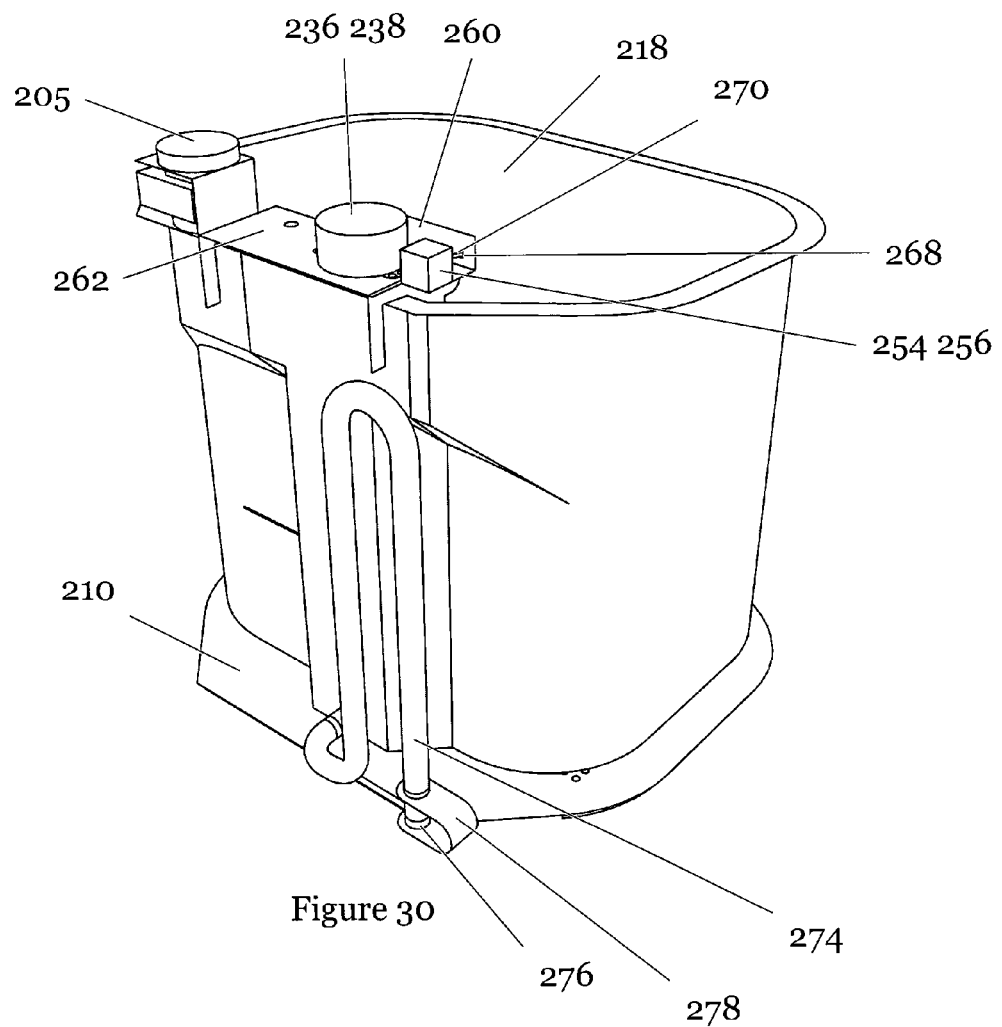
FIG. 30 is a rear perspective view of the third preferred embodiment of FIG. 19 with an outer base cover removed, and illustrating a drainage hose, hose plug, and basket position sensors switch.
Figure 31:
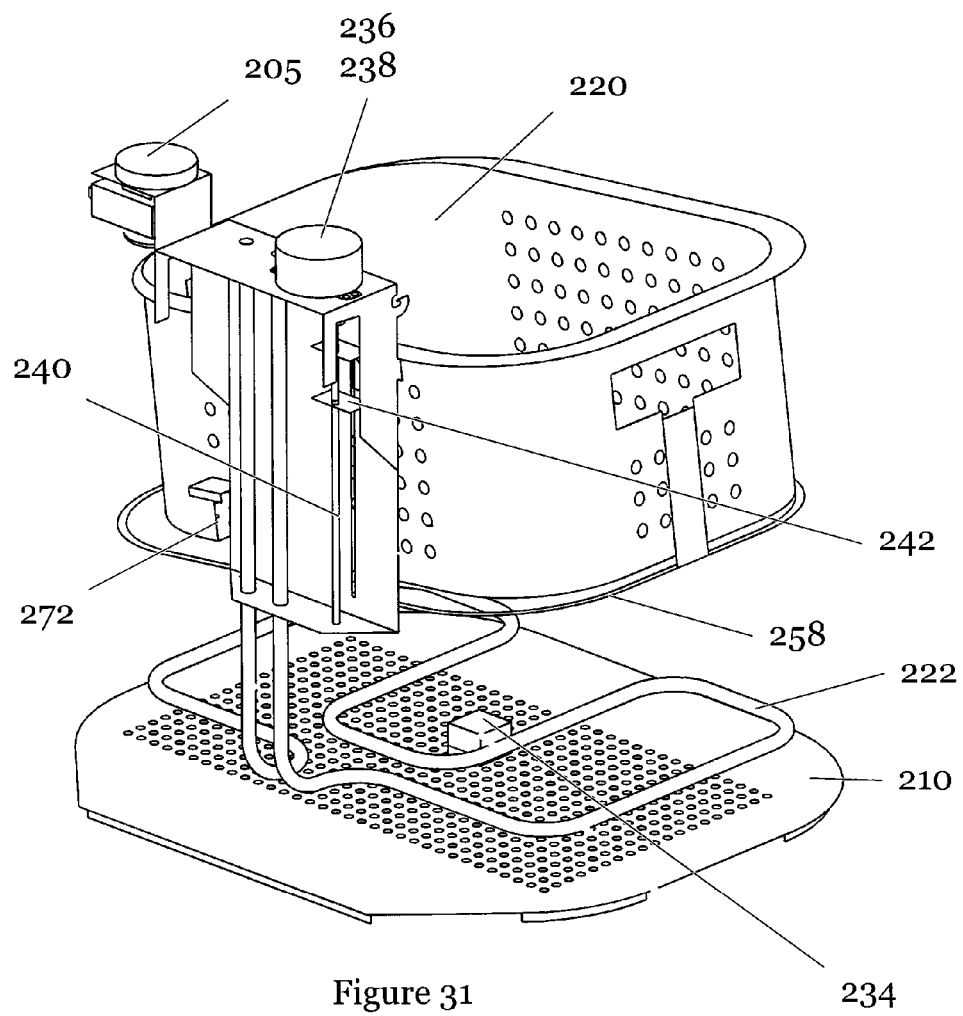
FIG. 31 is a rear perspective view of the third preferred embodiment of FIG. 19 with an oil containment bucket removed, and the food holding basket is in its upper position.
Figure 32:
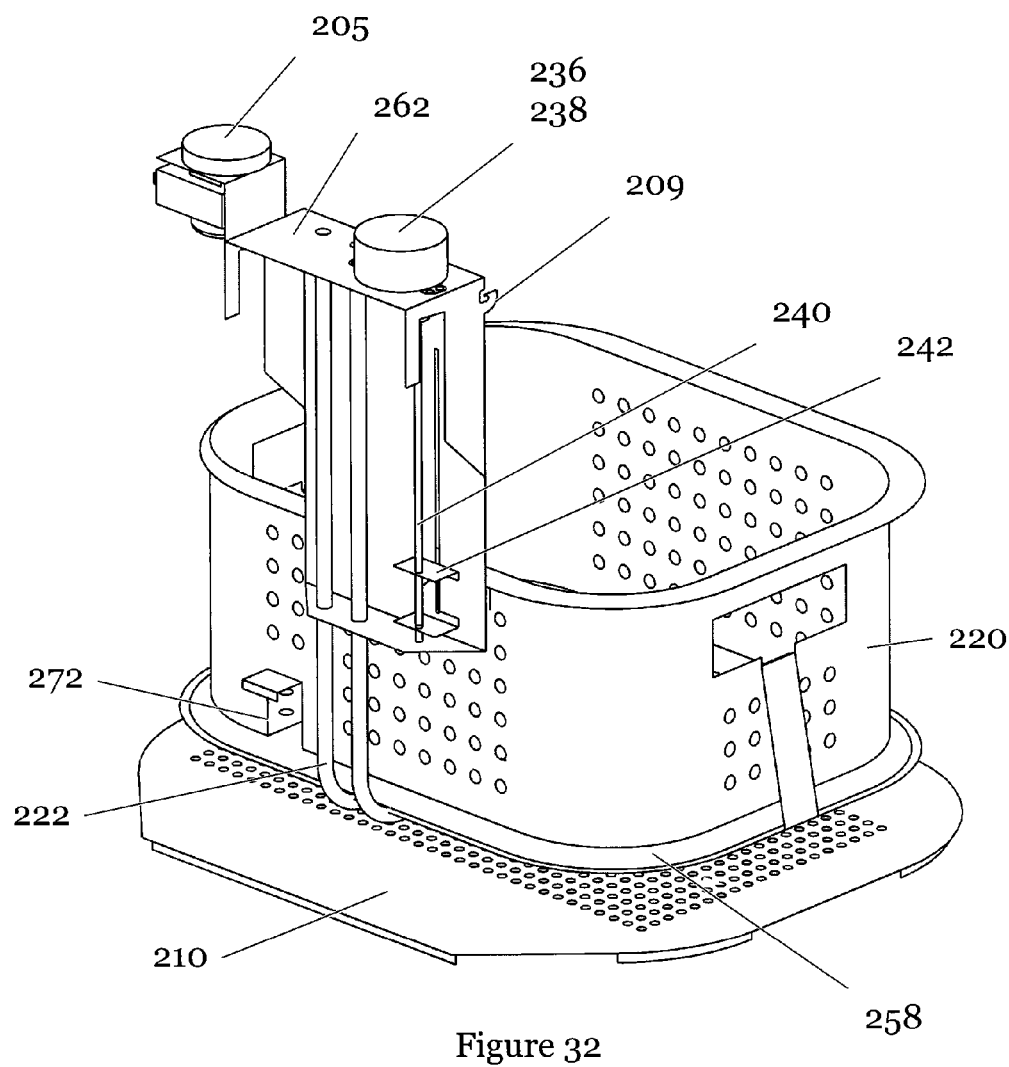
FIG. 32 is a rear perspective view of the third preferred embodiment of FIG. 19 with the oil containment bucket removed, and the food holding basket is in its lower position.
Figure 33:
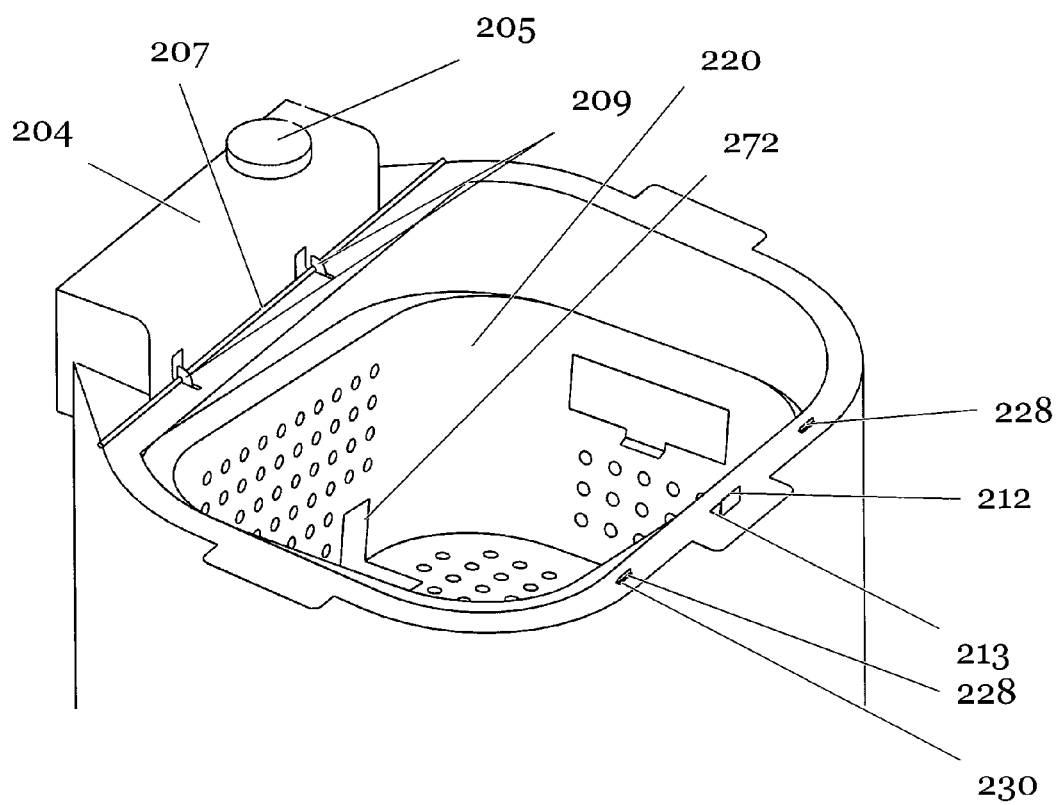
FIG. 33 is an upper perspective view looking into the third preferred embodiment of FIG. 19, with food holding basket in its upper position.
Figure 34:
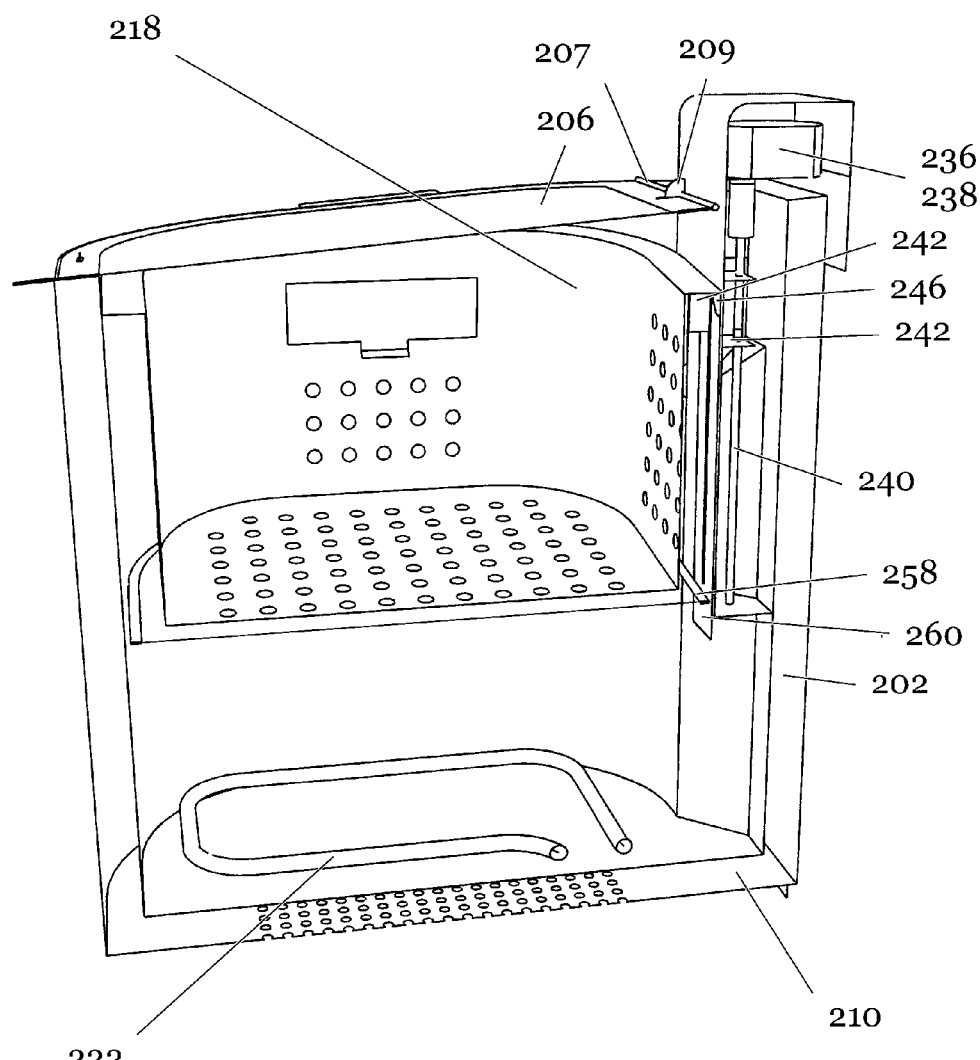
FIG. 34 is cross-sectional side view of the third preferred embodiment of FIG. 19, with the food holding basket in its upper position.
Figure 35:
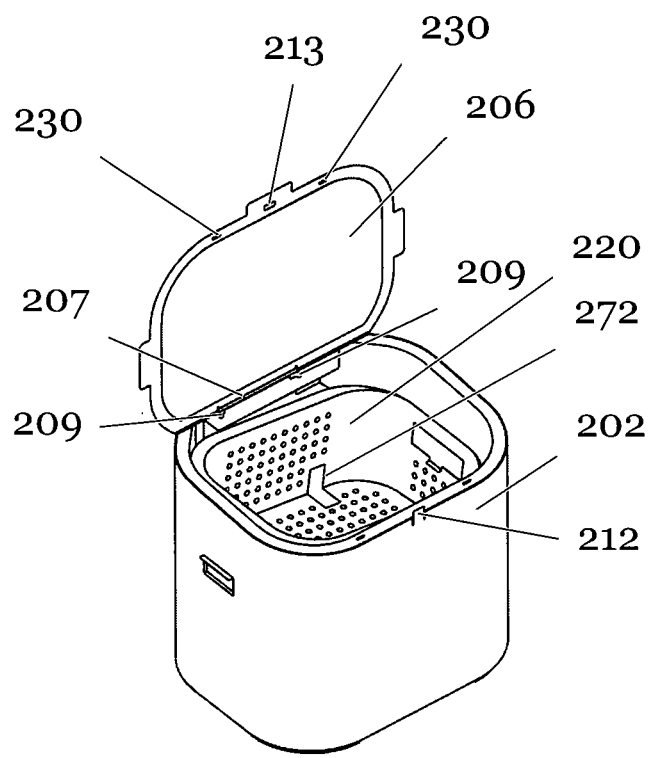
FIG. 35 is a front upper perspective view of the third preferred embodiment of FIG. 19, with a lid in a raised stable position for loading and unloading food.
Figure 36:
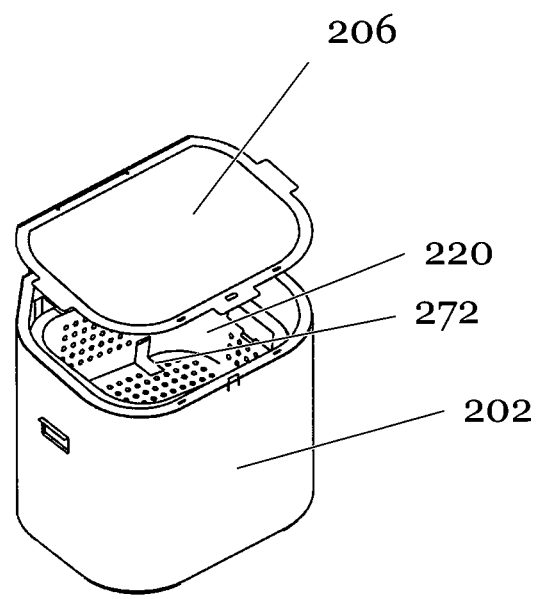
FIG. 36 is a front upper perspective view of the third preferred embodiment of FIG. 19, with the lid removed from the rest of the device.

As shown in FIG. 30, the third embodiment cooking device of this invention may also include a drain hose 274 with plug at its end 276, that is attached to the outer housing 202 and that functions in a manner similar to the flexible hose described above for the first embodiment cooking device. In an example embodiment, the plug 276 is retained on the end of drainage hose 274 by a plug retainer 278 which secures the plug it to the end of hose 274 even when the plug 276 is removed from its plugged position.

Figure 37:
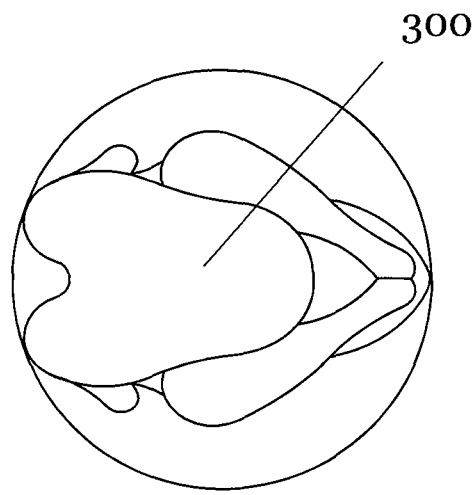
FIG. 37 is a plan view of a poultry product in a round container.
Figure 38:
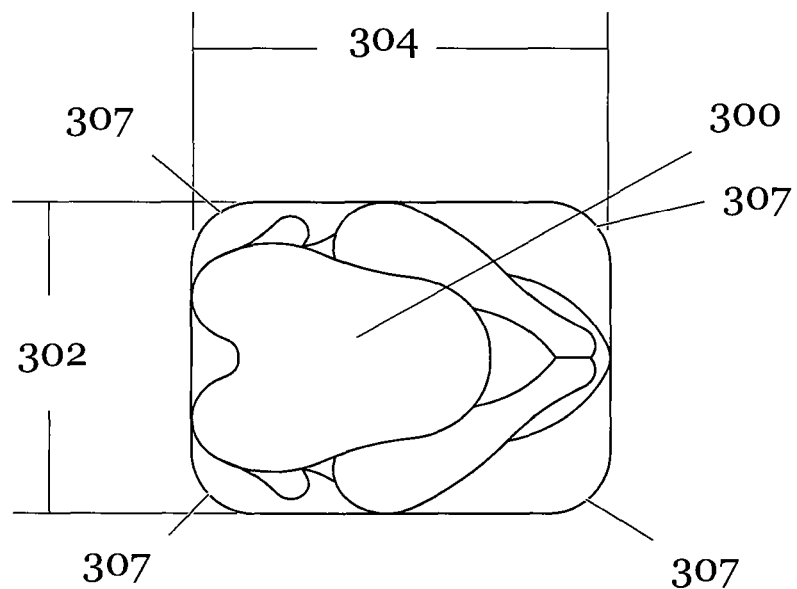
FIG. 38 is a plan view of a poultry product in a rectangular container with radiused corners.

FIGS. 37 and 38 illustrate the contrast in space efficiency between using food article containers, e.g., food support vessels, having a cylindrical cross section or circular plan view (shown in FIG. 37) versus a rectangular cross section or rectangular plan view (shown in FIG. 38) for cooking a poultry food product 300 in a horizontal position. A best efficiency for a food article food container having a rectangular plan design has been found where the ratio between length 304 and width 302 is between about 1.1 to 1.5. The improved space efficiency presented using such a rectangular food article container means that less oil may be used for cooking food, and that a cooking device comprising such food article container may take up less countertop space. The use of radiused corners 307 in such food article container further improve this efficient use of space. Best results are provided when the food article container for cooking poultry foods is rectangular as noted above, and has radiused corners 307 that are sized more than about 10% of the length 304. The above description of improved efficiencies that are gained by using a non-cylindrical food article container is understood to apply to all embodiments of the cooking device as constructed according to this invention.

Fourth Embodiment

Figure 39:
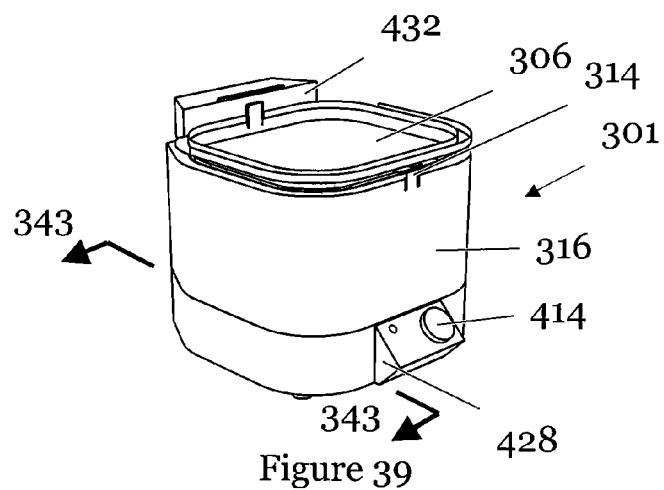
FIG. 39 is a forward upper perspective view of a fourth preferred embodiment of the present inventions, with a lid shown in its inverted storage position.
Figure 40:
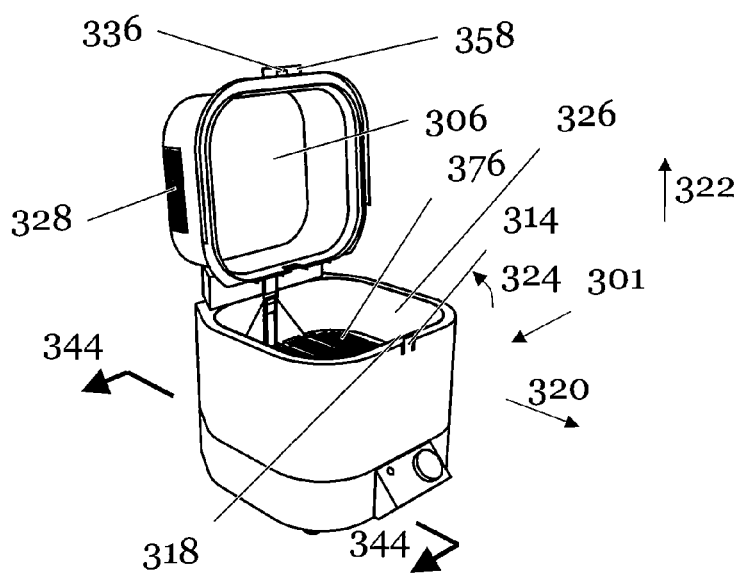
FIG. 40 is a forward upper perspective view of the fourth preferred embodiment of FIG. 39, with the lid shown in a raised stable position for loading and unloading food.
Figure 41:
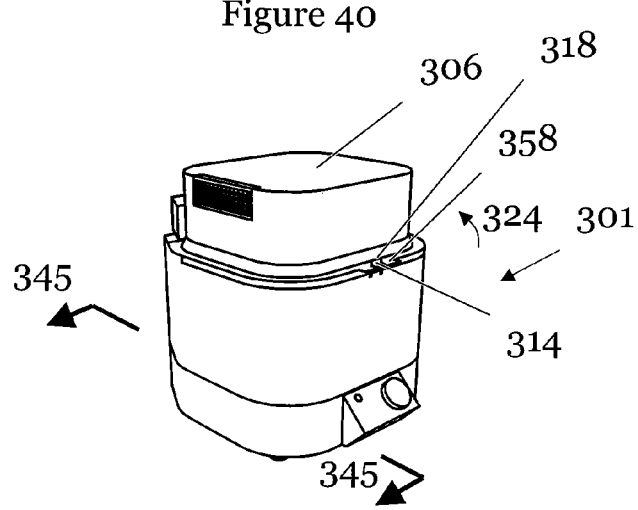
FIG. 41 is a forward upper perspective view of the fourth preferred embodiment of FIG. 39, with the lid shown in a closed position for cooking.

FIGS. 41 to 57 illustrate a fourth embodiment food cooking device 301, constructed in accordance with the principles of this invention, generally comprising an outer housing 316 and a lid 306 that is movably position over a open end of the outer housing. FIGS. 39, 40, and 41 show forward perspective views of the cooking device 301 with the lid 306 in different positions. In FIG. 39, the device 301 is shown with the lid 306 in an inverted position to minimize the space needed for storage. In FIG. 40, the device 301 is shown with the lid in a raised position for loading and unloading foods. In FIG. 41, the lid is shown in a closed position for cooking a food article. The lid 306 may also be removed completely at any time, by simply unlatching and lifting it away from the outer housing 316.

The lid 306 is specially constructed having a wall section that projects outwardly a distance from a lip that extends around a peripheral edge of the lid and that is configured to contact the open end of the outer housing 316. The wall section extends to a closed end of the lid that forms the top portion of the lid when the lid is placed in a closed position on the cooking device. Accordingly, the lid is configured having a concave inside surface defined by the wall section and top portion.

This lid configuration provides improved storage compactness (when the lid is inverted and placed within the cooking device as shown in FIG. 39), and provides exceptional food visibility is accomplished because. In an example embodiment, it is desired that the lid wall section extend a vertical depth that is greater than about 20 percent of the width of the lid as measured from right to left across the front portion of the lid. As noted above, the lid 306 may be inverted and placed inside of the cooking device for compact storage. In an example embodiment, the cooking device of this fourth embodiment is designed to be efficient in storage by having over about 70% of the lid 306 store inside of the cooking device.

The lid 306 may be made of transparent material, such as those materials described above for the lid of the other cooking device embodiments. The use of such transparent material, in combination with the unusually large area of lid 306 due to its concave shape, operates to facilitate viewing food while the food article is cooking, both because it allows more light into the food cooking vessel or compartment 326, and because it allows more viewing area to observe the food article disposed therein. The enhanced ability to view the food article being cooked has advantages of both creating appetite appeal, and helping in gauging food cooking progress.

The lid 306 may be constructed in many different ways well known in the art. In an example embodiment, the lid can be formed by injection molding from a plastic material, such as polypropylene plastic, as a single piece. Such lid construction would be both inexpensive to manufacture and very durable.

The lid 306 may be securely latched to the cooking device during the food cooking process through the engagement of a latch 314 extending from the outer housing and a latch opening 336 that is disposed within a lid lift handle 358 extending outwardly away from a forward portion of the lid lip. The latch 314 can be spring biased to provide a releasable latching attachment with the latch opening when the lid is lowered down onto the outer housing open end.

The lid 306 rests upon an upper portion 346 of the outer housing 316 (as shown in FIGS. 51A, 51B, and 52), which may be constructed of the same types of materials described above for the other embodiments of the cooking device, such as plastic or other temperature limited material.

Figure 53:
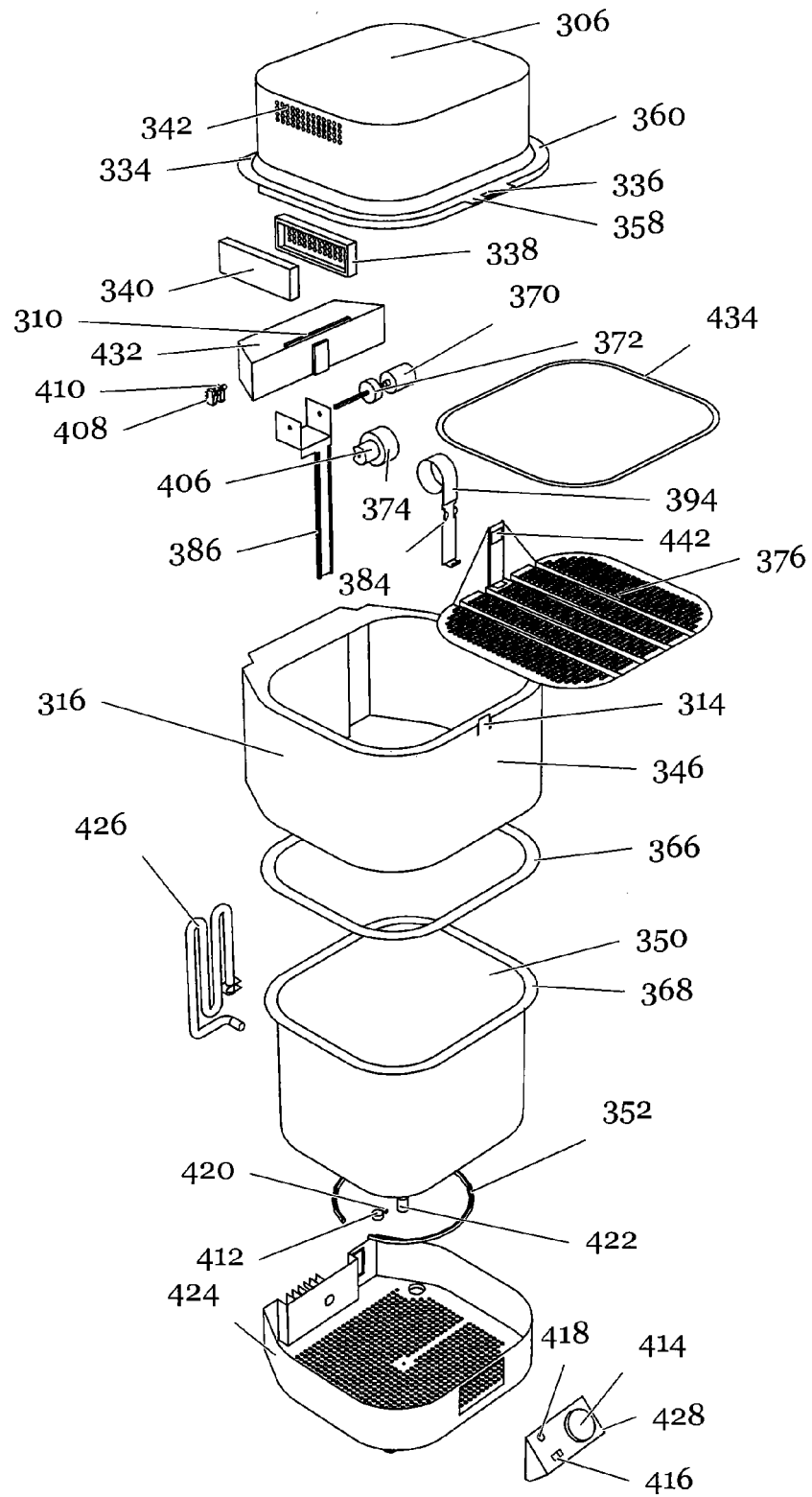
FIG. 53 is a forward upper perspective exploded view of the fourth preferred embodiment of FIG. 52 illustrating all of the elements in an unassembled state.

A cooking vessel or bucket 350 is disposed within an inner cavity of the outer housing 316 and is sized and configured to accommodate a volume of cooking fluid therein. As best shown in FIG. 53, the outer housing 316 is sized and shaped to fit over and cover a portion of the cooking vessel 350. The cooking vessel 350 is covered along its upper region by the outer housing 316, and is covered along its lower region and is supported by an outer housing base 424. Thus, the outer housing of this fourth embodiment cooking device is provided as a two part assembly.

A pliable heat resistant gasket 366 is interposed between an outwardly flanged edge 368 of the cooking vessel 350 and an inwardly flanged edge of the outer housing 346 to protect and insulate the outer housing therefrom. Insulating connectors, such as stainless steel screws or the like may be used connect the outer housing 346 to the cooking vessel 350, wherein such connectors extend through the pliable heat resistant gasket 366.

As best shown in FIGS. 51A, 51B, and 52, the pliable heat resistant gasket 366 wraps over both the inner and outer perimeters of the cooking vessel flanged edge 368. Where the gasket 366 wraps over the inner perimeter of the flanged edge 368, it spaces the lid 306 away from, and thermally insulates it from, the cooking vessel 350 when lid 306 is in a closed position closed. The gasket 366 also operates to provide a seal between the lid 306 and the cooking vessel 350. If desired, this seal can be enhanced by ribs or the use of other surface features extending from the inner perimeter of pliable heat resistant gasket 366. Wrapping the exterior perimeter of pliable heat resistant gasket 366 around, over, and back again in a "C" shape over the outer perimeter of the cooking vessel flanged end 368 (as shown in FIGS. 51A and 51B) helps to lock the gasket 366 into place.

Figure 50:
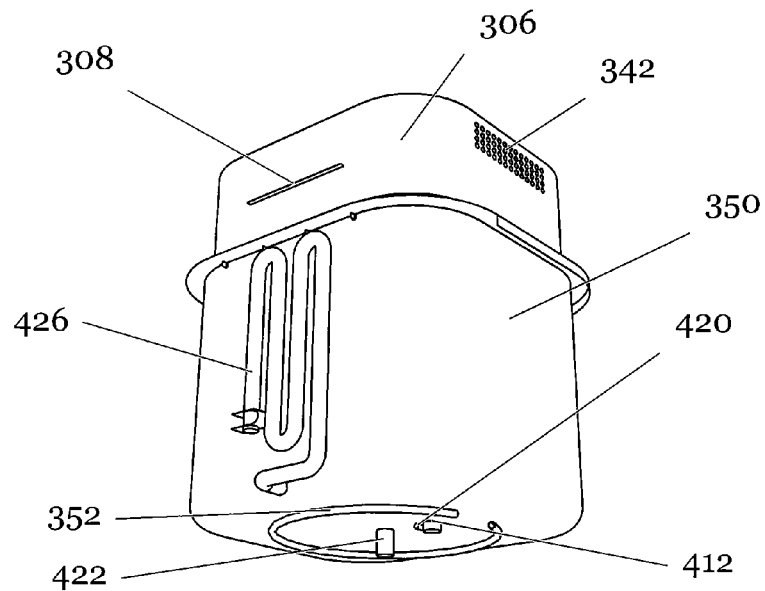
FIG. 50 is a rear lower perspective view of the fourth preferred embodiment of FIG. 39, with a lower body removed.

As best shown in FIGS. 50 and 53, an external heating element 352 is affixed to a bottom portion of the cooking vessel 350. Positioning the heating element 352 outside of bucket 350 is both less expensive to manufacture and easier to clean than a heater placed within bucket 350. The heating element can be of the same type described above for the first cooking device embodiment. In addition to the heating element, a thermostat 412 and a thermal fuse 420 are also connected with the bottom of the cooking vessel. The thermostat 412 may actually be a single preset thermostat, can be two or more switch controlled preset thermostats, or can be a user adjustable thermostat. The thermal fuse 420 cuts power going to the cooking device in the event of unacceptable heat within the embodiment.

A support 422 can be used to connect between the bottom of the cooking vessel 350 and an inside surface of the outer housing base portion 424. The support is provided to help distribute the weight of cooking vessel and its contents directly to the outer housing base 424 of the cooking device where the support feet are (see FIG. 49).

FIGS. 51A and 51B illustrate respective details 330 and 332 taken from FIG. 52 that best show the manner in which the lid is attached to the outer housing. FIG. 51A illustrates the releasable attachment that is formed between the lid and the outer housing along a forward portion of the lid, wherein the latch 314 projecting from the outer housing engages the latch opening 336 in the lip handle. FIG. 51B illustrates the attachment between a rear portion of the lid and the outer housing, that is provided by the mechanism of a rear rib 334 projecting outwardly from a rearward portion of the lid and sliding under a lower portion of a lifting mechanism enclosure 432. The lid 306 may be separated from the outer housing lower body 316 by pulling actuator lever 318 of latch 314 forward 320 and lifting lid 306 upward 322 (FIGS. 51A, 51B, and 52).

FIG. 53 illustrates all of the elements of the fourth embodiment cooking device. The lid is shown with the central lid handle 358 extending outwardly a distance from a forward portion of the lid lip or rim 360. The central handle 358 allows a user to both pull actuator lever 318 that is attached to an end of the latch, and simultaneously lift the central handle 358 rearwards 324 with one hand, in this manner enabling the user to release the lid from a locked down position and move the lid away from the cooking device opening.

Figure 57:
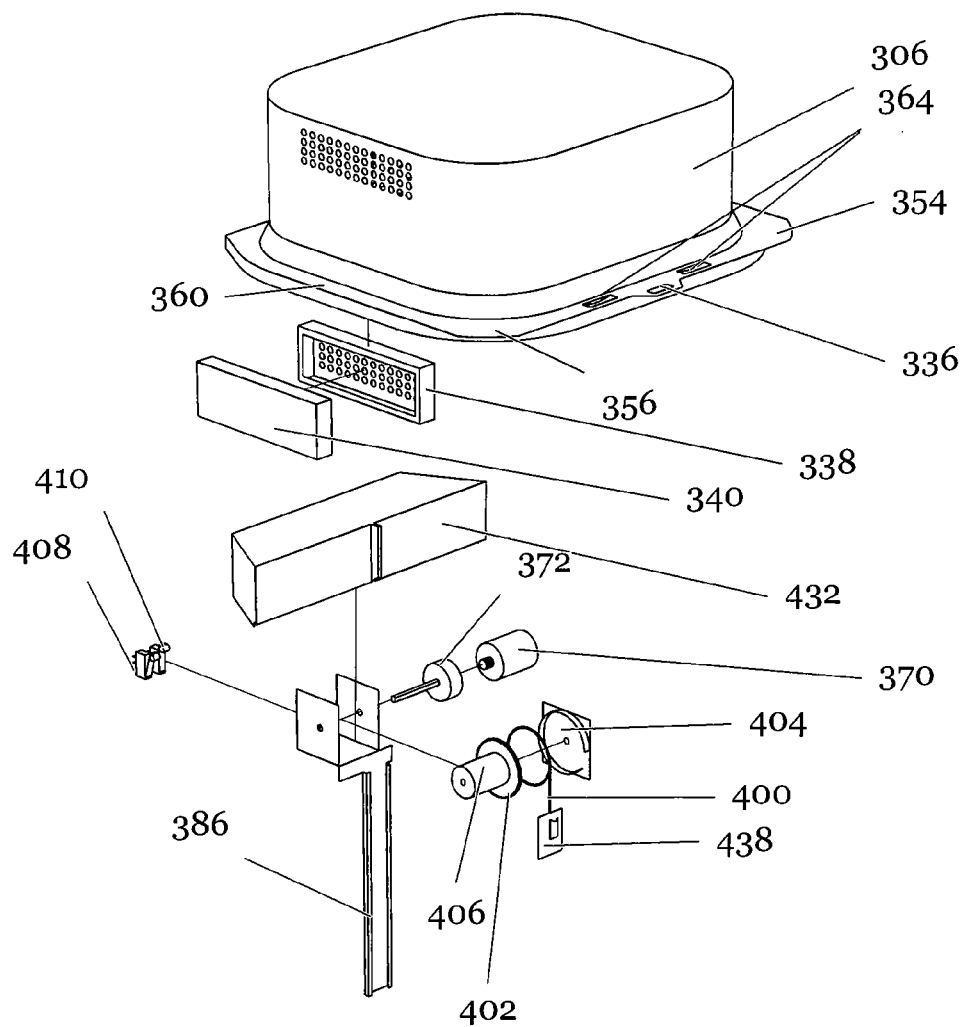
FIG. 57 is a forward upper perspective view of an alternative cable lifting mechanism for the fourth preferred embodiment of FIG. 52.
Figure 58:
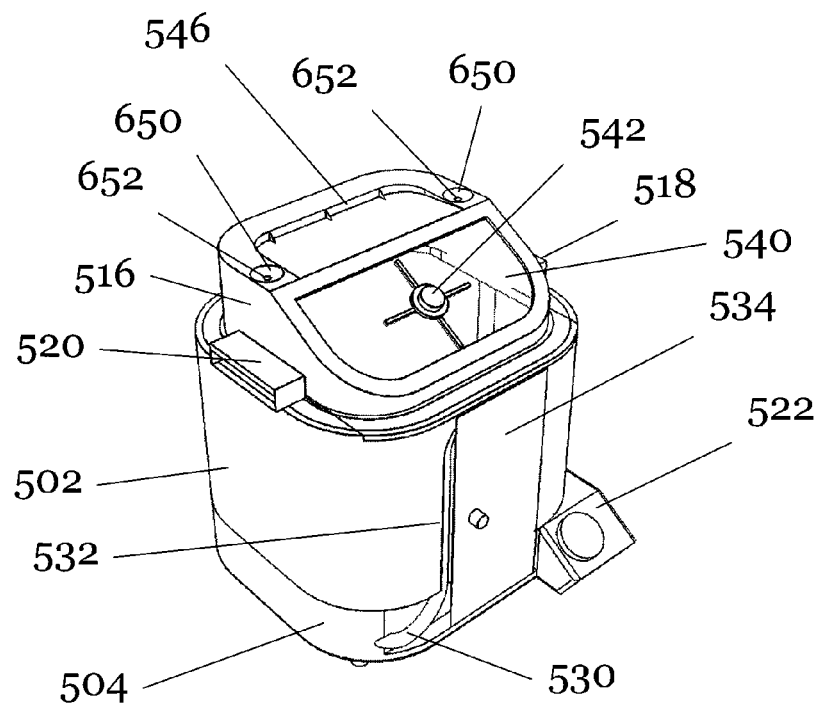
FIG. 58 is a forward perspective view of an exemplary embodiment of the present inventions with its lid on and its food support platform in its lowered cooking position.
Figure 59:
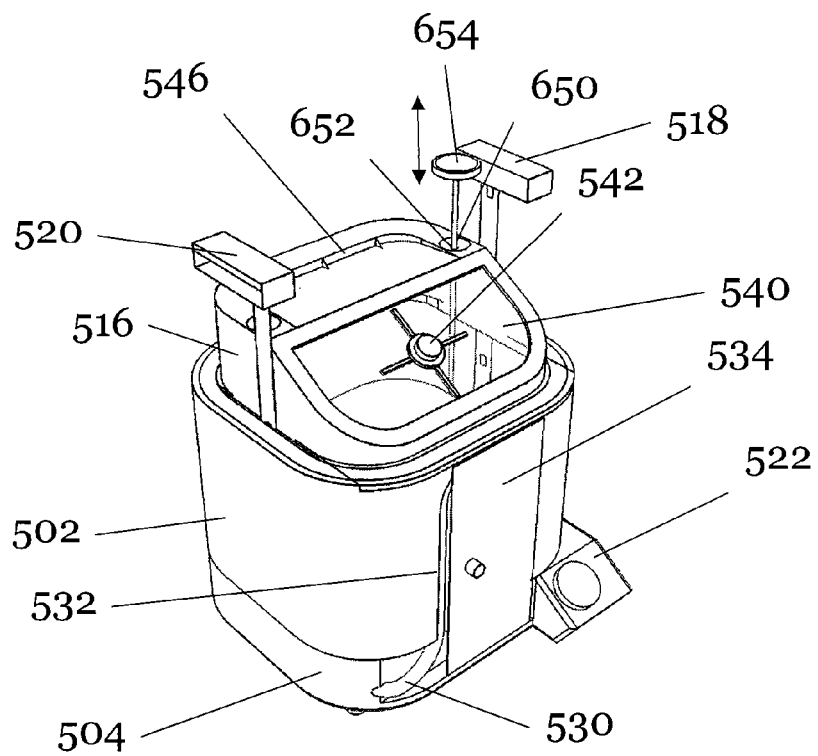
FIG. 59 is identical to FIG. 58 except that FIG. 59 shows the embodiment with its food support platform in its partially raised position.
Figure 60:
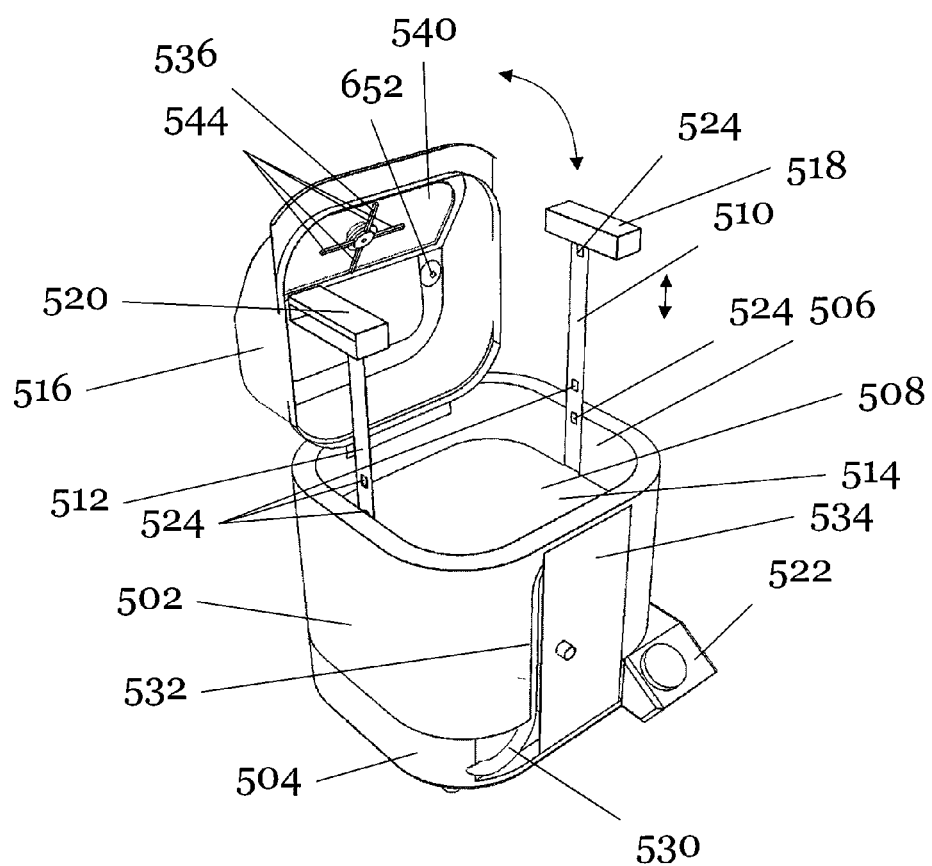
FIG. 60 is identical to FIGS. 58 and 59 except for showing the food support platform it's fully raised position and its lid raised but not removed.

FIG. 57 illustrates an alternate embodiment of the lid 306 comprising lid handles 354 and 356 that extend outwardly a distance from the forward right and left corners respectively of the lid rim 360. Locating the handles on the sides of the lid in this alternative embodiment prevents the user from having to place their hands or arms directly above cooking cavity 362 when lid 306 is opened.

Figure 44:
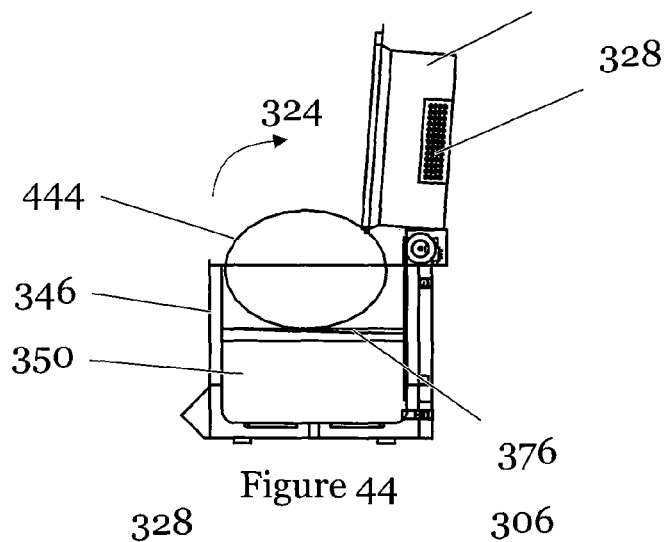
FIG. 44 is a cross-sectional side view taken along section 344-344 through the fourth preferred embodiment of FIG. 39, with the food support platform in its raised position.

As shown in FIG. 57, the lid of this embodiment comprises a biasing means 364, e.g., provided in the form of a spring member or the like, molded into the lid rim 360 and that is configured and positioned to rest against an upper horizontal flange of the outer housing 316. The spring member operates to impose a desired biasing force between the lid and the outer housing to bias the lid 306 open a short distance and uncouple latch 314 from rim 360, when latch actuator lever 318 is pulled forward in a forward direction to release it from the latch opening 336. The lid 306, after becoming unlatched, may then be lifted upwardly and rearwardly 324 (as best shown in FIG. 44) with one hand or two hands gripping the lid lifting handles 354 and/or 356. This allows the alternate embodiment of lid 306 to be unlatched and lifted with only one hand.

Figure 42:
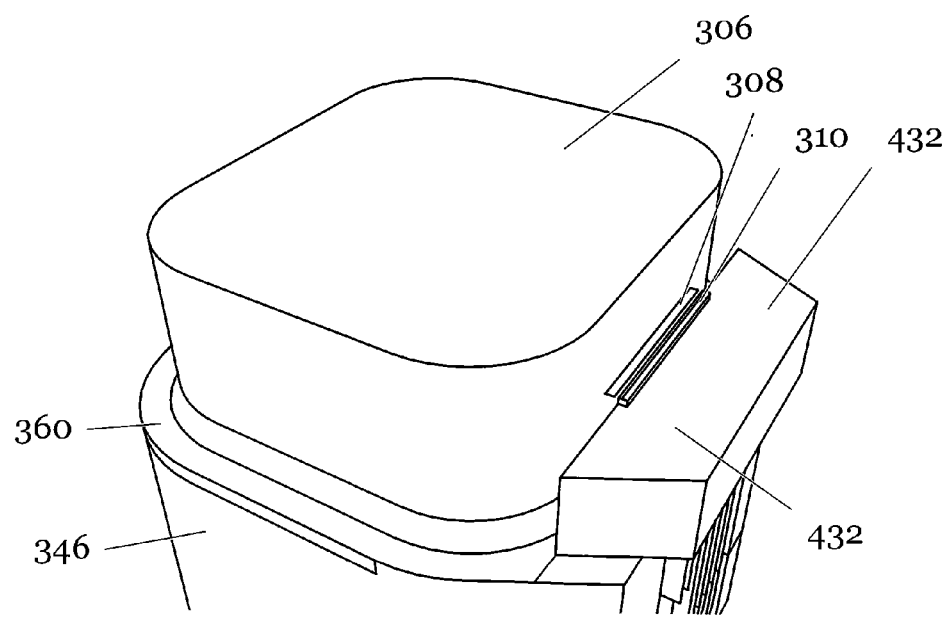
FIG. 42 is a partial rear upper perspective view of the fourth embodiment of FIG. 39.

FIG. 42 illustrates a rear right perspective view of the fourth embodiment cooking device 301. In an example embodiment, the cooking device comprises a lid that is configured to cooperate with a portion of the cooking device to facilitate moving or rotating the lid upwardly and rearwardly from a closed to an open position. In an example embodiment, the lid 306 is constructed having a pivot rib 308 that extends a predetermined distance from a rearward facing outside surface of the lid wall section. The pivot rib 308 extends horizontally a distance therealong and is sized and positioned to cooperate with a pivot groove or trough 310 that is positioned along a top surface of a control box 312 mounted to a rearward portion of the outer housing 316. The pivot rib 308 is sized and configured to fit within the pivot groove 310 when the lid is rotated back into an open position to facilitate movement and placement of the lid thereon when the lid is placed into an open position. Alternatively, the lid can configured comprising a pivot groove and the control box can be configured comprising a pivot rib, for the purpose of permitting the same type of cooperative engagement described above.

Configured in this manner, the lid 306 may be placed in its open position (as shown in FIGS. 40 and 44) by unlatching it from the outer housing 316 as described above, and tilting it rearwardly 324 (as shown in FIG. 52). During this translational movement of the lid, the pivot rib 308 is disposed within and engages the pivot groove 310, and the cooperation of these two features operate to provide a pivot axis for the lid 306 when it is being tilted rearwardly 324. After the lid is moved rearwardly in this fashion, the cooperation of the pivot rib and pivot grove also operates to locate the lid 306 in a stable position on top of control box 312 (as best shown in FIGS. 40, 44, and 52).

As best shown in FIG. 57, the cooking device 301 includes an odor filter assembly that is attached thereto. In such example embodiment, the odor filter assembly 328 is provided in the form of a filter box 338 that is removably attached to an inside surface of the lid 306. A filter media 340 is disposed within the filter box 338 and can be made from one of any of variety of different filtering materials, including, alone or in combination: metal mesh, nonwoven materials such as nonwoven polyester or metal, woven material, activated charcoal, or other known filtering materials for: condensing grease and oils, and/or for filtering odors and/or gaseous and/or particulate matter.

In an example embodiment, the filter box 338 removably snaps to the interior of lid 306 and is positioned adjacent a section of the lid that includes a plurality of exit openings 342 disposed therethrough to facilitate the passage of air from the cooking device. In an example embodiment, the exit openings 342 are disposed through a wall section of the lid, thereby allowing for the passages of cooking exhaust, steam and/or hot air from the side of the lid 306 where its will not damage countertop splash or get caught between the splash and the over-counter cabinets. Such side exhausting arrangement has advantages over many current countertop deep fat fryers that exhaust damaging steam and hot air upward towards and against over-counter cabinets. Additionally, the cooking odor filter 328 operates in combination with the pliable heat resistant gasket 366, and lid 306 latching to lower body 316 during the cooking process to helps to prevent the unwanted escape of cooking orders and directed then through the odor filter, to thereby help control and prevent such unfiltered cooking orders from contaminating room air.

Figure 43:
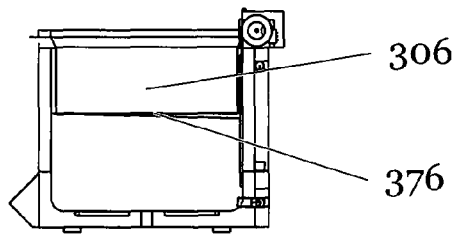
FIG. 43 is a cross-sectional side view taken along section 343-343 through the fourth preferred embodiment of FIG. 39, with a food support platform in its raised position.
Figure 45:
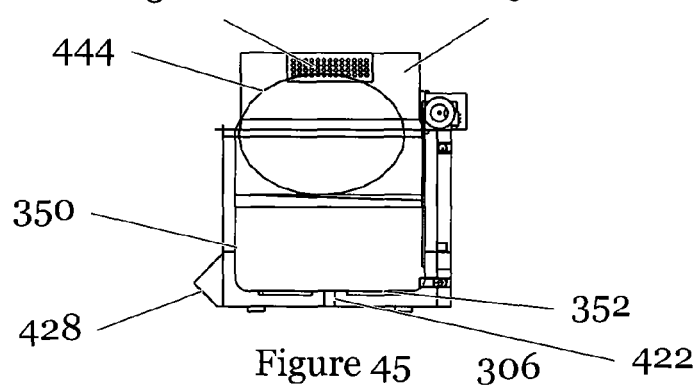
FIG. 45 is a cross-sectional side view taken along section 345-345 through the fourth preferred embodiment of FIG. 39, with the food support platform in its raised position.
Figure 46:
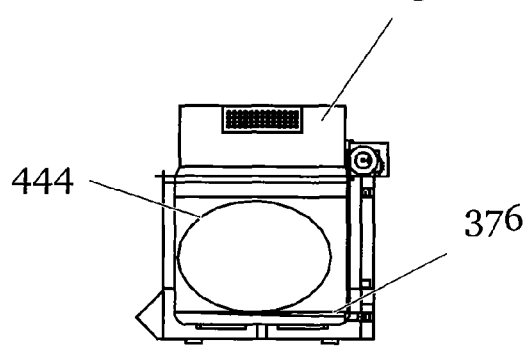
FIG. 46 is a cross-sectional side view taken along section 345-345 through the fourth preferred embodiment of FIG. 39, with the food support platform in its lowered position.

Sections 343, 344, and 345 of the cooking device set forth in FIGS. 39, 40, and 41 are more fully illustrated in respective FIGS. 43, 44, and 45. FIGS. 44 to 46 illustrate the cooking device comprising a food article disposed therein as represented by ellipse 444. FIG. 44 shows the position of the food article after it has been loaded into the device and onto a food support vessel 376 for cooking. FIG. 45 shows the position of the food article after the lid has been lowered from its open position to a closed position onto the outer housing, and while the food support vessel 376 is maintained in a raised position. In this operative position, the lid is latched closed so that during the cooking process it operates to create a safety barrier to protect users of the device from possible splattering of hot cooking liquid. The closed lid may also help prevent rapid egress of cooking liquid in the event the device is accidentally tipped over of falls off of a supporting substrate surface such as a countertop. FIG. 46 shows the position of the food article 44 within the device when the food support vessel 376 has been lowered into a cooking position.

The food support vessel 176 is sized and configured to be removably disposed within the cooking bucket 350. In an example embodiment, the food support vessel 376 is provided in the form of a planar member that, unlike the other described cooking device embodiments, does not include a surrounding wall structure. In a preferred embodiment, the food support vessel 376 is configured having a plurality if openings disposed therethrough to permit for the passage of cooking liquid during both cooking and after cooking to facilitate cooking oil draining from the food article.

In an example embodiment, the food support vessel 376 includes a number of channels extending along the surface to further facilitate the draining of cooking fluid away from the food article when raised above the cooking fluid. Such channels can be configured having an inclined or angled orientation to further facilitate the passage of cooking fluid away from the food article. In a preferred embodiment, the channels are configured having an orientation that is angled rearwardly towards a rearward portion of the cooking device so that the cooking fluid that drains from the food support vessel is channeled in a direction away from the front of the cooking device and the user.

As shown in FIG. 53, an oil filter screen 434 may be positioned to rest upon the food support vessel 376 to filter used oil when the food support vessel 376 is raised, thereby helping to extend the useful cooking life of the oil. A fine mesh screen, as described earlier, or other filtering material, may be used. The oil filter screen 434 may be easily removed from the device for easy cleaning, such as in the dishwasher, or for other reasons, simply by lifting it off from food support platform 376. In an example embodiment, the oil filter screen is sized and configured to fit within the cooking device in close proximity to the walls of the cooking vessel 350.

Figure 47:
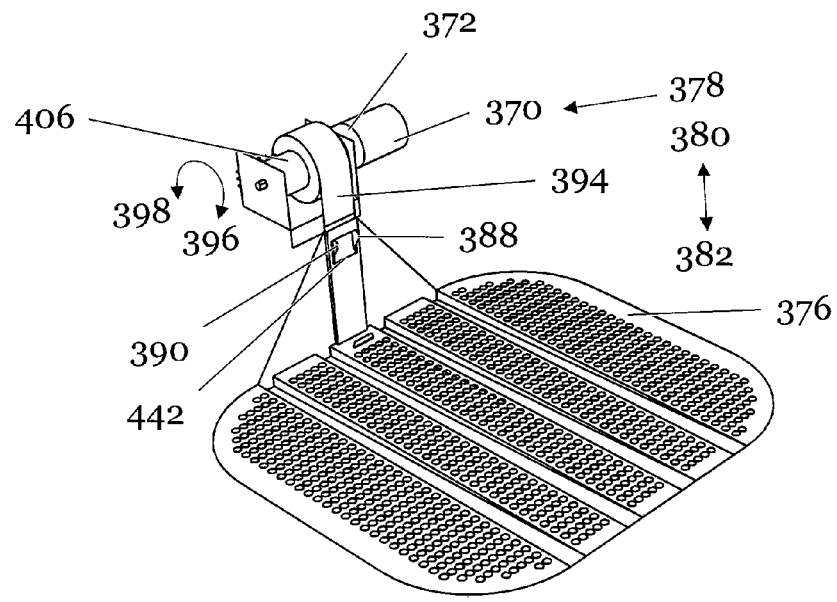
FIG. 47 is a forward perspective view of a lifting mechanism and food support platform of the fourth preferred embodiment of FIG. 39.
Figure 48:
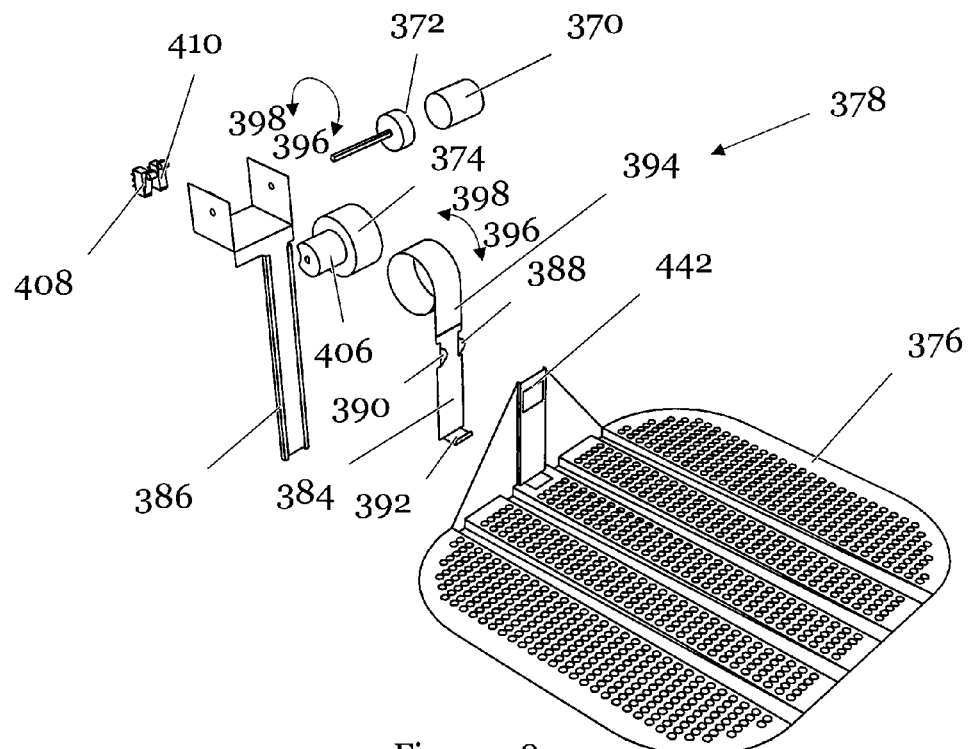
FIG. 48 is an exploded view of the lifting mechanism of FIG. 47 illustrating its elements in an unassembled state.
Figure 49:
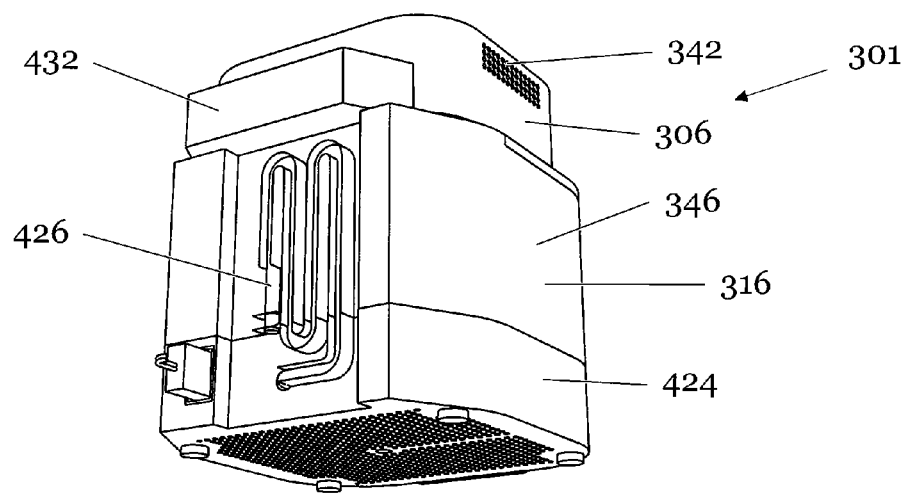
FIG. 49 is a rear lower perspective view of the fourth preferred embodiment of FIG. 39.

In an example embodiment, the food support vessel 376 is detachably coupled to a food support vessel lifting mechanism 378 that is constructed to raise 380 and lower 382 platform 376 (as shown in FIGS. 47 and 48). The lifting mechanism 378 comprises a coupling bracket 384 that couples through hooks 388, 390 and 392 to a backplate 442 attached to a rearside portion of the platform 376. The coupling bracket 384 is slidably disposed within a track member 386 that is configured to enable vertical movement of the coupling bracket up 380 and down 382 along the track member. In example embodiment, the track member includes a "C" shaped channel that is sized to slidably retain the coupling bracket therein.

A lifting member 394 is disposed within a portion of the track member 386 and is attached to the coupling member to cause the coupling member upward and downward movement. In an example embodiment, the lifting member 394 is provided in the form of a flexible lifting tape 394. The flexible lifting tape 394 is coupled to a spool 374 that is rotatably mounted to the track member. The spool 374 is driven clockwise 396 and counterclockwise 398 by a gear reduction member 372, which in turn is powered by a reversing motor 370 (as best shown in FIGS. 47 and 48). The flexible lifting tape 394 may be fabricated from a those materials capable of providing a sufficient degree of tensile strength and being rolled and unrolled, such as a coiled metallic material similar to that used for a tape measure and the like.

FIG. 57 illustrates an alternative lifting mechanism where the flexible lifting tape 394 has been replaced by a cable lift member 400 that is wound on a cable spool 402 and that is held against the cable spool 402 by a cable guard 404. In an example embodiment, the cable lift member is provided in the form of a stainless steel cable, e.g., similar to cable found on many bicycle handbrake systems or the like. The cable 400 is connected to single cable hook member 438, which in turn is removably hooked to the food support vessel backplate 442. The single cable hook member 438 rides up and down in the track member 386 in the manner described above.

The food support vessel 376 includes a channel in its rearward facing surface, e.g., disposed along the backplate 384, that engages both sides of track member 386 so as to provide a stabilizing effect, thereby eliminating the need for any additional connection to the lifting mechanism.

The lifting mechanism according to either embodiment includes a cam 406 that is coaxial and integral with the spool 374. The cam includes two cammed surfaces that cause an upper food support vessel sensor switch 408 to turn off only when the food support vessel 376 reaches its uppermost position (as shown in FIG. 44), and that cause a lower food support vessel sensor switch 410 to turn off only when food support vessel 376 reaches its lowermost position (as shown in FIG. 46). In an example embodiment, the sensor switches 408 and 410 are mounted on the track member 386. In an example embodiment, the cam 406 can operate reliably because less than one full turn of spool 374 is required to fully raise or fully lower food support vessel 376, thus, in such example embodiment the spool 374 is sized having a circumference that is sized greater than the vertical distance traveled by the food support vessel 376. An enclosure 432 is disposed over, surrounds and protects an upper portion of food support vessel lifting mechanism 378.

Figure 56:
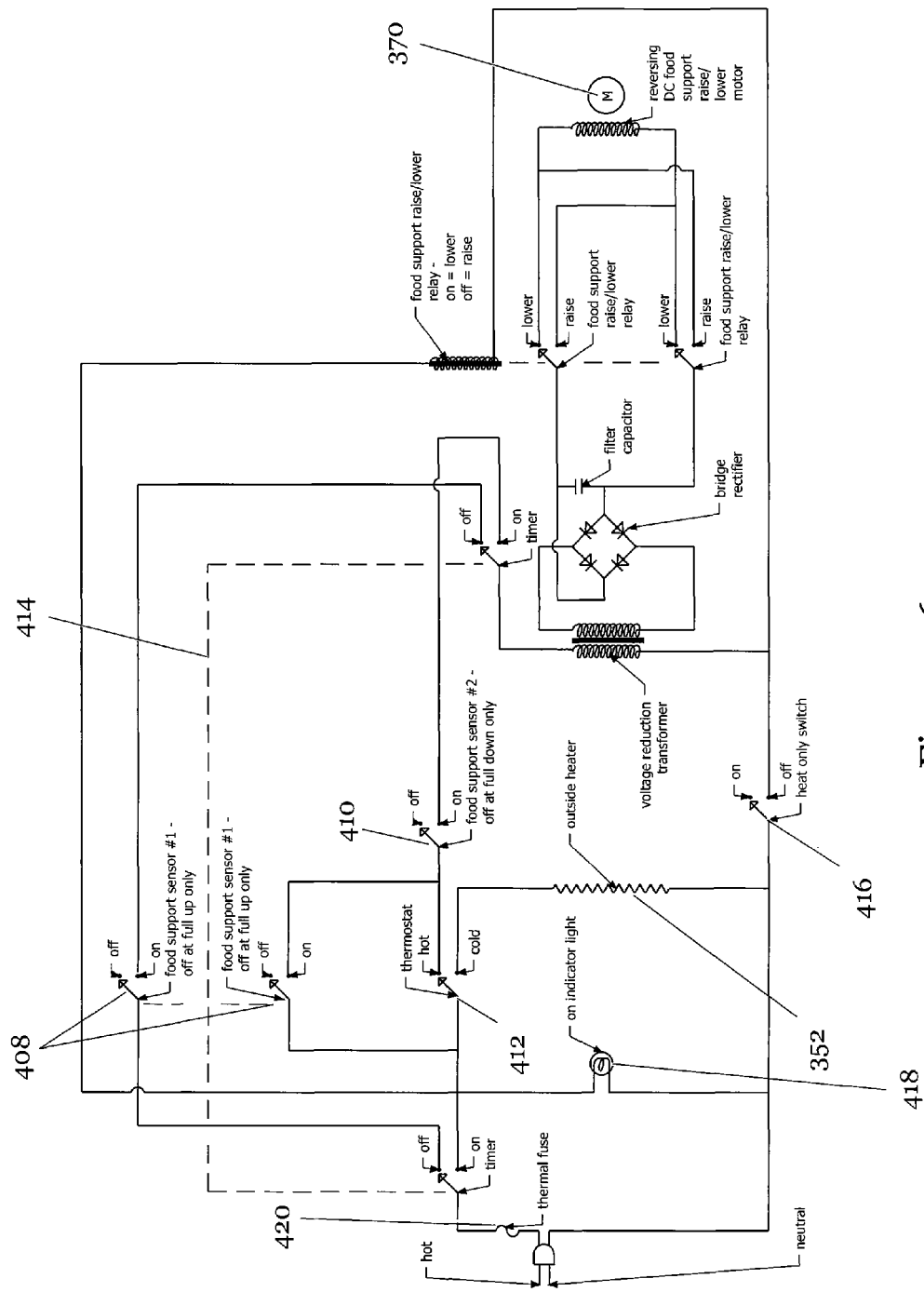
FIG. 56 is a schematic diagram of an electrical system of the fourth preferred embodiment of FIG. 52.

FIG. 56 illustrates a control circuit useful for operating the cooking device of this fourth embodiment in the following manner. In operation, a user places the cooking liquid into the cooking vessel 350, and places the food article to be cooked onto the food support vessel 376, before closing the lid 306 and setting a timer 414 that is configured with combined cooking fluid warm up and cooking times.

The outside heater 352 is activated, and the food support vessel 376 remains in its uppermost position (as shown in FIG. 44) until the thermostat 412 senses that the desired cooking liquid temperature has been reached. Once the cooking liquid temperature has been reached, the thermostat 412 is triggered to activate the motor 370 to lower 382 the food support vessel 376 to its lowermost position (as shown in FIG. 46) where it remains until the timer 414 reaches its user preset time. Once the preset time has been reached, the timer is turned off, causing activation of the motor 370 to raise 380 the food support vessel 376 to its uppermost limit (as shown in FIG. 44) where the food article is allowed to drain of liquids before being removed from the device and served.

The cooking device includes a user operable heater only switch 416 that is mounted with the timer 414 on the outer housing. The heater only switch, when on, only operates the outside heater 353 and does not operate the food support vessel lifting mechanism, thus maintains food article within the cooking device in an uppermost position to permit the food article to be steamed, roasted, or otherwise cooked without being automatically lowered on the food support vessel. For user convenience, the heater only switch 416 still allows for cooking control by timer 414 of the outside heater 352. Additionally, in the heat only mode of operation, foods may be cooked within the cooking vessel 350 without the use of food support vessel simply by removing the food support vessel 376 therefrom.

The cooking device includes a user interface enclosure 428. In an example embodiment, the user interface enclosure 428 is attached to a front portion of the outer housing, and more specifically, is mounted to a front portion of the base portion of the outer housing. The user interface enclosure is configured to accommodate an indicator light 418, the heater only switch 416, and the timer 414. In an example embodiment, the enclosure includes an upwardly angled faceplate that present each of the above-noted control elements in a manner that permits easy user control. Likewise, placement of the enclosure 428 on the outer housing base portion makes use of all controls and viewing of all indicators easier for a user. The foreword upward angled face of enclosure 428 also catches more ambient light, which further increases the visibility of the controls and indicators.

The indicator light 418 notifies the user any time the timer 414 is turned on. As noted above, the heat only switch 416 allows the user to turn off the food lifting mechanism and use the embodiment with food support vessel 376 in its raised position, or use the cooking device without use of the food support vessel 376.

As shown in FIGS. 50 and 52, the fourth embodiment cooking device 301 is also constructed comprising a drain hose 426, which is configured similarly to the above-described cooking device embodiment, to facilitate draining the cooking vessel 350.

Figure 54:
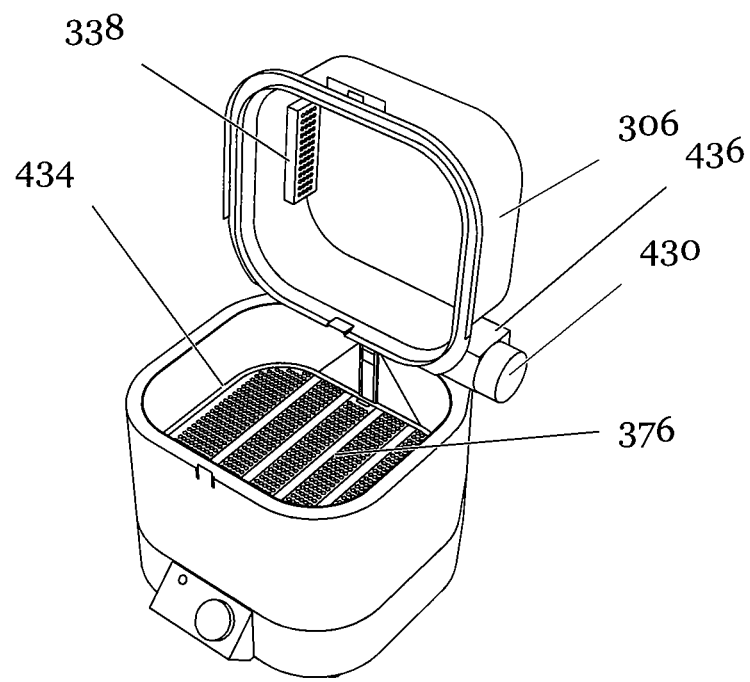
FIG. 54 is a forward upper perspective view of a hand powered version of the fourth preferred embodiment of FIG. 52.
Figure 55:
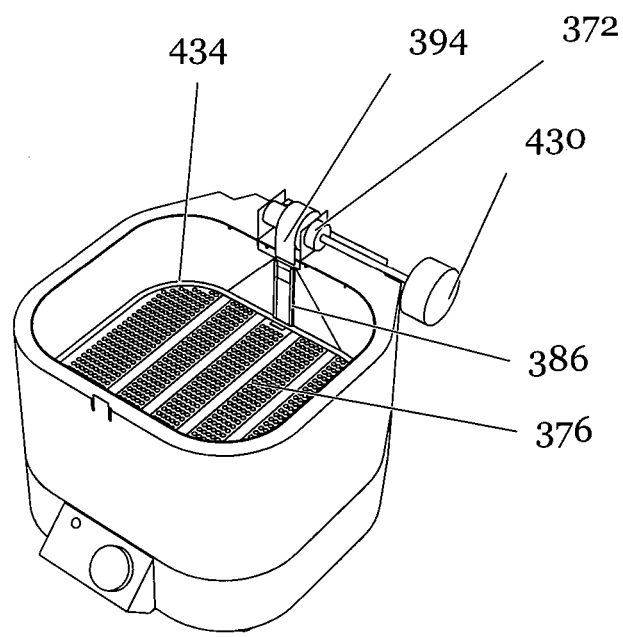
FIG. 55 is a forward upper perspective view of the hand powered version of the fourth preferred embodiment of FIG. 52, with the lid and lift mechanism removed.

FIGS. 54 and 55 illustrate an alternative fourth embodiment cooking device of this invention that is configured to use a manual method, rather than an electrically-powered motor, to raising and lowering the food support vessel. Such alternative embodiment comprises a hand grip knob 430 that is disposed adjacent the outer housing and that is connected to the lifting member 394 to permit the raising and lowering of the food support vessel by turning the knob in opposite directions. FIG. 55 illustrates the hand-powered lift mechanism with a hand-lift mechanism cover 436, and the lid 306 removed.

Each of the cooking device embodiments described above and illustrated in the various figures, depending on the scale at which it is produced, may have the potential to cook both small and large foods, ranging from a few ounces of French fries, to over a 20 pound turkey. Where the cooking device is specifically constructed to accommodate the cooking of larger types of food articles, wire baskets or other similar devices may be used in conjunction with the cooking device of this invention to facilitate cooking smaller foods. Such devices are well known in the art and hence are not illustrated herein. Such devices may also help in steaming, roasting, boiling, or otherwise cooking food articles in the cooking device of this invention.

Any and all of the cooking device embodiments described above and illustrated in the accompanying figures may be constructed in any practical scale. However, it has been found advantageous to make the height of such cooking devices with a lid on in the range of from about 14½ to 16 inches tall overall. This allows enough internal space within the cooking device to cook a 15 to 20 pound turkey and also provides sufficient clearance so that each cooking device embodiment can sit on a standard countertop and clear over-countertop cabinets.

Also it has been found practical for reasons of food cooking capacity and in-kitchen standard countertop space usage, to make each cooking device embodiment in the range of from about 14¼ to 17 inches wide (as measured left to right across the front of the cooking device), and from between about 11 to 15¼ inches deep.

Materials and method used for constructing cooking device embodiments of this invention may imitate those used by many of today's home use deep fat fryers. As an example, and not by way of any limitation, the outer housing can be formed from such materials as plastic, such as polypropylene or ABS. Alternatively, the cooking device outer housing may be constructed from metal, such as painted mild steel or aluminum, or may be constructed from a combination of metals and plastic.

The cooking device cooing vessel or cooking bucket can be formed from such materials as deep drawn aluminum or mild steel, and might be anodized, or coated with an easy-to-clean nonstick surface.

What have been described herein are several example embodiments of cooking devices constructed in accordance with principles of the invention. Those knowledgeable in the art will readily understand that many other cooking device embodiments not specifically described herein may employ the present invention. It is for this reason that the protections afforded by this document shall be limited only by the scope of claims contained herein and their legal equivalents.

Fifth Embodiment

Referring to FIGS. 58 through 61, the exemplary embodiment shown offers economies in manufacture, as well as user safety, design/engineering simplicity, and ease of cleaning and operation.

The exemplary embodiment includes two-piece outer enclosure 502, 504 comprising tubular shaped upper outer enclosure 502 attached to the upper rim of open top box shaped lower outer enclosure 504. Lower outer enclosure 504 includes in its forward right portion control box 522 which contains embodiment controls.

Outer enclosure 502, 504, which generally resembles an open top box, contains within it open top box shaped cooking vessel 506 which has vertically movable food support 508 removeably located within it.

An air gap between outer enclosure 502 504 and cooking vessel 506 helps reduce outer enclosure temperatures for user and countertop safety. An air gap, formed by feet on the bottom of outer enclosure 504, and formed between the bottom of outer enclosure 504 and the countertop on which it rests, also reduces potential damage to countertops from heat.

Cooking liquid within vessel 506 is heated by an external heater attached on the bottom of cooking vessel 506 similar to those shown in earlier exemplary embodiments contained herein (see FIGS. 50 and 53).

Right handle bracket 510 and the left handle bracket 512 provide means for manually lifting and lowering food support platform 514 within cooking vessel 506. Grips 518 and 520 are at the ends of right handle bracket 510 and left handle bracket 512 respectively to provide manual gripping locations and to reduce heat at those locations.

Figure 61:
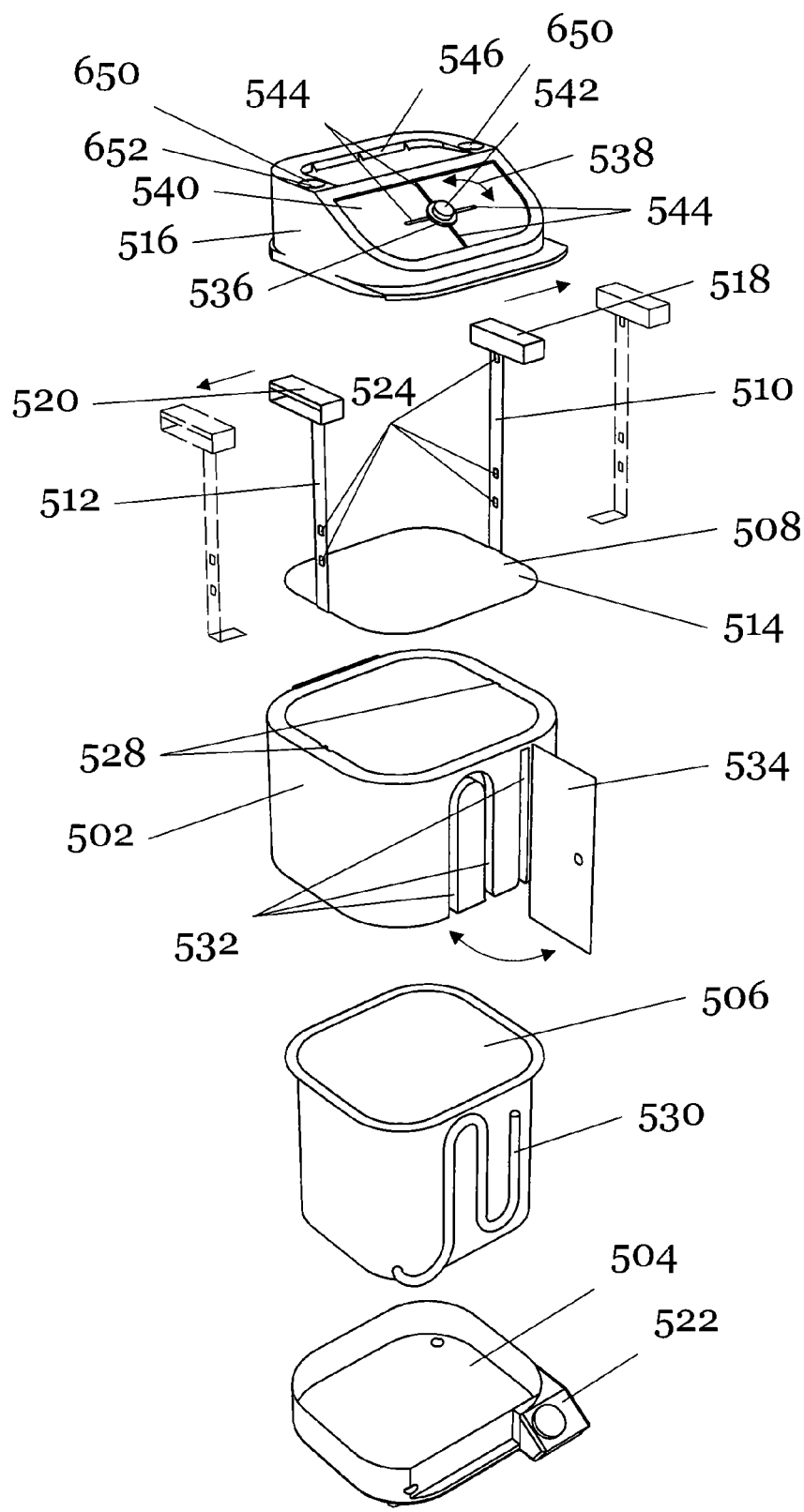
FIG. 61 shows an exploded perspective view of the exemplary embodiment shown in FIGS. 58 through 60.
Figure 62:
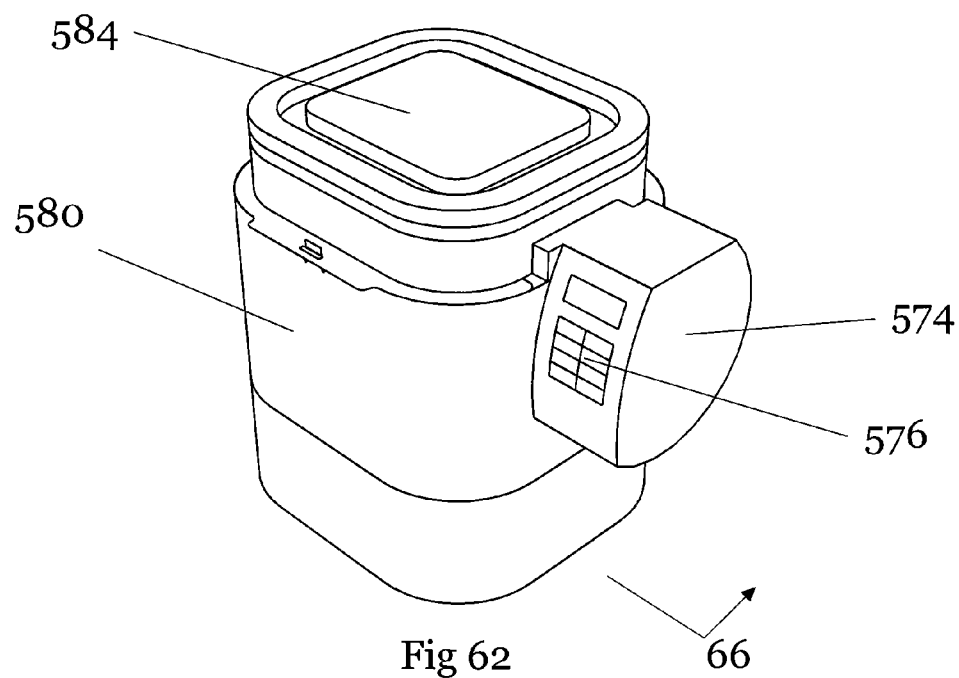
FIG. 62 shows a forward perspective view of another exemplary embodiment of the present inventions.
Figure 63:
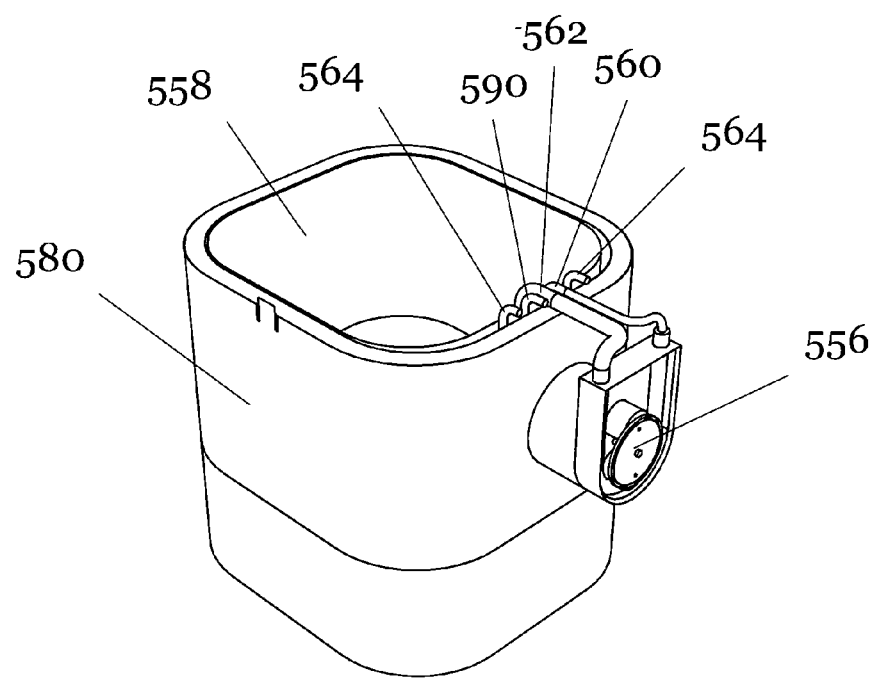
FIG. 63 shows the embodiment illustrated in FIG. 62 with its lid and control box cover removed.
Figure 64:
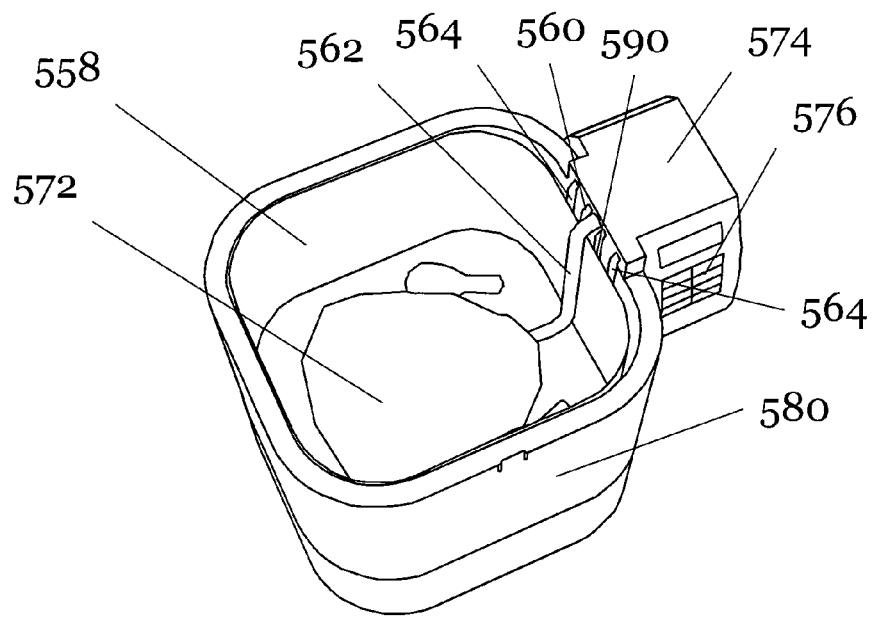
FIG. 64 shows an overhead perspective of the embodiment illustrated in FIGS. 62 and 63 with its lid removed and its food support vessel in its raised floating position.

Right handle bracket 510 and the left handle bracket 512 removeably attach to the right and left sides respectively of food support platform 514, as shown in FIG. 61, to make movable food support 508 more compact and/or less bulky, as an example during shipment, cleaning, and/or storage. The attachment of brackets 510 and 512 to food support platform 514 may be made, as an example, by threaded studs welded to platform 514 passing through holes in brackets 510 and 512 and being capped on the threaded stud ends with wing nuts.

Spaced along the length of both right handle bracket 510 and left handle bracket 512 are holes 524 which engage protrusions 526 and 528 located on the interior upper rim of upper outer enclosure 502. This in turn, by pushing grips 518 and 520 towards each other provides manually controlled engagement at various vertical levels for movable food support 508.

Holes 524 are located to provide: a low cooking position; an intermediate raised position where food can be raised out of hot cooking oil and yet not touch lid 516 when closed; and a fully raised position where food support 508 is raised to its fullest extent for food insertion and removal. This versatility enhances the ease-of-use of the exemplary embodiment.

Similar to earlier exemplary embodiments described herein (see FIGS. 51A, 51B, and 52), lid 516 may be latched in its down position to cap cooking vessel 506, or it may be rested in a vertical open position, or it may be completely removed from cooking vessel 506.

Likewise similar to exemplary embodiments earlier described herein (see FIGS. 49, 50, and 53), drainage tube 530 is flexible and attached to the bottom of cooking vessel 506, and may be dismounted from slots 532 and used to drain cooking vessel 506.

Door 534, when closed, hides all but a left-hand section of drainage tube 530 (see FIGS. 58 and 59) and prevents drainage tube 530 from being accidentally dismounted from slots 532. Thus door 534 provides both aesthetic features, by hiding most of drainage tube 530, and provides safety features, by preventing drainage tube 530 from being accidentally dismounted where it might accidentally spill hot or cold cooking liquid.

Flexible drainage tube 530 may be translucent or transparent. This in combination with allowing a portion of drainage tube 530 to be visible with door 534 closed allows drainage tube 530 to be used as an accurate indicator of liquid levels within cooking vessel 506 because the liquid level within drainage tube 530 is the same as the liquid level within cooking vessel 506. This provides an accurate, simple, and inexpensive liquid level gauge for cooking vessel 506. For added safety, a removable plug, similar to that shown in FIGS. 30, 49, 50, and 53, may be placed on the end of drainage tube 530, however an air hole must be present in the plug if drainage tube 530 is to be used to measure the liquid level in cooking vessel 506.

Wiper blades 544 are located on the interior of glass 540, and may be rotated 538, using knob 542, which is located on the exterior of glass 540, to clear condensation or other debris from the interior of glass 540 so that the contents of cooking vessel 506 may be more easily viewed when condensation or other debris is present on glass 540.

Wiper 536 has wiper blades 544 integrally connect to one end of an axle which penetrates through a hole in glass 540. Attached solidly on the other end of the axle and located on the exterior side of glass 540, is knob 542. Wiper blades 544 contact the interior surfaces of glass 540 and wipe condensation and/or debris from those surfaces when knob 542 is rotated. This device works similar to windshield wipers on a car.

Glass 540 is forward inclined to both reduce condensation and other debris build up on its interior during cooking, and to help in viewing the contents of cooking vessel 506 during the cooking process by providing a more natural viewing angle and by allowing substantial amounts of ambient light into the cooking area of the exemplary embodiment.

Vents 546 exit cooking exhaust forward during the cooking process and help prevent over counter cabinet damage by directing cooking exhaust away from such cabinets. Vents 546 may be backed by one or more filters (not shown) to reduce odors and pollution exiting from the exemplary embodiment. Vents 546 are located high and back, away from positions a user would normally touch, thus helping to prevent user injuries from hot cooking exhaust.

Frustum conical depressions 650 each have holes 652 penetrating their bases to allow insertion of long stem cooking thermometers 654 or other sensing devices through holes 652 and thus through lid 516 without opening lid 516. This advantageously allows heat measurement of cooking liquid without having to open lid 516. By having transparent glass 542 to view where foods being cooked within the exemplary embodiment might be pierced to measure their temperatures, and by using a cooking thermometer or other temperature sensing device with a rod type probe with a food piercing tip to pass through holes 652, foods being cooked may also be temperature measured without opening lid 516. Not having to open the lid 516 to take cooking liquid or food temperature measurements helps improve both embodiment usability and safety.

One example of a cooking process using the embodiment is as follows. The user partially fills cooking vessel 506 with cooking oil using direct observation and/or viewing drainage tube 532 to fill vessel 506 to the proper level. It has been found that to deep fry a 9 pound to 25 pound turkey, 2½ gallons to 6 gallons of cooking oil is most advantageously used.

Either before or after this, movable food support 508 is inserted into cooking vessel 506 and raised to its uppermost position where it is held by protrusions 526 and 528 engaging holes 524. Here food is placed on food support 508, food support 508 is lowered to its intermediate position where it is above the cooking liquid but still low enough that lid 516 can be lowered without hitting the food. Lid 516 is then latched down in its cooking vessel 506 capping position.

Using the controls contained in control box 522, the user turns on the heat and warms the oil to cooking temperature. A timer or heat sensing mechanism within control box 522 may sound an alarm to alert the user when the oil has reached cooking temperature.

Once oil cooking temperature has been obtained, using handle brackets 510 and 512, the user presses grips 518 and 520 towards each other which disengages holes 524 from protrusions 526 and 528 and allows food support 508 and the food resting on it to be lowered into the hot cooking oil where they remain until the cooking process is complete.

Once cooking is complete, the user reverses the above process, and raises movable food support 508 and the food on it from the hot cooking oil and latches them in the intermediate position, away from the hot oil, where the food can drain and cool.

After this, the user opens lid 516 and removes the food. Oil may be drained from cooking vessel 506 by opening door 534 and placing the dismounted end of flexible drainage tube 530 into a storage or disposal container and then lowering the container to below the bottom of cooking vessel 506 for drainage.

Food support 508 may be removed and possibly disassembled for cleaning in a dishwasher or sink. Nonstick coating may be used on the exterior surfaces of food support 508 and cooking vessel 506 to help in the cleaning process. Lid 516 may also be washed in a dishwasher or sink. For storage, food support 508 may be placed back within cooking vessel 506 and lid 516 turned upside down and nested into the top of cooking vessel 506 (analogous to the lid inversion shown in FIGS. 43 through 46).

This exemplary embodiment may be constructed at any advantageous size and in any advantageous proportions. To deep fat fry a 9 to 20 pound turkey, the most common turkey sizes available in the United States, it has been found that cooking vessel 506 should be between 9 inches and 14 inches in depth, 9 inches and 15 inches in width, and between 9 inches and 14 inches in height.

Various materials may be used to construct the embodiment including, by way of example only, metal: such as mild steel, stainless steel, or aluminum, each possibly coated with nonstick or plated with chromium or nickel; may be used to construct cooking vessel 506 and food support 508. Plastics; such as polypropylene, polycarbonate, SAN, Melamine, Bakelite, or ABS, may be used to construct outer enclosure 502 504 and lid 516. Lid 516 may be constructed from translucent materials, including, by example only: polypropylene, polycarbonate, or SAN, to advantageously allow in more ambient light to cooking vessel 506 to make viewing its contents easier.

Sixth Embodiment

Referring to FIGS. 62 to 69, another exemplary embodiment of the present inventions is illustrated.

This embodiment offers: economies in manufacture; design/engineering simplicity; safety; and ease of use and cleaning.

Generally described, this embodiment has inner bucket shaped food support vessel 558 nested within outer bucket shaped cooking vessel 554, with bidirectional pump 556 moving cooking liquid between the inner and outer bucket shaped vessels. Heater 564 is located inside and near the bottom of outer cooking vessel 554 and outside of inner food support vessel 558.

Figure 68:
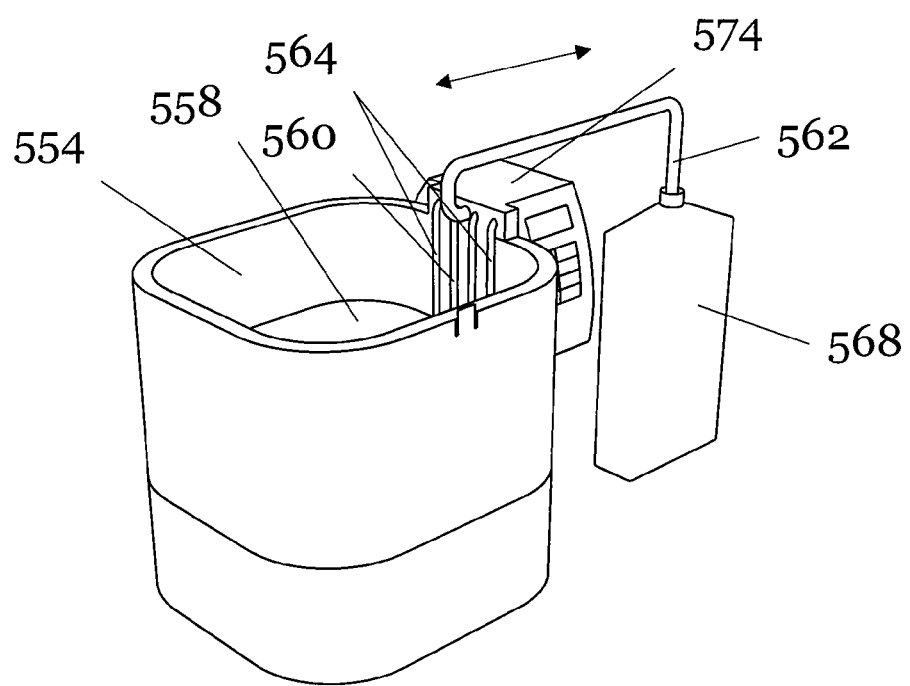
FIG. 68 is a forward perspective view of the exemplary embodiment shown in FIGS. 62 through 67 showing how the embodiment would look when draining or filling the cooking vessel with cooking liquid from an external container.
Figure 69:
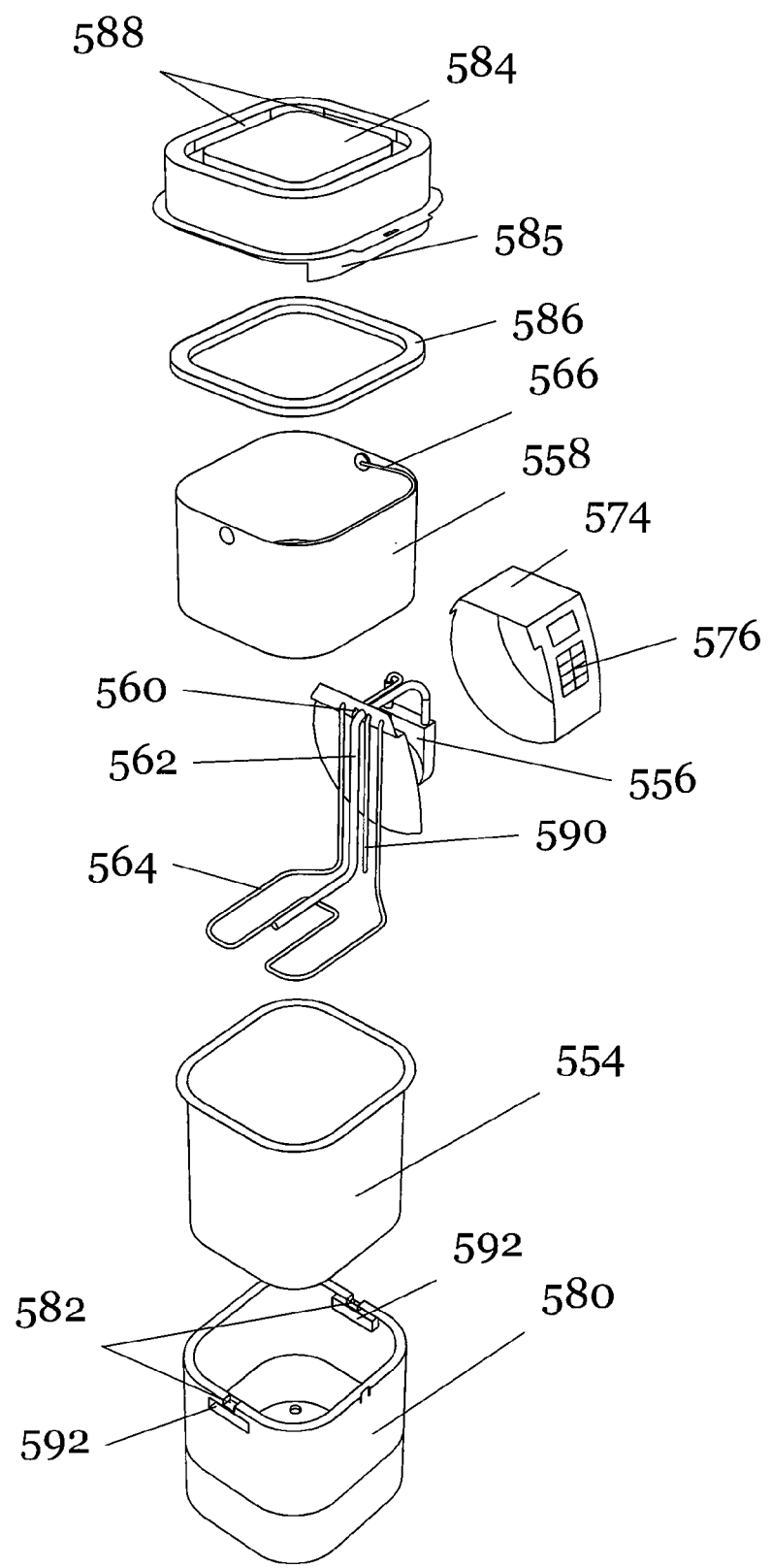
FIG. 69 is an exploded perspective view of the embodiment shown in FIGS. 62 through 68.
Figure 70:
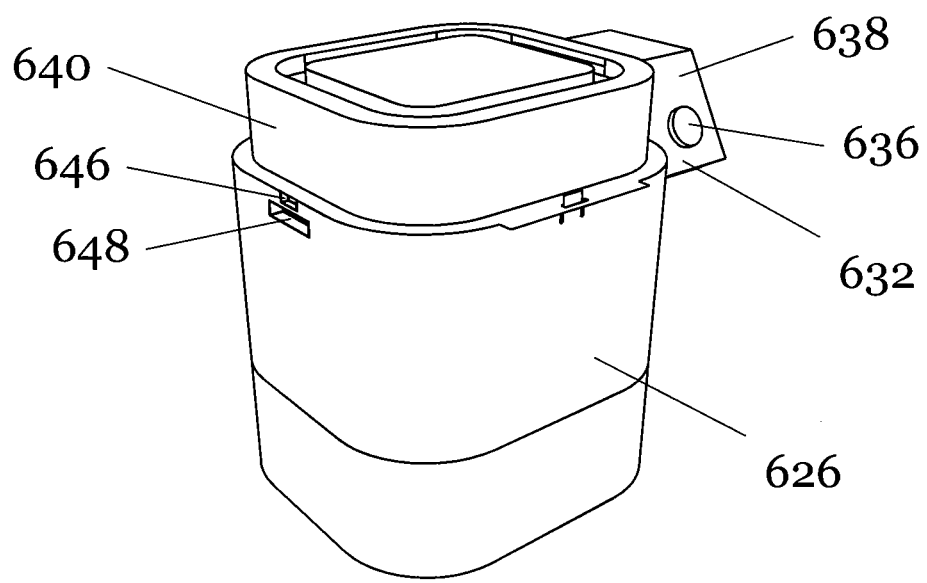
FIG. 70 is a forward perspective view of another exemplary embodiment of the present inventions.

At the start of an exemplary cooking process, inner cooking vessel 554 contains food to be cooked but no cooking liquid, and it floats on cooking liquid 570 which has been added by a user into outer vessel 554 either by pouring the cooking liquid directly into outer vessel 554, or by using bidirectional pump 556, as shown in FIG. 68. The user also places one end of flexible tube 562 into inner support vessel 558.

Once heater 564 raises the cooking liquid in outer cooking vessel 554 to cooking temperature as determined by a sensor, a logic mechanism triggers bidirectional pump 556 to move the liquid through tube 560, which has one end open near the floor of cooking vessel 554, into cooking vessel 554 through flexible tube 562 which has an open end user placed into the bottom of inner food support vessel 558.

This removes most, but not all, of the hot cooking liquid 570 from outer cooking vessel 554, and moves it into food support vessel 558, where hot cooking liquid 570 partially fills vessel 554, and immerses any food 572 contained within it with hot cooking liquid 570.

Figure 65:
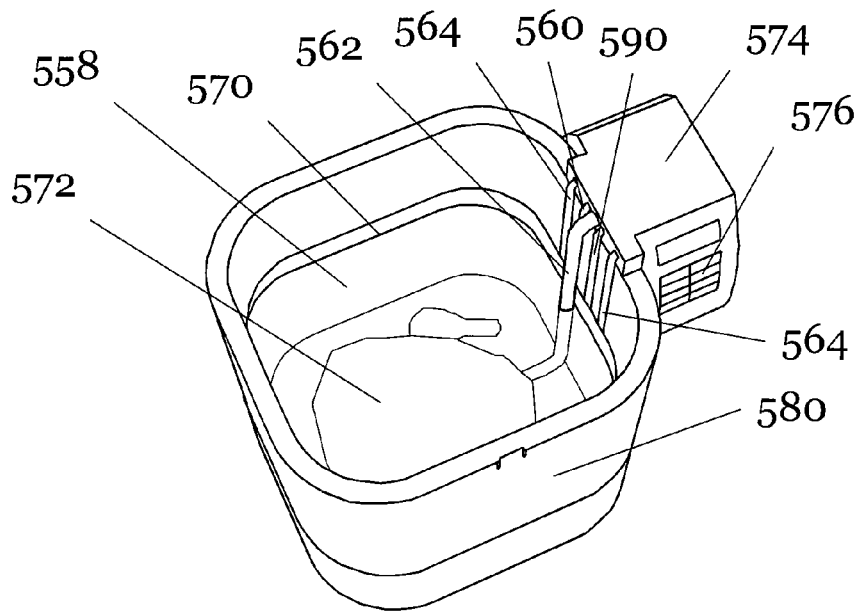
FIG. 65 is identical to FIG. 64 except showing the food support vessel mostly filled with cooking liquid and in its lowered cooking position.
Figure 66:
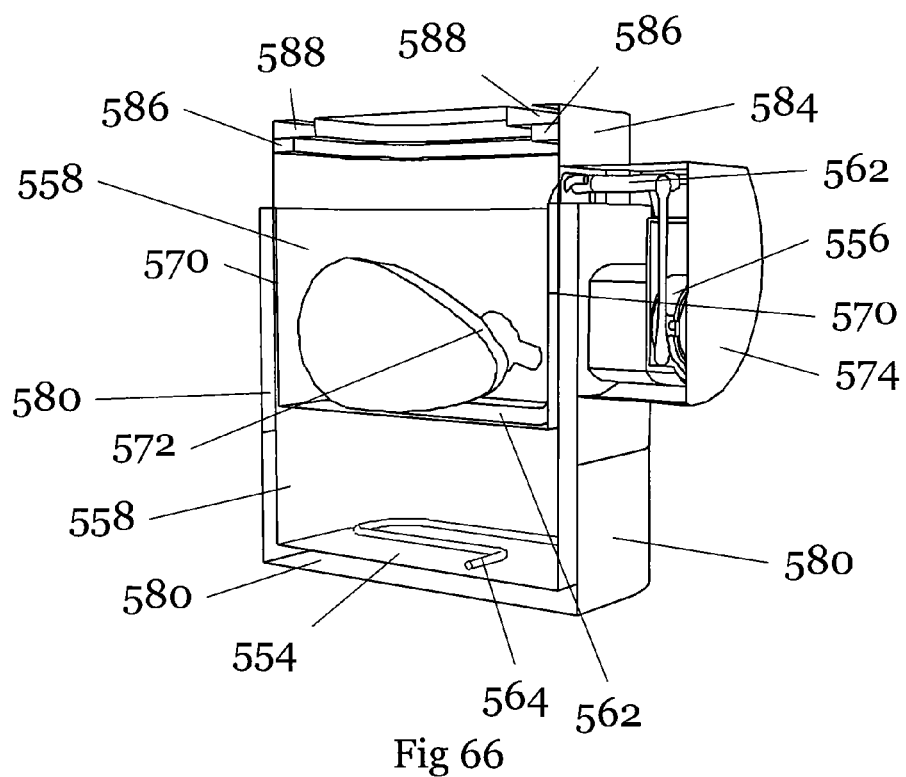
FIG. 66 is a section perspective view of the embodiment shown in FIG. 62 as indicated in FIG. 62, with cooking liquid filled into outer bucket shaped cooking vessel 554 which in turn floats upward inner food support vessel 558.
Figure 67:
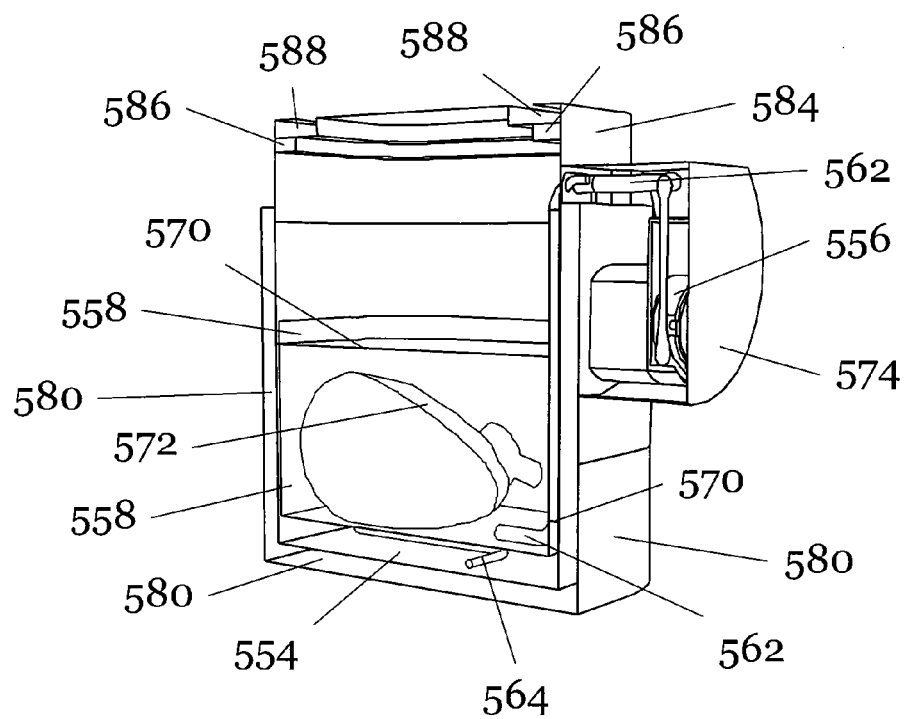
FIG. 67 is identical to FIG. 66 except showing the food support vessel mostly filled with cooking liquid and thus in its lowered cooking position.

This hot cooking liquid movement causes outer cooking vessel 554 to no longer contain substantial liquid, and causes inner food support vessel 558 to be partially or mostly filled with cooking liquid (see FIGS. 65 and 67). This in turn results in inner food support vessel 558 sinking to near the bottom of outer cooking vessel 554 as shown in FIGS. 65 and 67. The reduced amounts of cooking liquid still left in outer cooking vessel 554 convey heat from heater 564 to the cooking liquid contained in inner food support vessel 558.

The amount of cooking liquid left within cooking vessel 554 is precisely determined by how high the open end of tube 560 is above the floor of cooking vessel 554. Further, this height adjustment of tube 560 may be made to be user controlled by the user simply sliding tube 560 up or down. This, by sliding tube 560 to its fullest downward extent, may also help in more completely draining cooking liquid from outer cooking vessel 554 in the cooking vessel draining operation explained below.

Alternatively, the amount of cooking liquid moved between cooking vessel 554 and food support vessel 558 may be controlled by a timer mechanism or a flow measuring device.

Upon food contained in food support vessel 558 being immersed in hot cooking liquid by the aforementioned hot cooking liquid movement, cooking commences. The duration of this cooking may be determined by a control timer. Alternatively, in combination or as a separate alternative, food temperature, as determined by a probe inserted into the food might be used to time the cooking process.

After the cooking process is complete, the above process is reversed, with bidirectional pump 556 moving cooking liquid from inner food support vessel 558 into outer cooking vessel 554 through tubes 562 and 560. This again causes inner food support vessel 558 to float upward on liquid contained in outer cooking vessel 554 (see FIGS. 64 and 66).

Because inner food support vessel 558 no longer contains substantial amounts of cooking liquid, food within it may cool and drain. The cooling and draining time may be measured by an integrated timing mechanism with an alarm. Once the food cooling and draining is complete, food is removed and may be served.

The amount of hot cooking liquid used during any cooking process may vary depending on the quantity and type of food being cooked. In certain circumstances the amount of cooking liquid present may not be sufficient to float inner food support 558, and therefore no upward or downward movement of food support 558 will occur even though cooking liquid is being pumped between outer cooking vessel 554 and inner food support vessel 558.

The removal of food from the exemplary embodiment may be accomplished by removing the food from within inner foods support vessel 558 while it is still nested within outer cooking vessel 554, or alternatively, inner food support vessel 558 may be removed from outer cooking vessel 554, possibly using bucket handle 566 to assist, before food is removed from inner food support vessel 558.

Bucket handle 566 is mounted to the top rim of food support vessel 558 to help in removing it, and possibly food contained within it, from within cooking vessel 554.

As illustrated in FIG. 68, flexible tube 562 may be removed from within cooking vessel 554 and placed into cooking liquid container 568. Here bidirectional pump 556 may move cooking liquid either out of liquid container 568 into cooking vessel 554 to fill it in preparation for cooking; or move cooking liquid from cooking vessel 554 into cooking liquid container 568 to empty cooking vessel 554 and either store or dispose of the cooking liquid.

Bidirectional pump 556 may comprise one or more pumps of any suitable type. As examples; it may be a pair of piston pumps, or a pair of diaphragm pumps, or a peristaltic pump (as illustrated), or a gear pump, or any other suitable pump or pumps.

The peristaltic pump illustrated has two rollers which successively crush a resilient hose around a semi circular track. This pump has advantages of being: self priming, able to contain hot liquids, and bidirectional.

One or more filters may be placed between the ends of tube 560 and flexible tube 562 to help cleanse the cooking liquid during the pumping process and therefore extend the liquid's useful life.

Control box 574, including attached devices: bidirectional pump 556, flexible tube 562, heater 564, tube 560, controls 576, heat sensing tube 590, and control box cover 578, are removeably attached over the overlapping upper right hand edges of outer cooking vessel 554 and outer enclosure 580.

Removal of control box 574 from outer cooking vessel 554 and outer enclosure 580 is accomplished by the user simply lifting control box 574 vertically.

Once control box 574 is separated from outer cooking vessel 554 and outer enclosure 580, outer cooking vessel 554 may be lifted and separated from outer enclosure 580. This separation may make embodiment cleaning or other operations easier. Finger detents 582 in the upper rim of outer enclosure 580 may help in the removal of outer cooking vessel 554 from outer enclosure 580 by allowing room for fingertips to get under the upper rim of cooking vessel 554.

Lid 584 may be mounted to outer enclosure 580 and outer cooking vessel 554 in a manner similar to earlier embodiments described earlier herein (see FIG. 51, and FIGS. 51a and 51b). This affords advantages of: being latched closed onto outer cooking vessel 554, being opened in a near vertical position, and being able to be fully removed.

Like the exemplary embodiment direct the above, lid 584 may contain holes similar to those identified as 652 for use in introducing a cooking thermometer into the interior of cooking vessel 554 without having to open or remove lid 584.

Lid 584 may be constructed mostly or entirely of transparent or translucent material to aid in viewing of foods being cooked in the embodiment and to help in placement into foods within the embodiment of heat sensing probes introduced through holes in lid 584 which may be present and may be similar to those identified as 652 in the previous exemplary embodiment.

Alternatively, lid 584 may be constructed mostly or entirely of opaque material.

Steam guard rib 585 extends downward from the forward lower portion of lid 584 and helps protect the user from hot steam when lid 584 is being raised.

Filter 586 fits within the top of lid 584 and filters odors, grease and other pollutants from the exhausts of the cooking operations. These exhausts exit through inward facing annular vents 588 which are adjacent to, and are surrounded by, the outer upper perimeter of lid 584.

Heat sensing tube 590 may contain thermostats, thermal sensors, and/or thermal fuses any or all of which may be used in the control mechanism.

Handles 592, located on either side of outer enclosure 580 may aid in transporting the embodiment.

Seventh Embodiment

FIGS. 70 to 73 show an additional exemplary embodiment. This embodiment uses the rotation of parallel swing arms 596 616 to raise 606 and lower 608 a horizontal food support platform 610.

This embodiment offers: economies in manufacture; design/engineering simplicity; safety; and ease of use and cleaning.

In the embodiment, lever 594 is rigidly attached to upper swing arm 596 along rotational axis 598 of swing arm 596.

Connecting rod 600 links to crank disk 602 in such a manner as to pull 612 and push 614 the upper extent of lever 594 as crank disk 602 rotates 604 and thus pulls 612 and pushes 614 on connecting rod 600.

Figure 71:
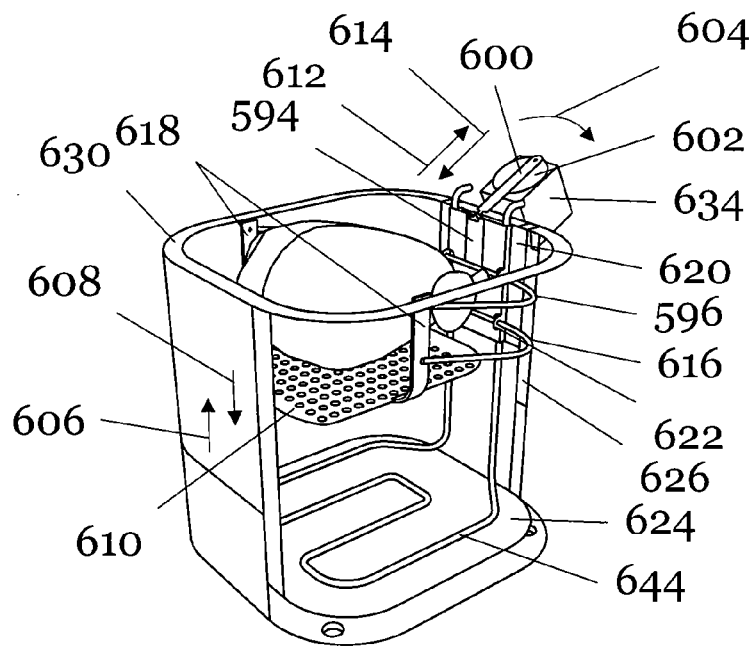
FIG. 71 is identical to FIG. 70 except the exemplary embodiment has its lid and control box cover removed and portions of the forward walls of both the inner cooking vessel as well as the outer enclosure have been removed. The food support platform is in its raised food loading/unloading position.
Figure 72:
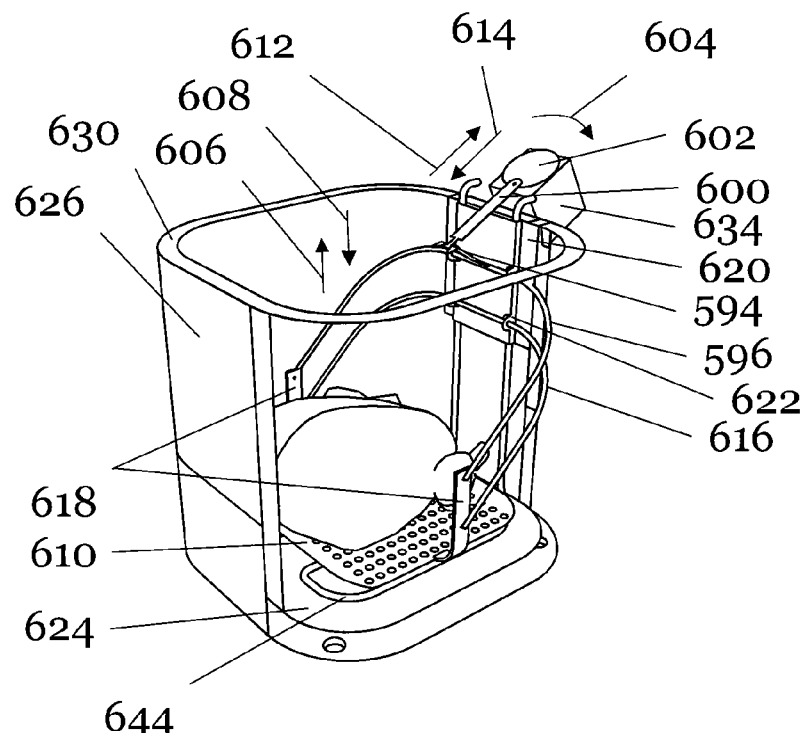
FIG. 72 is identical to FIG. 71 except that it shows the food support platform in its lowered cooking position.
Figure 73:
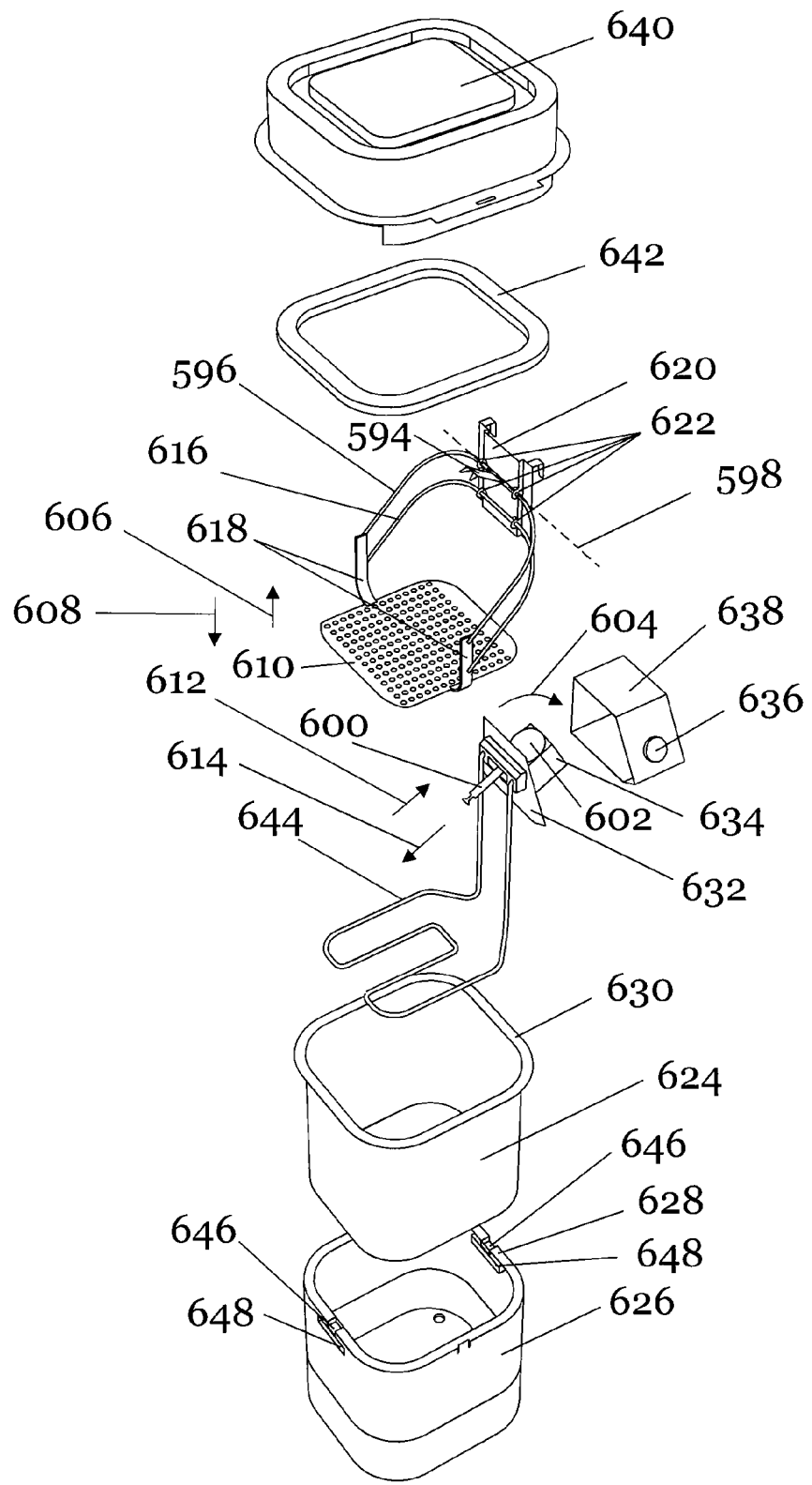
FIG. 73 is an exploded perspective view of the exemplary embodiment shown in FIGS. 70 through 72.

Crank disk 602 rotation 604 results in lever 594 being pulled 612 and pushed 614 by connecting rod 600 in such a manner as to cause swing arm 596 to rotate on axis 598 and thus raise 606 and lower 608 food support platform 610 between respectively food support platform 610's raised food loading and unloading position (FIG. 71) and lowered food cooking position (FIG. 72).

Lower parallel swing arm 616 rotationally connects to both vertical food support members 618 which are in turn attached to the floor of food support platforms 610, and lower parallel swing arms 616, along with upper swing arms 596 which also rotationally connect to both vertical support members 618, forming two parallelograms which keep food support 610 horizontal while it raises 606 and lowers 608.

Both lower swing arm 616 and upper swing arm 596 rotate at their respective bases from pivots 622 extending from food support mounting bracket 620. Food support mounting bracket 620 is essentially an inverted "U" in cross-section and mounts on outer enclosure 626 by straddling flange 630 which extends outward from the upper rim of cooking vessel 624, and by simultaneously straddling flange 628 which extends inward from the upper rim of outer enclosure 626 as illustrated in FIGS. 71 and 72.

Cooking vessels 624 nests inside of outer enclosure 626, with its flange 630 resting on top of outer enclosure 626 flange 628, but below food support mounting bracket 620 which straddles both flange 630 of cooking vessels 624 and flange 628 of outer enclosure 626.

Control box 632 also mounts to outer enclosure 626 by straddling flanges 628 and 630. Control box 632 contains crank disk drive motor 634 which powers crank disk 602 to rotate 604. Control box 632 also encloses: crank disk 602, part of connecting rod 600 as well as embodiment controls 636.

Rigidly attached to control box 632 is heating element 644 which extends downward into cooking vessel 624 when control box 632 is mounted and is straddling flanges 628 and 630.

Control box cover 638 encloses control box 632.

Lid 640 and filter 642 are similar in construction and function to lid 584 and filter 586 described herein for an earlier exemplary embodiment.

In operation, cooking vessel 624 is dropped into outer enclosure 626 and rests with flange 630 on top of flange 628. Control box 632 is then mounted over flanges 630 and 628 by dropping it in place.

Cooking liquid may then be poured into cooking vessel 624.

Food support platform 610 is next mounted into cooking vessels 624 by lowering it into place with food support mounting bracket 620 straddling flanges 630 and 628 and contacting the inside of the right side wall of cooking vessel 624 and the outside of the right side wall of outer enclosure 626.

Food support platform 610 is then manually raised 606 so that connecting rod 600 may be coupled to lever 594.

Food is next placed on top of food support platform 610. Lid 640 is then latched down to enclose cooking vessel 624.

Embodiment controls 636 are then activated causing heating element 644 to warm the cooking liquid.

Once the cooking liquid has reached cooking temperature, a heat sensor triggers embodiment controls 636 to cause crank disk motor 634 to rotate 604, which in turn causes crank disk 602 to rotate 604 and push 614 on connecting rod 600, which then results in lever 594 rotating upper swing arm 596 on axis 598 which in turn causes food support platform 610 to lower 608 to its food cooking position (FIG. 72).

Once the food is in its food cooking position (FIG. 72), cooking commences. Determination of cooking time may be done by a timer mechanism, or by other means such as, for example, a sensor placed within the food.

After cooking time is complete, as determined by time or other means, embodiment controls cause the above process to be reversed, with cranked disk motor 634 being rotated 604 causing attached crank disk 602 to rotate 604 thus pulling 612 connecting rod 600 which rotates lever 594 causing upper swing arm 596 to raise 606 food support platform 610 to its food loading and unloading position (FIG. 71).

Crank disk 602 may have one or more cams on its underside (analogous to the cam shown on FIG. 11) which may activate sensing switches which tell embodiment controls 636 when food support platform 610 is in its food loading and unloading position (FIG. 71), or in its food cooking position (FIG. 72).

Eighth Embodiment

FIGS. 74 to 88 show an additional exemplary embodiment. This embodiment uses right handle member 700 and left handle member 702 to manually raise and lower food support platform 704 within cooking vessel 714 (FIG. 89).

This embodiment offers: economies in manufacture; design/engineering simplicity; safety; and ease of use and cleaning.

Referring in general to FIGS. 74 through 88, and with particular attention to FIG. 80, this embodiment 706 is constructed as follows.

Lower outer enclosure 708 and upper outer enclosure 710 couple together to form outer enclosure 712.

Cooking vessel 714 drops into, and is mounted within, outer enclosure 712. This operation may be done by manually lowering cooking vessel 714 into outer enclosure 712. The tops of left handle track 722 and right handle track 724 undercut the upper horizontal rim of cooking vessel of 714 and provide finger holds to make manually lower cooking vessel 714 into our enclosure 712 easier. Mounting may be done using gravity, or by using other mechanical means such as: latches, magnets, mechanical engagement mechanisms, or other means.

After performing this assembly, heating and control unit 716 is manually lowered toward, and is mounted onto, forward right corner 718 of the assembly comprised of cooking vessel 714 and outer enclosure 712. By having cooking vessel 714 easily mountable and dismountable from our enclosure 712, cleaning and other operations are made easier.

Heating and control unit 760 has within it controls. These controls may be similar to control units described earlier in this document for other embodiments, including those controls which lower food into cooking liquid once the cooking liquid has reached cooking temperature, and controls which lift food from cooking liquid at a user set time 776 interval.

Heating and control unit 760 also is integrally attached to heat coil 748. A thermostatic sensor and a thermal fusing device are also attached to heating and control unit 760.

Controls may include a user adjusted temperature setting mechanism for controlling cooking liquid temperature, or the embodiment may use a single factory set cooking temperature, such as 400° F. cooking oil temperature for deep fat frying.

Food support platform 704, including attached right handle member 700, and attached left handle member 702 may then be lowered into cooking vessel 714 and mounted (FIG. 89). During this operation, left outer arm 734 of left handle member 702 is mounted within left handled track 722, and right outer arm 736 of right handle member 700 is mounted within right handle track 724 which, through arm members 734 and 736 sliding within handle tracks 722 and 724, allows food support platform 704 to vertically move within cooking vessel 714.

Figure 85:
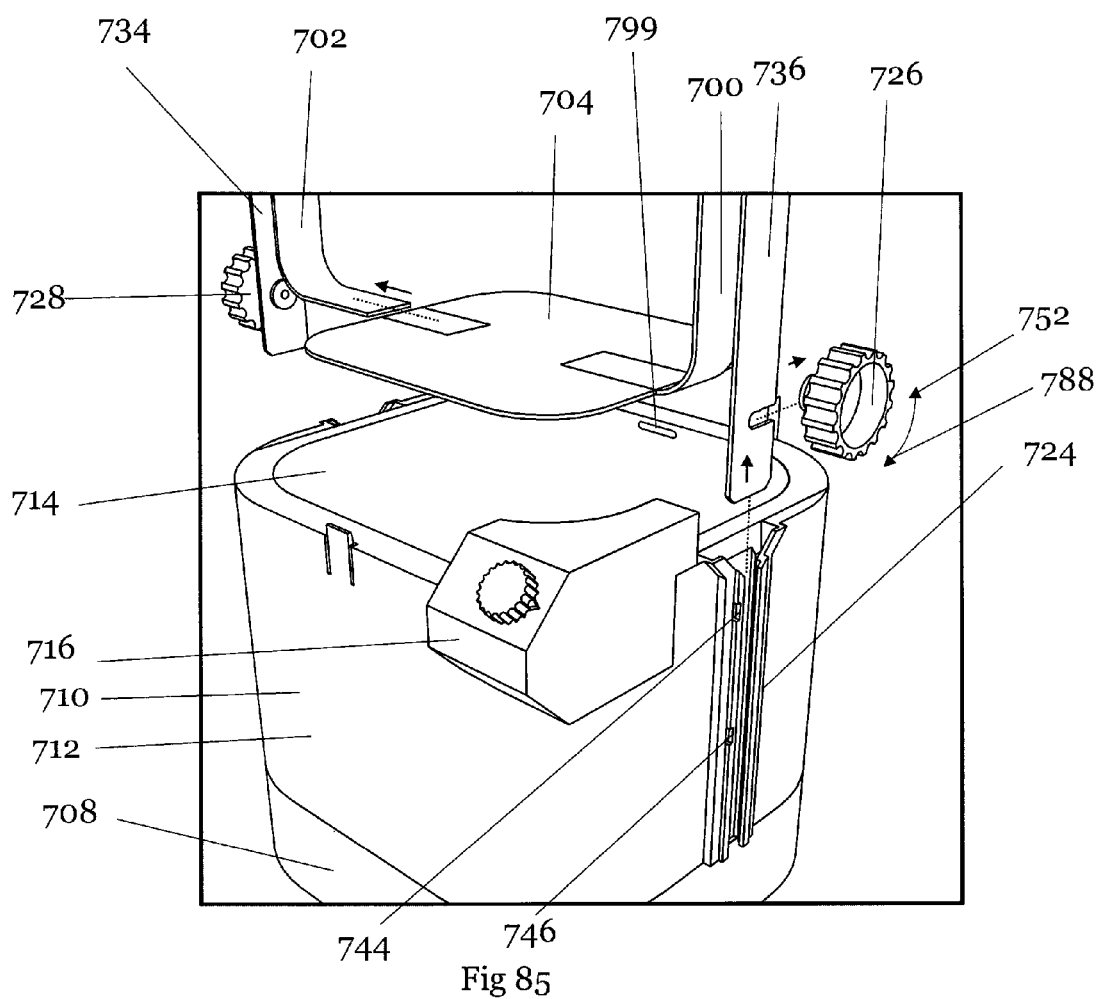
FIG. 85 is a forward perspective you have a portion of embodiment of a 06 with partial explosions of food support platform 704.
Figure 86:
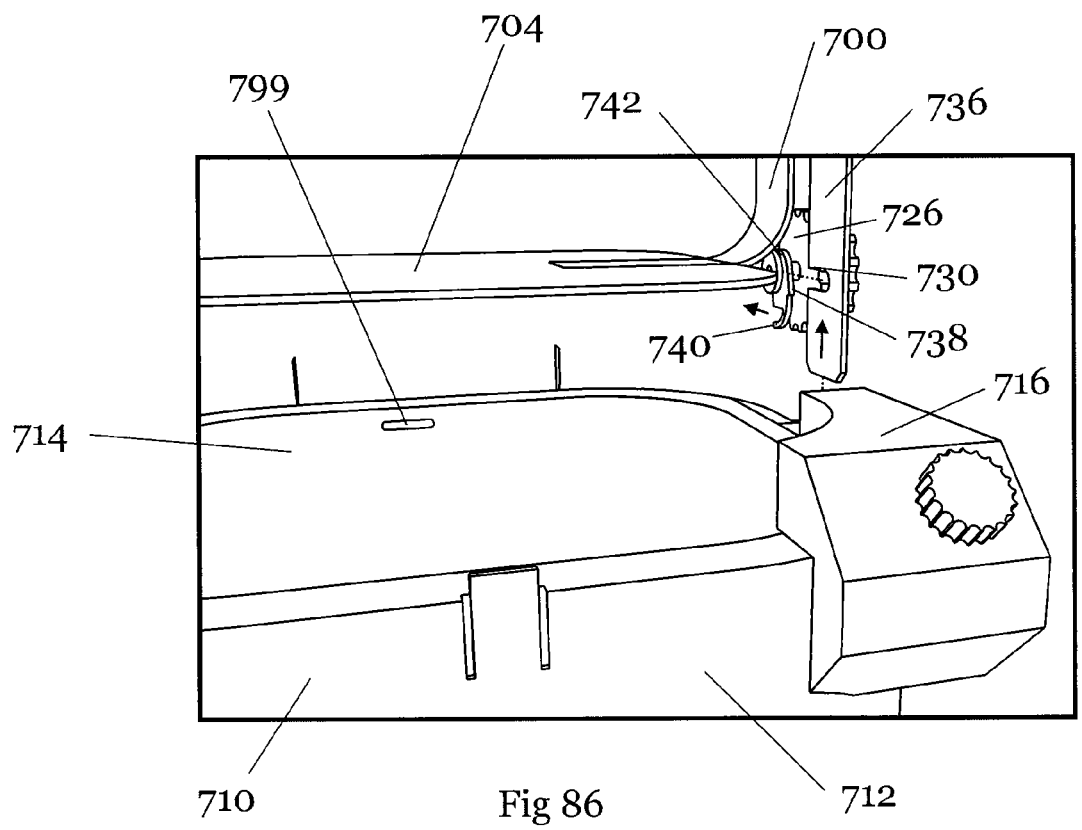
FIG. 86 is a forward perspective view of embodiment 706 with food support platform 704 removed and partially exploded.
Figure 87:
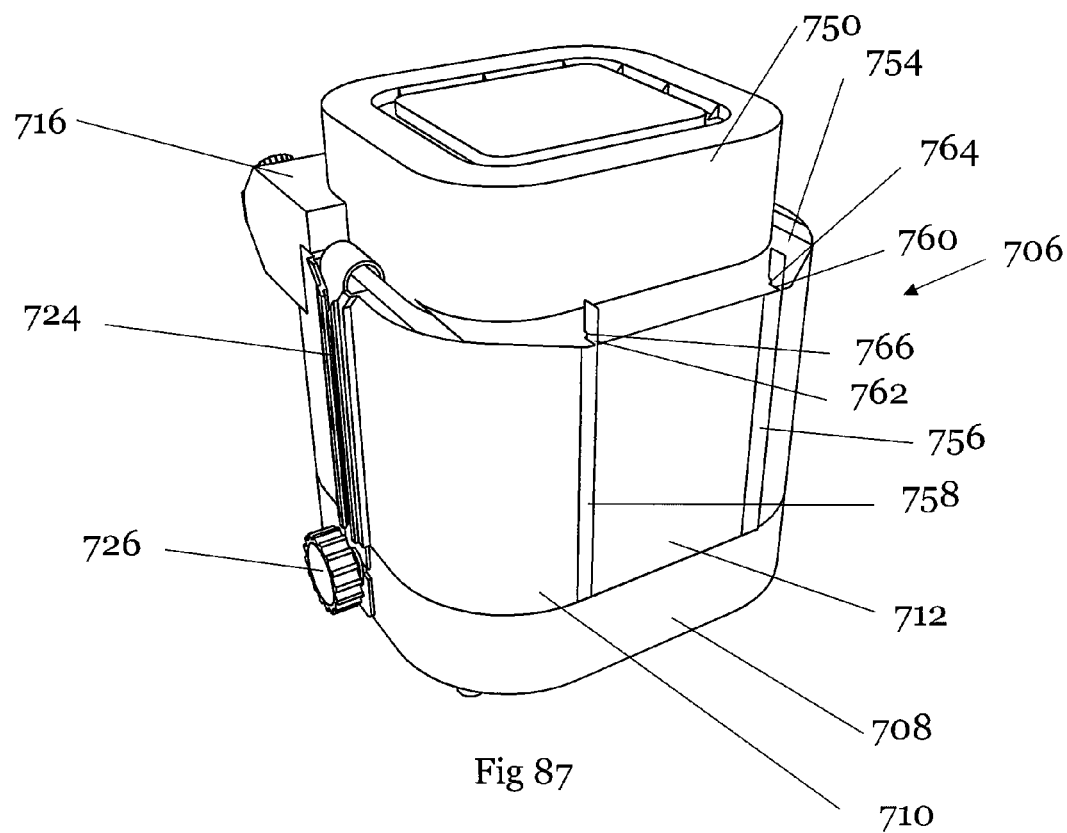
FIG. 87 is a rear perspective view of embodiment 706 with lid 750 closed and food support platform 704 in its lowermost cooking position.

Using right annular trough 742, right handle knob 726 snaps into limited rotational engagement within right knob mounting slot 730 which is located at the base of right outer arm 736 (FIG. 86). Likewise, left handle knob 728 is engaged within left knob mounting slot 732 (see FIGS. 80, 85 and 86).

Referring to FIG. 86, located on right handle knob 726, and directly adjacent and outward of right annular trough 742, are right latch spring 740 and right latching paw 738. Right latching spring 740 rotationally biases 788 right latching paw 738 into engagement with upper right latch receptacle 744, and alternatively, with right lower latch receptacle 746 (FIGS. 85 and 86) when right handle member 700 is mounted within right handle track 724.

The above handle mechanism is mirror imaged on the left side of embodiment 706 (FIG. 85).

Right handle member 700 and left handle member 702 may be detached from food support platform 704 for storage, cleaning, or other purposes. Handle members 700 and 702 may attach to food support platform 704 using: screws and wing nuts; two flat formed tunnels in food support platform 704 engaging by friction, snap fit or latches the ends of handle members 700 and 702; or other means.

Descriptions herein related to right handle member 700 and components coupled to it also apply in mirror image to left handle member 702 and components coupled to it.

Figure 76:
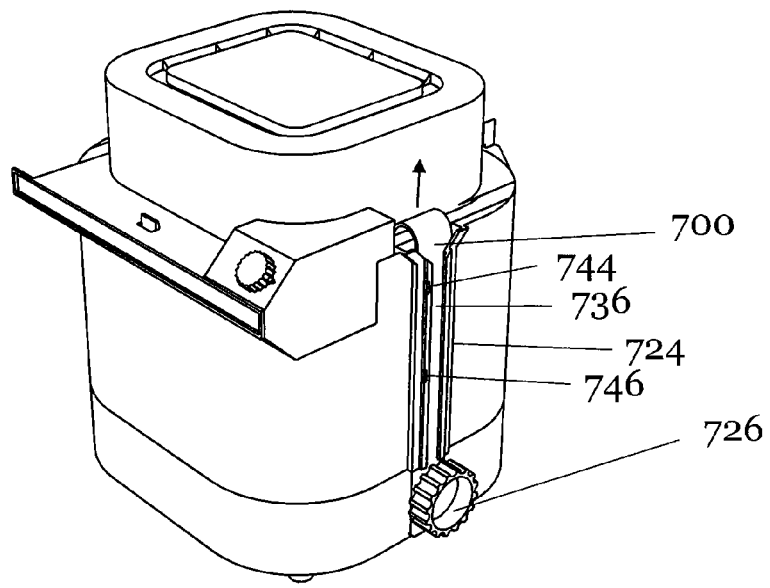
FIG. 76 is identical to FIG. 75 except food support platform 704 is in its lower most position for cooking.

Food support platform 704 may be lowered into cooking vessels 714 and secured at one of at least three positions. The upper two of these three positions are controlled by engagement between right latching paw 738, and right upper latch receptacle 744 and right lower latch receptacle 746. The third of these three positions is the lowest position and is secured by food support platform 704 bottoming out above heat coil 740. As shown in FIG. 76, this lowermost position is the cooking position where foods are fully immersed into cooking liquids.

Figure 74:
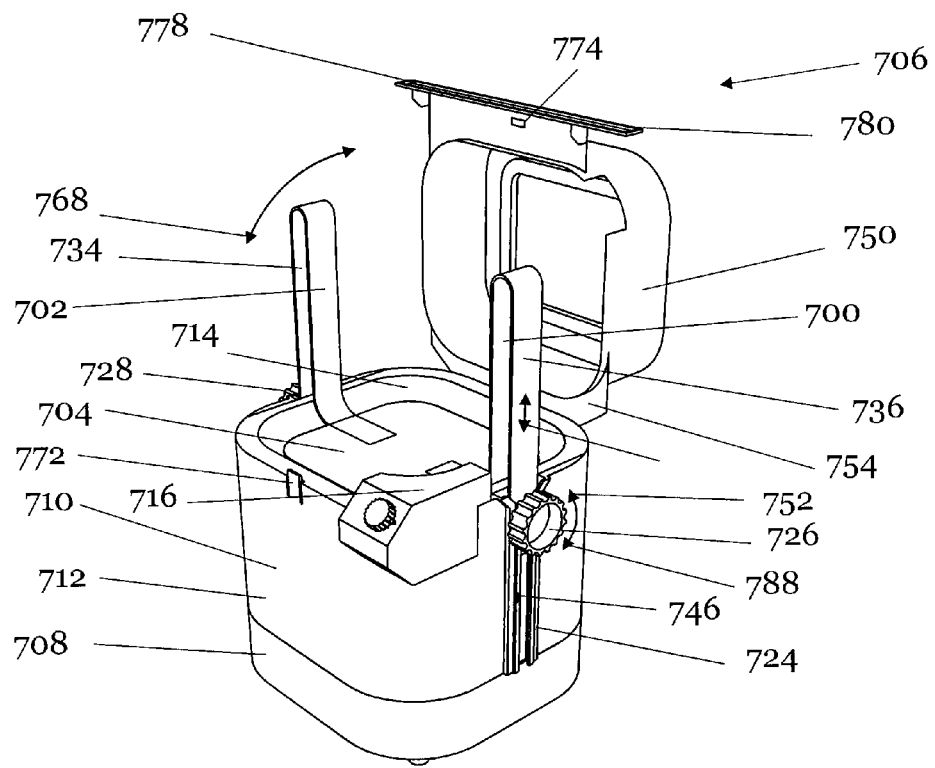
FIG. 74 is a forward perspective view of exemplary embodiment 706 with its food support platform in its uppermost position for food loading.

As shown in FIG. 74, the uppermost of the three food support platform 704 positions may be used for loading and unloading food. By mounting food support platform 704 high within cooking vessel 714 in this uppermost position, food loading and unloading is simplified and made more convenient by most of the food being exposed above or near the upper rim of cooking vessel 714 where the food can be easily gripped and manipulated.

Figure 75:
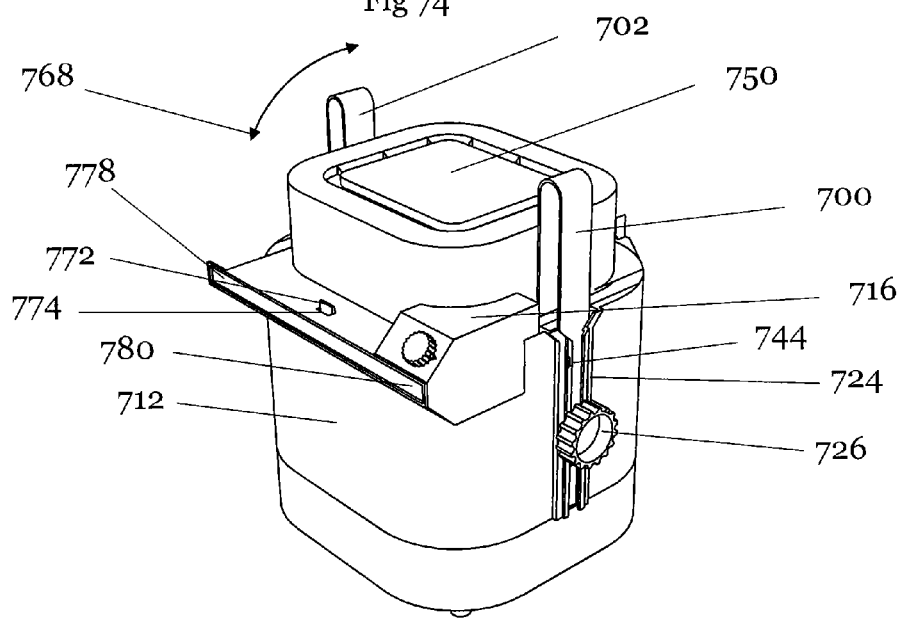
FIG. 75 is identical to FIG. 74 except lid 750 is closed and food support platform 704 is in its middle position.

As shown in FIG. 75, the middle of these three food support platform 704 positions allows foods to be suspended above cooking liquid contained in cooking vessel 714, and simultaneously allows lid 750 to be lowered and latched closed enclosing even the tallest foods able to be cooked within embodiment 706.

Food support platform 704 may be first lowered into cooking vessel 714 by gripping right handle knob 726 and left handle knob 728 (FIG. 89) and lowering them so that left outer arm 734 engages within left handled track 722 and right outer arm 736 engages within right handled track 724. Knobs 726 and 728 are then further lowered until right latching paw 738, biased by right latch spring 740, engages right upper latch receptacle 744. Simultaneously, this latching engagement occurs mirror imaged on the handle mechanism on the left-hand of embodiment 706.

Lowering food support platform 704 from its uppermost to its middle position requires turning right handle knob 726 counterclockwise 752 (FIG. 85), and likewise, in mirror image, turning left handle knob 728. This disengages right latching paw 738 from right upper latch receptacles 744, and likewise with left handle knob 728, and allows food support platform 704 to be lowered to its middle position.

This operation is repeated to lower food support platform 704 from its middle position to its lowermost position.

Raising food support platform 704 from its lowermost position to its middle position requires only gripping and lifting left handle knob 728 and right handle knob 726 until food support platform 704 is in its middle position. At this location, the right and left latching paws, biased by their respective latching springs, engage their respective lower latch receptacles.

Similarly, raising food support platform 704 from its middle position to its uppermost position, simply repeats the above process.

In all operations involving spring 740 pressure turning of handle knobs 728 and 726, biasing these knobs may be augmented through hand torsional pressure.

Dismounting food support platform 704 from within cooking vessel 714 merely requires upward lift on left handle knob 728 and right handle knob 726.

FIGS. 80 through 84 show how lid 750 attaches to cooking vessel 714 when cooking vessel 714 is assembled with outer enclosure 712.

Figure 81:
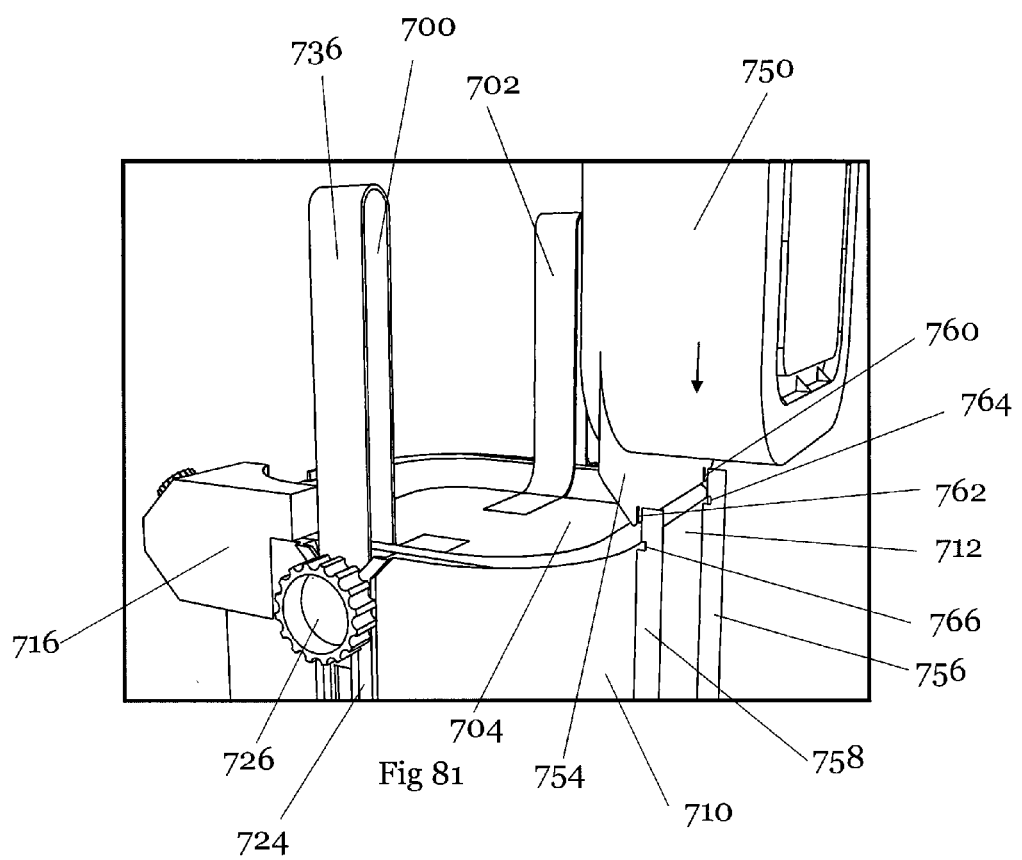
FIG. 81 is a rear perspective view of a portion of embodiment 706 with lid 750 detached from outer enclosure 712.

Lid rear flange 754 includes at its back left engagement slot 760 and right engagement slot 762. When lid 750 is lowered 770 onto outer enclosure 712, as shown in FIGS. 81 and 82, left engagement slot 760 straddles left engagement notch 764; and right engagement slot 762 straddles right engagement notch 766.

Figure 82:
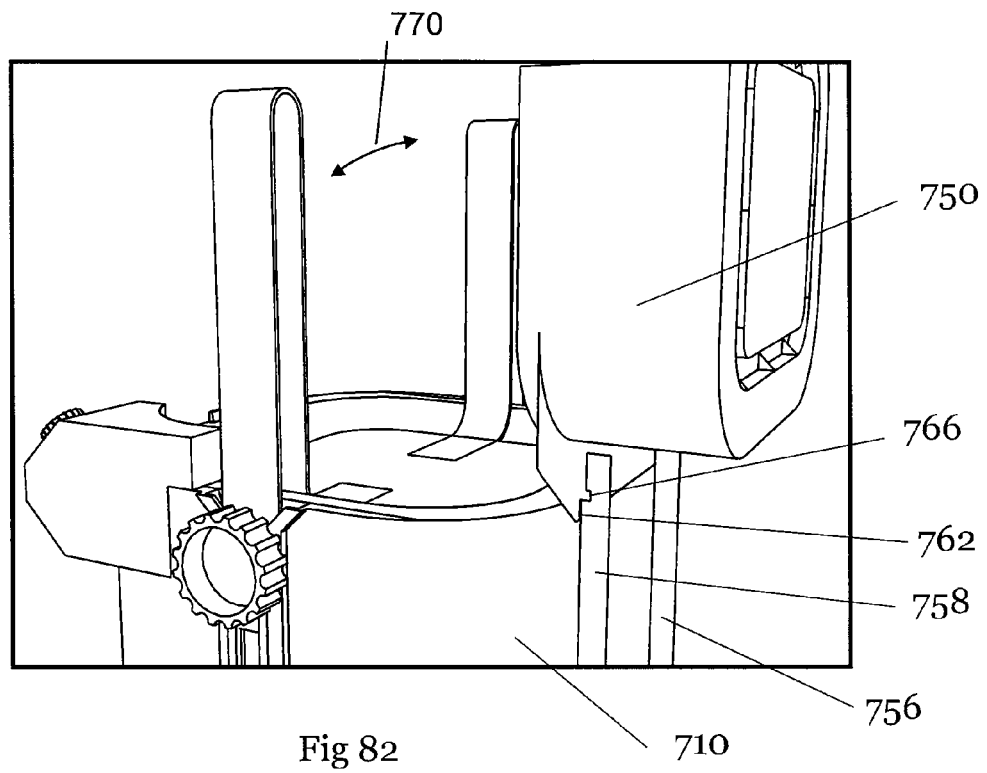
FIG. 82 is identical to FIG. 81 except lid 750 is shown in its open position and attached to outer enclosure 712.

Once lowered, lid 750 may rest in a stable open vertical position as shown in FIG. 82 supported by the upper portion of enclosure rear left flange 756 and the upper portion of enclosure rear right flange 758 (FIG. 82).

Figure 83:
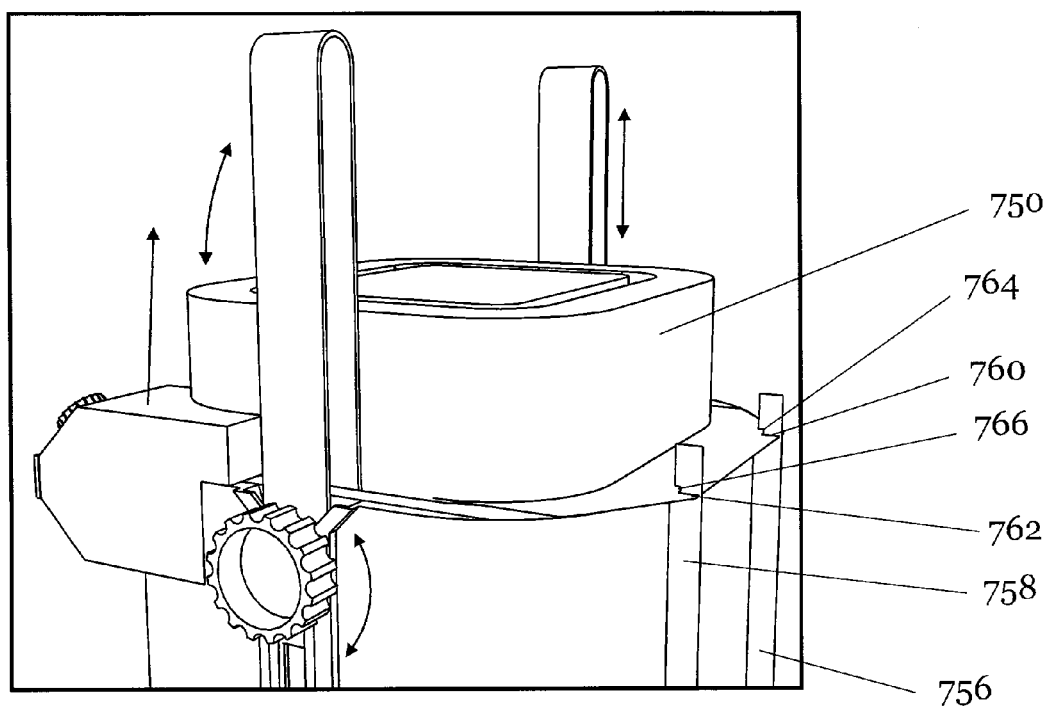
FIG. 83 is identical to FIG. 82 except lid 750 is shown in its closed position.
Figure 84:
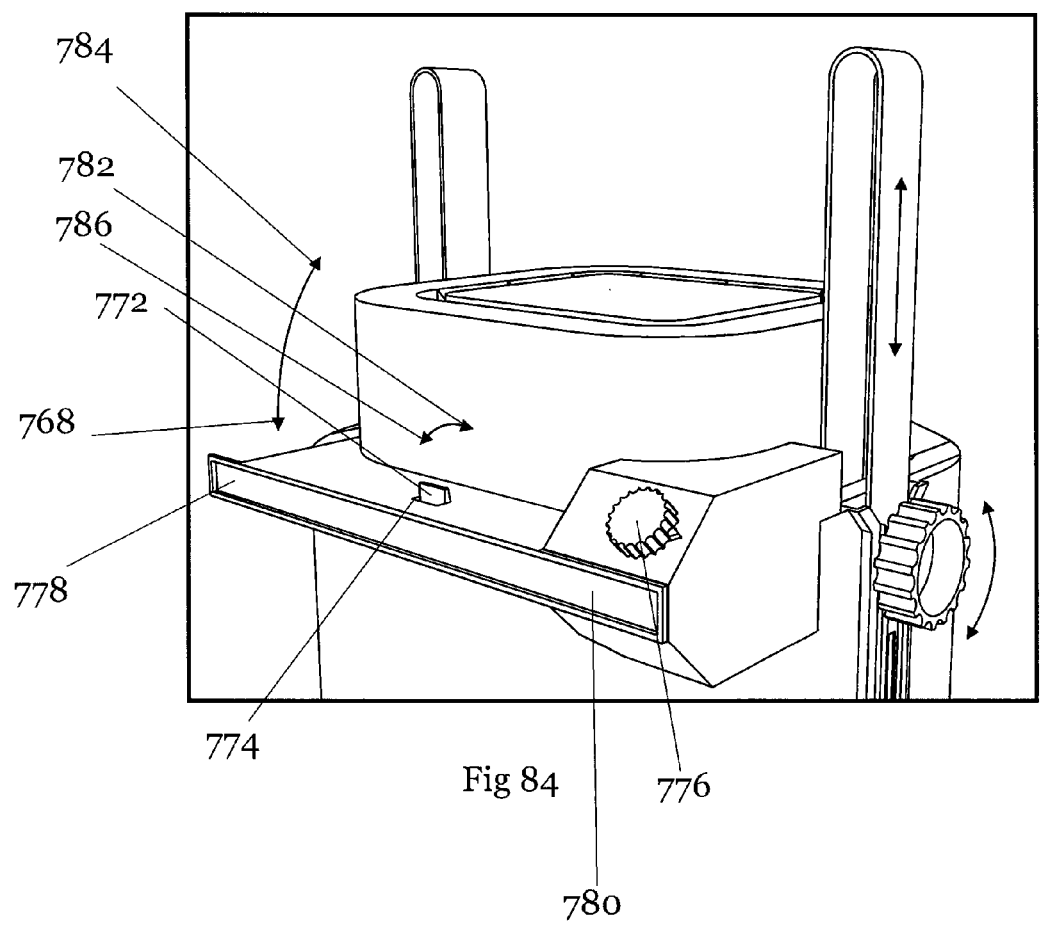
FIG. 84 is a forward perspective view of a portion of embodiment 706 with lid 750 in its closed position.

From this open position lid 750 may be rotated forward 768 to its closed position as shown in FIG. 84. Interference between left engagement slot 760 and left engagement notch 764, as well as interference between right engagement slot 762 and right engagement notch 766, hold down the rear of lid 750 when lid 750 is in its closed position (FIG. 83).

In its closed position the forward portion of the lid 750 is held in place by the engagement between lid latching member 772 and lid latch orifice 774 (FIG. 84). Lid latching member 772 comprises a flat probe with a barb undercut on its rear face. This undercut is biased rearward 782 and latches over the rear portion of lid latching orifice 774 when lid 750 is in its closed position.

To help in opening lid 750, a spring may bias 784 the lid to lift away from its fully closed position when lid latching member 772 is moved forward 786 and releases from engagement from the rear portion of lid latching orifice 774. This spring may be located on the forward portion of the upper horizontal rim of outer enclosure 712, or it may be located on the portion of lid 750 directly adjacent to this location. This may be a separate spring, such as a metal leaf spring, or it may be integrally molded into either outer enclosure 712 or into lid 750.

Such a spring biasing lid 750 makes it easier to open lid 750 by springing it into full disengagement with lid latching member 772 when lid latching number 772 is pulled away from its engagement with lid latch orifice 774.

The above lid coupling arrangement makes it easy to remove lid 750 for cleaning or other purposes. It also allows lid 750 to rest in a fully open upright position for food loading or other purposes. Further, it allows lid 750 to be removed and inverted into cooking vessel 714 for compact storage. Finally, it allows lid 750 to be solidly latched closed while food is being lowered into, or being removed from, cooking liquid, and also while food is being cooked. This is a major safety factor.

Referring to FIG. 84, left lid handle 778 and right lid handle 780 are disposed on lid 750 at its forward left-hand and right-hand corners respectively. This reduces the chance a user will be burned by escaping steam when the user opens embodiment 706 during cooking.

Lid 750 may have exhaust vents, filters, as well as other features, similar to those described earlier in this document for lids used on other exemplary embodiments.

Figure 88:
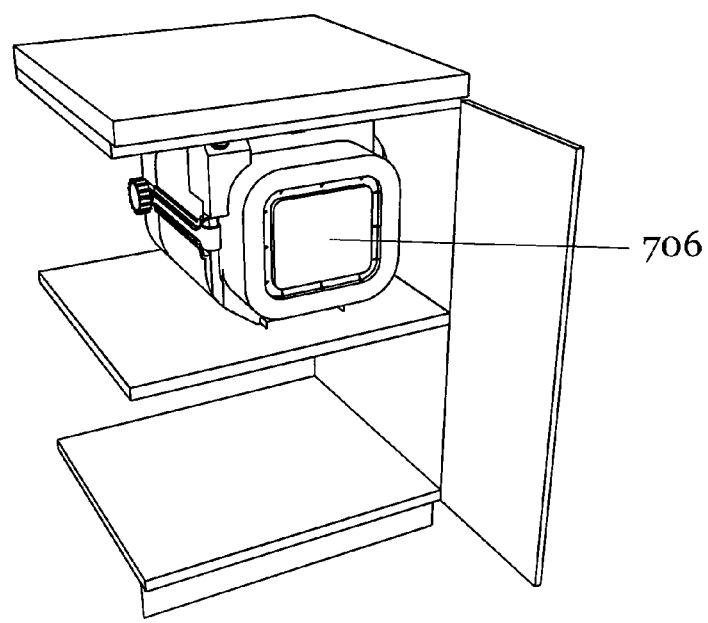
FIG. 88 is a forward perspective view showing embodiment 706 being stored in a below countertop cabinet.
Figure 89:
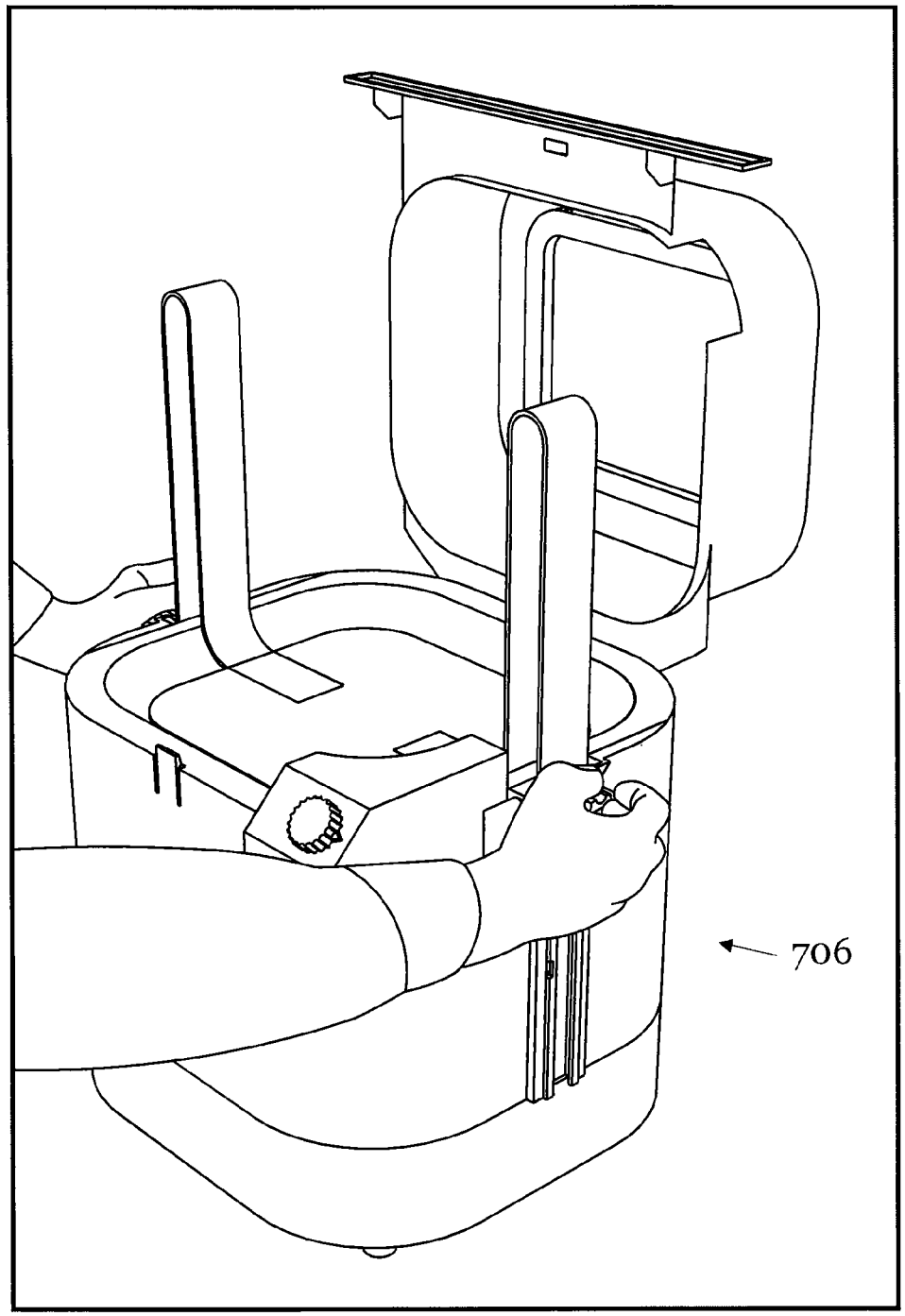
FIG. 89 is a forward perspective view of embodiment 706 in use, with a user gripping right handle knob 726 and left handle knob 728, and with food support platform 704 fully raised for food loading, and with lid 750 in its open position.

Outer enclosure 712 includes enclosure rear left flange 756 and enclosure rear right flange 758 which extend rearward from the back face of enclosure 712 and provide support for storing embodiment 706 on its back as shown in FIG. 88. This may be particularly convenient in many storage situations where storage height is limited, such as the below countertop storage illustrated in FIG. 88.

During storage, whether embodiment 706 is stored on its back, its side, or upright, lid 750 may be inverted and placed into the top of cooking vessels 714 as described for other exemplary embodiments within this document.

Figure 77:
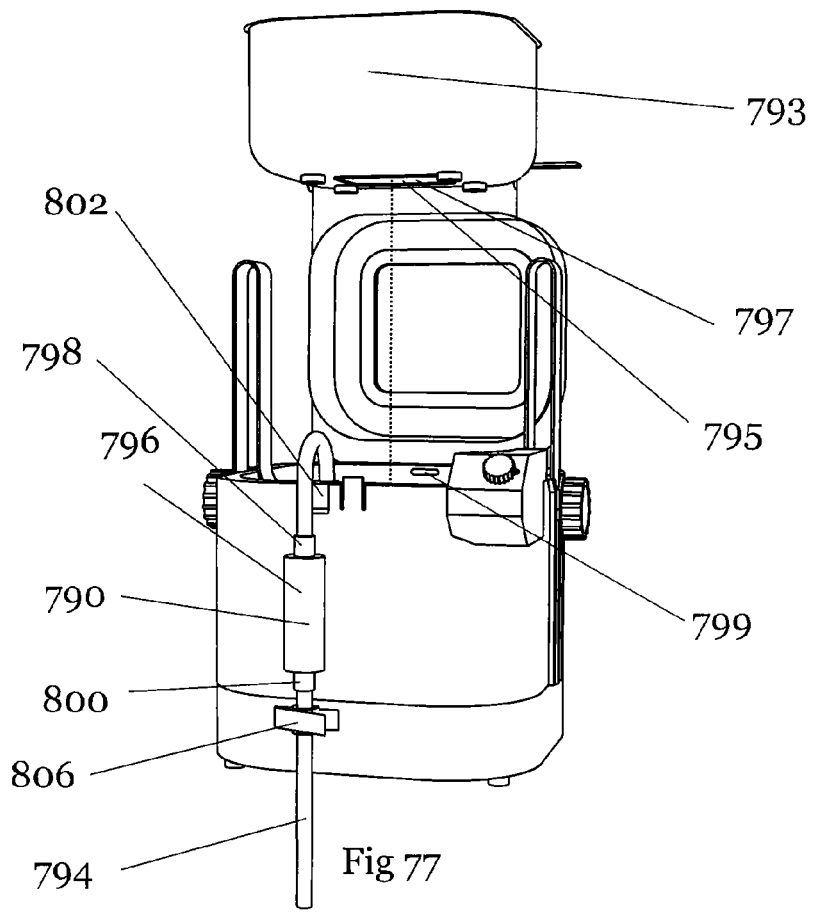
FIG. 77 is a forward perspective of the embodiment 706 showing siphon 790 used for cooking liquid drainage and showing fry pot 793 which is used for cooking smaller food articles. Fry pot 793 is shown removed and above embodiment 706.

FIG. 77 illustrates fry pot 793 which is used to cook smaller food articles such as, by way of example only: French fried potatoes, fish sticks, shrimp, onions, and other small food articles.

In embodiment 706, fry pot 793 is placed on top of food support platform 704.

Food is placed within fry pot 793, and then hot cooking liquid is introduced into fry pot 793 through fry pot entry 797 located in the bottom of pot 793. In embodiment 706 this is done by lowering food support platform 704, with fry pot 793 on top of it, into hot cooking liquid contained within cooking vessel 714, and allowing the hot cooking liquid to fill fry pot 793 through fry pot entry 797.

Filter 795 covers fry pot entry 797 and filters liquid entering or leaving fry pot 793. By filtering cooking liquid entering fry pot 793, impurities which might affect food taste are filtered out. By filtering cooking liquid leaving fry pot 793, cooking liquid useful life may be increased as explained herein.

In embodiment 706, oil is emptied from fry pot 793 by elevating food support platform 704, and fry pot 793 on top of it, above cooking liquid contained within cooking vessel 714.

Filter 795 may be reusable and/or disposable. By way of example only, it may be a fine mesh stainless steel screen. Filter 795 may be removable from fry pot 793 for cleaning or other purposes.

Filter 795 may be placed in the bottom and/or any of the sides of fry pot 793.

Fry pot 793 is functionally different than perforated metal buckets which are commonly used in deep fat frying at least because such buckets have 20% or more of their surface area penetrated by open holes which freely allow cooking liquid to flow and circulate in and out of the buckets without substantial restriction.

Likewise, fry pot 793 is functionally different from baskets which are also commonly used in deep frying at least because such baskets also allow cooking liquid to freely circulate in and out of their interiors without substantial restriction.

Fry pot 793 may also be easier to clean than commonly used frying baskets.

An alternative to filter 795 is use of restrictive filler-drain holes. Such holes would limit cooking liquid entry and exit by occupying less than 10% of the surface area of fry pot 793. Such restrictive filler-drain holes would be placed in the bottom and/or sides of fry pot 793. Such restrictive filter-drain holes may reduce the uneven cooking effects of convection currents rising from heat elements.

Fry pot 793 may be adapted for use on any of the exemplary embodiments described herein.

FIG. 77 illustrates the presence of drain hole 799. Excessive foaming is an unpredictable problem in deep fat frying. It may be caused by: overusing cooking oil, or by mixing cooking oils, or by the type of cooking oil used, or by other reasons. When cooking oil excessively foams, the surface of the foam may overflow the oil containment vessel and cause oil to flow onto the top of the surface supporting the fryer.

Drain hole 799 helps prevent this by allowing oil foam to drain out of cooking vessel 714 before the foam overflows the upper rim of cooking vessel 714. Oil foam which exits drain hole 799 falls into lower outer enclosure 708 (which must be constructed without open holes in the overflow oil reservoir area). The oil may collect in lower outer enclosure 708 until emptied by a user. This helps prevent countertop or supporting surface damage, and helps reduce the risk of a user burning themselves by trying to stop extremely hot oil from flowing onto, and potentially damaging, their countertops.

To make user cleanup of this overflow oil easier, an oil collection bucket may be placed into lower outer enclosure 708. Such a collection bucket could slide in and out of lower outer enclosure 708 like a drawer, or simply be lifted from lower outer enclosure when cooking vessels 714 is removed from outer enclosure 712.

Drain hole 799 may be adapted for use on any of the exemplary embodiments described herein, and may be particularly useful in exemplary embodiments which automatically lower food into cooking liquid without the necessity of user presence. In such automated exemplary embodiments, unwitnessed overflowing oil could cause substantial damage before anyone became aware of it.

FIG. 77 also illustrates how cooking vessel 714 may be drained using a siphon. In FIG. 77, siphon 790, including: inlet hose 792, outlet hose 794, pinch valve 806, hand pump 796 (which includes inlet one-way valve 798, siphon bulb 804, and outlet one-way valve 800); is shown mounted onto the forward upper lip of outer enclosure 712 through the use of siphon mounting clip 802.

To drain cooking liquid from cooking vessel 714, using siphon mounting clip 802, a user clips inlet hose 792 of siphon 790 to the forward rim of outer enclosure 712 (FIG. 77), and places the end of the outlet hose 794 into a containment and/or storage and/or disposal vessel. The user initiates the siphon process by repeatedly squeezing siphon bulb 804 until siphon action commences.

Should it be necessary to interrupt the siphon process to change containers or for other purposes, the user may squeeze pinch valve 806 closed.

Figure 78:
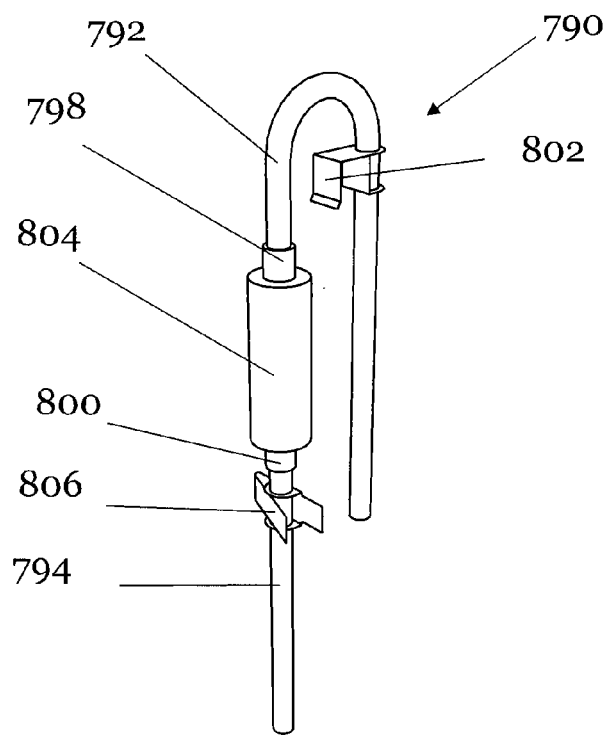
FIG. 78 is a forward perspective view of first exemplary siphon 790.

FIG. 78 shows siphon 790 when not mounted to cooking vessels 714.

Figure 79:
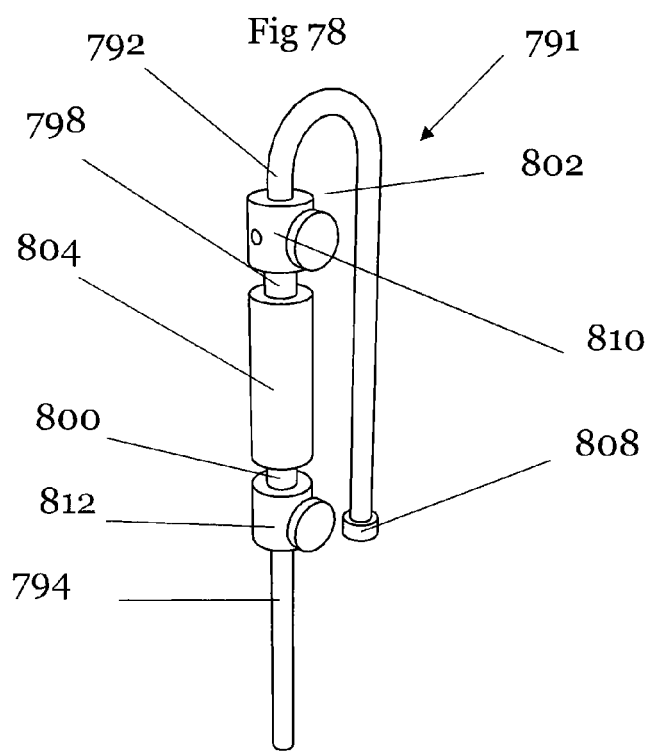
FIG. 79 is a forward prospective view of alternative siphon embodiment 791.
Figure 80:
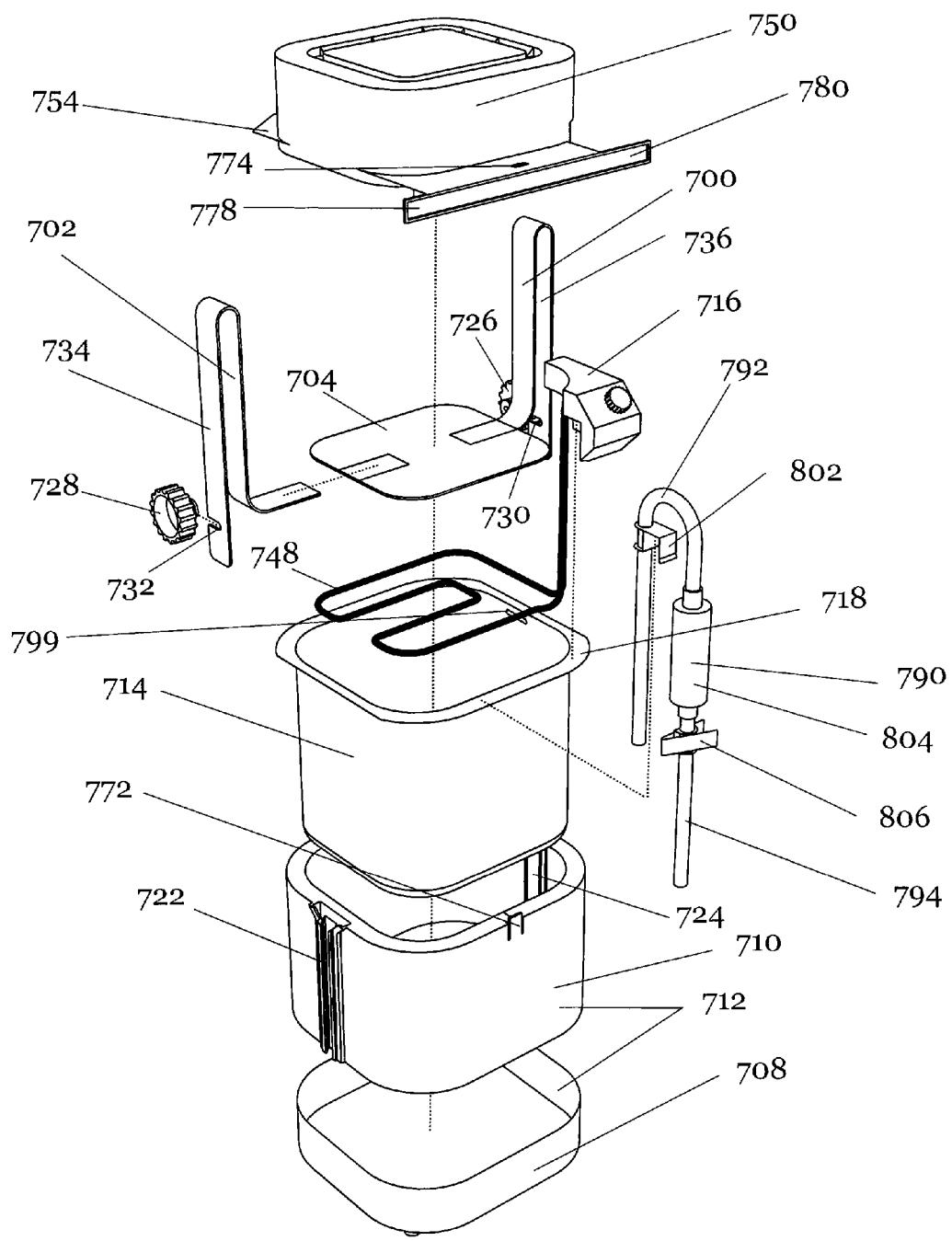
FIG. 80 is an exploded forward prospective view of embodiment 706.

FIG. 79 shows alternative siphon 791. This is identical to siphon 790 except: pinch valve 806 has been replaced by stopcock 812; weighted inlet 808 is used to hold inlet hose 792 at or near the bottom of cooking vessel 714 instead of using siphon mounting clip 802; and air bleed valve 810 is shown which may be used to break the siphon drainage at any desired point rather than using a flow restricting valve such as pinch valve 806 or stopcock 812.

Air bleed valve 810 stops the flow of liquid through siphon 790 by introducing outside air into inlet hose 792 and thus breaking the siphon action.

To break the siphon action, any one of, or all of, or combination of: pinch valve 806, stopcock 812, or air bleed valve 810, may be present and used. Alternatively, a hose soft enough to be bent or finger pinched may be used to stop the siphon action.

Likewise, positioning the intake end of inlet hose 792 near or at the bottom of cooking vessel 714 may use any one of, any combination of, or all of: siphon mounting clip 802 and/or weighted Inlet 808, and/or other means, such as, by way of example only, a hose gripping notch cut into food support platform 704.

Weighted inlet 808 positions the end of the inlet hose 792 near or at the bottom of cooking vessel 714 by placing weight near or at the end of inlet hose 792. Weighted inlet 808 may also have a particulate filter within or coupled to it to strain particulates within the cooking liquid being drained so as to lengthen the useful life of the cooking liquid. By way of an example, weighted inlet 808 may have a fine mesh screen within it. This filter may be removable for cleaning or other purposes.

Drained cooking liquid may be disposed or reused. It is possible cooking liquid may be reused several times, depending on, among other things: cooking conditions, food being cooked, and type of cooking oil or liquid being used. Between uses it may be desirable to drain the cooking liquid from cooking vessel 714 and store it in protective containers.

Siphon 790 and/or alternative siphon 791 may also be used to fill cooking vessel 714 with cooking liquid by placing inlet hose 792 into the container of the cooking liquid, and placing the end of outlet hose 794 into cooking vessel 714, and then starting the siphon action.

Numerous features, devices, methods, constructions, and designs have been taught herein. Many, if not most, may be interchanged between exemplary embodiments. As examples: handles which are on the side walls of an outer enclosure and are used to transport an embodiment which uses motor powered swing arms to raise and lower a food support platform, may also be used on an embodiment which uses handles to manually raise and lower a food support platform; a bail type handle used to lift a food support platform free from an exemplary embodiment cooking vessel which moves its food support platform up and down by pumping cooking liquid using a bidirectional pump may also be used on exemplary embodiments which use powered swing arms or hand operated handles to raise and lower their food support platforms; heat coils that are immersed into cooking liquid may be interchanged for heat coils that mount external to a cooking vessel; or a lid which has an angled glass viewing window might be replaced with a lid which is molded from transparent or translucent material; or a wiper mechanism used to clear the inside of a glass panel from condensation might equally well be use on a molded transparent or translucent lid; or a lift mechanism which uses powered swing arms might replace a manual lift mechanism; or a thermostatic tubular probe which mounts inside a cooking vessel where its end is immersed in cooking liquid might replace an externally mounted thermal sensor; or a circuit which determines cooking time through use of a timer might be replaced or used in conjunction with a circuit which gauges cooking time by the temperature of the food being cooked; etc. One knowledgeable in the art would easily understand this interchangeability and therefore would readily recognize the value of each feature, device, method, construction, and design when placed in combination with any or all of the other similar items suggested.

Likewise, one knowledgeable in the art would recognize that devices taught herein might be used for various kinds of cooking. As examples: they might be used for deep fat frying; steaming of fish, fowl, meats, and vegetables; flavored steaming of various kinds of food including imparting smoked, spiced, sweet or other kind of flavors to foods; baking, such as is common with tub roasters of the type made by Nesco; making of stews and soups; boiling of fish, fowl, meats, and vegetables; etc.

Again, one knowledgeable in the art would readily see these alternative applications.

Referring to FIGS. 90 through 99, this additional preferred embodiment includes: lid 900 which contains and mounts wire mesh filter 919 which filters debris from the exhaust of the cooking process. When closed, lid 900 rests upon upper flange 920 of cooking vessel 902 forming a cooking cavity 903. Upper flange 920 in turn engages upper rim 922 of outer enclosure 918. When cooking, cooking vessel 902 rests within outer enclosure 918.

Electric heater unit 924 is contained entirely within enclosed heatsink 914 where it is free from contact with cooking liquid contained within cooking vessel 902.

Alternatively, electric heater unit 924 may be a bare exposed rod type heat coil in direct contact with cooking liquid contained within cooking vessel 902.

Wires run within tubes 926R and 926L which are contiguous with tubes which are part of electric heater unit 924 or which are contiguous with outer rods of the rod type heat coil.

Bracket 928 is coupled to tubes 926R, 926L, and 926C and provides structural stability. Oil level indication holes 992 (FIG. 116) penetrate bracket 928 and provide a clear, difficult to obscure, indication of the height of cooking fluid levels within cooking vessel 902. This in turn provides unambiguous, easy to read indications of the volume of cooking fluid within cooking vessel 902.

Figure 116:
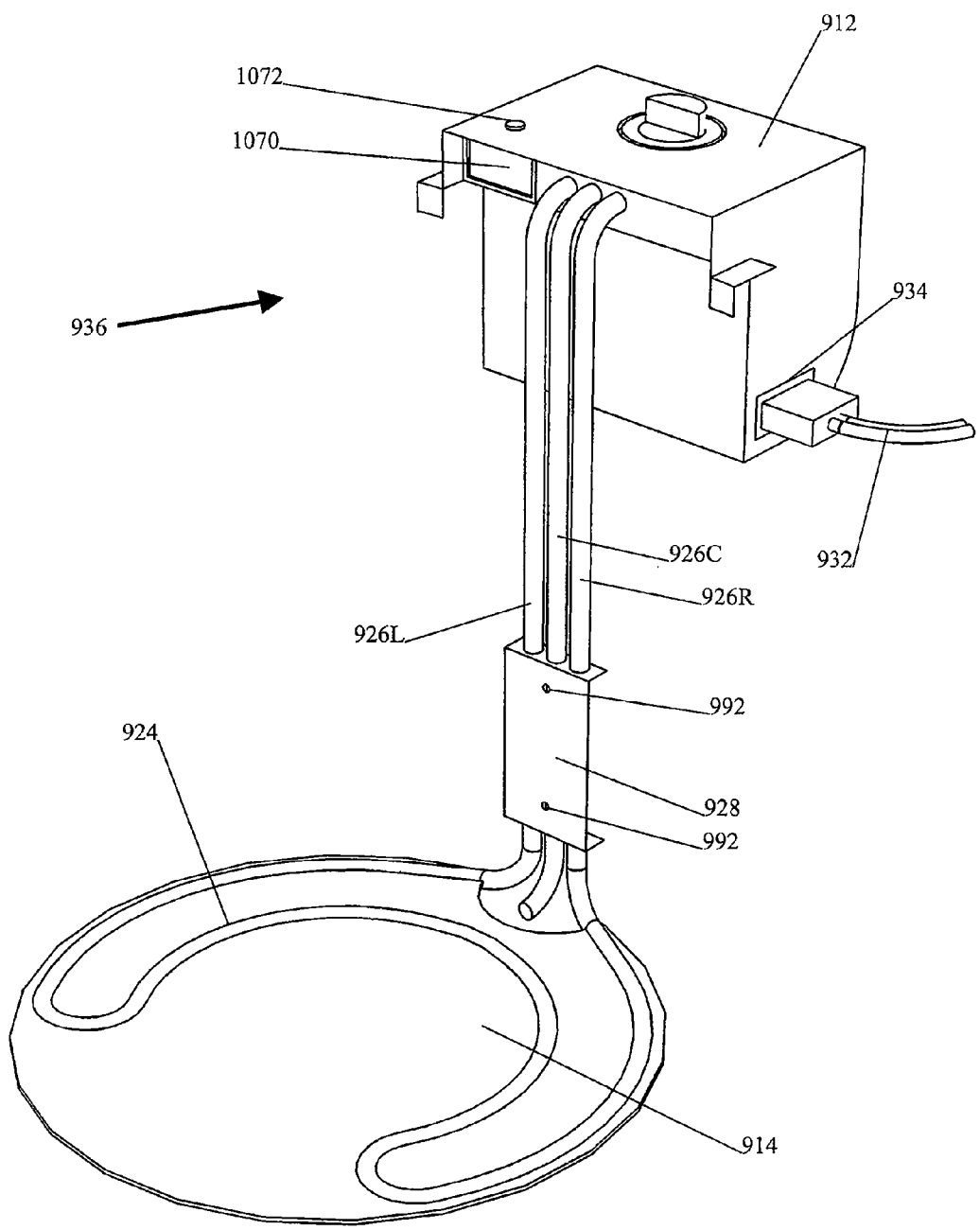

At their tops, tubes 926R, 926L, and 926C bend and couple to control box 912 (see FIG. 116). This coupling may be through a fixed rigid mounting, or it may be through a plug which can be detached to separate tubes 926R, 926L, and 926C as a unit from control box 912, for storage, shipping, cleaning, or for other purposes.

Wires within tubes 926R, 926L, and 926C connect control box 912 to respectively: the heat coil input, the thermostat and thermal fuse, and heat coil output. By connecting the thermostat and thermal fuse in series with either the heat coil input or the heat coil output, the number of connections required between the control box and the wires within tubes 926R, 926L, and 926C can be reduced to two. This means that if tubes 926R, 926L, and 926C are coupled to control box 912 through a plug, then only a two prong plug is required. Such a simplified plug, when compared with alternatives having plugs with three or more prongs, should be less expensive to produce and be more reliable.

Control box 912 and attached electric heater unit 924 may be detached from cooking vessel 902 and outer enclosure 918 simply by lifting control box 912 upward.

Power cord 932 couples to control box 912 through magnetically secured safety power socket 934, such as in use on many home deep fryers. Magnetically secured safety power socket 934 easily breaks away and disconnects power from control box 912 if tension is placed on power cord 932.

Power cord 932 may couple to a wall mounted power outlet plug, or connect to power through other means.

Rib 994 projects from the back of outer enclosure 918 (FIG. 96) and dislodges magnetically secured safety power socket 934 from power cord 932 when control box 912 and attached electric heater unit 924 are lifted and detached from cooking vessel 902 and outer enclosure 918. This provides safety by automatically disconnecting power from the control box when the control box is dismounted from the rest of the exemplary embodiment. It is also more: obvious, inexpensive, and reliable than safety switches which may provide similar type safety protection.

Handle 1074 (FIG. 98B—upper enlarged, and 102) on the back of control box 912 provides a convenient hand grip for the removal of control box 912 from cooking vessel 902.

Figure 98A:
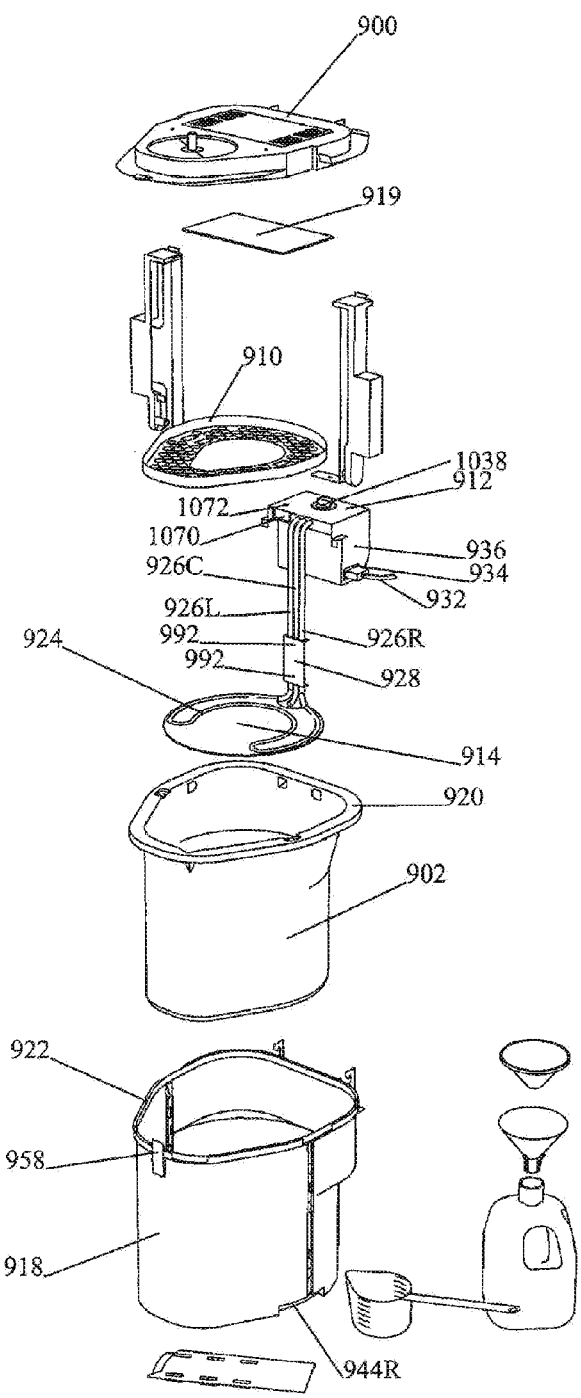
FIG. 98A is a forward exploded perspective view of the embodiment shown in FIGS. 90 through 98.

Cooking vessel light 1070 is located in the forward left vertical upper portion of control box 912 (FIG. 98A—upper enlarged). Cooking vessel light 1070 turns on when electric heater unit 924 is activated, and may illuminate the interior of cooking vessel 902 when the exemplary embodiment is cooking. This may help in determining cooking progress as well as provide a certain level of visual interest from light emanating from the exemplary embodiment. Lens 1072 on the top of control box 912 is illuminated by the bulb in cooking vessel light 1070 and may serve as an inexpensive "on" indicator light.

Figure 96:
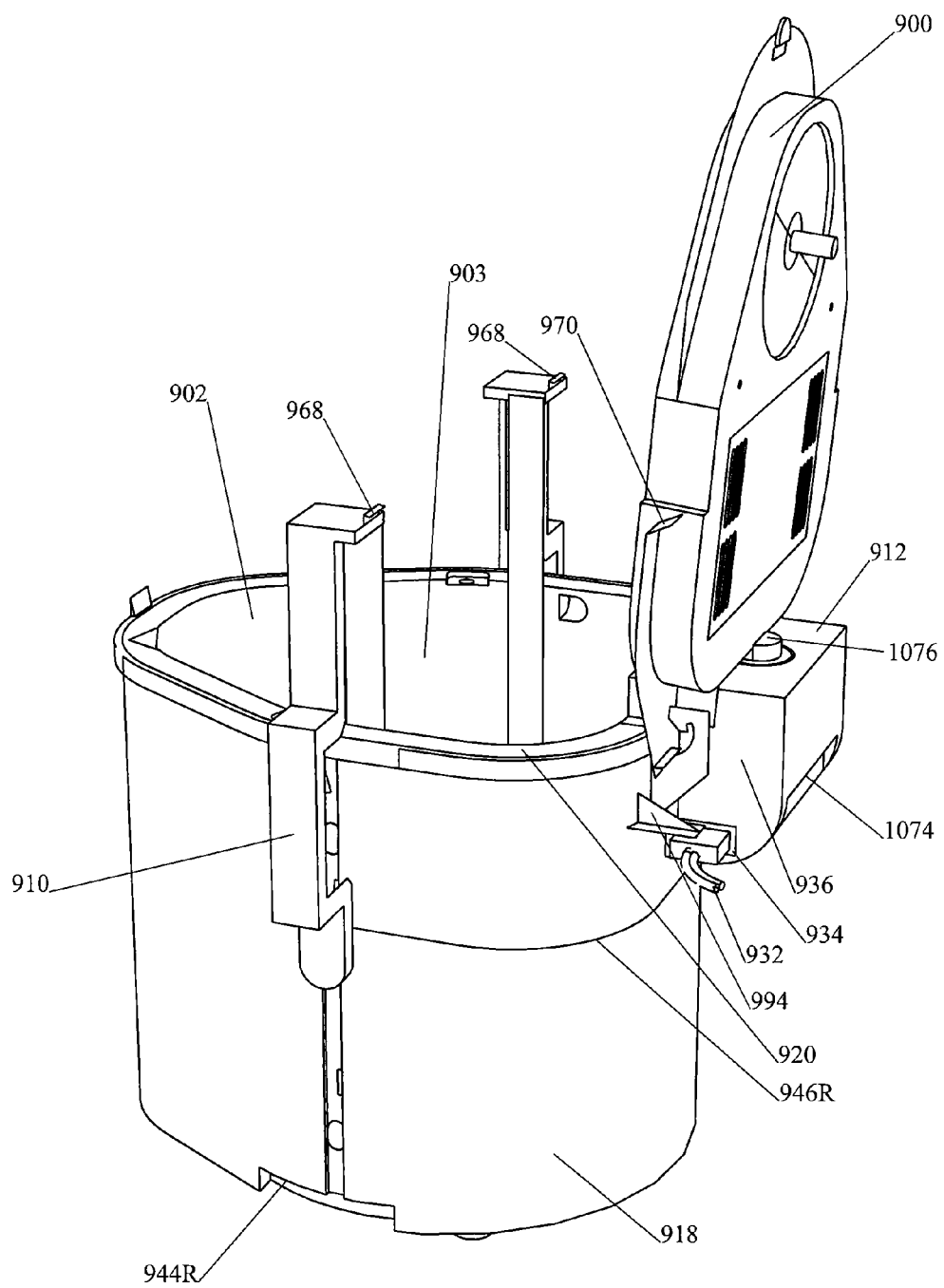
FIG. 96 is similar to FIG. 91 except the perspective view is taken from the right side.
Figure 97:
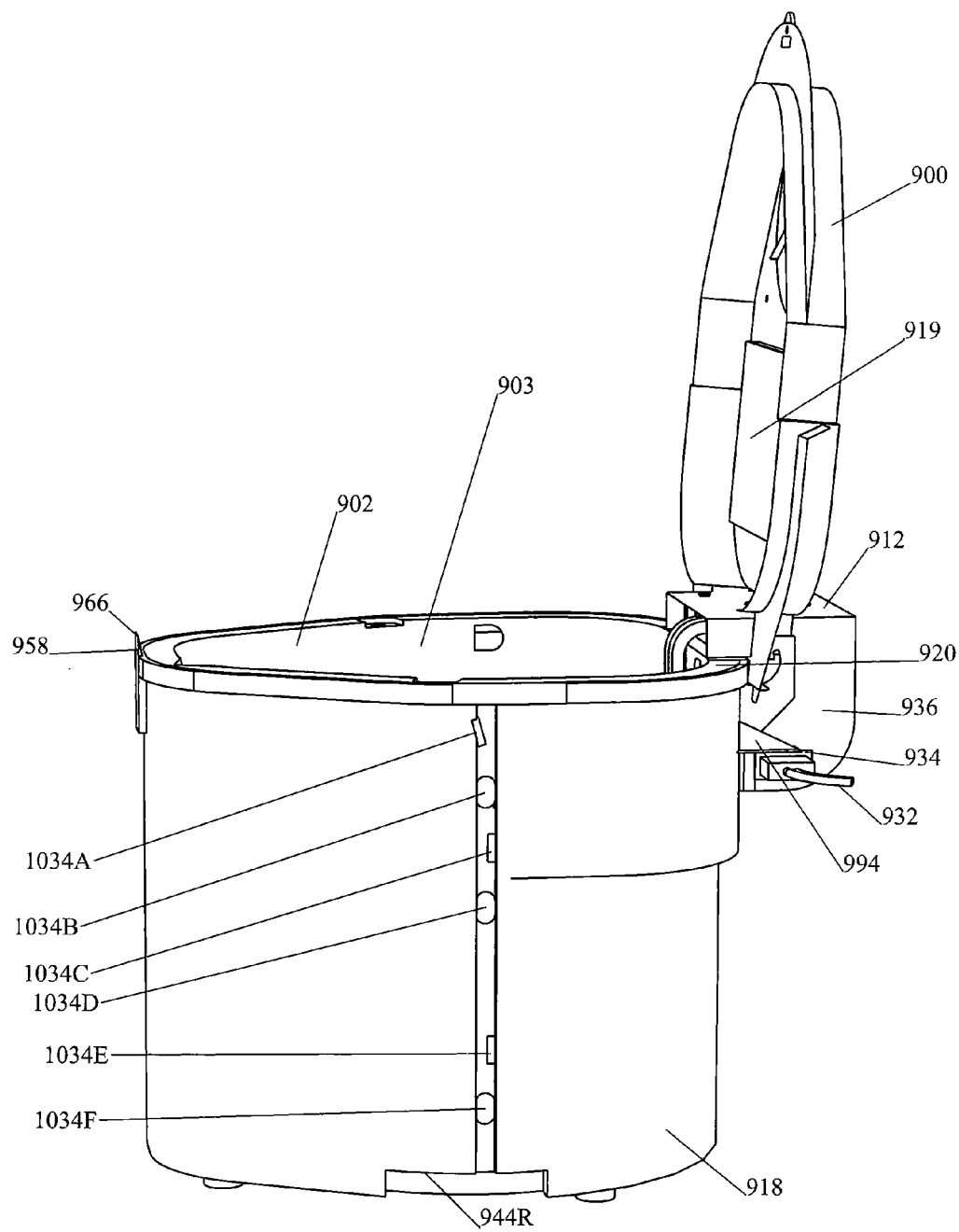
FIG. 97 is similar to FIG. 96 except food support assembly 910 is removed.

When the device is cooking, the control/heating assembly 936, which includes: control box 912, tubes 926R, 926L, and 926C, electric heater unit 924 and heatsink 914, is lowered over and mounted on to the edge of upper flange 920 by straddling it, as shown in FIGS. 96 and 97. This results in enclosed heatsink 914 being cantilevered and spaced above the floor of cooking vessel 902. A brace, extending from or part of either the floor of cooking vessel 902 or from heatsink 914 or some combination of these, may be added to give strength to cantilevered heatsink 914. As an example of such a brace, and not by way of any limitation, raised lower floor portion 915 of cooking vessel 902 (FIG. 117) may contact heatsink 914, may be added to provide strength. As stated herein, heatsink 914 may not be present in all embodiments built according to the teachings herein. Each of the above structures may be adapted to function with bare rod type heat coils. Such adaptation is easily done by one knowledgeable in the art and thus is not covered in detail herein.

Alternatively, raised lower floor portion 915 (see FIG. 117) may contact the bottom of food support platform 940 to provide structure, and to provide spacing away from heatsink 914, or an alternative rod type heat element. Raised lower floor portion 915 may be constructed to resemble a two tiered wedding cake and provides structural support and spacing to both the heating element and the food support member.

Raised lower floor portion 915 may reduce the amount of cooking liquid needed by substituting its volume for expensive cooking liquids.

Heatsink 914 contacts electric heater unit 924 to increase heat dispersion and transfer area and thus lower transfer temperatures between electric heater unit 924 and liquid contained within cooking vessel 902. High temperatures may cause cooking oil to have shortened life, and high temperatures have been alleged to generate unhealthy substances, such as cancer-causing agents, within cooking oils.

Heatsink 914 may be fabricated from any suitable heat transmitting material including, but not limited to, metals such as: aluminum, copper, and steel.

Figure 92:
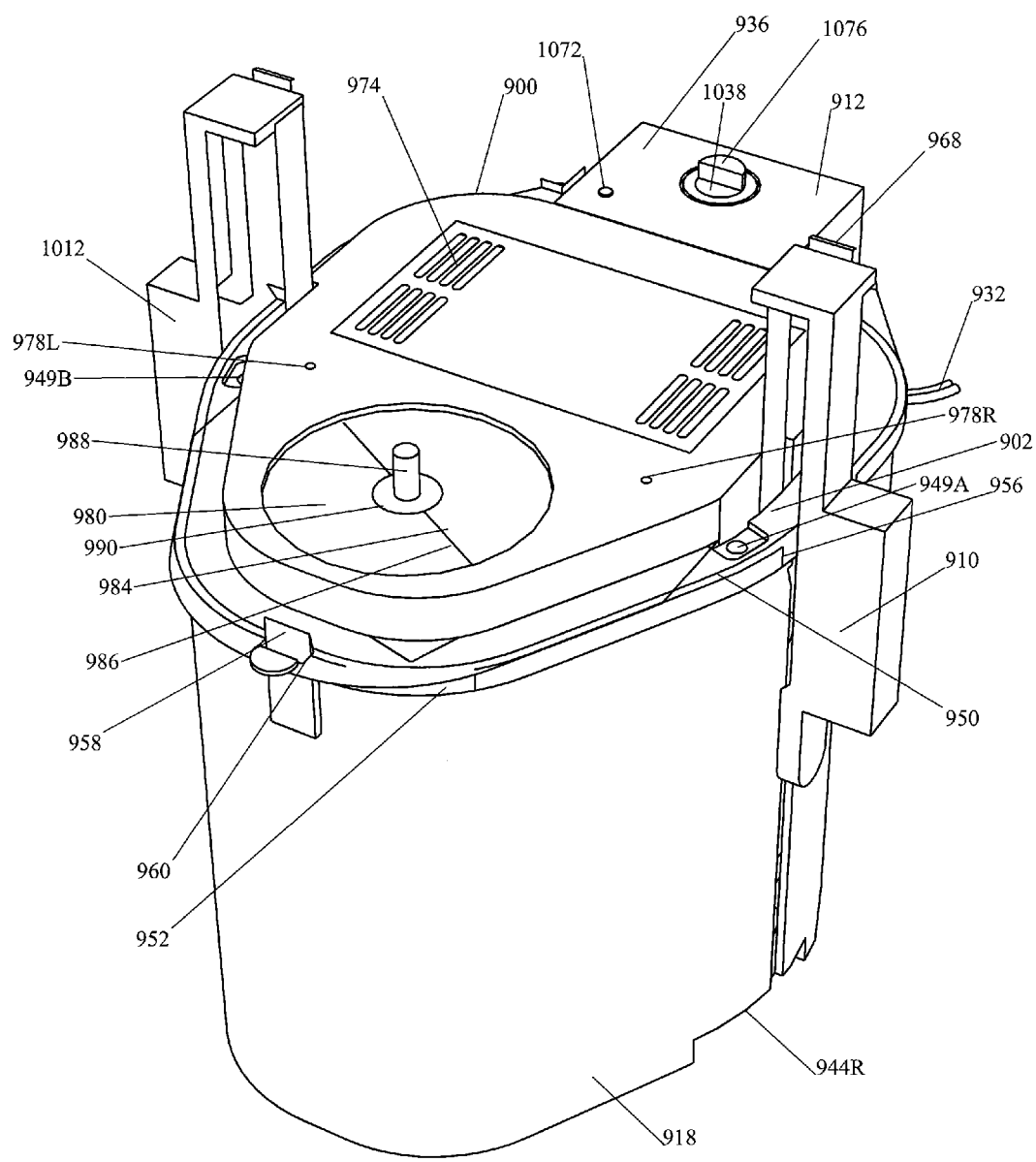
FIG. 92 is similar to FIG. 91 except lid 900 is lowered.
Figure 93:
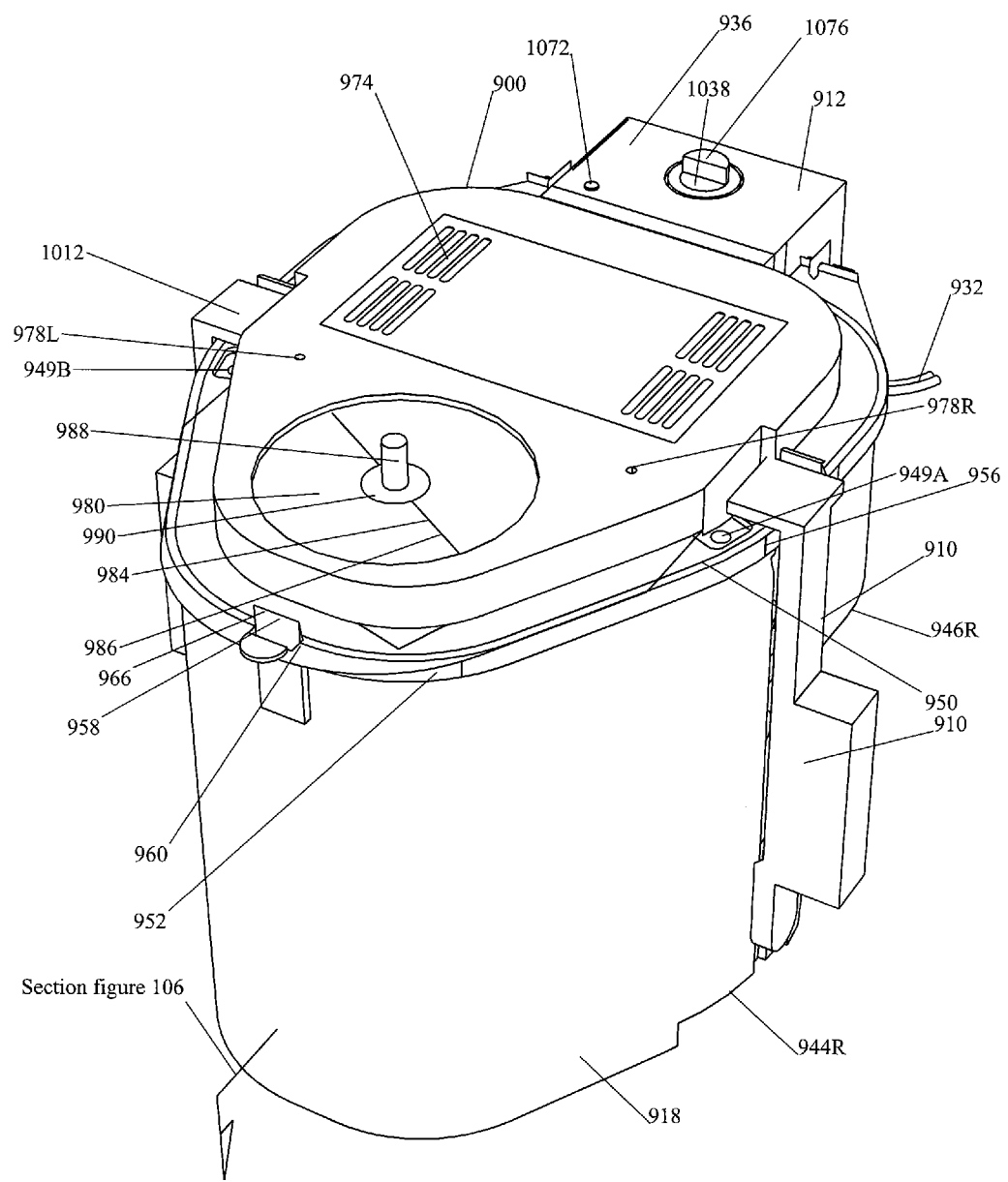
FIG. 93 is similar to FIG. 92 except food support assembly 910 is fully lowered.
Figure 95:
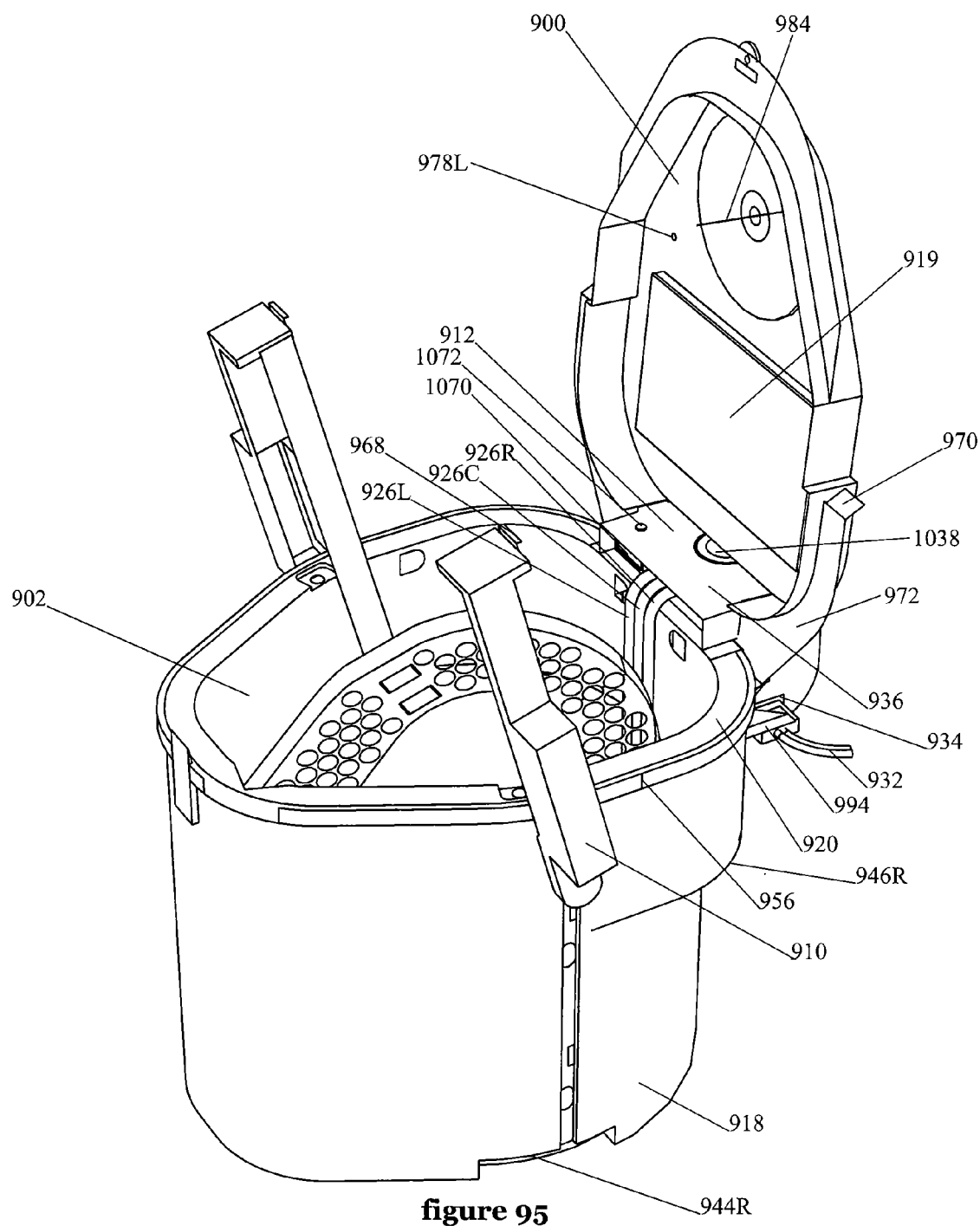
FIG. 95 is similar to FIG. 91 except food support assembly 910 is fully raised and tilted forward for food draining.

Food support assembly 910 may be mounted in one of three positions, each positioning food support assembly 910 differently with respect to cooking vessel 902. Each position in turn results in food support platform 940 being in different positions above the floor of cooking vessel 902 as shown in FIGS. 92, 93, and 95.

Figure 102:
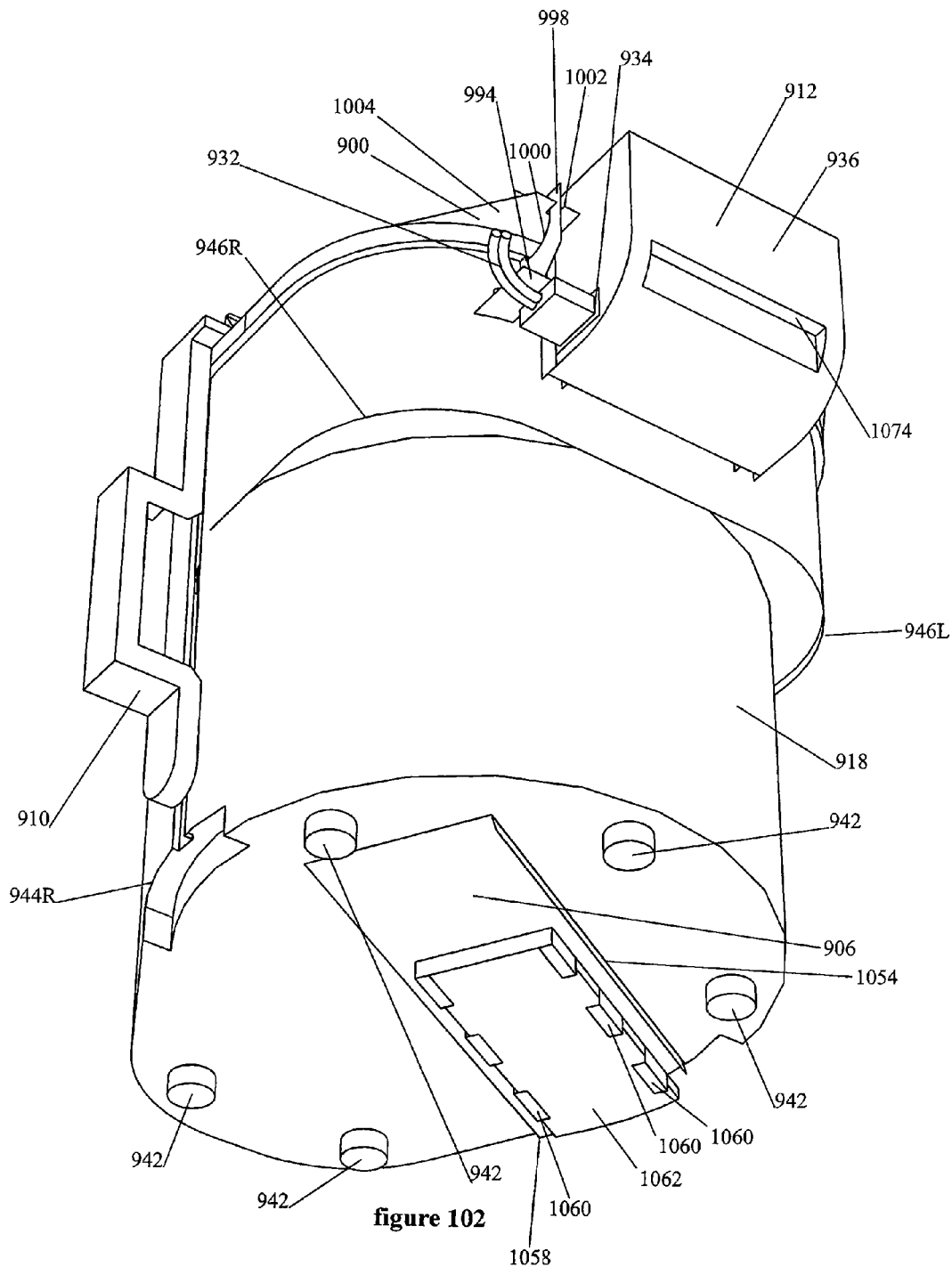
FIG. 102 is a lower rear perspective view of the embodiment shown in FIGS. 90 through 98.
Figure 103:
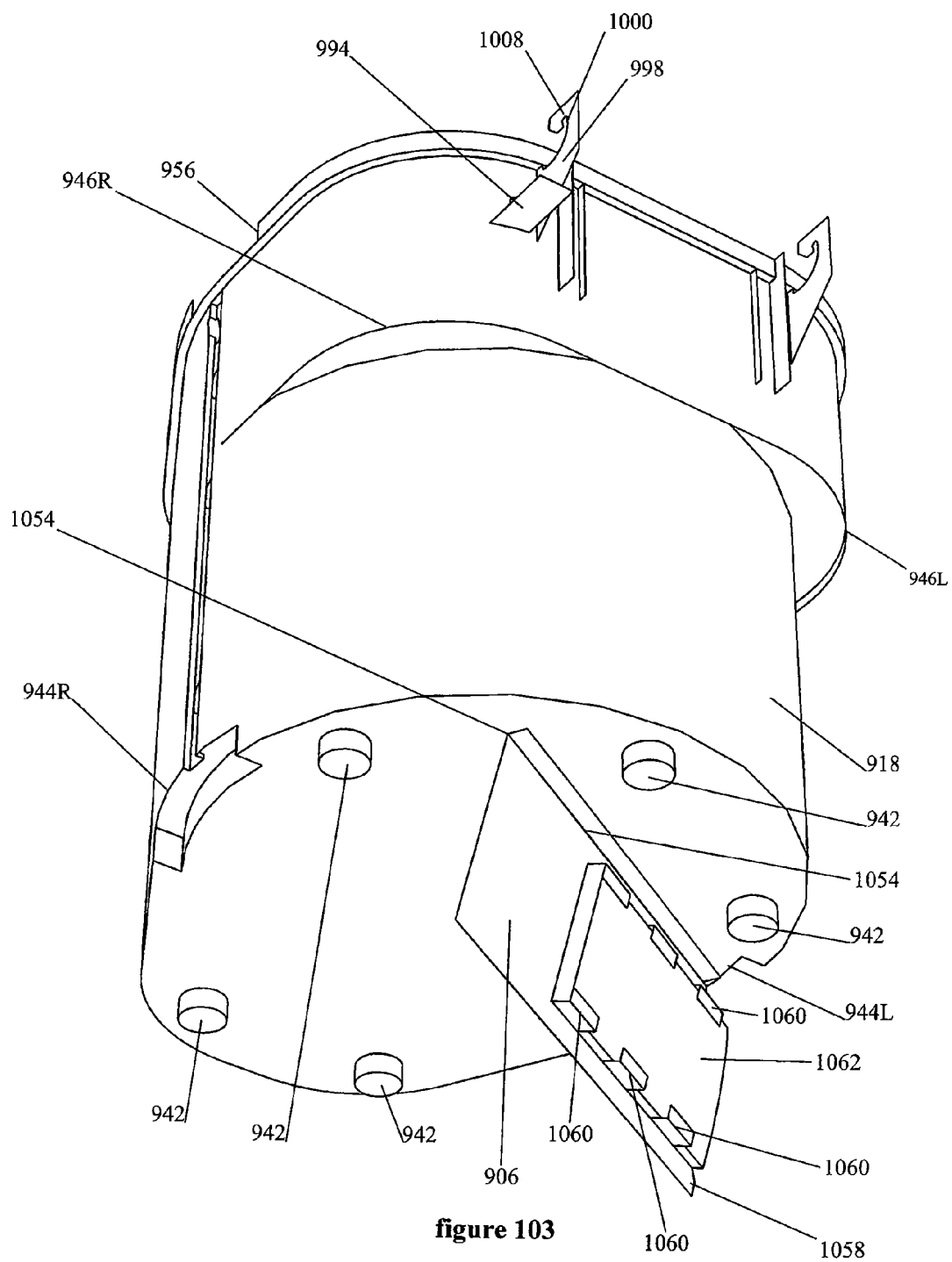
FIG. 103 is similar to FIG. 102 except prop member 906 is lowered, and lid 900, control box. 912 and food support assembly 910 are removed to facilitate emptying cooking vessel 902 of cooking liquid for cleaning for other purposes.

Feet 942 (FIGS. 102 and 103) elevate the bottom of outer enclosure 918 from the surface on which it rests. This elevation helps prevent heat damage to countertop surfaces. Feet 942 may have pliable outwardly domed the lower surfaces. Such construction reduces embodiment rocking when the embodiment is placed on uneven surfaces.

Lower handles 944R and 944L located on the lower right and left hand perimeter of outer enclosure 918 (see FIGS. 95 and 96), and upper handles 946R and 946L located on both sides of the back of outer enclosure 918, make it much easier for the exemplary embodiment to be: lifted, tipped, carried, dumped and otherwise maneuvered.

Figure 105:
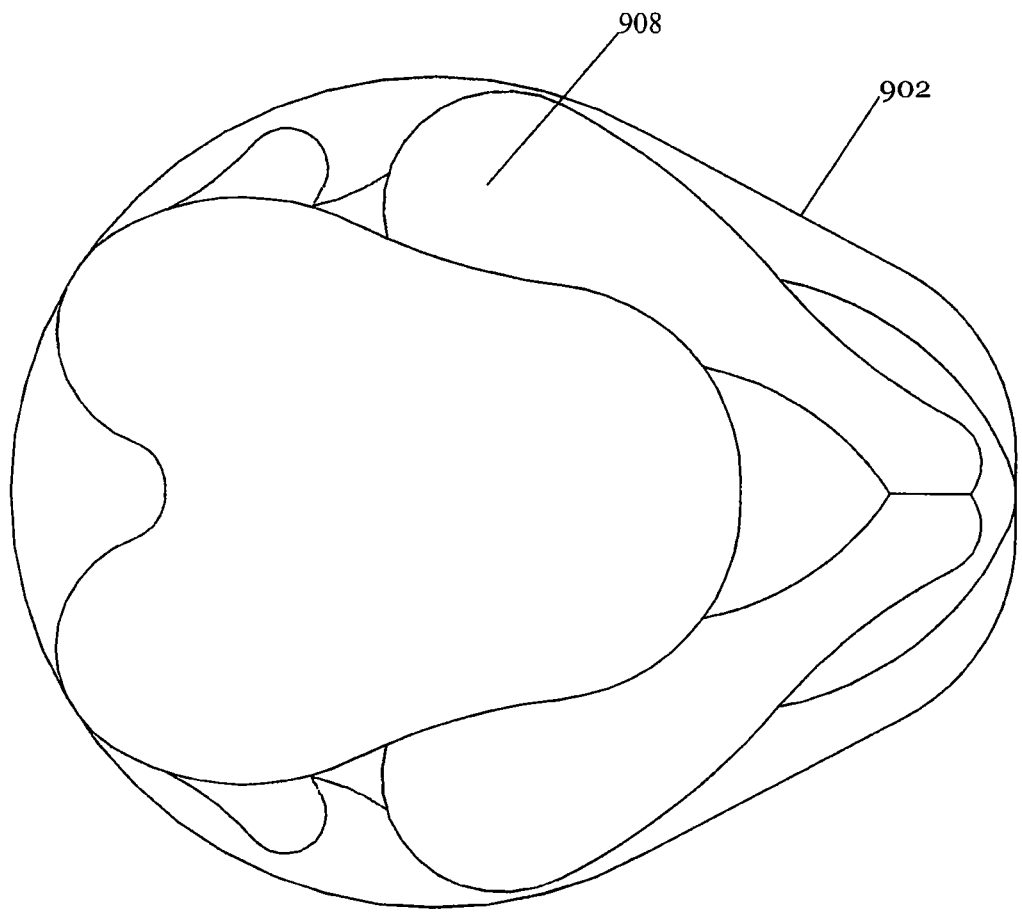
FIG. 105 is a plan section view, taken as indicated in FIG. 93, of large fowl 908 fitted within the lower portion of cooking vessel 902.

FIG. 105 illustrates how the rounded coffin shape of the lower cross section of cooking vessel 902, which is generally broad and circular at one end and tapers back and away from the generally broad and circular end to have a generally narrower opposite end, efficiently fits fowl 908, such as a chicken or a turkey, with minimal wasted space. This cross-sectional shape also is able to efficiently accommodate substantial quantities of other foods to be fried or steamed or otherwise cooked.

Other fryers have lower cooking pot cross sections which are generally symmetrical along two orthogonal horizontal axes. The exemplary embodiment as illustrated by contrast, is generally symmetrical to one horizontal axis only, while being asymmetric to any horizontal axis which is orthogonal to this first horizontal symmetrical axis.

This efficient rounded coffin shape cross-section may be used in any orientation. As nonlimiting examples: the narrow end can face toward the user, or away from the user, or be rotated to any angle in between. In combination with this, it may be generally horizontal as illustrated, or rotated up to where the narrow end is vertically above the broad and circular end, or rotated down to where the narrow and is vertically below the broad and circular end, or any angle in between. In combination with both of the above, it may be rotated so that large fowl 908 rests generally on its back, or on its breast, or on its head end, or on its tail end, or on its side, or any angle in between This efficiency, when frying, reduces the amount of cooking oil needed to cook fowls, and particularly to cook large ones. This in turn reduces operating costs and warmup times. This efficiency also, in all cooking situations, reduces the countertop footprint needed for the exemplary embodiment when it is compared to other fryers using alternative shaped cooking vessels to cook equal sized fowls and other foods.

As shown in FIGS. 90, 91, 98A and 98B, cooking vessel 902 has a broader cross-section at its top than in its lower portion. It is common when deep fat frying for cooking oil to foam and expand its volume. The broader cross-section in the upper portion of cooking vessel 902 reduces the chance of foaming cooking oil overflowing cooking vessel 902 by providing additional room for the expanding cooking oil to habitate. This geometry also reduces the chance that foaming cooking liquid will overflow cooking vessel 902 resulting in the loss of cooking liquid for the cooking process.

Overflow holes 948*a*, 948*d*, and 948*e* (FIGS. 90 and 91) help drain off excess cooking liquid and foam to greatly reduce the likelihood of cooking vessel 902 overflowing on to a countertop. Excess liquid and foam exiting through the drain holes drain directly into the bottom of outer enclosure 918 where they can be easily dumped or otherwise emptied. Alternatively, the drain holes may drain into a container placed in the bottom of outer enclosure 918. This container could be easily removed, dumped and cleaned. This container could also be, in yet a third alternative, located under the floor of outer enclosure 918 with outer enclosure 918 having one or more drain holes to empty into the container. In this configuration, as just one alternative, the container could hang below outer enclosure 918 and be pulled in and out like a drawer.

Overflow holes 948*a*, 948*d*, and 948*e* may be formed by punching holes into the sides of cooking vessel 902 and bending back the punched metal so that it is in close proximity or touching the inside upper perimeter wall of outer enclosure 918. This can enhance the structure of the exemplary embodiment, and help it resist damage, particularly in an accidental drop or during shipping.

Overflow drain holes 949A and 949B are shown indented into upper flange 920 of cooking vessel 902. Overflow drain holes 949A and 949B may be used in conjunction with, or instead of, overflow holes 948*a*, 948*d*, and 948*e*. Overflow drain holes 949A and 949B may drain in the same manner and into the same receptacles as overflow holes 948*a*, 948*d*, and 948*e*. Overflow drain holes 949A and 949B may penetrate through a lowered horizontal plane surface as shown, or through an angled surface which may be curved or flat, or through any other geometric configuration which will place upper flange 920 of cooking vessel 902 above drain holes 949A and 949B.

FIG. 119 shows overflow reservoir 996 which can be used in conjunction with any of the drain holes described above, simply by providing one or more passageways to reservoir 996 from the drain holes, such as, by way of a nonlimiting example, by placing one or more holes in the floor of outer enclosure 918. Overflow reservoir 996 may alternatively be used without any drain holes. By way of a nonlimiting example, upper flange 920 of cooking vessel 902 may be uniformly horizontal, angled, or may have one or more lowered sections. In each of these examples, cooking fluid would be allowed to overflow all or portions of upper flange 920 and subsequently drain into overflow reservoir 996. Outer enclosure 918 may loosely rest within overflow reservoir 996, or it may be wedge fitted, or latch fitted, or may be coupled by some other acceptable means.

Cooking vessel 902 may be constructed out of any suitable material. As an example, and not by way of any limitation, it may be constructed from: aluminum, copper, stainless steel, mild steel, or any other suitable material. This material may or may not be coated. As an example, and not by way of any limitation, it may be coated with a nonstick coating, or with a corrosion resistant coating such as chromium or nickel.

Downward facing flange 952 (FIG. 98A—lower enlarged and 98B—lower enlarged) located on the upper perimeter edge of cooking vessel 902 engages into trough 950 located on the upper perimeter edge of outer enclosure 918 when cooking vessel 902 is inserted into outer enclosure 918. This helps increase the structure of the device and makes it easy to remove cooking vessel 902 from outer enclosure 918 simply by lifting cooking vessel 902 upward.

Bracing brackets 954 located in bottom inner perimeter of outer enclosure 918 (FIG. 117), directly contact, or come close to contacting cooking vessel 902. They provide additional structure both under normal use, and in the event of accidents, such as falling off a countertop, or impacts while shipping. Bracing brackets 954 may be formed as part of outer enclosure 918, or they may be additional parts. As but two examples, and not by way of limitation, outer enclosure 918 may be molded from polypropylene with bracing brackets 954 included as part of the molded part; or bracing brackets 954 could be made of metal, such as galvanized steel, and be mounted into outer enclosure 918.

Hand grip interruptions 956 cut into the outside right and left hand edges of trough 950 (FIGS. 91, 92, 93, and 95) allow the user to grasp downward facing flange 952 to help in the insertion and removal of cooking vessel 902 into and from outer enclosure 918. Overflow hole 948D and its corresponding counterpart on the right hand side of cooking vessel 902 which is not shown, may also may serve as finger/thumb grips to help in the insertion and removal of cooking vessel 902 into and from outer enclosure 918. Being able to easily insert and remove cooking vessel 902 into and from outer enclosure 918 may at least facilitate cleaning.

Latch 958 is located on the forward upper edge of outer enclosure 918. It secures lid 900 when lid 900 is lowered. Latch 958's barbed point 966 (FIGS. 118A and 118B) is resiliently biased toward the back of outer enclosure 918, causing latch 958 to catch on the backside of latch hole 960 and automatically latch lid 900 down when lid 900 is lowered.

Latch lock 962 rotates 964 (FIGS. 118A and 118B) to lock latch 958 closed (FIG. 118B) and rotates again to release the latch 958 before lid 900 can be reopened (FIG. 118A). This is both a safety feature, due to requiring two deliberate actions instead of just one to release latch 958 and open lid 900; and a structural feature to ensure latch 958 remain securely closed even when stressed, such as, by way of nonlimiting examples, during an accidental drop or during shipping.

Figure 90:
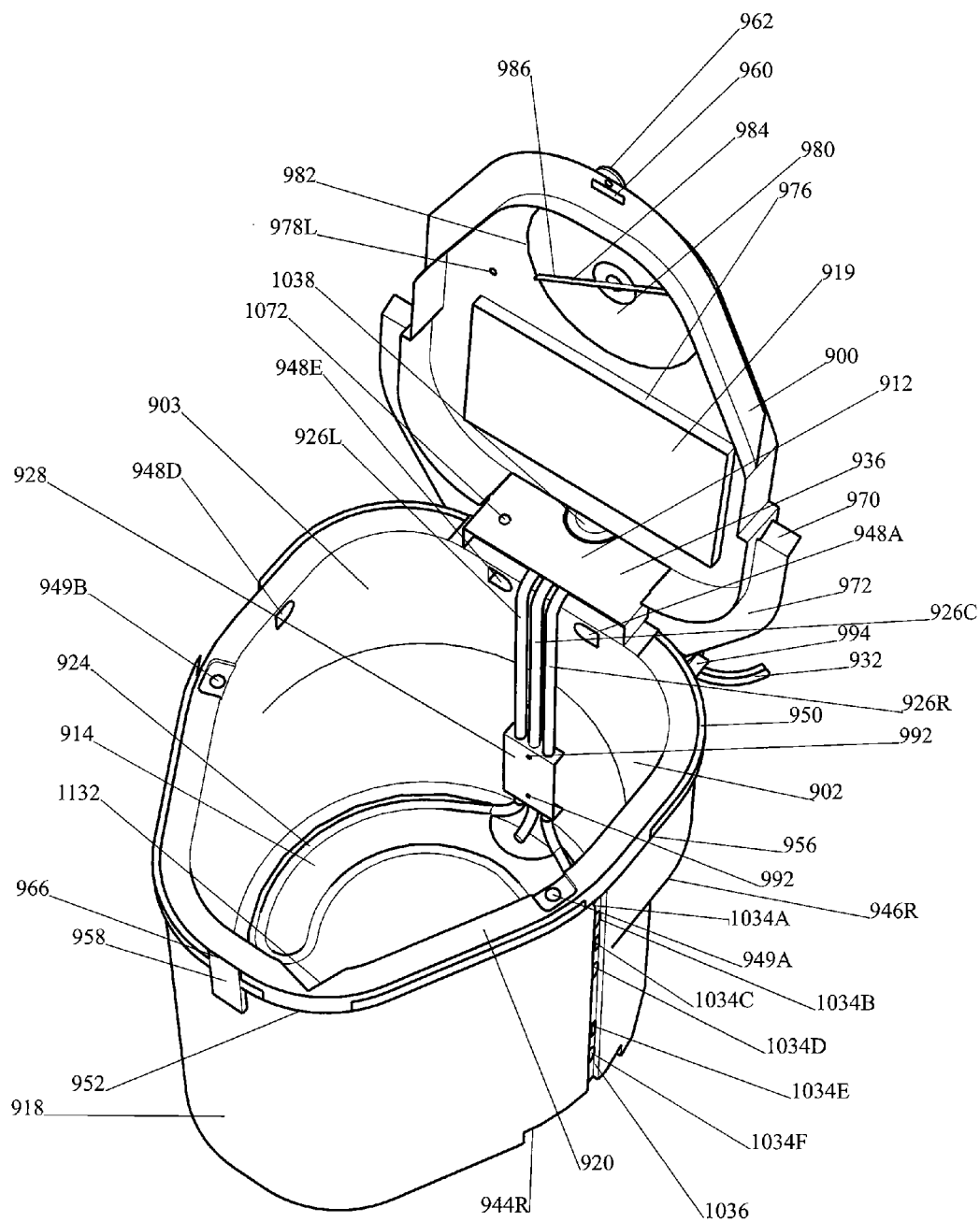
FIG. 90 is a forward perspective view of an additional exemplary embodiment with its lid 900 raised, and its food support assembly 910 removed, and the view looking down into the embodiment's cooking vessel 902.
Figure 94A:
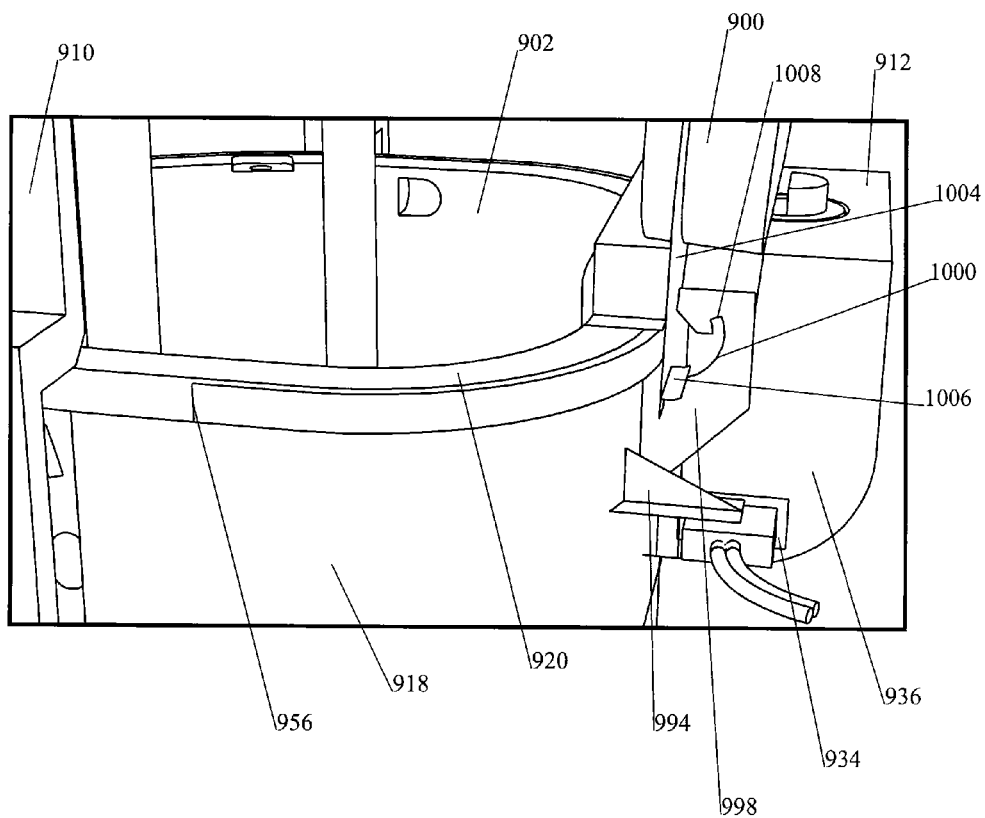
FIGS. 94A, 94B, and 94C are partial side perspective views of the exemplary embodiment shown in FIGS. 90 through 93 and showing close-ups of various embodiment details.
Figure 94B:
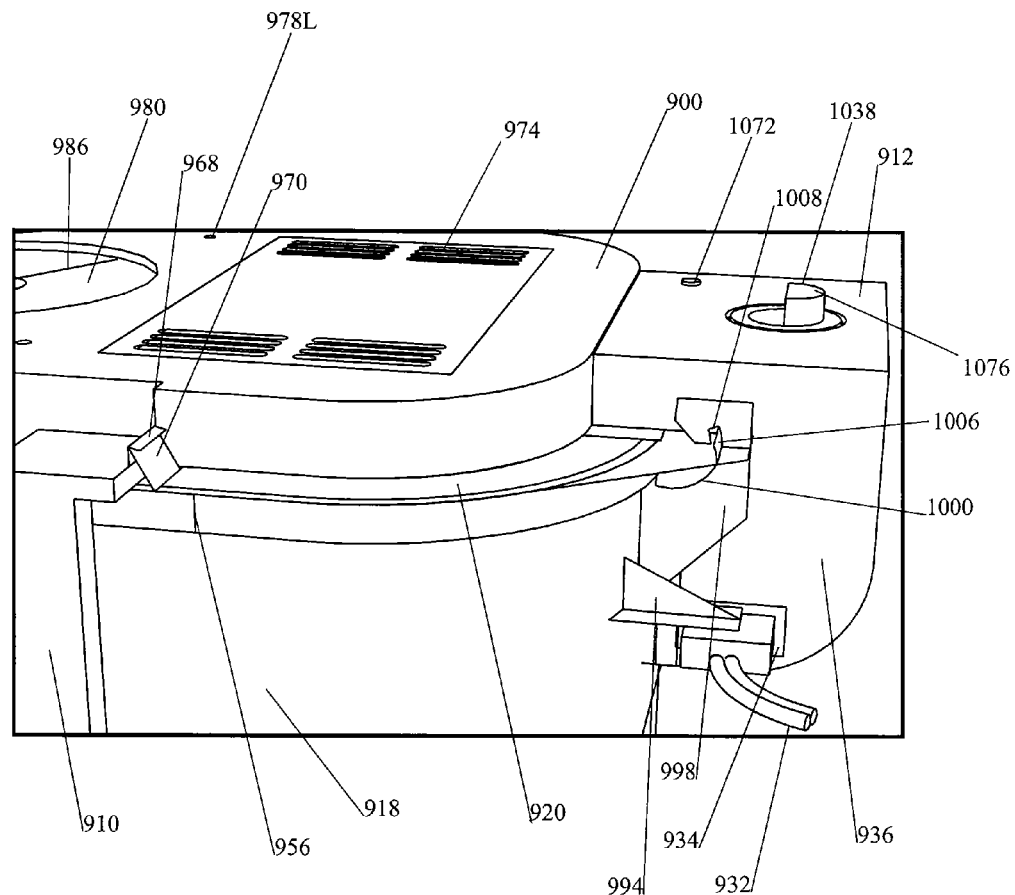
Figure 94C:
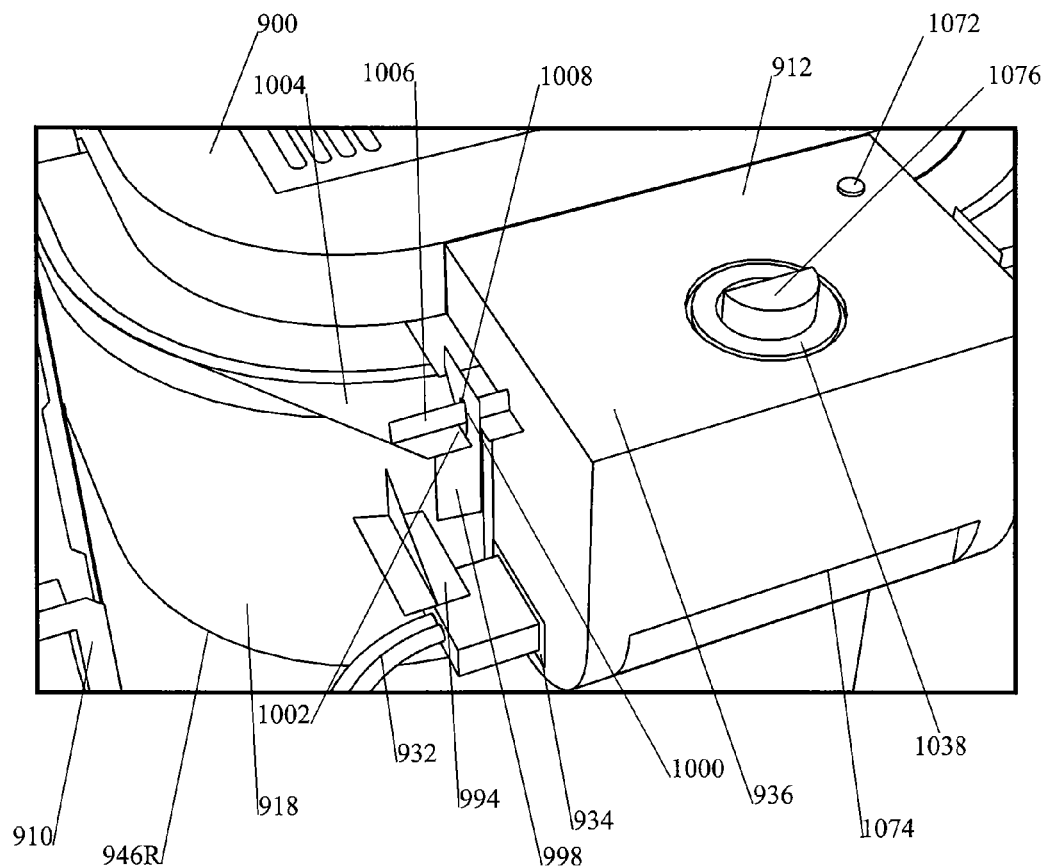

At its rear, lid 900 is coupled to the rest of the exemplary embodiment through a hand releasable hinge arrangement (FIGS. 94A, 94B, and 94C). This structure allows lid 900 to be fully closed (FIGS. 94B and 94C) or rotated open to a stable, just past vertical position (FIGS. 90, 91, and 94A). It also allows lid 900 to be easily disengaged from engagement with the rest of the exemplary embodiment simply by lifting lid 900 upward.

Referring to FIGS. 94A, 94B, and 94C, right hinge flange 998 is part of outer enclosure 918 and includes cut out 1000 which engages right slot 1002 located on the rearmost portion of horizontal outer flange 1004 of lid 900. Cut out 1000 limits the rotational travel of lid 902 to its open and close positions. When lid 900 is open (FIG. 94A), horizontal flange 1004 rests against the top of right hinge flange 998 and prevents lid 900 from falling further backward. When lid 900 is in its closed position (FIGS. 94B, and 94C), cut out 1000 limits the upward travel of the rear of lid 900 away from cooking vessel 902 by trapping lid 900's rear under the upper portion of cut out 1000 (FIGS. 94B and 94C).

When lid 900 is closed, rib 1006 is generally at right angles to and also is located on the rear of lid horizontal outer flange 1004 (FIGS. 94A, 94B, and 94C), engages into slot 1008 located on right hinge flange 998 as part of cut out 1000. This makes the engagement between lid 900 and outer enclosure 918 more secure by limiting fore and aft movement of lid 900.

The hinge arrangement described above is mirror imaged on the left-hand side of the exemplary embodiment.

Referring to FIGS. 94A, 94B and 94C, lid 900 is also held closed when food support assembly 910 is fully lowered to its cooking position (FIG. 93). Referring to FIGS. 94B, 95, 96 and 98B—upper enlarged, hook 968 located on the rear top of food support assembly 910, latches onto resilient, cantilevered, forward angled rib 970 located on right perimeter flange 972 of lid 900 (FIG. 94B) and holds lid 900 in its closed position until food support assembly 910 is raised (FIG. 92). Similar structure is mirror imaged on the left-hand side of the exemplary embodiment. By being resilient; cantilevered, forward angled rib 970 allows lid 900 to lower and become latched under hook 968 even if food support assembly 910 is mistakenly in its lower most cooking position (FIG. 94) when lid 900 is lowered. Having lid 900 secured closed when food support assembly 910 is lowered is a safety feature which helps ensure lid 900 will not be accidentally raised when cooking is taking place.

Lid 900 secures filter 919 below filter vent holes 974 using a snap fit into rectangular vertical rib frame 976 (see FIGS. 90, 91, 95, 97, 98A—upper enlarged, and 98B—upper enlarged). Filter 919 is open on its lower side which faces into cooking vessel 902. Filter 919 helps to remove undesirable debris from cooking exhaust. Filter 919 is spaced away from the roof of lid 900 to allow circulation through all portions of filter 919. Filter 919 may be constructed from any of several different materials known to those knowledgeable in the art. As nonlimiting examples: filter 919 may be an open metal mesh, or an open plastic mesh, or a nonwoven substance such as nonwoven polyester, or fiberglass, or it may contain activated charcoal, or any other appropriate filtering material. Likewise, Filter 919 may be reusable or disposable. Filter 919 may work on any suitable filtering principle. As nonlimiting examples: it may condense pollutants onto cool surfaces, it may limit the size of particles, it may introduce substances to help exhaust be more benign, or it may use other advantageous principles.

Referring to FIG. 98A—upper enlarged, probe holes 978R and 978L allow a user to insert an elongated tool or probe, such as the rod on a long stem cooking thermometer, into cooking vessel 902, as an example to test the temperature of cooked food or cooking liquid, without opening lid 900. This is a safety feature providing lid 900 as a safety barrier when such temperatures are being taken.

Lid 900 may be made of any suitable material. As an example, and not by way of any limitation, it may be formed from opaque material, such as the molded ABS or molded polypropylene. Lid 900 could also be formed from transparent or tinted transparent material, such as acrylic, polycarbonate, SAN, or other transparent material.

Alternatively, lid 900 may be molded from translucent plastic, such as polypropylene, which would allow ambient light to enter into cooking vessel 902. However, using a translucent material may not allow suitably clear observation of the contents of cooking vessel 902. Such clear observation may be useful, at least in determining the cooking progress of foods.

Circular glass 980, mounted in the forward upper portion of lid 900, allows clear observation of the contents of cooking vessel 902. Circular glass 980 is mounted with a snap fit into circular vertical rib frame 982 (see FIGS. 95 and 96). In combination with translucent material used to fabricate to lid 900, circular glass 980 (FIG. 98A—upper enlarged) may provide unusually good observation of the contents being cooked in cooking vessel 902, particularly when compared to other deep fryers having mostly opaque lid surfaces.

Lid 900 may be virtually or totally monolithic. As an example, and not by way of any limitation, it may be molded in a single piece from clear, opaque, or translucent material without having circular glass 980. This could provide substantial cost savings and increase reliability, structure, and durability.

Being completely monolithic, as an example, being molded as a single piece without glass 980, or being almost monolithic, as shown, with the presence of glass 980, may allow lid 900 to be easily cleaned by hand or in a dishwasher.

During the cooking process, condensation and debris may collect on the inward side of circular glass 980. Referring to FIGS. 90 and 92, in order to help prevent this from obscuring clear observation of the contents of cooking vessel 902, rotary wiper 984 may be hand rotated using knob 988, causing its wiper blades 986 to rotate against the inside of glass 980 and thus to wipe and clean the inside of circular glass 980. Flange 990, located at the base of knob 988 and above the upper surface of circular glass 980 (FIG. 92) helps prevent users from getting burned on circular glass 980 when knob 988 is being hand turned.

Referring to FIG. 98A—upper enlarged, food support assembly 910 includes right hand handle assembly 1010 and left hand handle assembly 1012 respectively which are removeably attached to food support platform 940. Right hand handle assembly 1010 includes right hand grip 1014 which is rigidly coupled to right handle support member 1016. Right handle support member 1016 at its base is bent at right angles and away from right hand grip 1014 (see FIG. 98A—upper enlarged).

Figure 98B:
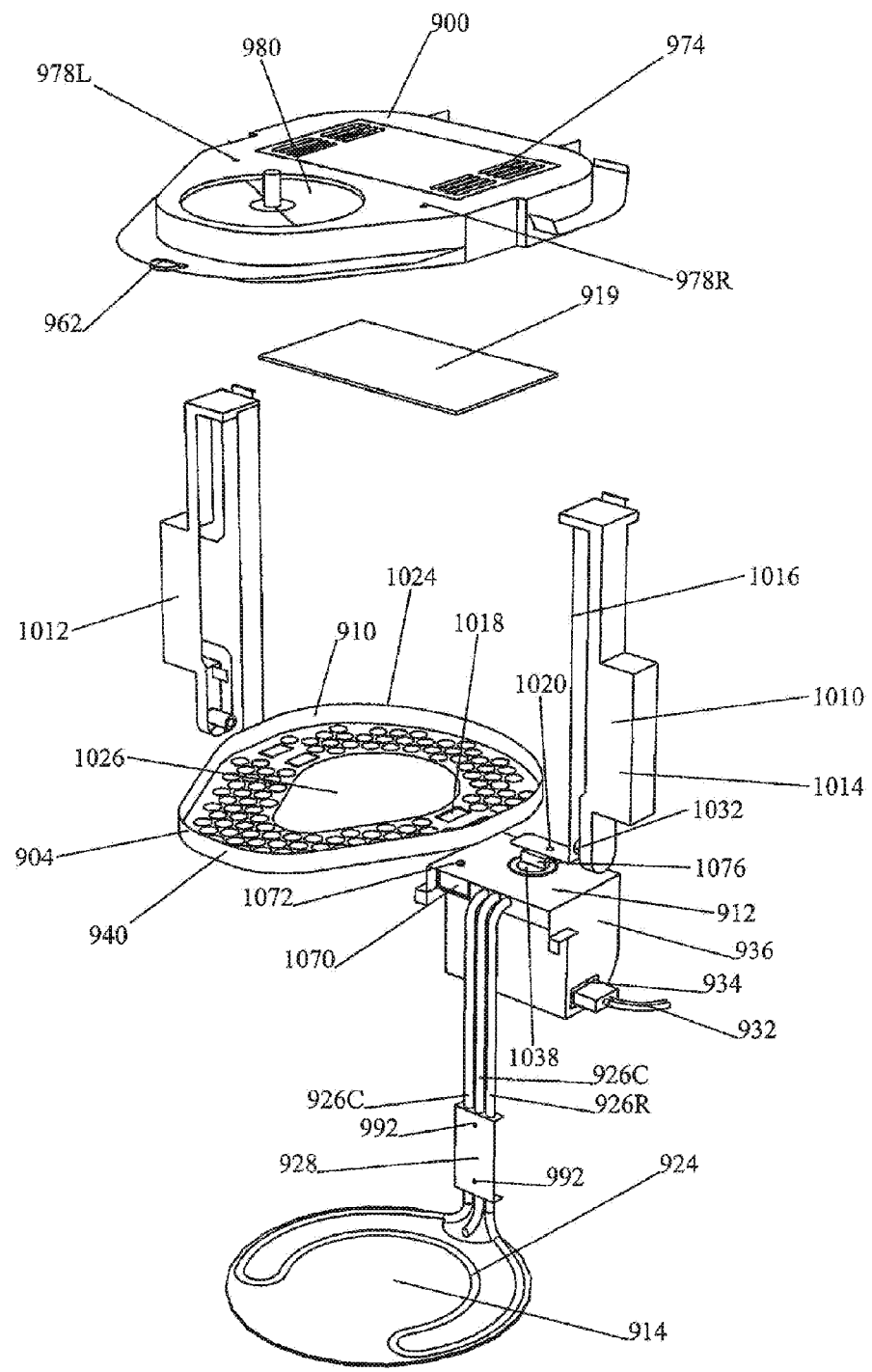
FIG. 98B is a rear exploded perspective view of the embodiment shown in FIGS. 90 through 98.
Figure 98C:
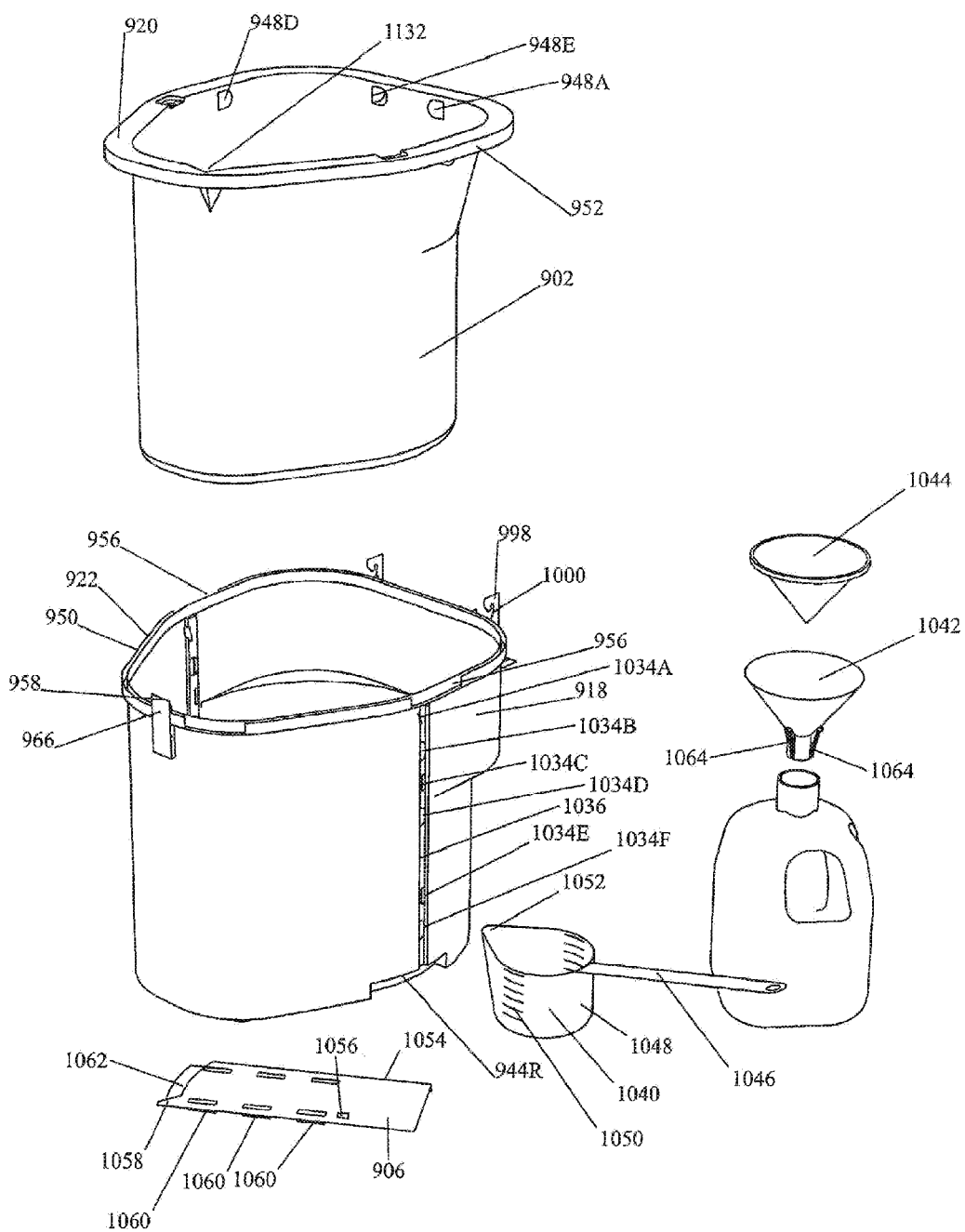
FIG. 98C is a view of a cooking vessel and associated structure.
Figure 98D:
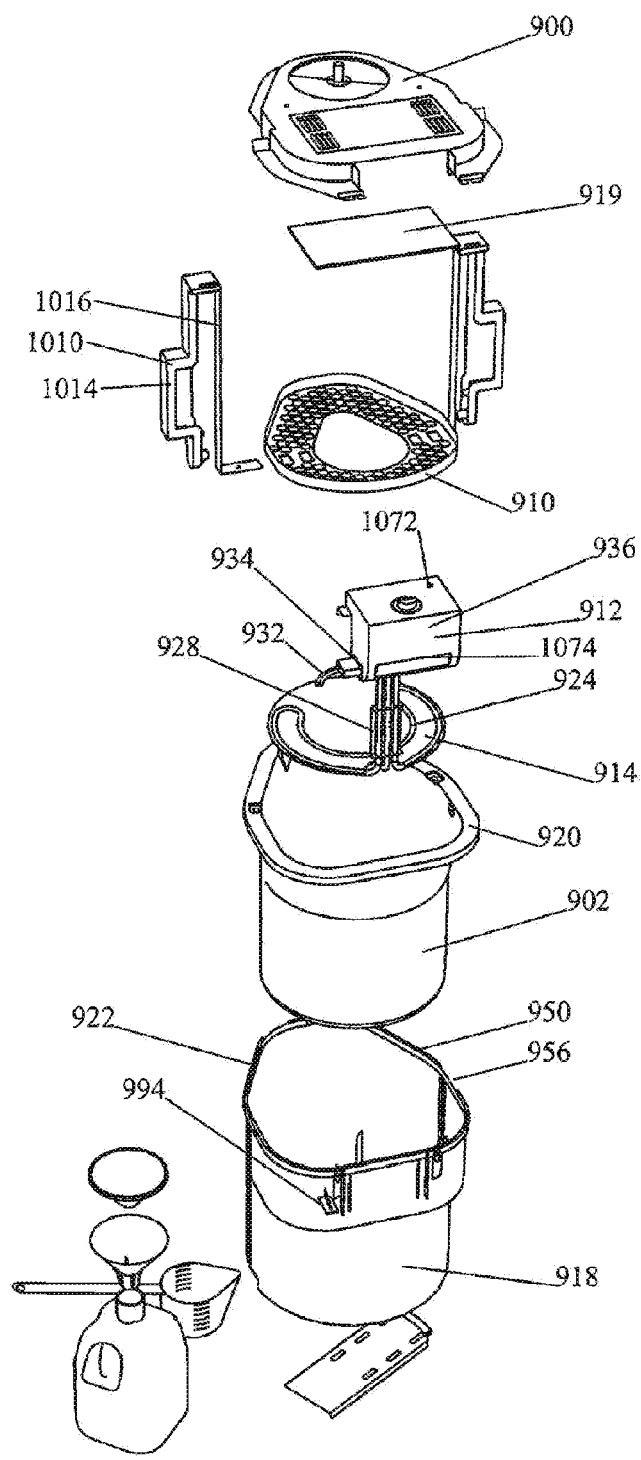
FIG. 98D is an exploded view of a cooking vessel and associated structure.
Figure 98E:
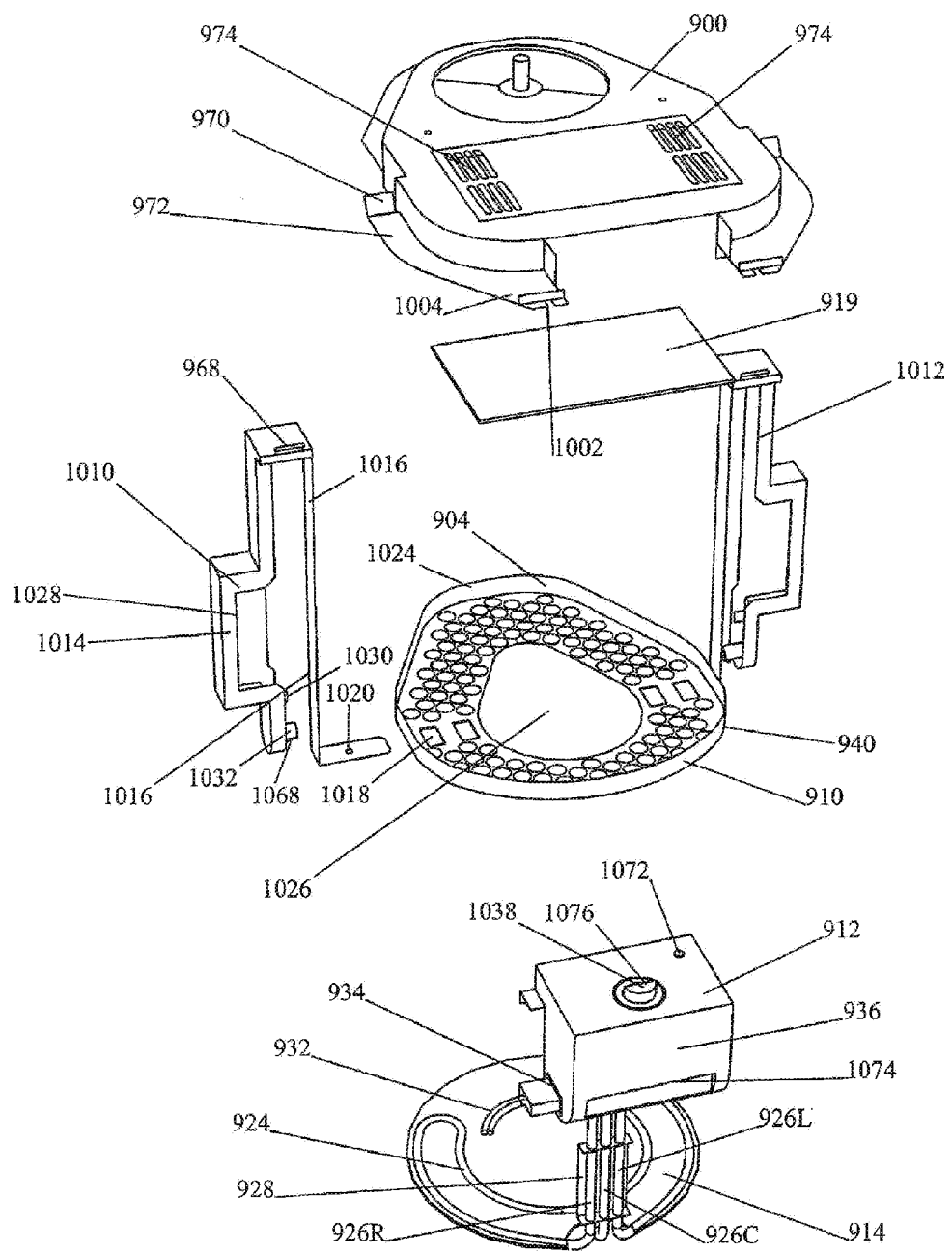
FIG. 98E is an exploded view of components of a cooking vessel.
Figure 98F:
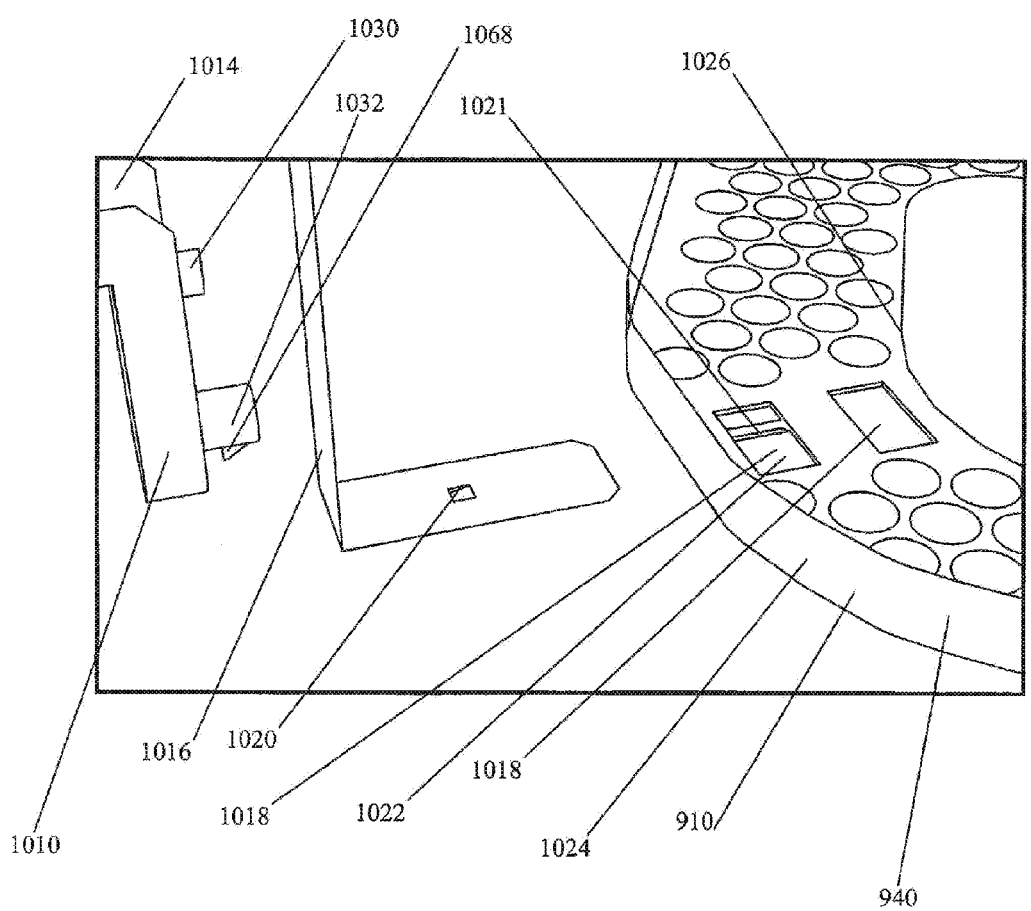
FIG. 98F is a detailed view of a portion of a cooking vessel.
Figure 98G:
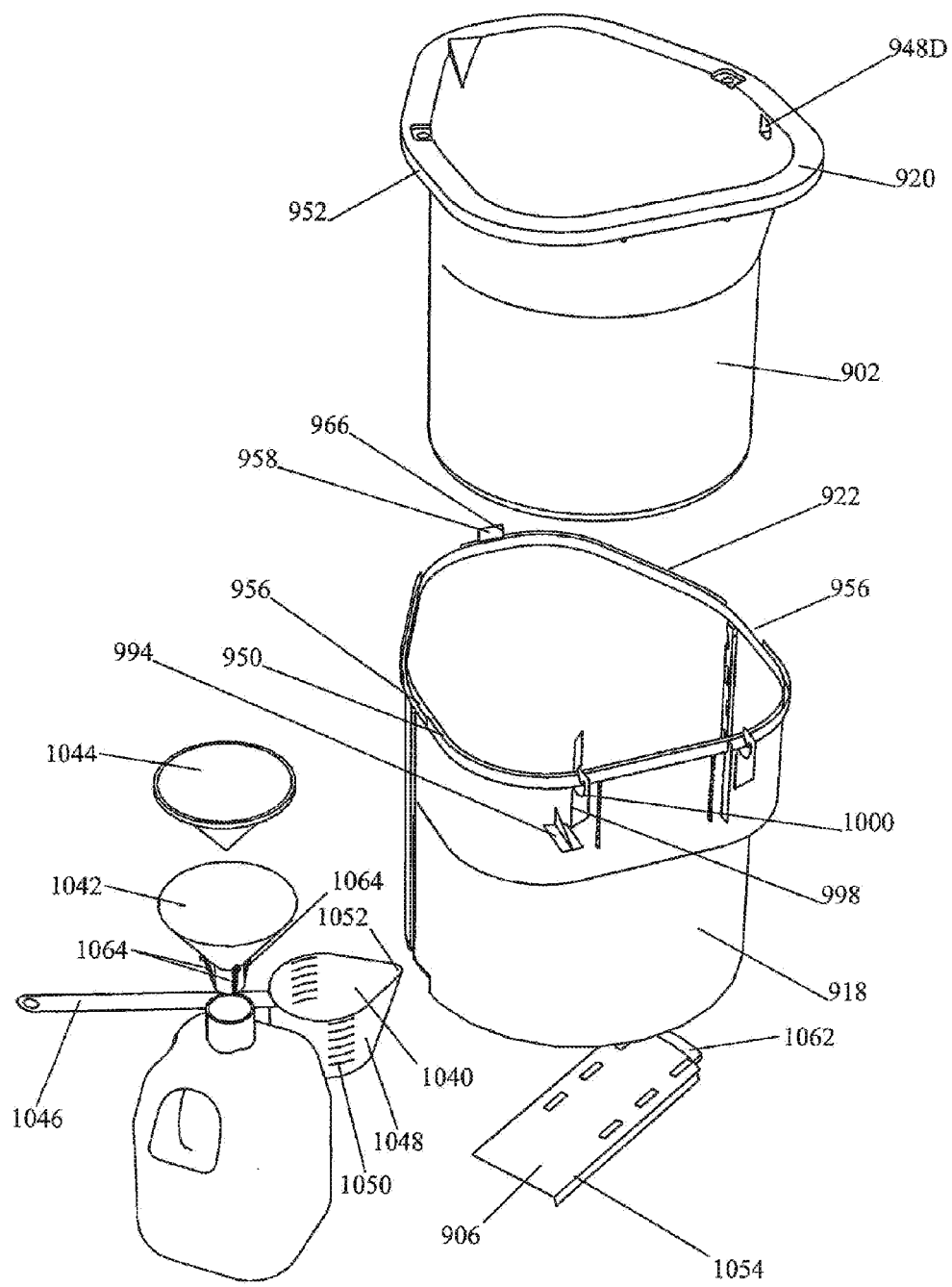
FIG. 98G is a view of a cooking vessel and associated structure.

Also referring to FIG. 98A—upper enlarged, this bent end of right handle support member 1016 slides into, and removeably mounts into right handle mounting track 1018 located on the right side of support platform 940. Referring to FIG. 98B—food support enlarged, once fully slid into track 1018 the bent end of right handle support member 1016, engages food support platform 940 through right latch member 1020 located on the bent end latching against right resilient latch member 1022. Right hand handle assembly 1010 may be released from engagement with food support platform 940 by pulling down on the end 1021 of right resilient latch member 1022 and pulling right hand handle assembly 1010 away from food support platform 940. This structure is mirrored on the left side of the food support assembly.

Food support platform 940 has holes in its floor to facilitate draining of cooking liquid. Food support platform 940 includes solid perimeter wall 1024 which provides structure and helps support food placed upon food support platform 940 (FIG. 98B—food support a large).

Referring to FIG. 98A—upper enlarged, and 98B—upper enlarged, large central hole 1026, located generally in the center of food support platform 940 helps steady food placed upon food support platform 940 and allows food placed upon food support platform 940 to rest as low as possible within cooking vessel 902, which, by way of example, may result in less cooking oil being needed to cover food being cooked, which in turn may result in lower operating costs and quicker warm up and overall cooking times.

Right handle support member 1016 rigidly connects at its top to right hand grip 1014. Midway down right hand grip 1014 is right handle indent 1028 which provides a grip point for the user.

Further down still on right hand grip 1014 are right upper engagement member 1030 and right lower engagement member 1032 (see FIG. 98B—food support enlarged). Right upper engagement member 1030 and right lower engagement member 1032 cooperatively engage engagement holes 1034A and 1034B, or 1034C and 1034D, or 1034E and 1034F (FIG. 97) to mount food support assembly 910 in respectively: it's forward tilted uppermost drainage position (FIG. 95), in its horizontal middle food insertion position (FIG. 96), or in its horizontal lower most cooking position (FIG. 93). This engagement is aided by barb 1068 (FIG. 98B—food support enlarged) located at the end of right lower engagement member 1032. Barb 1068 engages the lower portion of each appropriate engagement hole and helps prevent right lower engagement member 1032 from being accidentally disengaged.

This engagement between engagement members 1030 and 1032, and their respective engagement holes is also aided by right handle support member 1016 acting like a leaf spring which biases engagement members 1030 and 1032 against right the side of outer enclosure 918 where they may be spring loaded into their respective engagement holes. Again, this action is mirror image of the left side of outer enclosure 918.

An alternative to the essentially horizontal axis of right lower engagement member 32 is to incline right lower engagement member 32 downward 10° to 60° as it extends out and away from right hand grip 1014. This provides natural engagement which increases as weight on food support assembly 910 increases. Such a configuration may also eliminate the need for barb 1068.

Note, all structure and actions described herein for the right hand side of this exemplary embodiment for mounting food support assembly 910 to outer enclosure 918 are mirror imaged on the exemplary embodiment's left-hand side.

Also note that all referenced figures within this document are given to help in more quickly understanding the features of the exemplary embodiments. They are not intended as a substitute for reviewing all information within this document to understand the teachings herein To accomplish the engagement between food support assembly 910 and outer enclosure 918, a user pulls right handle indent 1028 and its mirror image counterpart on the left side away from food support platform 940. This is made possible through the ability of right handle support member 1016, and its counterpart on the left-hand side, to resiliently bend allowing outward excursion of the lower portion of right hand grip 1014.

This in turn may be possible by constructing right handle support member 1016 from any suitable resilient material. This, by way of nonlimiting examples, could include constructing it from: stainless steel, aluminum, mild steel, or other suitable material.

Right lower engagement member 1032 is inserted into right open track 1036 located on the right side of outer enclosure 918 and is slid up and down until it reaches the desired position, and then it is inserted into the appropriate engagement hole (see FIGS. 90, 98A—upper enlarged, and. 98A—lower enlarged). Right open track 1036 makes it easier to slide engagement members 1030 and 1032 up and down and find their respective engagement holes.

Having two engagement members, right upper engagement member 1030 and right lower engagement 1032 (FIG. 98B—food support enlarged), helps stabilize the food support platform from tipping forward or backward.

Once again, these structures and actions are simultaneously replicated and mirrored on the exemplary embodiment's left-hand side.

Right upper engagement holes 1034A and 1034B are angled off vertical (see FIGS. 95, 97 and 104) to cause food support 904 to tilt forward to aid in draining of foods including large and small fowl, as well as other foods.

Right upper engagement member 1030 and right lower engagement member 1032 are different in shape. This difference prevents engagement member 1032 from being mistakenly placed into a hole design for engagement member 1030, as an exemplary benefit. Because of this, food support assembly 910 slides smoothly up and down guided in open track 1036 until it reaches one of its three predesignated food holding positions.

Although three food support assembly 910 positions are described, more positions can be easily added as desired simply by adding more engagement holes.

Control box 912 is mounted to cooking vessel 902 and outer enclosure 918 by control box 912 straddling the upper overlapping rear edges of both the structures (FIGS. 95, 96, and 98A). Electric heater unit 924 suspends downward from control box 912 into cooking vessel 902 (FIG. 98A). Control box 912 includes user set timer 1038 which turns on and off heater unit 924, and sounds an alarm simultaneous with turning off the heater (FIG. 98A).

Cooking liquids can be heated to predictable desired temperatures simply by using timer 1038 to adjust the amount of time the cooking liquid is heated during warm-up.

Likewise, timer 1038 may be used to time the cooking cycle using its alarm. Timer 1038 may also be a safety feature by having no continuously on position and thus limiting to the timer limit the maximum amount of time the heater is on for.

As shown in FIGS. 91 and 96, user access to user set timer 1038 is blocked when lid 900 is in its raise position. This is a safety feature preventing the user from turning on timer 1038, and thus electric heater unit 924, until lid 900 is lowered.

Also, timer 1038 has raised half moon shaped central portion 1076 (FIGS. 94C, 96 and 98B—upper enlarged) which serves as a finger grip and also prevents lid 900 from being fully opened until timer 1038 is in its full off position. This also is a safety feature.

Using this exemplary embodiment may include several steps. As an example of one way of using the exemplary embodiment, and not by way of any limitation, the following process may be used. Note that there are several other alternative methods for using this exemplary embodiment.

First, the user must open lid 900, remove food support platform 910, and pour in the appropriate amount of cooking liquid. This may be aided through the use of cooking fluid level indication holes 992 on bracket 928 (FIGS. 90 and 116).

Next, the user must place the food to be cooked into cooking vessel 902. This may be done by placing food support assembly 910 on a countertop and placing the food to be cooked on to it, and then lifting the food and support assembly into the cooking vessel and securing food support assembly 910 at its mid-level food insertion/removal position as described above (FIG. 91). Lid 900 is then lowered and latched closed including locking the latch using latch lock 962 (see FIGS. 118A and 118B).

Next, the user must set timer 1038 to the appropriate time for heating the cooking liquid to the desired temperature. Note, the exemplary embodiment could have an adjustable thermostat. However, for reasons at least of: ease-of-use, cost, reliability, and simplicity, the illustrated exemplary embodiment uses a single temperature preset thermostat with backup thermal fuse.

Next, after the time set on timer 1038 has been reached and the cooking liquid is at cooking temperature, the user lowers food support assembly 910, and the food that it is holding, into the hot cooking liquid.

At the end of the desired cooking time, possibly triggered by the alarm from user set timer 1038, food support assembly 910 is raised by the user to either its intermediate or uppermost positions to allow the food to cool and drain. After the food has been cooled and drained, lid 900 is raised and food support assembly 910 and the cooked food is removed by lifting food support assembly 910 and the cooked food from cooking vessel 902 and back onto the countertop.

After cooling, cooking liquid may be removed from cooking vessel 902 using bailing ladle 1040 and funnel adapter 1042 (see FIGS. 98A, 98A—lower enlarged, 98B, 98B—lower enlarged, 99, 100, 101, and 104). Funnel filter 1044 snaps into funnel adapter 1042 (see FIGS. 99, 100 and 101) and filters cooking liquids, such as cooking oil, as they are emptied from cooking vessel 902 to extend their useful life.

Filter funnel 1044 is designed to snap into the pouring openings of various size cooking liquid containers. As an example, and not by way of any limitation, filter funnel 1044 is designed to snap into the pouring openings of blow molded 1 gallon to 3 gallon containers commonly used in grocery stores to contain cooking oils such as: corn oil, vegetable oil, and canola oil. Notched ribs 1064 engage the interior perimeter of pouring openings on common blow molded and other containers and securely hold funnel adapter 1042 in an upright position.

Figure 99:
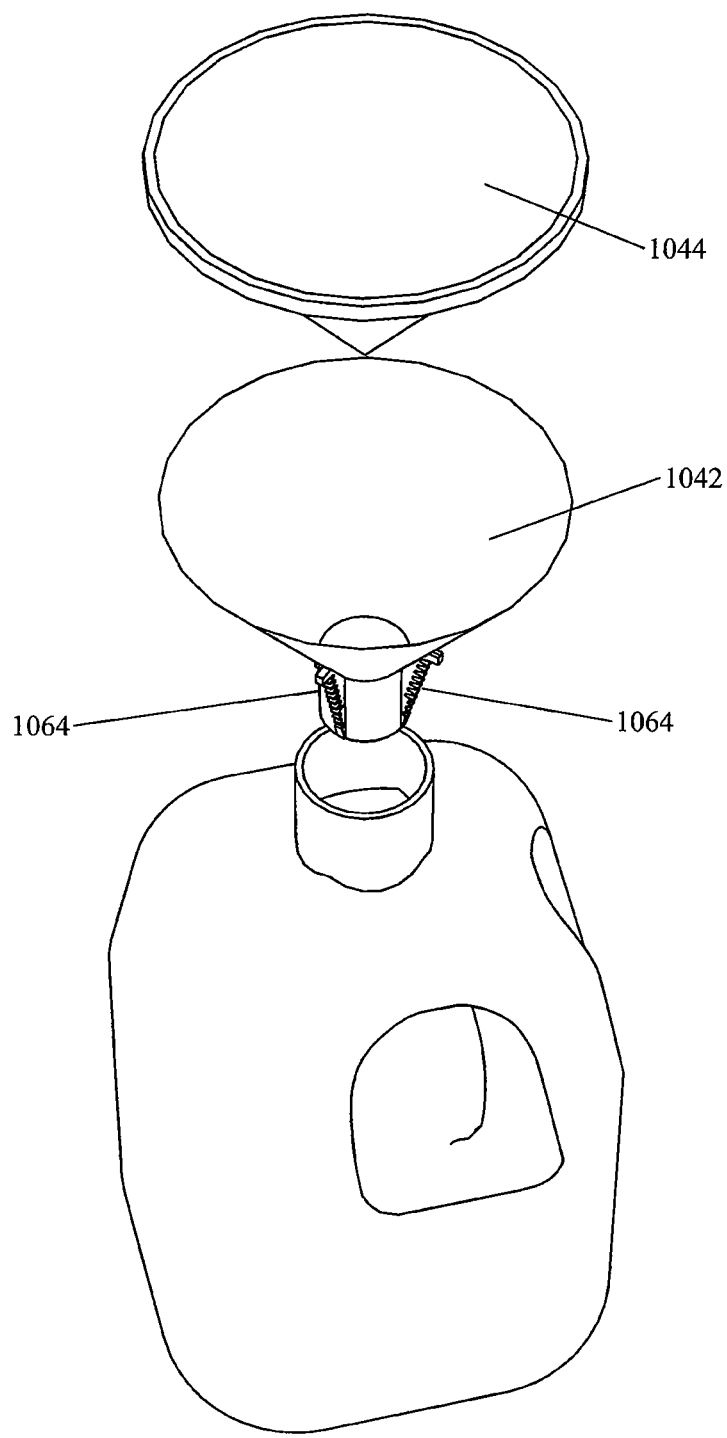
FIG. 99 is a forward exploded perspective view of components used to empty liquid from cooking vessel 902.
Figure 100:
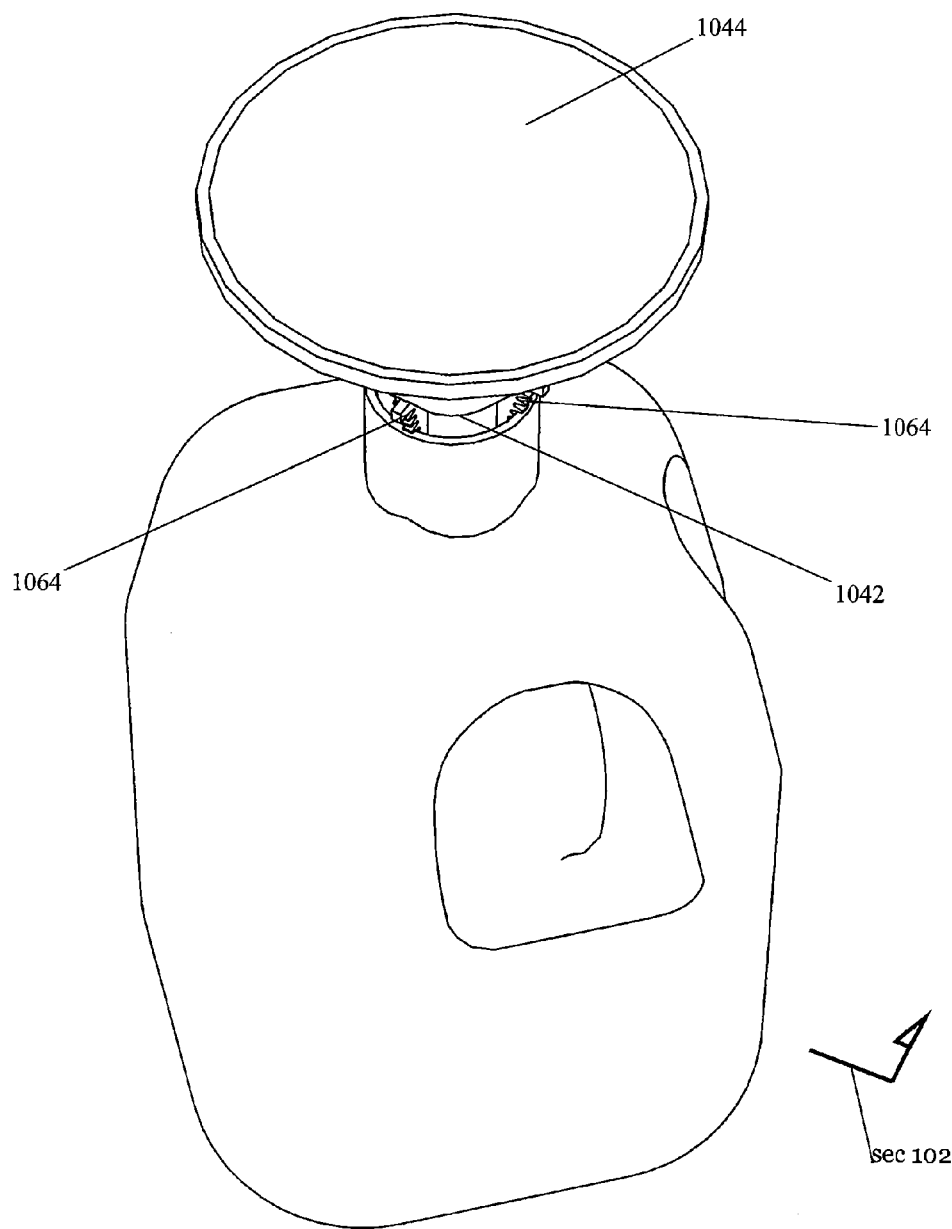
FIG. 100 is a forward perspective view of a subset of the components shown in FIG. 99.
Figure 101:
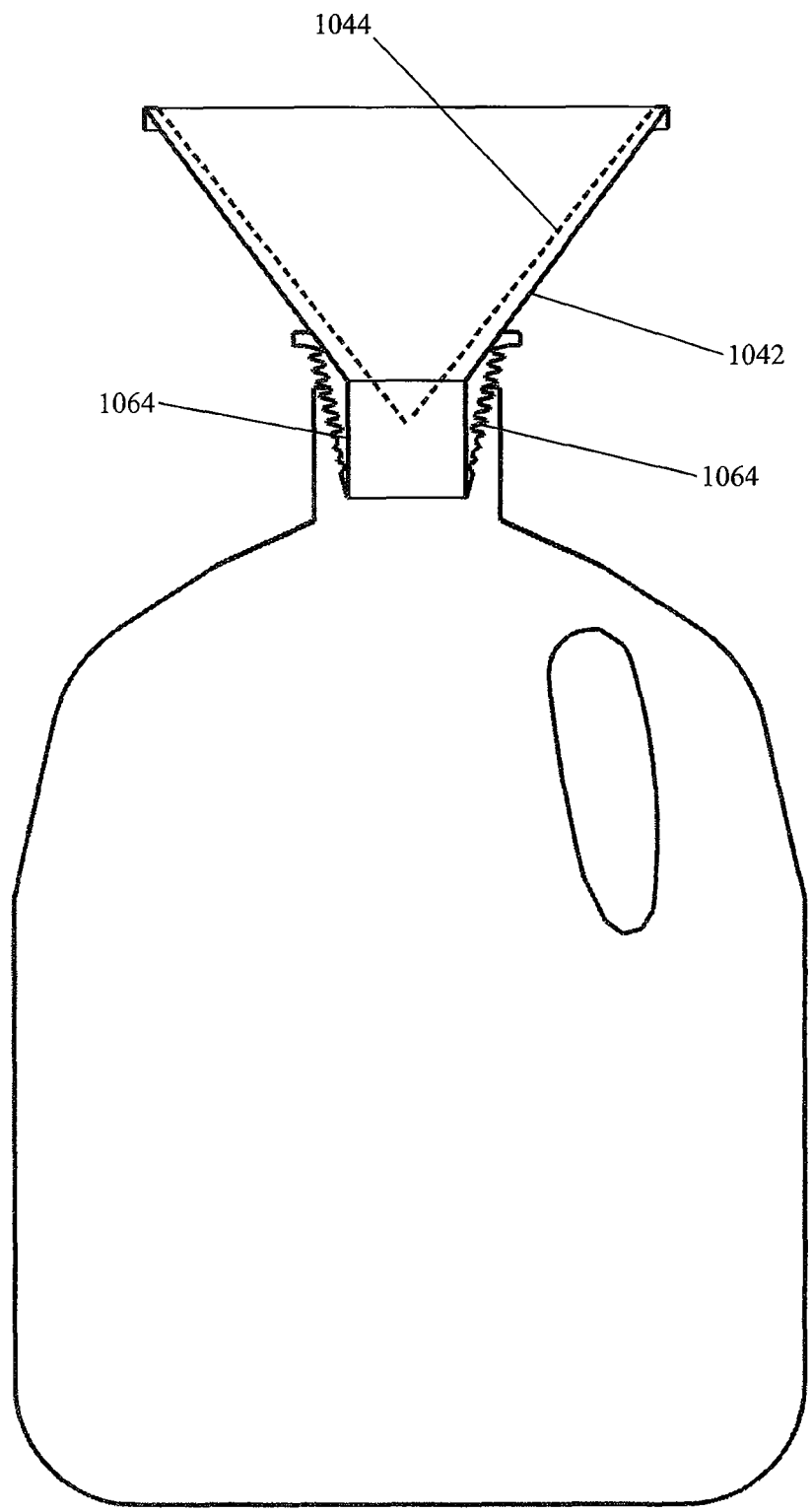
FIG. 101 is a section view taken through FIG. 100 as indicated in FIG. 100.

Filter funnel 1044 is snapped into funnel adapter 1042, as a nonlimiting example, like snapping on a Tupperware (R) cap, as shown in FIGS. 99, 100, and 101. Filter funnel 1044 is spaced away from the interior wall of funnel adapter 1042

(FIG. 101) so that the interior wall of funnel adapter 1042 does not block cooking liquid from passing through the filter.

Filter funnel 1044 may use any of a variety of reusable or disposable filter mediums to filter out particulates, chemical impurities, grease, oil, and other impurities. By way of non-limiting examples: fine mesh screen, nonwoven polyester, activated charcoal, cloth, or any other appropriate filter mediums might be used. By way of an example which is not limiting: filter funnel 1044 could resemble conical home coffee strangers which have either permanent fine mesh screens, or use conical shaped disposable insert filters.

Emptying cooking vessel 902 of cooled down cooking fluid is accomplished by repeatedly bailing cooking vessel 902 using ladle 1040. This is most efficiently done with both food support assembly 910 and control box 912 removed from cooking vessel 902.

The bailed cooking liquid contents of cooking vessel 902 may be dumped into filter funnel 1044 which is press mounted into the pouring opening of a liquid container, such as the container which the cooking liquid may have been purchased in. This is desirable because it allows convenient storage of the cooking liquid or it allows the cooking liquid's clean disposal.

Ladle 1040 is specifically designed for bailing cooking vessel 902. Ladle handle 1046 is angled at 5° to 30° from ladle bucket 1048 so that ladle 1040 may reach deep inside cooking vessel 902. Ladle handle 1046 has a hole at one and so it may be hung.

Ladle bucket 1048 also has snout 1052 which protrudes forward off vertical 10° to 45° and is narrower at its tip than the corners of cooking vessel 902 so that ladle 1040 can fully bail out each corner of cooking vessel 902.

Ladle bucket 1048 also has markings 1050 which allow it to be used as a measuring device.

Referring to FIG. 98B—lower enlarged, 102, 103, and 104, outer enclosure 918 on the underside of its floor has prop member 906 which is attached to the underside of outer enclosure 918's floor by hinge 1054 and snap 1056. Snap 1056 (FIG. 98A—lower enlarged) holds prop member 906 flat against the underside of the floor of outer enclosure 918.

Figure 104:
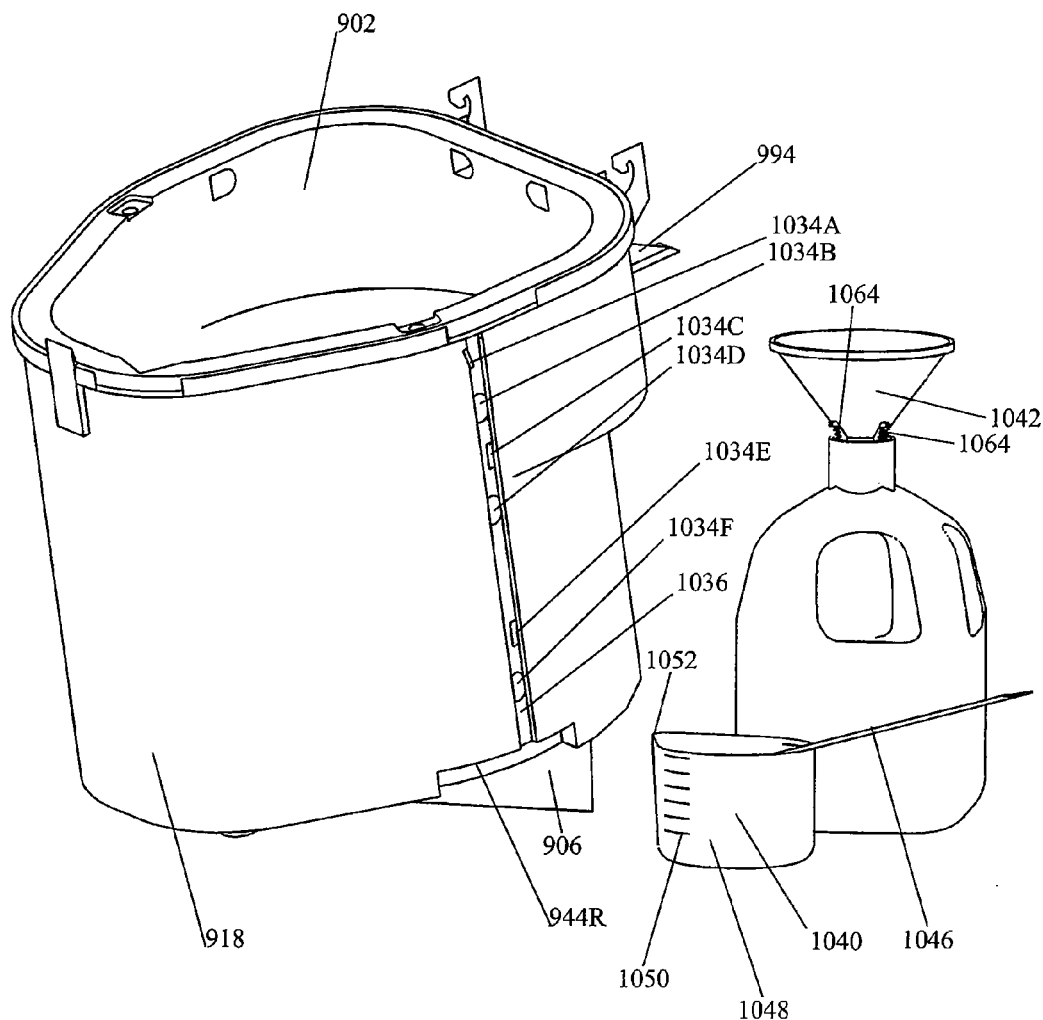
FIG. 104 is a forward perspective view of the components shown in FIG. 99 except outer enclosure 918 is tilted forward at an angle by prop member 906.

Prop member handle 1058 extending from the forward left hand corner of prop member 906 (see FIG. 98A—lower enlarged) allows the user to swing prop member 906 from its position resting against the underside of the floor of outer enclosure 918 (FIG. 102) to a lowered position (FIGS. 103, and 104) where it can prop up and tilt outer enclosure 918 and cooking vessel 902 diagonally forward as shown in FIG. 104. This tilting increases the ease with which cooking vessel 902 may be bailed.

Pour spout 1132 allows cooking vessel 902 to be emptied by tipping it and pouring out its contents. This may be used instead of bailing, or to augment bailing. Tipping the exemplary embodiment and pouring out the contents of cooking vessel 902 is made much easier due to the presence of upper handles 946R and 946L and the presence of lower handles 944R and 944L which alone or in combination make lifting, tipping, and pouring easier.

The outer wall of trough 950 is interrupted directly adjacent to pour spout 1132 to prevent cooking liquid from entering into and dirtying trough 950 during the pouring process.

Brackets 1060 extending from the underside of prop member 906 (FIG. 102) hold information cards 1062 which can be pulled out at any time so that user can have information about the exemplary embodiment without having to find a recipe/instruction book. Information cards 1062 may also contain other information.

Additional Exemplary Embodiment

FIGS. 106 through 111 illustrate a variant of the just described exemplary embodiment. In this variant exemplary embodiment, control box 912 is replaced by automated control box 916.

Figure 106:
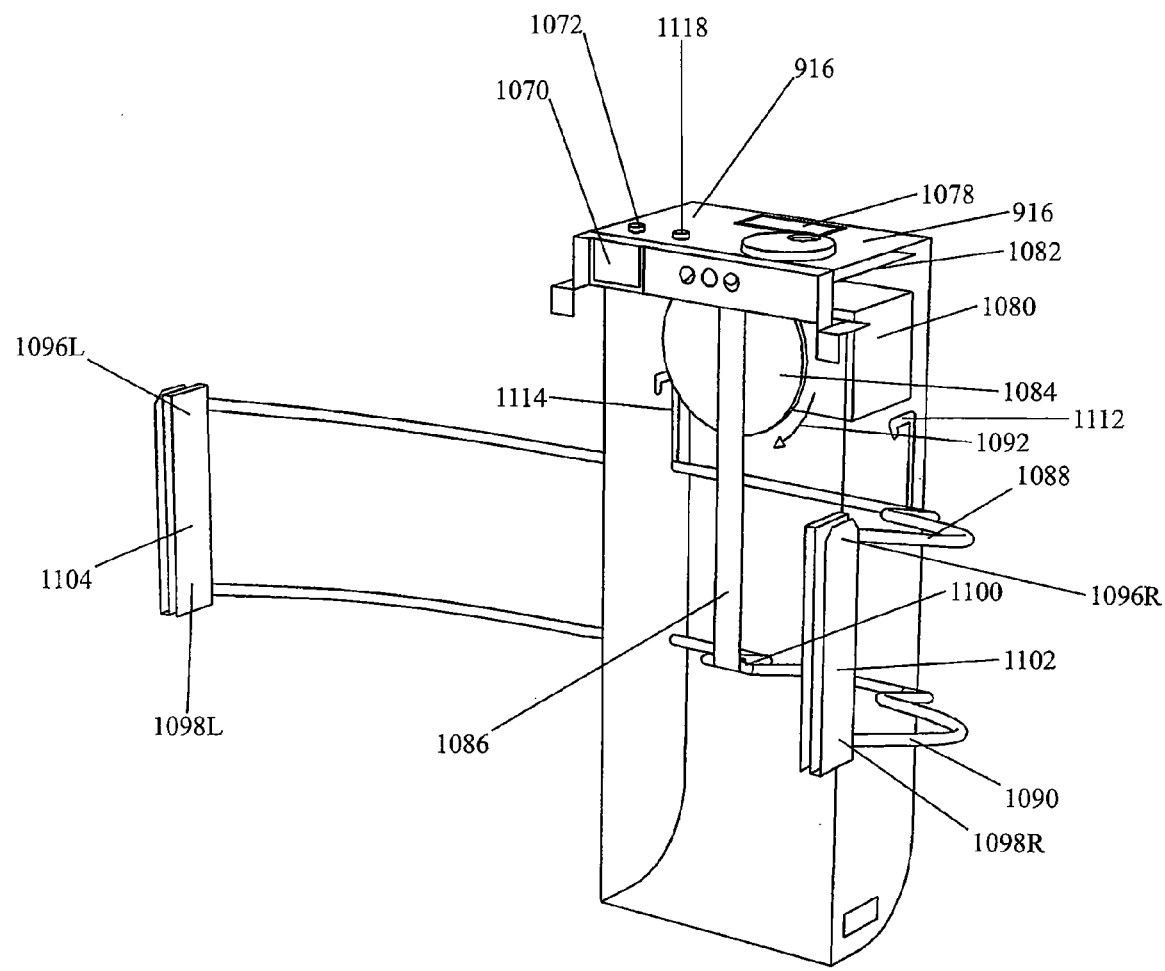
FIG. 106 is a forward perspective view of automated control box 916 with its forward walls ghosted out to reveal inner details.

Referring to FIG. 106, automated control box 916 contains: a central portion of upper basket lift arm 1088, and a central portion of powered lower basket lift arm 1090. Powered lower basket lift arm 1090 in turn is connected through a central levered portion 1100 formed in powered lower basket lift arm 1090 to the lower end of connecting rod 1086, with the upper end of connecting rod 1086 being coupled to crank disk 1084, which in turn is connected to, and rotated 1092 by, the output shaft of gear reduced lifting motor 1080.

As seen in FIG. 106, all of the above mechanism is contained within automated control box 916. Automated control box 916 also contains electronic circuit 1082 which includes timer 1078. A microswitch (not shown), which rides on a cam (not shown) positioned on the back surface of crank disk 1084, is mounted behind crank disk 1084 and on the front face of the outer casing of gear reduced lifting motor 1080.

This microswitch/cam combination, is similar to those described earlier in this document for alternative exemplary embodiments, allows electronic circuit 1082 to sense the position of upper basket lift arm 1088 and powered lower basket lift arm 1090.

Upper basket lift arm 1088, and lower basket lift arm 1090 each protrude out both sides of automated control box 916 and extend forward to the central right and left hand sides of outer enclosure 918 (see FIG. 107) where they connect through upper pivot 1096R and upper pivot 1096L and through lower pivot 1098R and lower pivot 1098L (see FIG. 106) to right handle assembly connecting bracket 1102 and left handle assembly connecting bracket 1104 (FIG. 106).

Right handle assembly connecting bracket 1102 connects to right handle assembly 1106 through a vertical track sliding engagement. Likewise, left handle assembly connecting bracket 1104 connects to left handle assembly 1108 through a vertical track sliding engagement. Right handle assembly 1106 and left handle assembly 1108 are part of food support assembly 1110, and are slideably releasable by hand from the rest of food support assembly 1110. Right handle assembly 1106 and left handle assembly 1108, unlike for the direct previous exemplary embodiment, do not engage outer enclosure 918.

Upper basket lift arm 1088 exits automated control box 916 on its right side through right inverted "L" shaped elongated channel 1112, and exits automated control box 916's left side through left inverted "L" shaped elongated channel 1114 (FIG. 106). A user may slide, by hand, the central portion of upper basket lift arm 1088 to exit both sides of automated control box 916 through the top or bottom of both right inverted "L" shaped elongated channels 1112 and 1114.

This results in two different lifting geometries illustrated in FIGS. 108, 109, 110, and 111. When upper basket lift arm 1088 is in its lowest position exiting the elongated channels 1112 and 1114, food support assembly 1110 is horizontal in both its raised (FIG. 108) and lowered (FIG. 109) positions.

When upper basket lift arm 1088 is in its highest and most forward position exiting the elongated channels 1112 and 1114, food support assembly 1110 is horizontal in its lowered position (FIG. 111), but it is tipped forward for food drainage (FIG. 110) in its raised position.

Some foods, as a nonlimiting example, like French fries, are better cooked when they raise and lower on a horizontal food support. Some other foods, as a nonlimiting example, like turkeys, are better cooked if they are horizontal while cooking, but are tilted when they are drained and cooled at the end of the cooking cycle. The above structure advantageously provides both of these options.

Figure 107:
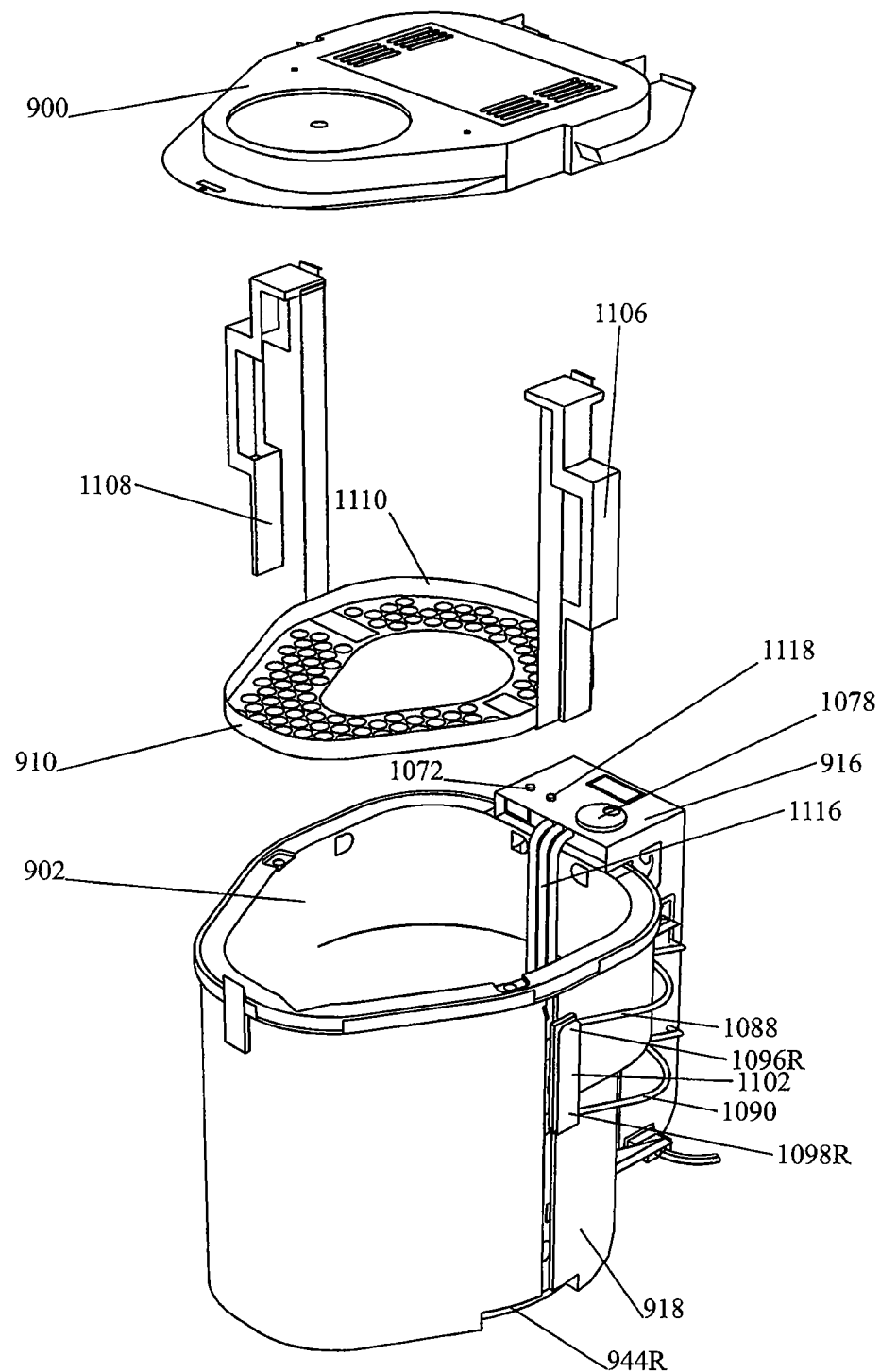
FIG. 107 is an exploded view of an exemplary automated version of the embodiment shown in FIGS. 90 through 98.
Figure 108:
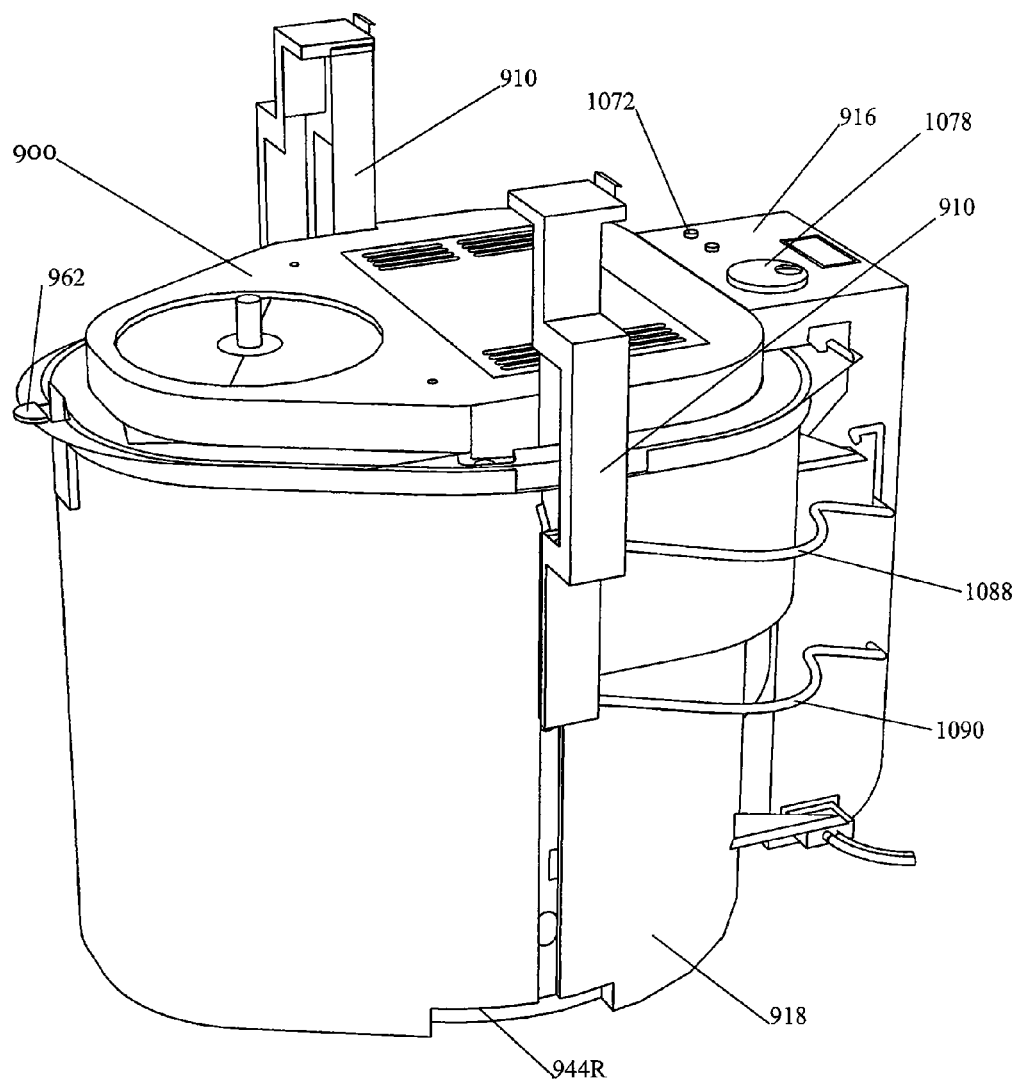
Figure 109:
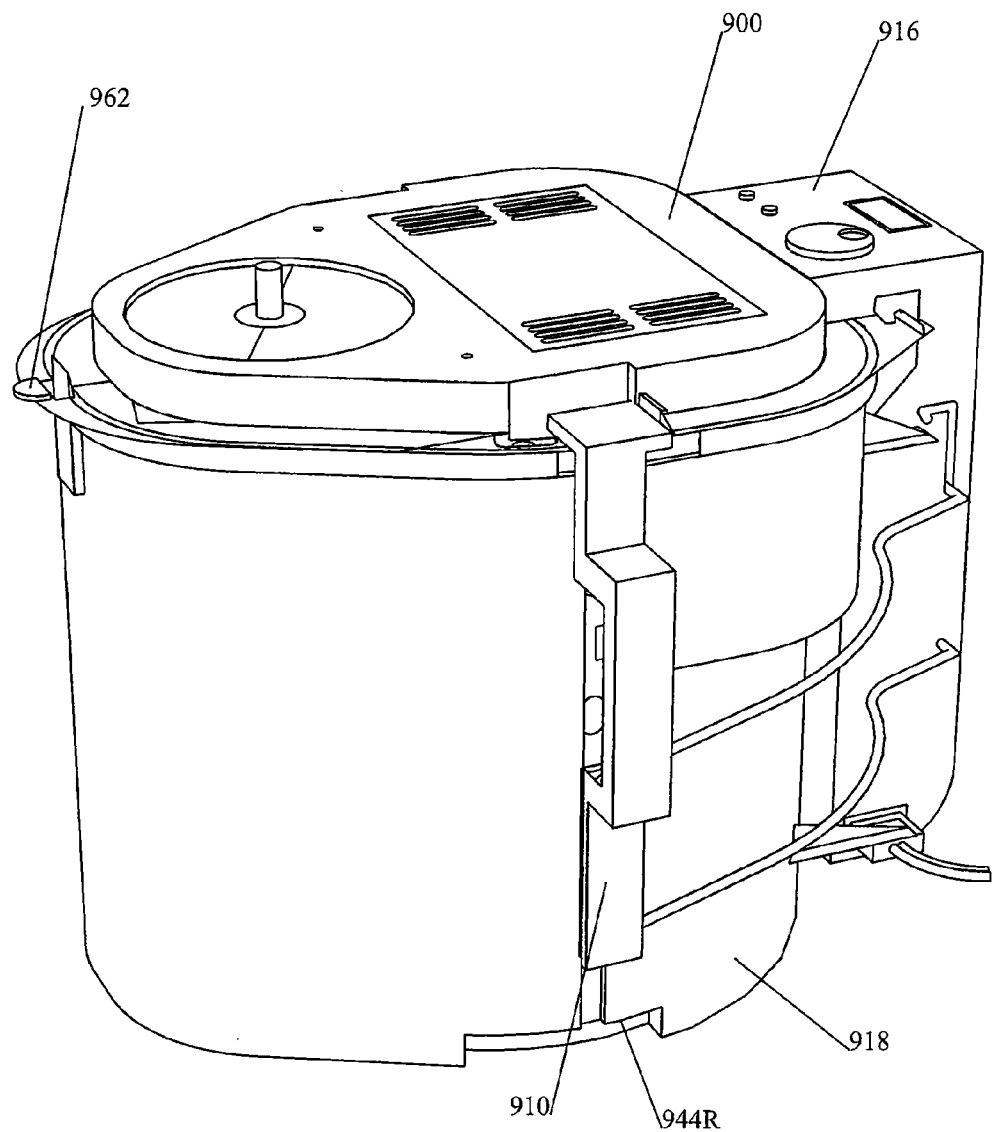
Figure 110:
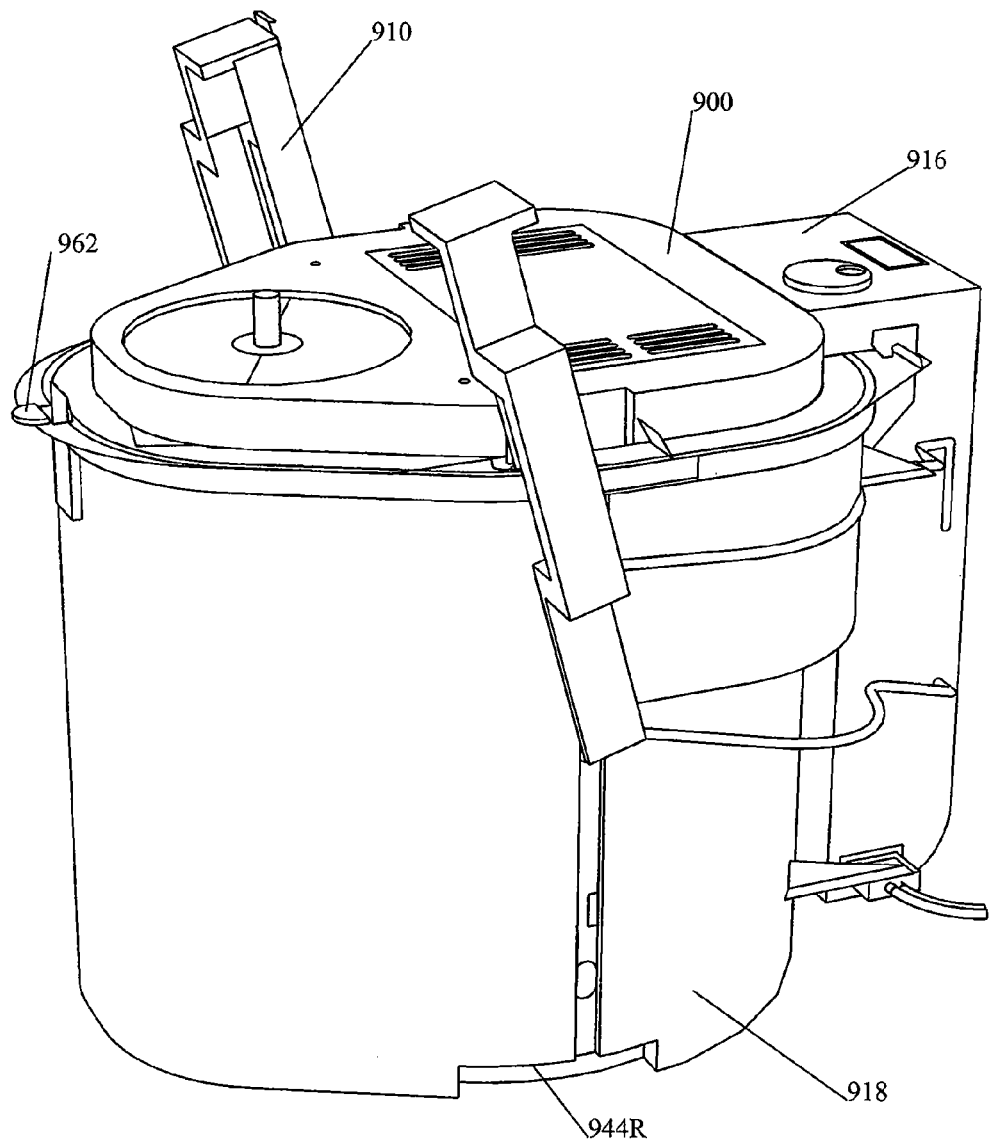
Figure 111:
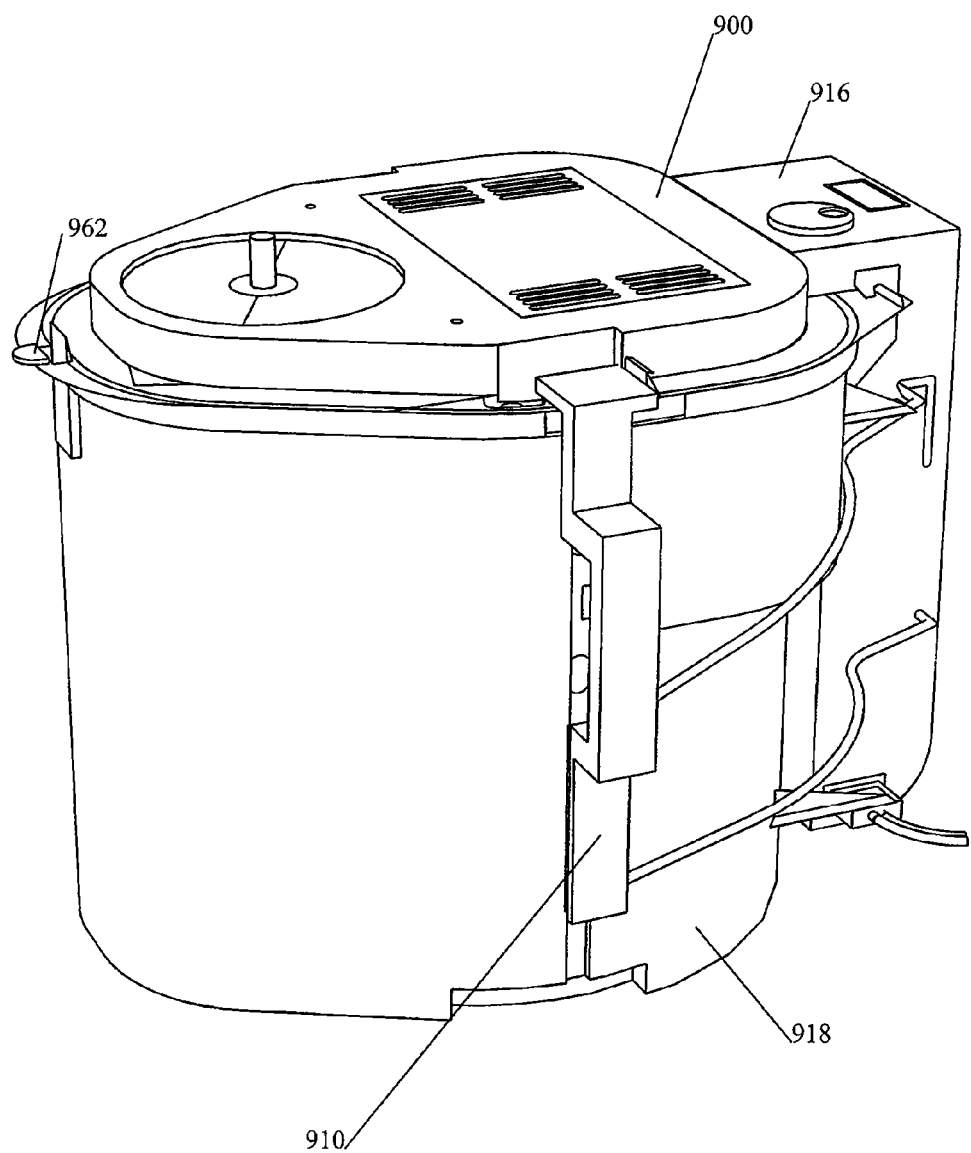

Electronic circuit 1082 is connected to an electronic heat sensor located on the lower end of tube 1116 (FIG. 107). When cooking liquid temperature is above a predetermined level which might injure the user in the event of direct contact (as a nonlimiting example, above 120° F.), even if the timer 1078 has expired and the exemplary embodiment is turned off, electronic circuit 1082 activates warning light 1118 which is located on the top of automated control box 916 (FIG. 107) and warns the user of the potential hazard of hot cooking liquid. This is a safety feature.

The control mechanisms in this exemplary embodiment may function similarly to those described earlier in this document for alternative exemplary embodiments. As a nonlimiting example, the control mechanisms may employ the following process. When timer 1078 is user set for the desired cooking time, the cooking liquid heater is turned on and remains on until the desired cooking temperature is reached. On the embodiment shown, this is a factory preset temperature. However, variant embodiments may employ a user set cooking temperature.

Either at the end of a factory set interval, or more advantageously, when the desired cooking temperature is reached, electronic circuit to 1082 activates the food lowering mechanism to lower the food into the cooking liquid. The food lowering/raising mechanism includes, but is not limited to: electronics circuit 1082, food support platform 940, lifting arms 1088 and 1090, crank disk 1084, and gear reduced lifting motor 1080.

The food remains in the cooking liquid until the end of the user set cooking time interval is reached. At this point, the food lowering/raising mechanism, activated by electronic circuit 1082, raises the food out of the cooking liquid. At this point electronic circuit 1082 turns off the heating coil and may or may not sound an alarm. Electronic circuit 1082 then delays for a preset time and sounds an alarm to indicate to the user that the food has been cooled and drained, and may be removed safely from the cooking vessel.

This exemplary embodiment may be produced using elements common with the previous exemplary embodiment, thus providing economies and flexibilities in manufacture. As a nonlimiting example, virtually all components except for the control box and handle assemblies may be commonly shared with both exemplary embodiments. A user could even interchange these components in their home, allowing for an easy way for a user to upgrade their product.

FIGS. 112, 113, 114, and 115 show a food holding basket system including: food containment baskets 911, 911A, 911B, as well as sheet food supports 1120, and 1120A. Food containment baskets 911, 911A, 911B share common construction as do sheet food supports 1120, and 1120A.

Figure 112:
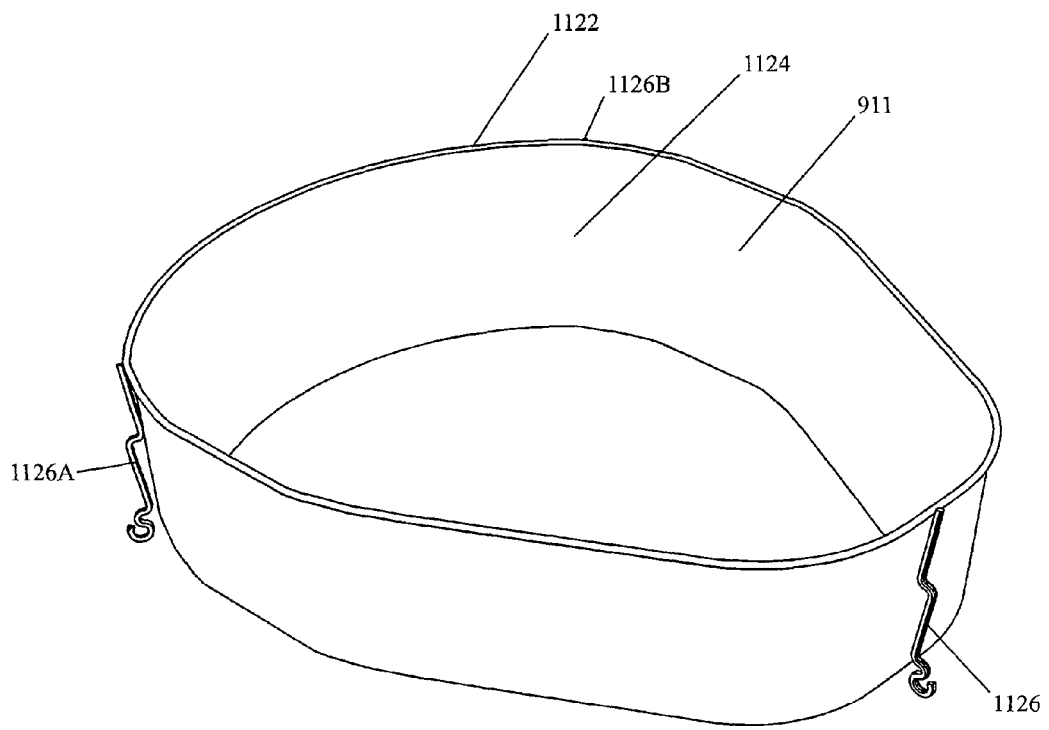

Referring to FIG. 112, food containment basket 911 has upper perimeter wire frame 1122 which mounts concave wire screen 1124 and springy bent rod support arms 1126, 1126A, and 1126B.

Figure 113:
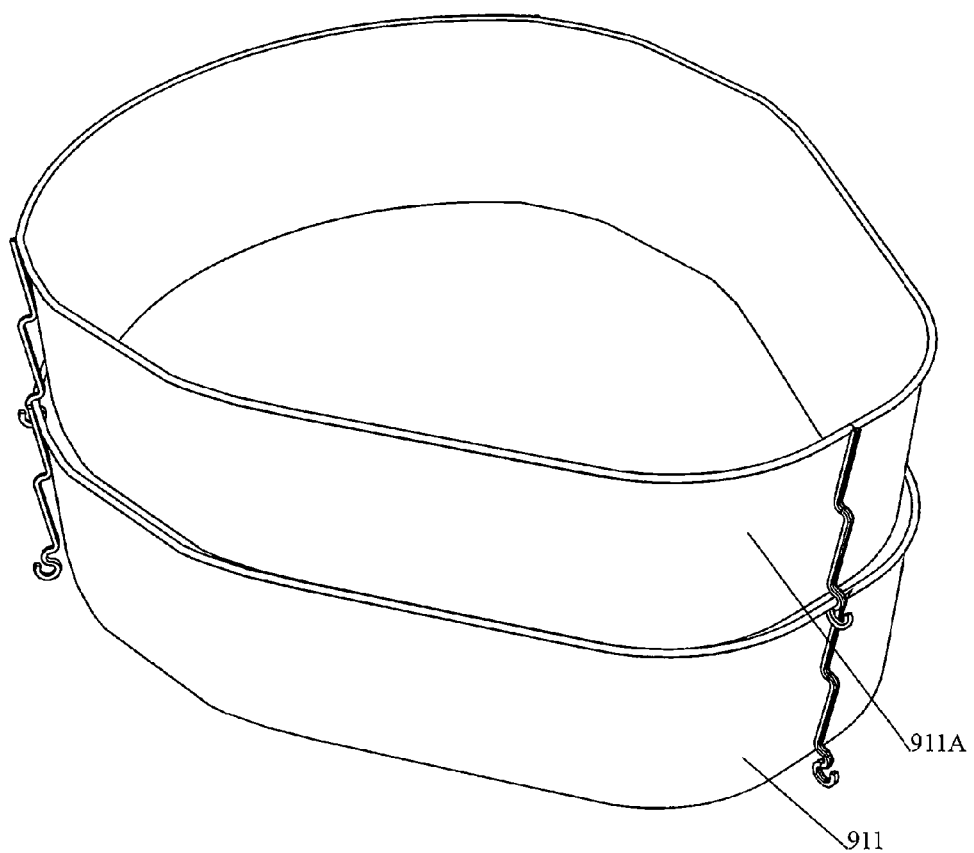
Figure 114:
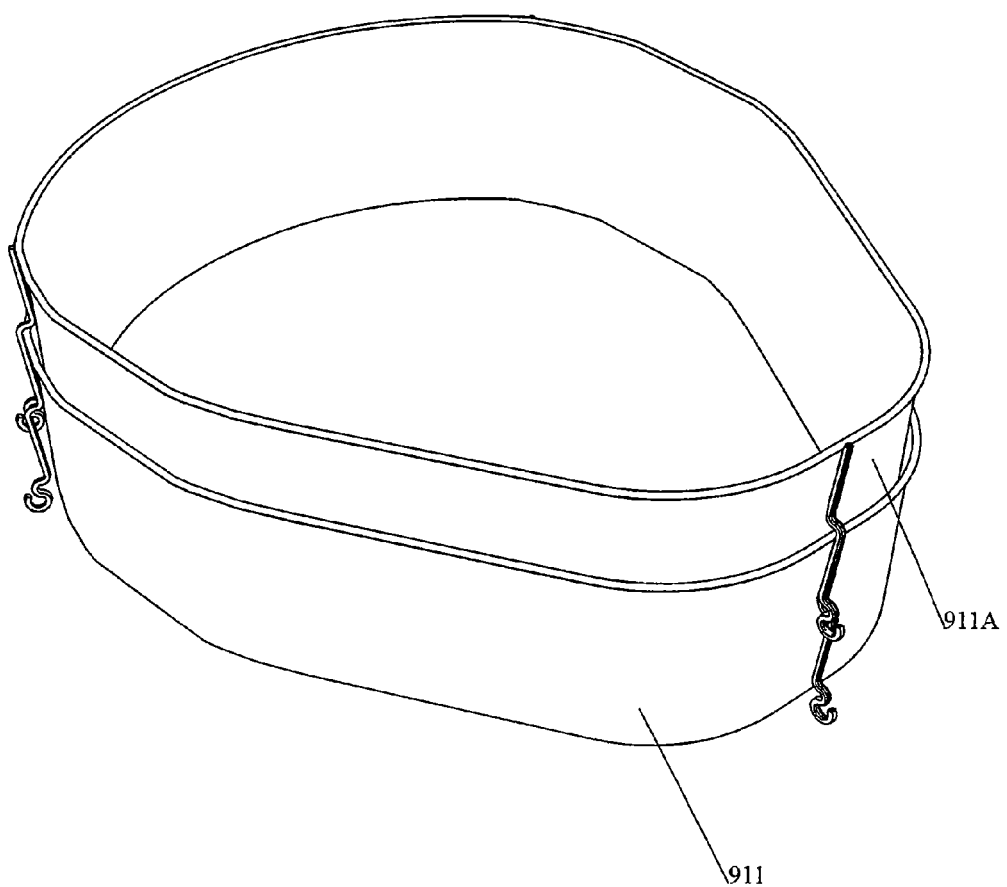

Referring to FIGS. 112, 113, 114, and 115, food containment basket 911 may rest and be supported on food support platform 940. Engagement of springy support arms 1126, 1126A, and 1126B of food containment basket 911A onto upper perimeter frame 1122 of containment basket 911, allows food containment basket 911A to mount on top of food containment basket 911 in one of two vertical positions as shown in FIGS. 113 and 114.

Figure 115:
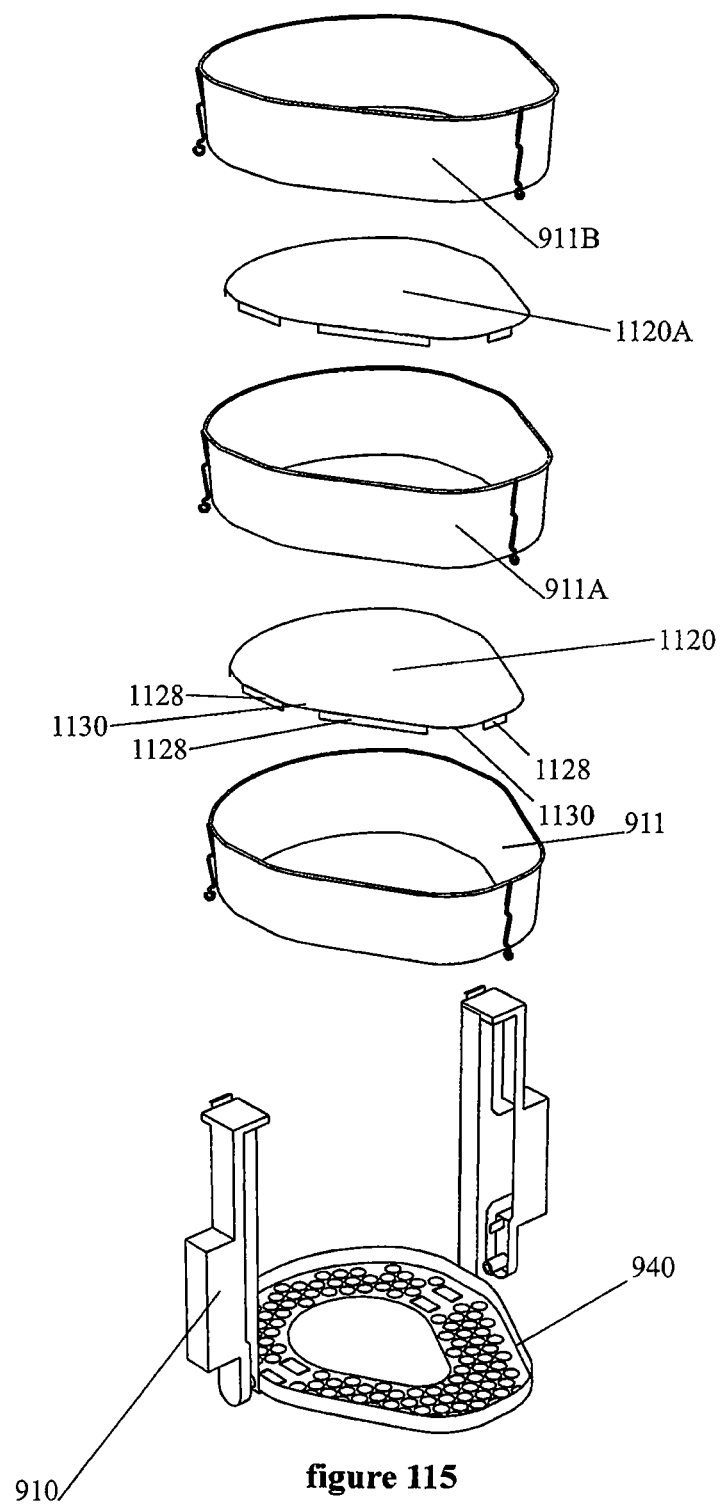

Food containment baskets 911, 911A, 911B, and sheet food supports 1120, and 1120A rest on, and generally mimic the plan view shape of, food support platform 940 (FIG. 115).

Basket 911 can be used alone in shallow cooking liquid to cook various foods such as onion rings and French fried potatoes. In these cases, as a nonlimiting example, a relatively small amount of oil is placed into cooking vessel 902 and heated, and food support platform 940, with food containing basket 911 on top of platform 940 is lowered into the cooking liquid.

Larger foods, such as, as a nonlimiting example, bigger cuts of meat, may also be cooked using just basket 911 alone and an appropriate amount of cooking liquid.

Basket 911A may also serve as just a lid for basket 911 in order to keep the content of basket 911 contained, and also possibly to keep the contents of basket 911 continuously submerged in the cooking liquid during the cooking process. To do this basket 911A may be in either its highest position (FIG. 113), or in its lowest position (FIG. 114).

Basket 911A in deeper cooking liquid may not only serve as a lid for food contained in basket 911, but it may contain food as well. In such an example, food may be placed between the floor of basket 911A and the floor of basket 911, as well as directly into basket 911A. Likewise, basket 911B may be attached to basket 911A for a three basket stack, with basket 911B either used as just a lid or as a lid and food container.

Using stacked baskets can greatly increase the amount of food the exemplary embodiment may cook.

Sheet food support 1120 fits within basket 911 and provides support for various types of food which cannot be cooked directly in a wire screen basket. As examples not to be construed as limiting, doughnuts, tempura, Hush Puppies, and many soft doughy foods bake onto wire screening during frying. Most of these foods are generally cooked by directly dropping the foods into a pool of hot oil. This, however, presents a safety hazard by exposing a user directly to an open pool of very hot cooking liquid which may sputter and boil upon food contact.

Such foods can be more safely cooked by placing them on top of sheet food support 1120, and possibly one or more additional sheet food supports stacked in baskets above sheet food support 1120 (FIG. 115), and placing the baskets on food support platform 940, and lowering the entire structure into hot cooking liquid with lid 900 closed to safely protect the user.

Sheet food support 1120 may have nonstick coating on its upper surfaces to facilitate foods not sticking to such upper surfaces.

Sheet food support 1120 has bent down edges 1128 to space it away from the wire screen floor of food containment basket 911.

During cooking, food placed on the upper surface of food support 1120 generally boils and floats away from the upper surface and is restrained from floating by contacting the undersurface of the floor of the wire basket directly above it, if such a basket is present. If such a basket is present, and if it has a sheet food support resting in it, the boiling action of the food can trap steam bubbles between the food floating against the overhead basket wire screen floor and the sheet food support resting on the wire screen floor of the overhead basket. This can cause uneven cooking of the food. To prevent this, bent down edges 1128 allows space between the wire screen floor of the overhead basket and the sheet food support resting on the wire screen floor.

Horizontal spaces 1130 between the bent down edges 1128 allow steam bubbles to exit from underneath the sheet food support without creating trapped steam bubbles which can cause uneven cooking.

It may be much safer to cook using sheet food support 1120 and having lid 900 lowered when food is: lowered into, cooked, and removed from hot cooking liquid.

All of the exemplary embodiments taught herein and in earlier documents to which this continuation in part is appended, may be constructed at any desired scale. As an example that is not to be construed as in anyway being limiting; in the exemplary embodiment directly above, it may be constructed for home kitchen countertop use. It might be particularly advantageous to construct such an exemplary embodiment so that it does not exceed 16½" in overall exterior height so that it will fit under most over countertop cabinets, at least for countertop storage. It would be even more advantageous if the height did not exceed 15½" to allow a margin of error for homes built which did not adhere strictly to accepted architectural standards.

Likewise, it is common for people to cook up to a 16 pound turkey for Christmas or Thanksgiving. To do this, it has been found advantageous to, in plan view, construct the interior of the cooking vessel to be between 10 inches and 14 inches at its widest point orthogonal to its generally symmetrical axes, and to be between 11 inches and 14½ inches along its generally symmetrical axis.

The exemplary embodiments taught herein have many features. To one knowledgeable in the art it would be obvious to combine features found in different embodiments taught herein in ways not specifically described in this document. As an example which should not be interpreted as being in anyway limiting, the system of emptying cooking oil from the cooking vessel by tipping and pouring the contents of the cooking vessel out through a pouring spout located on the upper rim of the cooking vessel, could be combined with one of the automated lift systems described at the very start of this document. Such apparent combinations should be considered as obvious and as part of the teachings herein.

What is claimed:

1. A hot fluid cooking vessel comprising:
    an enclosure having a bottom wall portion and a curved side wall portion extending upwardly from the bottom wall portion and terminating at an opening separated from the bottom wall portion by lower and upper portions of the enclosure defined by the curved side wall portion wherein a cross-section of the upper portion of the enclosure is broader than a cross-section of the lower portion of the enclosure, the enclosure comprising an outwardly directed annular rim portion at the opening and extending generally perpendicular to the side wall portion and generally in parallel with the bottom wall portion, the rim portion defining at least one overflow drain hole disposed in an associated, surrounding depression in the rim portion configured to permit a flow of associated cooking fluid from the enclosure, the annular rim including a generally perpendicular extension disposed radially outwardly of the curved side wall portion and the at least one overflow drain hole;
    an outer enclosure generally conforming to the bottom wall portion and curved side wall portion, operative to receive the enclosure in an internal cavity thereof so as to define a spaced, nested orientation therebetween, and wherein a separation cavity therebetween is oriented to receive effluent from the at least overflow drain hole;
    a resistive heating element received in the opening and configured to heat the associated cooking fluid in the enclosure;
    a lid configured to substantially cover the opening by engagement with an upper surface of the enclosure defined by the outwardly directed annular rim region; and,
    a food support surface in the enclosure, the food support surface being oriented so as to be interposed between the resistive heating element and associated food received in to the enclosure.

2. The hot fluid cooking vessel of claim 1 wherein the side wall portion defines a generally coffin-shaped cross section corresponding to a contour of fowl received therein.

3. The hot fluid cooking vessel of claim 2 further comprising a fill level indicator disposed on an exterior of the side wall portion and having at least one fluid path to an interior of the enclosure.

4. The hot fluid cooking vessel of claim 3 further comprising a hinged interconnection configured to hingedly connect the lid with the enclosure.

5. The hot fluid cooking vessel of claim 1 wherein:
    the rim portion defines a recess spaced apart from the upper surface; and,
    the at least one overflow drain hole is defined by the rim portion at the recess.

6. The hot fluid cooking vessel of claim 1 wherein the a resistive heating element is received in the opening of the enclosure so as to be oriented along the bottom wall portion and having a conductive path disposed along the side wall portion and through the opening.

7. The hot fluid cooking vessel of claim 1 wherein the side wall portion defines at least one side wall overflow drain hole disposed in adjacent the opening, and wherein the cooking vessel further comprises a fluid path from the overflow drain to an associated fluid overflow reservoir.

8. A deep fryer comprising:
    a vessel including a wall and a base defining a cavity configured to selectively receive associated cooking oil;
    a lid configured to selectively close the cavity of the vessel;
    a heating element extending into the cavity and being configured to heat the associated cooking oil received in the cavity;
    a food support surface configured to selectively lower an associated food article into the associated cooking oil received in the cavity of the vessel;
    an annular flange member disposed in a first horizontal plane relative to the base and extending radially outwardly from a top rim portion of the vessel;
    wherein the annular flange member defines at least one indented portion disposed in a second horizontal plane located between the first horizontal plane and the base of the vessel;
    wherein the annular flange member defines at least one passageway extending therethrough in an area outward of the top rim portion and in the indented portion, the at least one passageway being configured to selectively permit cooking oil to overflow from the vessel when a level of the cooking oil is increased above a predetermined overflow level as the associated food article is lowered into the cavity by the food support; and
    an outer enclosure generally conforming to the vessel, operative to receive the enclosure in an internal cavity thereof so as to define a spaced, nested orientation therebetween, and wherein a separation cavity therebetween is oriented to receive effluent from the at least one passageway.

9. The deep fryer according to claim 8 further including an outer enclosure wherein at least a portion of the vessel is received in the outer enclosure thereby defining a space therebetween.

10. The deep fryer according to claim 9 wherein the at least one passageway is in fluid communication with the space defined between the outer enclosure and the vessel.

11. The deep fryer according to claim 10 wherein:
an upper portion of the outer enclosure defines a generally circular upper rim; and,
the upper rim is selectively coupled with a radially outwardly extent of the annular flange member.

12. The deep fryer according to claim 10 wherein:
the an annular flange member defines at least one recess therein in the area outward of the top rim portion; and,
the at least one passageway is disposed at the at least one recess to selectively permit the cooking oil to overflow from the vessel and into the space defined between the outer enclosure and the vessel when a level of the cooking oil is increased above the predetermined overflow level.

13. The deep fryer according to claim 8 wherein:
the an annular flange member defines at least one recess therein in the area outward of the top rim portion; and,
the at least one passageway is disposed at the at least one recess.

14. A device to deep fry foods, the device comprising:
a vessel with a floor and a generally vertical side wall extending upwardly from the floor, and an upper rim at a top of the side wall, all defining a cavity configured to selectively receive associated cooking oil and associated food;
a heating element being configured to heat within the cavity, the associated cooking oil and the associated food;
an outer enclosure, the vessel being positioned within the outer enclosure, and the outer enclosure having a base, and a perimeter side wall extending upwardly from the base forming a reservoir configured to hold an overflow portion of the associated oil, wherein an opening is disposed in the vessel, adjacent to the upper rim and in a depression formed therein, configured to pass the associated oil from the cavity through the opening and into the reservoir if and when associated oil overflows the cavity;
an outer enclosure generally conforming to the vessel, operative to receive the enclosure in an internal cavity thereof so as to define a spaced, nested orientation therebetween, and wherein a separation cavity therebetween is oriented to receive effluent from the at least overflow drain hole.

15. The device of claim 14 wherein the opening is a slot disposed between the upper rim of the vessel and the perimeter sidewall of the outer enclosure.

16. The device of claim 14 wherein there are a plurality of slots disposed between the upper rim and the perimeter sidewall, and each slot being configured to pass oil overflowing the cavity into the reservoir associated.

17. The device of claim 14 wherein the reservoir extends below the floor.

18. The device of claim 14 wherein there is a generally vertical annular wall extending upward from the top of the vessel, and in cooperation with the vessel, the two forming a cooking chamber and the opening being disposed exterior to the cooking chamber.

19. The device of claim 18 wherein the generally vertical annular wall is configured to be mounted to and dismounted from the upper portion of the perimeter sidewall of the outer enclosure.

20. The device of claim 19 wherein the generally vertical annular wall is configured to, when dismounted from the upper portion of the perimeter sidewall, be stored surrounding the vessel.

* * * * *